United States Patent
Sasaki et al.

(10) Patent No.: US 9,277,217 B2
(45) Date of Patent: *Mar. 1, 2016

(54) VIDEO CODING DEVICE FOR CODING VIDEOS OF A PLURALITY OF QUALITIES TO GENERATE STREAMS AND VIDEO PLAYBACK DEVICE FOR PLAYING BACK STREAMS

(75) Inventors: Taiji Sasaki, Osaka (JP); Hiroshi Yahata, Osaka (JP); Tomoki Ogawa, Osaka (JP); Tadamasa Toma, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 312 days.

This patent is subject to a terminal disclaimer.

(21) Appl. No.: 13/978,458

(22) PCT Filed: Feb. 15, 2012

(86) PCT No.: PCT/JP2012/000974
§ 371 (c)(1),
(2), (4) Date: Jul. 5, 2013

(87) PCT Pub. No.: WO2012/111320
PCT Pub. Date: Aug. 23, 2012

(65) Prior Publication Data
US 2013/0287090 A1    Oct. 31, 2013

Related U.S. Application Data

(60) Provisional application No. 61/443,353, filed on Feb. 16, 2011.

(51) Int. Cl.
*H04N 11/02*    (2006.01)
*H04N 19/30*    (2014.01)
*H04N 19/597*   (2014.01)

(52) U.S. Cl.
CPC ......... *H04N 19/00424* (2013.01); *H04N 19/30* (2014.11); *H04N 19/597* (2014.11)

(58) Field of Classification Search
USPC ........................................ 375/240.01–240.29
See application file for complete search history.

(56) References Cited

U.S. PATENT DOCUMENTS 6,055,012 A  *  4/2000  Haskell et al. ................. 348/48
6,567,427 B1    5/2003  Suzuki et al.
(Continued)

FOREIGN PATENT DOCUMENTS

JP    10-191394    7/1998
JP    11-85966     3/1999
(Continued)

OTHER PUBLICATIONS

International Search Report issued May 22, 2012 in International (PCT) Application No. PCT/JP2012/000974.
(Continued)

*Primary Examiner* — Dave Czekaj
*Assistant Examiner* — Leron Beck
(74) *Attorney, Agent, or Firm* — Wenderoth, Lind & Ponack, L.L.P.

(57) ABSTRACT

Provided are video encoding device that encodes high-quality video, restricting increase of the required bandwidth, while maintaining playback compatibility with playback devices conforming to MPEG-2 standard, and video playback device. Data creation device 5401 includes: 2D compatible video encoder 2602 that generates stream conforming to MPEG-2 format by compress-encoding original video of normal quality; base-view video encoder 2605 that generates stream, composed of black images, that includes the same number of pictures as stream that is obtained by compress-encoding original video; and dependent-view video encoder 5409 that generates dependent-view video stream by compress-encoding higher-quality original video, by using, as reference pictures, pictures included in stream conforming to the MPEG-2 format that have the same time information as pictures included in the base-view video stream that correspond to pictures constituting higher-quality original video.

16 Claims, 106 Drawing Sheets

(56) References Cited

U.S. PATENT DOCUMENTS

| | | | |
|---|---|---|---|
| 6,573,819 B1* | 6/2003 | Oshima et al. | 386/329 |
| 7,720,999 B2* | 5/2010 | Lane | 709/247 |
| 8,373,700 B2* | 2/2013 | Terada et al. | |
| 8,584,190 B2* | 11/2013 | Lee et al. | |
| 2002/0034248 A1* | 3/2002 | Chen | 375/240.08 |
| 2004/0008774 A1* | 1/2004 | Takahashi et al. | 375/240.12 |
| 2005/0216950 A1* | 9/2005 | MacInnis | 725/135 |
| 2006/0171463 A1* | 8/2006 | Hanamura et al. | 375/240.13 |
| 2008/0089596 A1* | 4/2008 | Choi et al. | 382/238 |
| 2009/0103605 A1* | 4/2009 | Rodriguez et al. | 375/240.01 |
| 2009/0320081 A1* | 12/2009 | Chui et al. | 725/93 |
| 2010/0260484 A1* | 10/2010 | Hattori | 386/108 |
| 2010/0325676 A1 | 12/2010 | Kim et al. | |
| 2011/0010739 A1 | 1/2011 | Yun et al. | |
| 2011/0013884 A1 | 1/2011 | Sasaki et al. | |
| 2011/0090305 A1* | 4/2011 | Ikeda et al. | 348/42 |
| 2011/0216827 A1* | 9/2011 | Luo et al. | 375/240.12 |
| 2014/0204177 A1* | 7/2014 | Hattori | |

FOREIGN PATENT DOCUMENTS

| | | |
|---|---|---|
| JP | 2010-512096 | 4/2010 |
| JP | 2011-4411 | 1/2011 |
| JP | 2011-19224 | 1/2011 |

OTHER PUBLICATIONS

"Nikkei Electronics", Apr. 19, 2010, p. 55-62.

ISO/IEC 14496-10, Second edition Oct. 1, 2004, Information technology—Coding of audio-visual objects, "MPEG-4 Part 10: Advanced Video Coding".

* cited by examiner

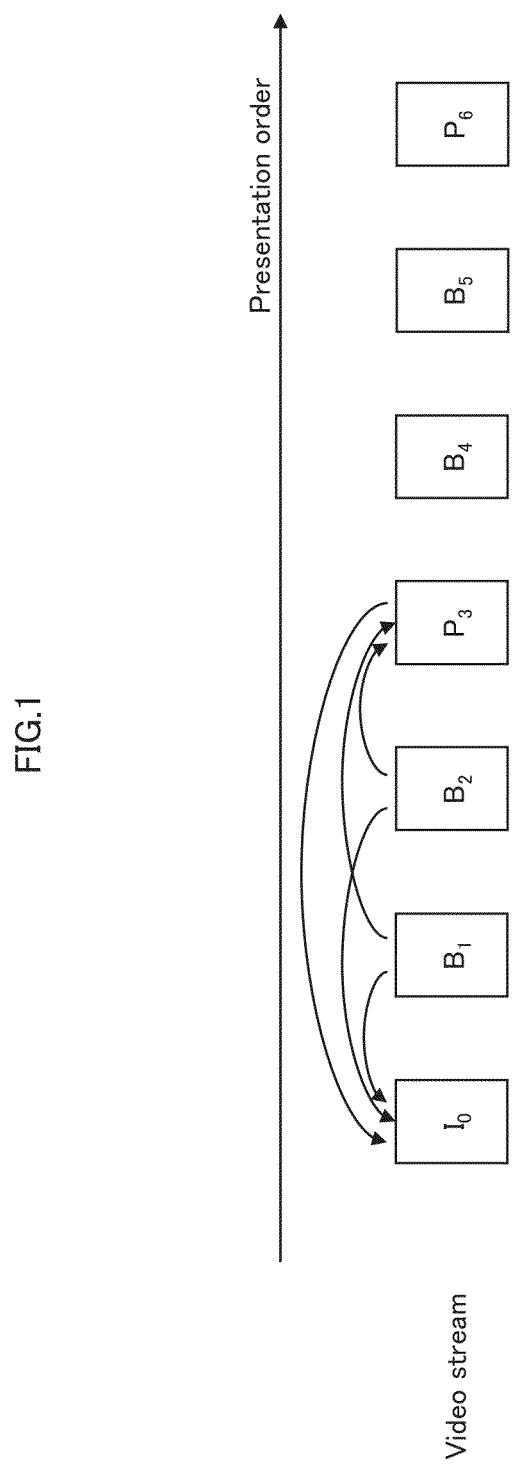

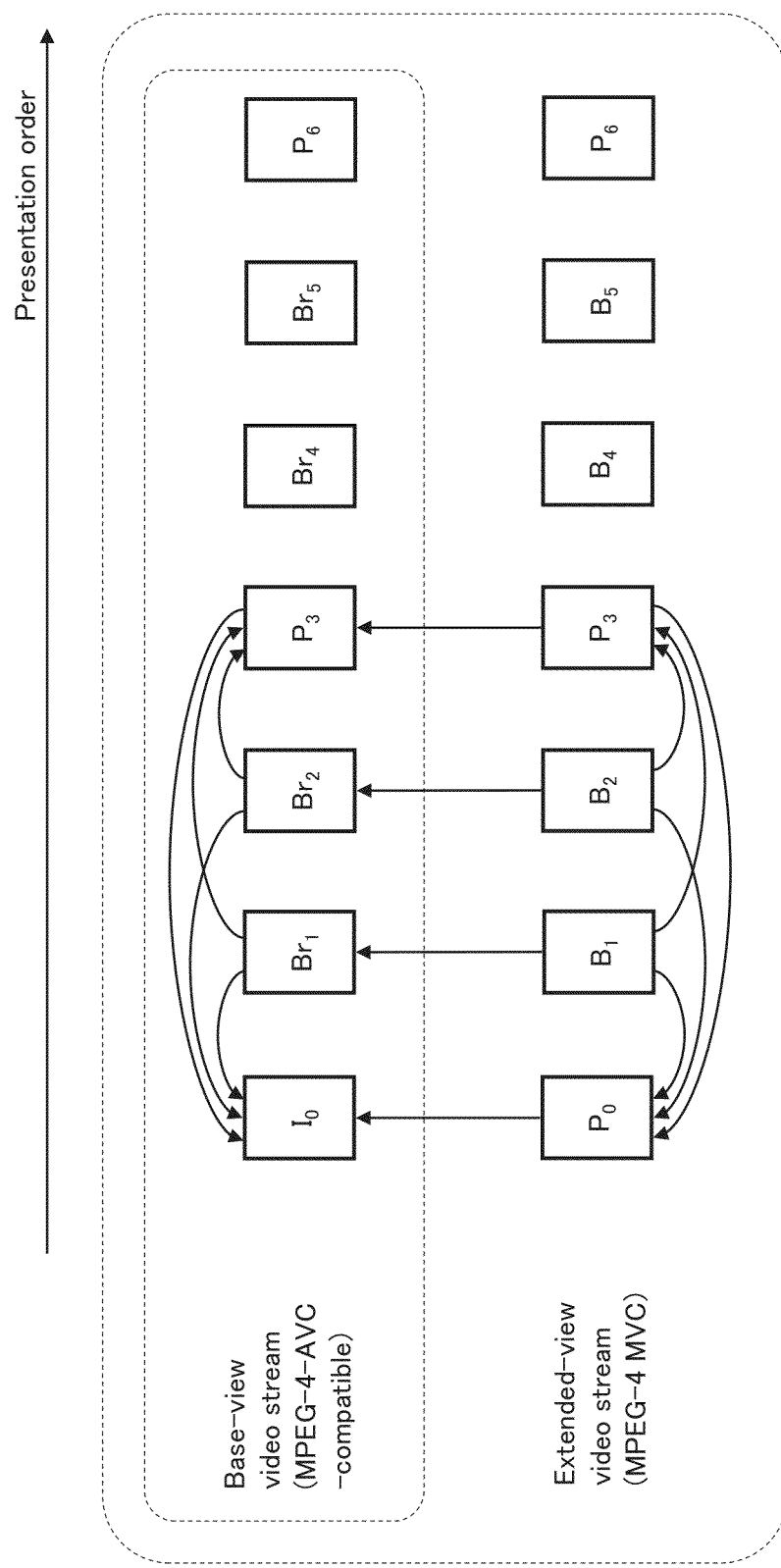

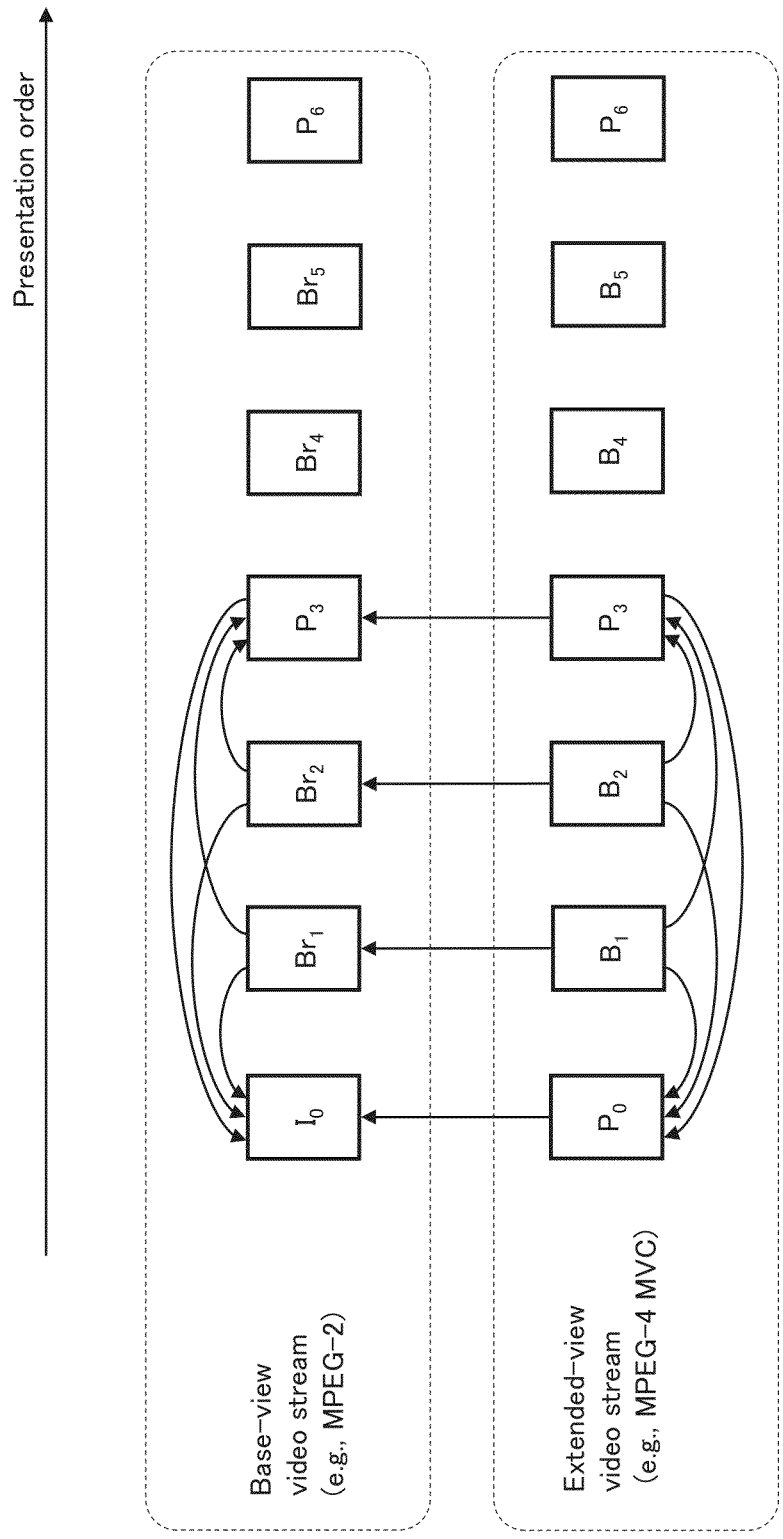

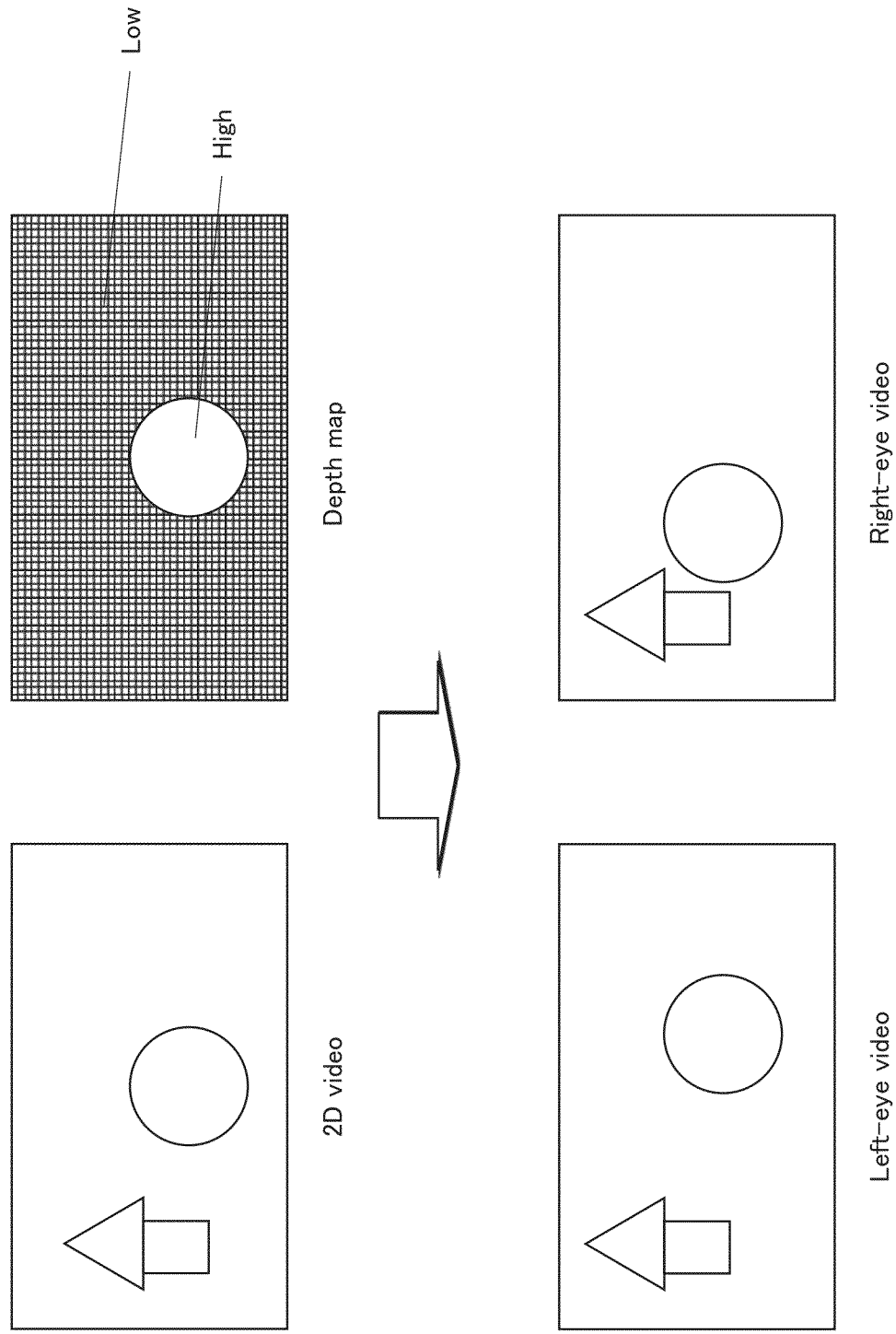

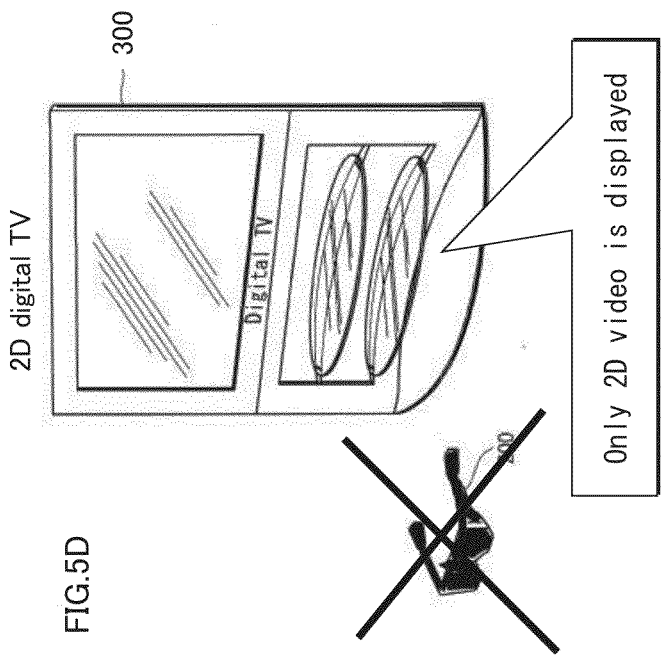
FIG.5D
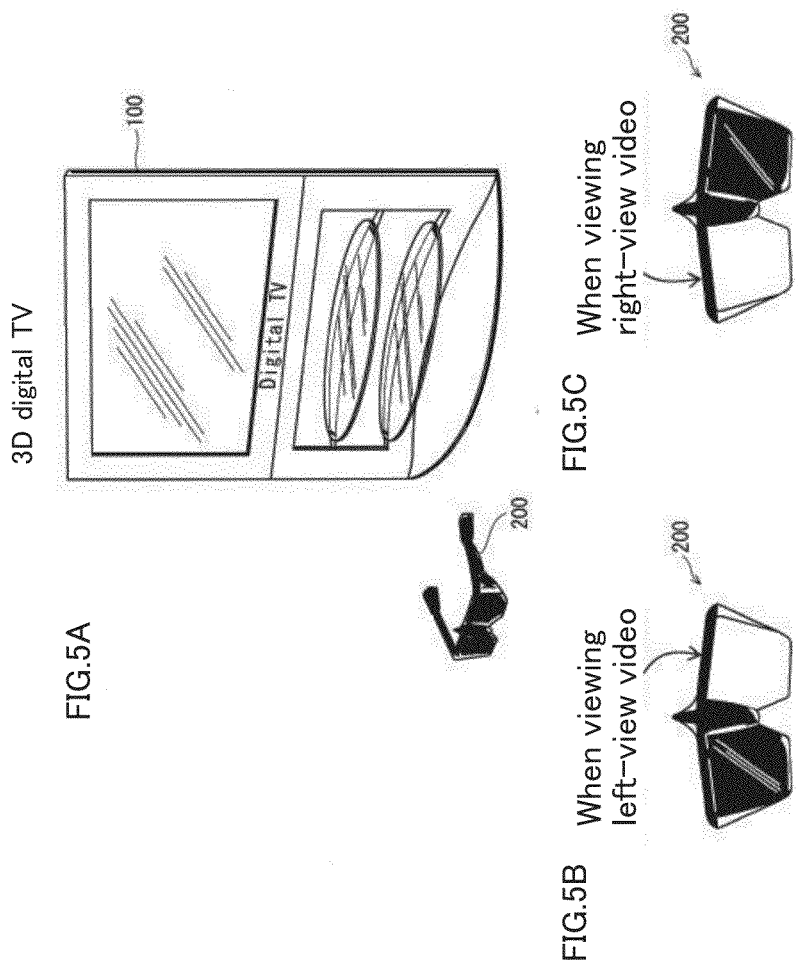
FIG.5A
FIG.5B
FIG.5C

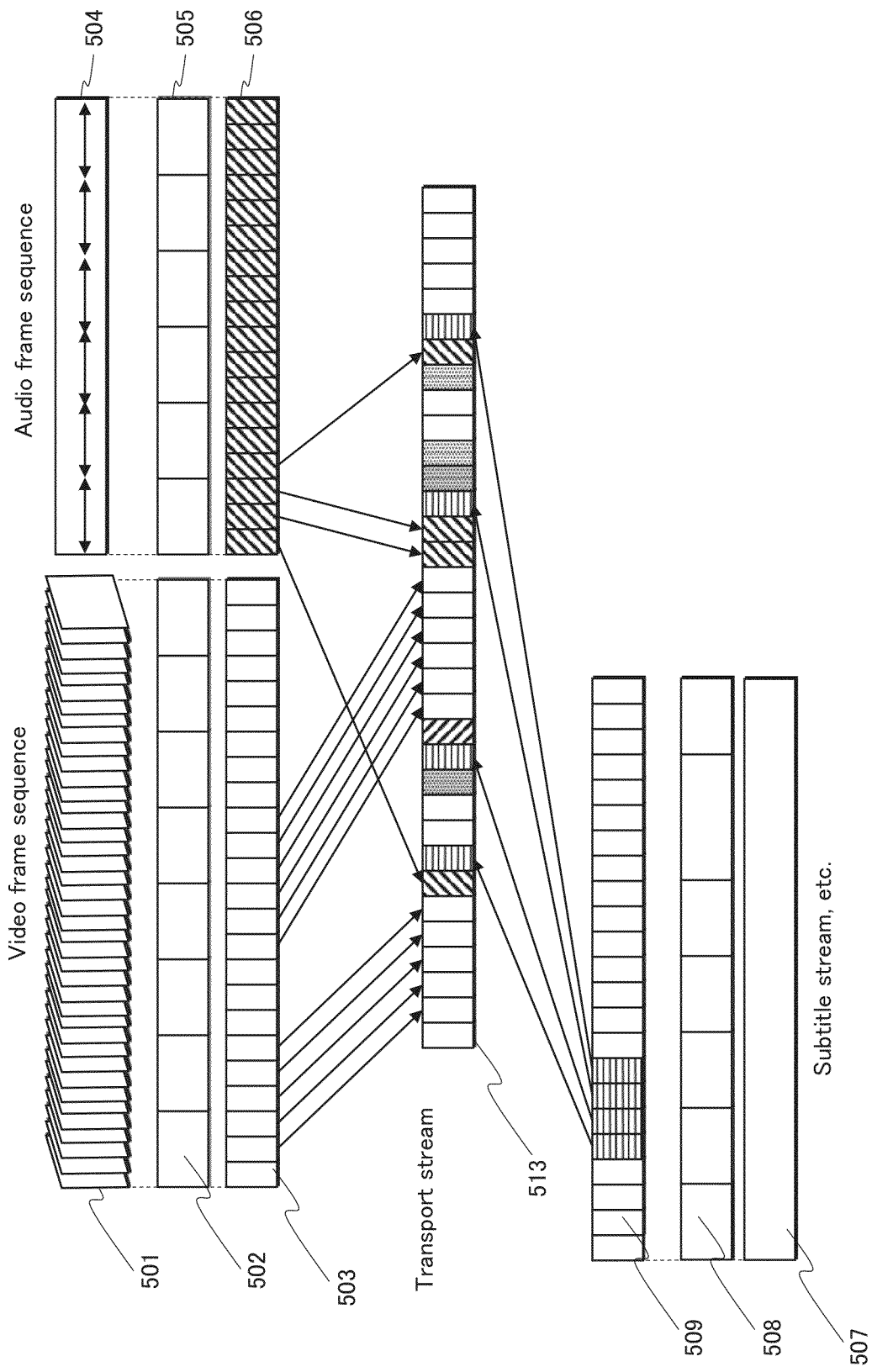

FIG.16
Access unit at head of GOP
| AU ID code | Sequence header | Picture header | Supplementary data | Compressed picture data | Padding data | Sequence end code | Stream end code |
Access units of GOP at other than head
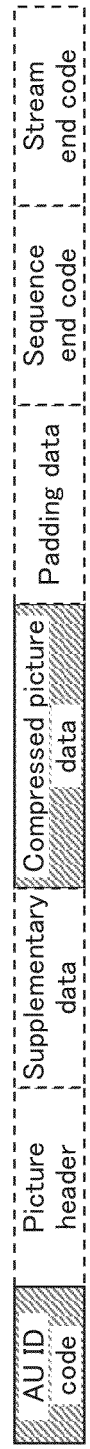
| AU ID code | Picture header | Supplementary data | Compressed picture data | Padding data | Sequence end code | Stream end code |

FIG.20
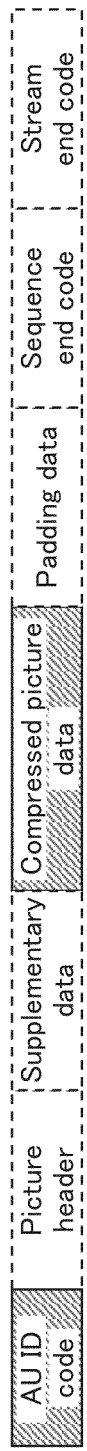
Access unit at head of GOP
Access units of GOP at other than head

FIG.22

Specific examples of video attributes to be matched between 2D compatible video stream and base-view/dependent-view video stream and field names of fields indicating video attributes

| Video attributes to be matched | Specific examples of fields indicating video attributes | |
|---|---|---|
| | 2D compatible video stream (MPEG-2) | Base-view/dependent-view video stream (MPEG-4 MVC) |
| Resolution | horizontal_size_value, vertical_size_value, | pic_width_in_mbs_minus1, pic_height_in_map_units_minus1 |
| Aspect ratio | aspect_ratio_information | aspect_ratio_idc |
| Frame rate | frame_rate_value | time_scale/num_units_in_tick/2 |
| Interlace or progressive | progressive_sequence | frame_mbs_only_flag |

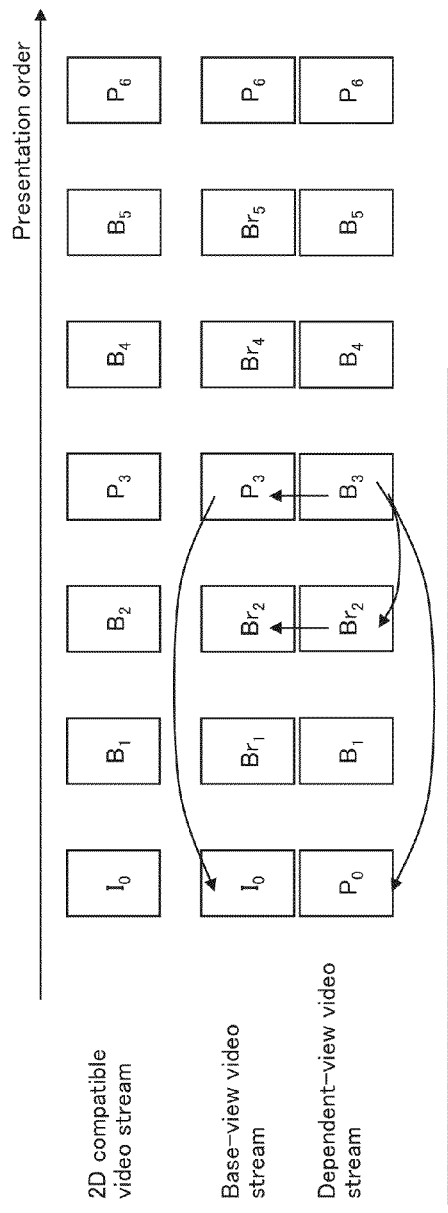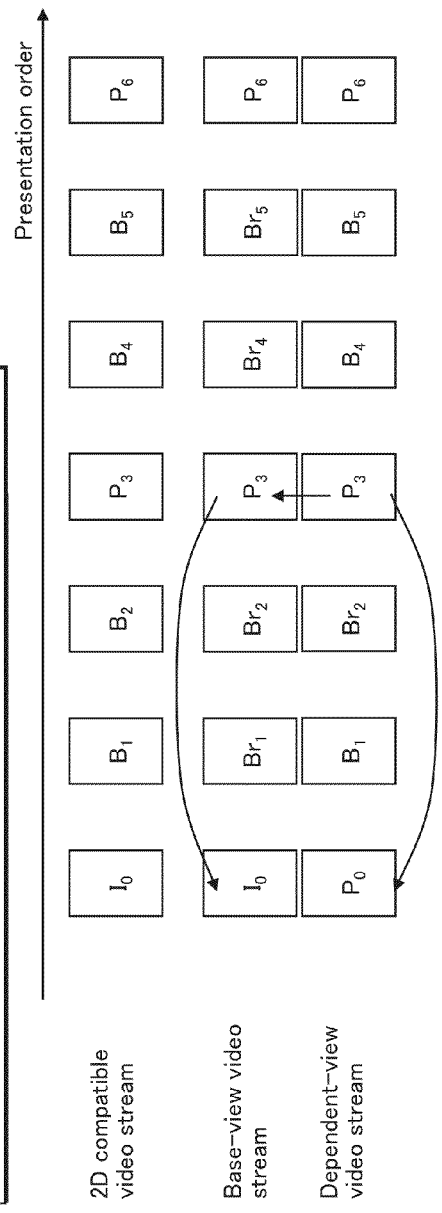
FIG.24

FIG.37

3D info descriptor

| Field name | Meaning |
|---|---|
| Playback format | Signaling of playback format<br>0: 2D video playback by playing back 2D compatible video<br>1: 3D video playback by playing back 2D compatible video and dependent-view video<br>2: 3D video playback by playing back base-view video and dependent-view video<br>3: 3D video playback by doubling playback |
| Left-eye video type | Type of left-eye video stream in playback of 3D video<br>0: 2D compatible video<br>1: Base-view video<br>2: Dependent-view video |
| 2D compatible video PID | PID of TS packets storing 2D compatible video stream |
| Base-view video PID | PID of TS packets storing base-view video stream |
| Dependent-view video PID | PID of TS packets storing dependent-view video stream |

FIG.39

3D stream descriptor

| Field name | Meaning |
|---|---|
| Base-view video type | Type of video contained in base-view video stream<br>0: Left-eye or right-eye video of 3D video<br>1: Dummy video to be replaced with 2D compatible video |
| Reference-target type | Video stream referenced by dependent-view<br>0: Base-view video<br>1: 2D compatible video |
| Reference type | Whether or not video stream is referenced by inter-view reference<br>0: Referenced<br>1: Not referenced |

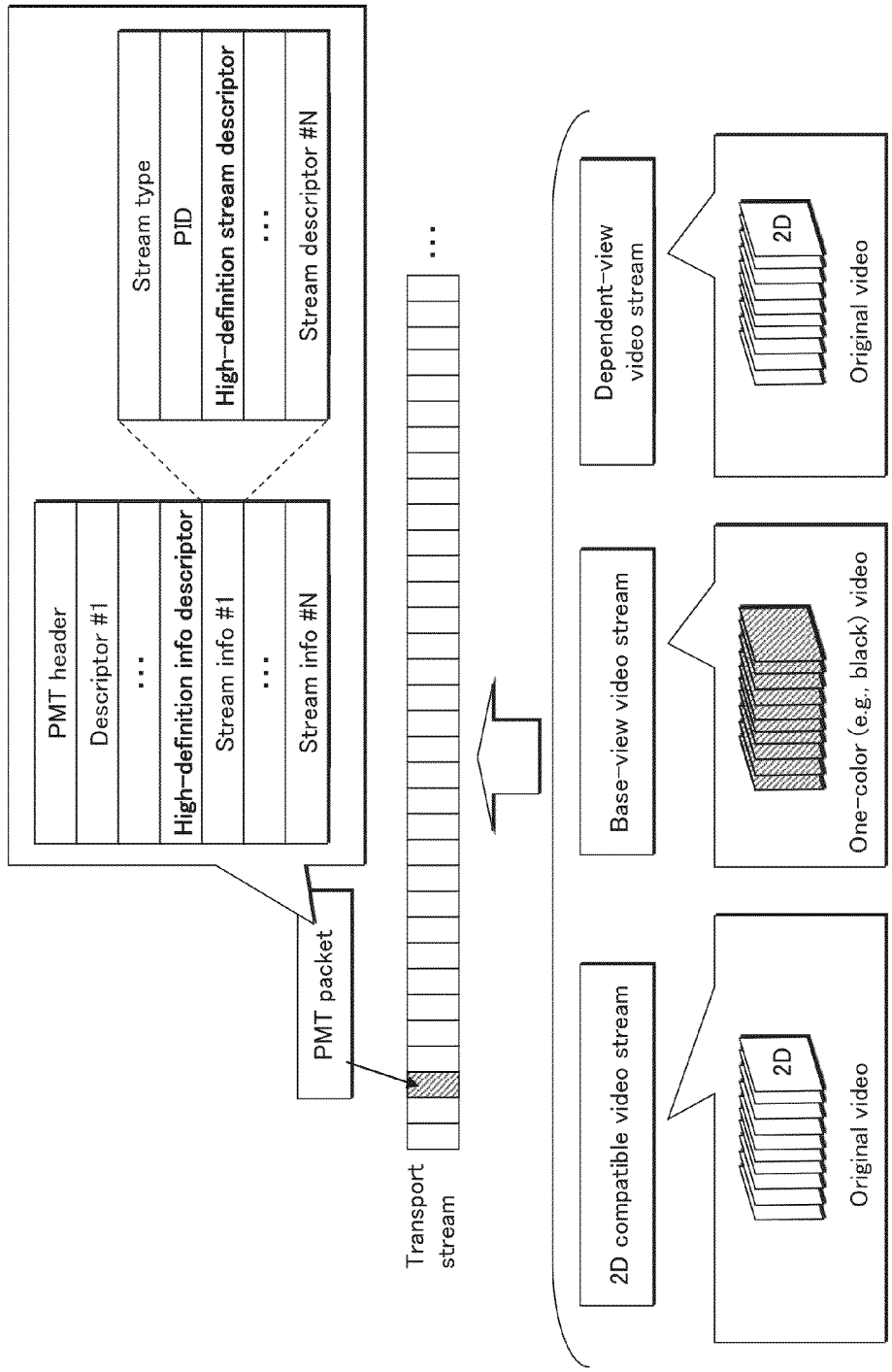

FIG.51

High-definition info descriptor

| Field name | Meaning |
|---|---|
| High-definition playback format | Signaling of playback format<br>0: 2D video playback by playing back 2D compatible video<br>1: High-definition video playback by playing back 2D compatible video and dependent-view video<br>2: High-definition video playback by playing back base-view video and dependent-view video<br>3: High-definition video playback by playing back base-view video |
| 2D compatible video PID | PID of TS packets storing 2D compatible video stream |
| Base-view video PID | PID of TS packets storing base-view video stream |
| Dependent-view video PID | PID of TS packets storing dependent-view video stream |

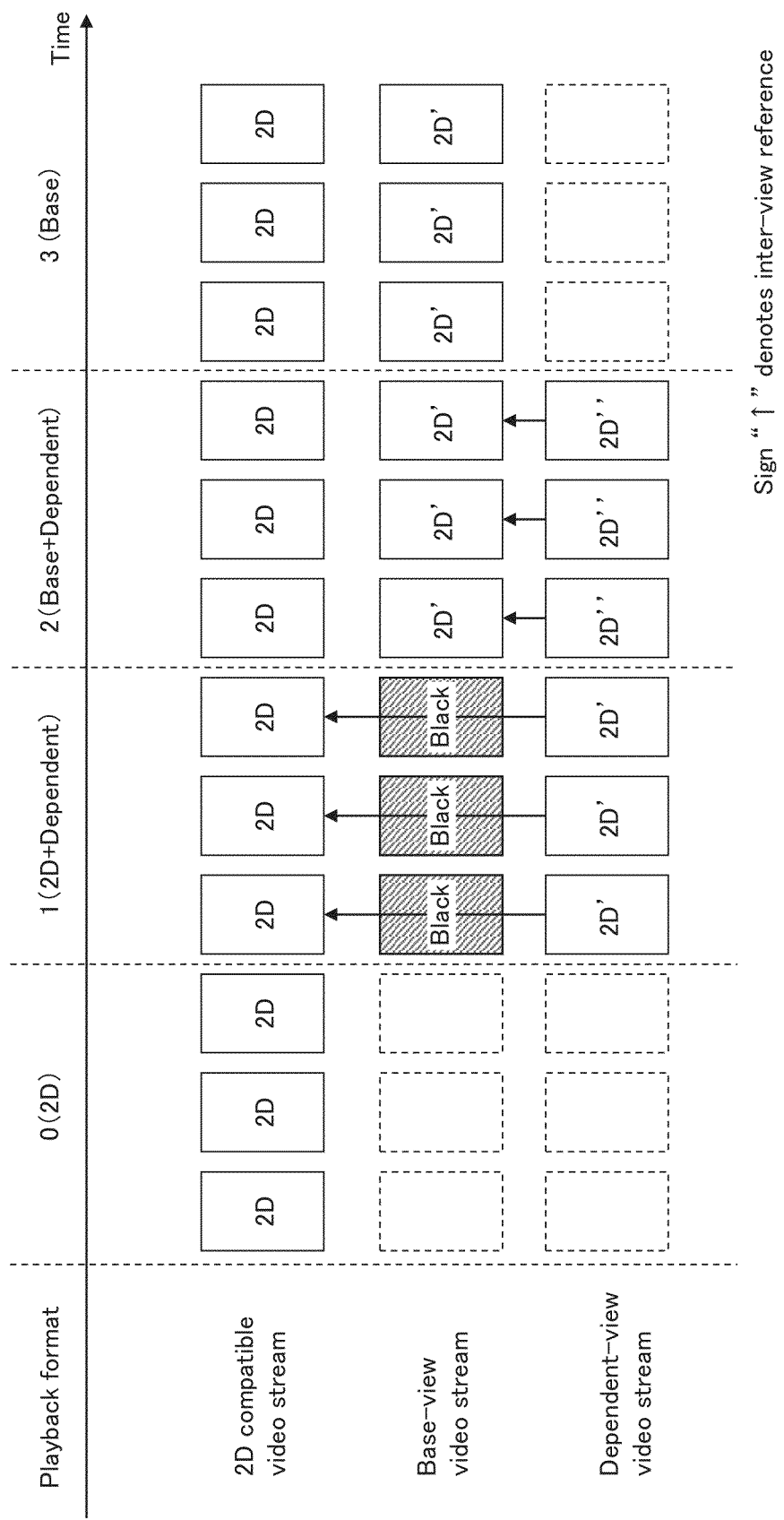

FIG.53

High-definition info descriptor

| Field name | Meaning |
|---|---|
| Base-view video type | Type of video contained in base-view video stream<br>0: Video storing basic video of high-definition video<br>1: Dummy video to be replaced with 2D compatible video |
| Reference-target type | Video stream referenced by dependent-view<br>0: Base-view video<br>1: 2D compatible video |
| Reference type | Whether or not video stream is referenced by inter-view reference<br>0: Referenced<br>1: Not referenced |

FIG.85

```
Playback format determination descriptor
{
    3D-playback_flag
    high-definition_flag
    high-color-depth_flag
    high-resolution_flag
    if(3D-playback_flag){
        info regarding 3D playback such as 3D playback info descriptor
    }
    if(high-definition_flag){
        info regarding high definition such as high-definition descriptor
    }
    if(high-color-depth_flag){
        info regarding high color depth such as high-color-depth descriptor
    }
    if(high-resolution_flag){
        info regarding high resolution such as high-resolution descriptor
    }
}
```

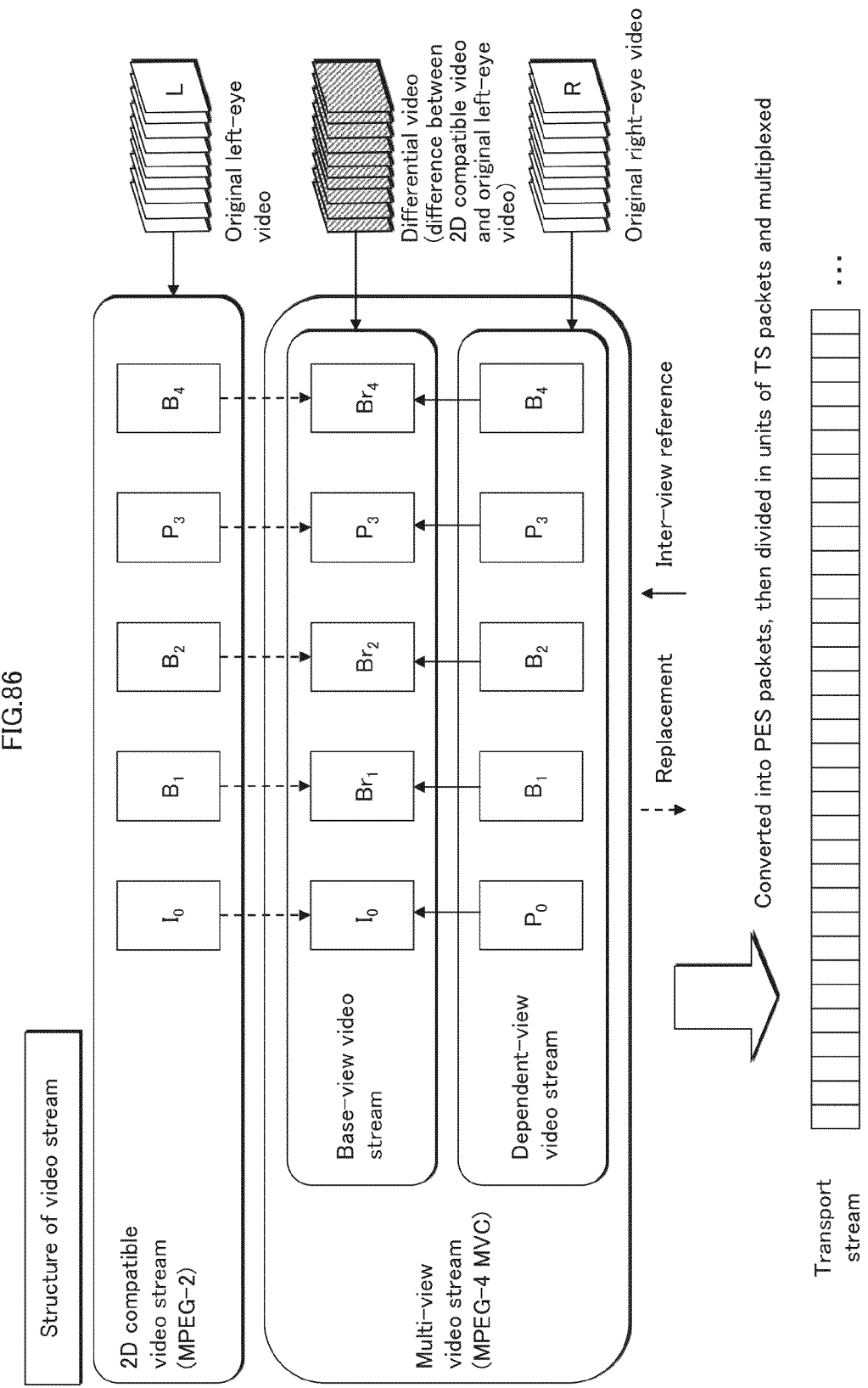

FIG.106
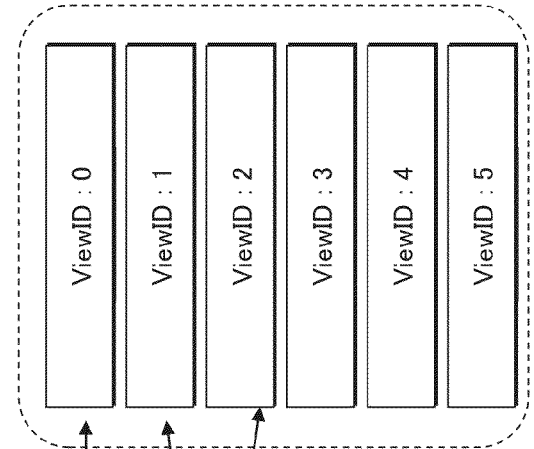
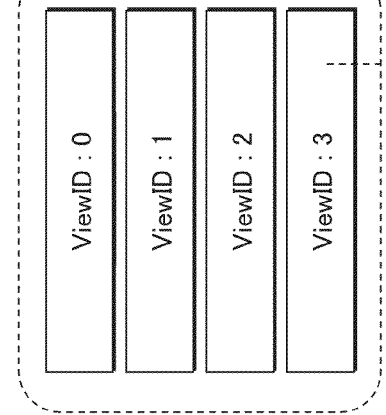

VIDEO CODING DEVICE FOR CODING VIDEOS OF A PLURALITY OF QUALITIES TO GENERATE STREAMS AND VIDEO PLAYBACK DEVICE FOR PLAYING BACK STREAMS

This application claims benefit to the U.S. Provisional Application No. 61/443,353, filed Feb. 16, 2011.

TECHNICAL FIELD

The present invention relates to a technology for encoding and decoding video, and in particular to maintaining playback compatibility.

BACKGROUND ART

In recent years, the digital TV broadcasting has become popular in Japan, U.S.A, and other countries. The video images and the like to be transmitted via the broadcast waves are compress-encoded based on the MPEG-2 (Moving Picture Experts Group-2) standard. Many viewers of the digital TV broadcasting have chances to view video of higher definition or resolution (hereinafter such video is referred to as "high-grade video"), via recording media such as BD (Blu-ray Disc). Accordingly, a demand to view high-grade video via the digital TV broadcasting is increasing. The encoding formats for compress-encoding with high efficiency high-grade video include, for example, the MPEG-4 MVC (Moving Picture Experts Group-4 Multiview Video Coding) format revised from the MPEG-4 AVC/H.264 standard (see Non-Patent Literature 1). The above demand will be satisfied if video that has been compress-encoded in such encoding format is broadcast.

However, the playback devices for the digital TV broadcasting that have already spread in the market support videos that have been compress-encoded in the MPEG-2 format, and cannot receive and play back videos compress-encoded in the MPEG-4 MVC format, even if such videos are broadcast. In this way, there is a problem regarding the playback compatibility. The problem of the playback compatibility will be avoided if video, which is multiplexed with video of a normal image quality having been compress-encoded in the MPEG-2 format and a high-grade video having been compress-encoded in the MPEG-4 format, is broadcast.

CITATION LIST

Non-Patent Literature

Non-Patent Literature 1:
ISO/IEC 14496-10 "MPEG-4 Part 10 Advanced Video Coding"

SUMMARY OF INVENTION

Technical Problem

However, when such video, in which video A of a normal image quality having been compress-encoded in the MPEG-2 format and video B which is a high-grade video having been compress-encoded in the MPEG-4 format have been multiplexed, is to be broadcast, a sum of bandwidths that are required to broadcast videos A and B is required, the sum being broader than the bandwidth required for broadcasting either video A or video B. This problem is not limited to the broadcasting. For example, when such video, in which video A of a normal image quality having been compress-encoded in the MPEG-2 format and video B which is a high-grade video having been compress-encoded in the MPEG-4 format have been multiplexed, is recorded on one recording medium or the like, the recording capacity required for recording both videos A and B equals the sum of the recording capacities required for recording the videos A and B respectively, which is larger than the recording capacity required for recording either video A or video B.

It is therefore an object of the present invention to provide a video encoding device that encodes a high-grade video, restricting increase of the required amount of data, while maintaining playback compatibility with playback devices conforming to the MPEG-2 standard, and a video playback device.

Solution to Problem

The above object is fulfilled by a video encoding device, comprising: a first encoding unit configured to generate a video stream conforming to MPEG-2 format by compress-encoding a first video of a first quality converted from an original video; a second encoding unit configured to generate a base-view video stream and a dependent-view video stream both conforming to MPEG-4 MVC format that allows for an inter-view reference; and an outputting unit configured to output the video streams generated by the first encoding unit and the second encoding unit, wherein the second encoding unit generates, as the base-view video stream, a video stream that is dummy data including the same number of pictures as, and having less total data amount than, the video stream generated by compress-encoding the first video, and generates the dependent-view video stream by compress-encoding a second video by using, as reference pictures, pictures included in the video stream conforming to the MPEG-2 format that have the same time information as pictures included in the base-view video stream and corresponding to pictures constituting the second video, the second video being of a second quality higher than the first quality and being converted from the original video.

Advantageous Effects of Invention

With the above-described structure, the video encoding device can compress-encode the video of the second quality higher than the first quality, restricting increase of the required amount of data compared with conventional technologies, while maintaining playback compatibility of the video of the first quality, with playback devices conforming to the MPEG-2 standard.

BRIEF DESCRIPTION OF DRAWINGS

FIG. 1 illustrates the reference relationship among pictures in a video stream.
FIG. 2 illustrates encoding in the MPEG-4 MVC format.
FIG. 3 illustrates picture reference when the base view and the dependent view are based on different codecs.
FIG. 4 is a schematic diagram illustrating one example of generating disparity images of left-eye and right-eye images from a 2D video and a depth map.
FIGS. 5A-5D illustrate a use form of the playback device.
FIG. 6 illustrates the structure of a digital stream in the transport stream format.

FIG. 16 illustrates the structure of the video access unit.

FIG. 20 illustrates the data structure of video access units included in the dependent GOP.

FIG. 22 illustrates video attributes to be matched between the 2D compatible video stream conforming to MPEG-2 video and the multi-view video stream conforming to MPEG-4 MVC, and field names of the fields indicating the video attributes.

FIG. 24 illustrates one example of preferred relation among pictures facilitating the trick play in the 2D compatible video stream, the base-view video stream, and the dependent-view video stream.

FIG. 37 illustrates the structure of the 3D information descriptor.

FIG. 39 illustrates the structure of the 3D stream descriptor.

FIG. 50 illustrates the relation between the structure of the transport stream and the PMT packets in Embodiment 2.

FIG. 51 illustrates the structure of the high-definition information descriptor.

FIG. 52 illustrates the high-definition playback format.

FIG. 53 illustrates the structure of the high-definition stream descriptor.

FIG. 85 illustrates the structure of the playback format determination descriptor.

FIG. 86 illustrates the data structure in a modification of Embodiment 1.

FIG. 106 illustrates the data structure for realizing the inter-view reference between different multi-view streams in a modification of Embodiment 1.

DESCRIPTION OF EMBODIMENTS

1. Embodiment 1

<1-1 Summary>

A broadcast system in an embodiment of the present invention generates a 2D video in the MPEG-2 format that is an existing technology, generates a 3D video composed of a base-view video stream and a dependent-view video stream, in a new format which is generated by extending the MPEG-4 MVC format (in the present embodiment, the new format is referred to as a format compliant with MPEG-4 MVC or an MPEG-4-MVC-compliant format), and transmits the generated videos.

On the receiving side, a 2D playback part of a playback device decodes the stream, which has been encoded in the MPEG-2 format, in an existing decoding format, and a 3D playback part decodes the base-view video stream and the dependent-view video stream, which have been encoded in compliance with the MPEG-4 MVC, in a decoding format corresponding to the new encoding format, and the decoded streams are played back.

Figure 21:
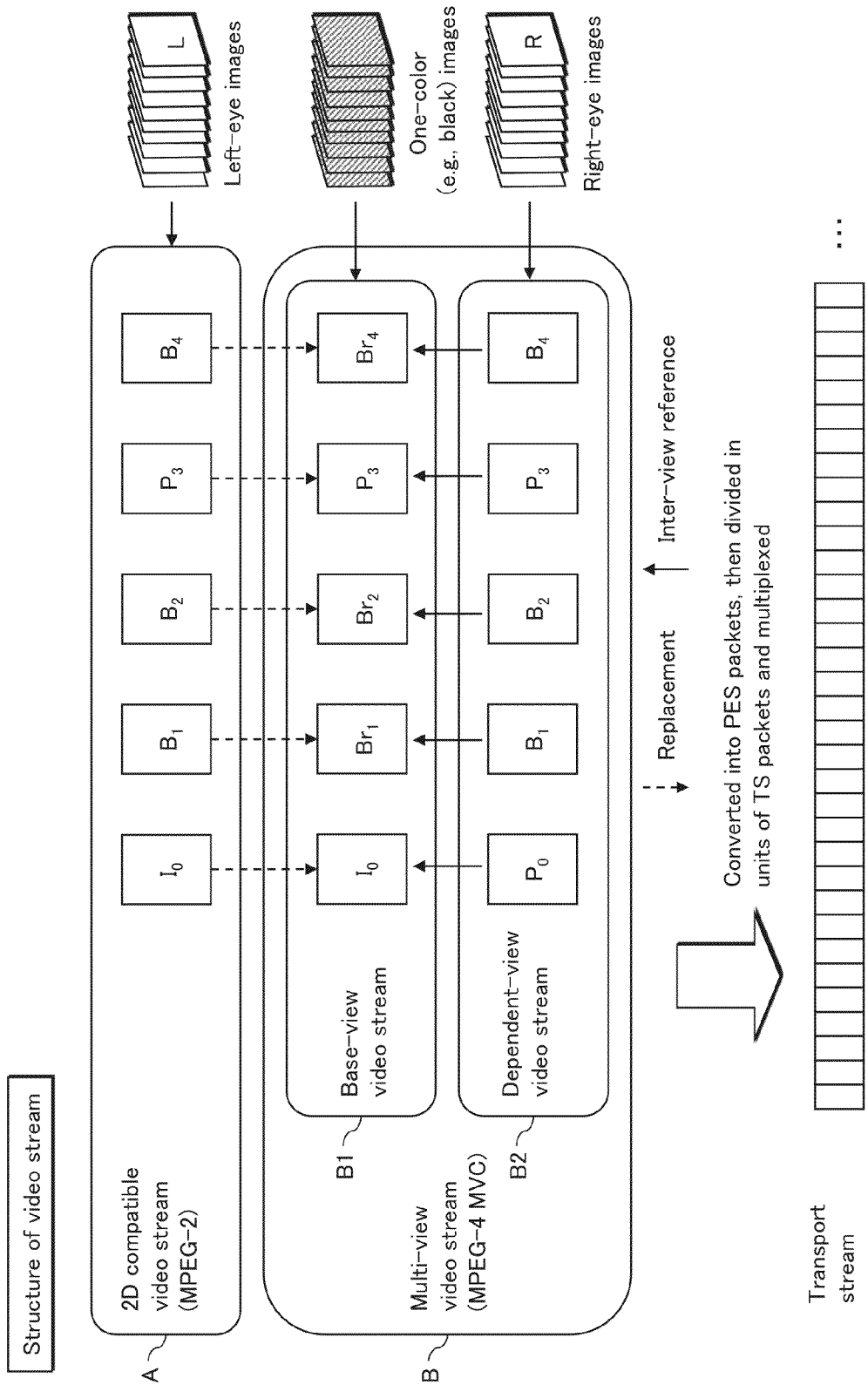
FIG. 21 illustrates the data structure of the transport stream.

FIG. 21 illustrates the data structure of the transport stream generated by the broadcast system of the present embodiment. As illustrated in FIG. 21, the transport stream is composed of a 2D compatible video stream A and multi-view video stream B. The latter multi-view video stream B is composed of a base-view video stream B1 and a dependent-view video stream B2. The 2D compatible video stream A is generated by compress-encoding left-eye images, and the base-view video stream B1 is generated by compress-encoding one-color (e.g., black) images (hereinafter, the one-color image is referred to as a "black image"). Furthermore, the dependent-view video stream B2 is generated by compress-encoding the difference between the left-eye images and the right-eye images. As described above, the base-view video stream B1 is generated by compress-encoding the black images and thus cannot used as reference images when the dependent-view video stream B2 is generated. This is the difference from the existing MPEG-4 MVC format, and the frame images of the 2D compatible video stream A to which the same values of time are allocated as to the frame images of the base-view video stream B1 are used as the reference images.

With the above streams in the MPEG-4-MVC-compliant format, both the 2D video and 3D video can be transmitted, and the base-view video stream B1 is generated by compress-encoding the black images. This lowers the bit rate extremely. As a result, both the 2D video and 3D video can be transmitted within the existing assigned frequency bands. When streams having been compress-encoded in the MPEG-4 MVC format are decoded, the dependent-view video stream is decoded by referencing frame images of the base-view video stream. In the present embodiment, the dependent-view video stream is decoded by referencing frame images of the 2D compatible video stream which is generated by compress-encoding left-eye images in conformance with the MPEG-2 format. The MPEG-4-MVC-compliant format defines, for example, a descriptor that instructs the playback side to change the reference target in decoding from the base-view video stream to the 2D compatible video stream.

The following describes the data creation device and playback device in one embodiment of the present invention with reference to the accompanied drawings.

<1-2. Data Creation Device>
<1-2-1. Structure>

The following describes the data creation device in an embodiment of the present invention with reference to the accompanied drawings.

Figure 26:
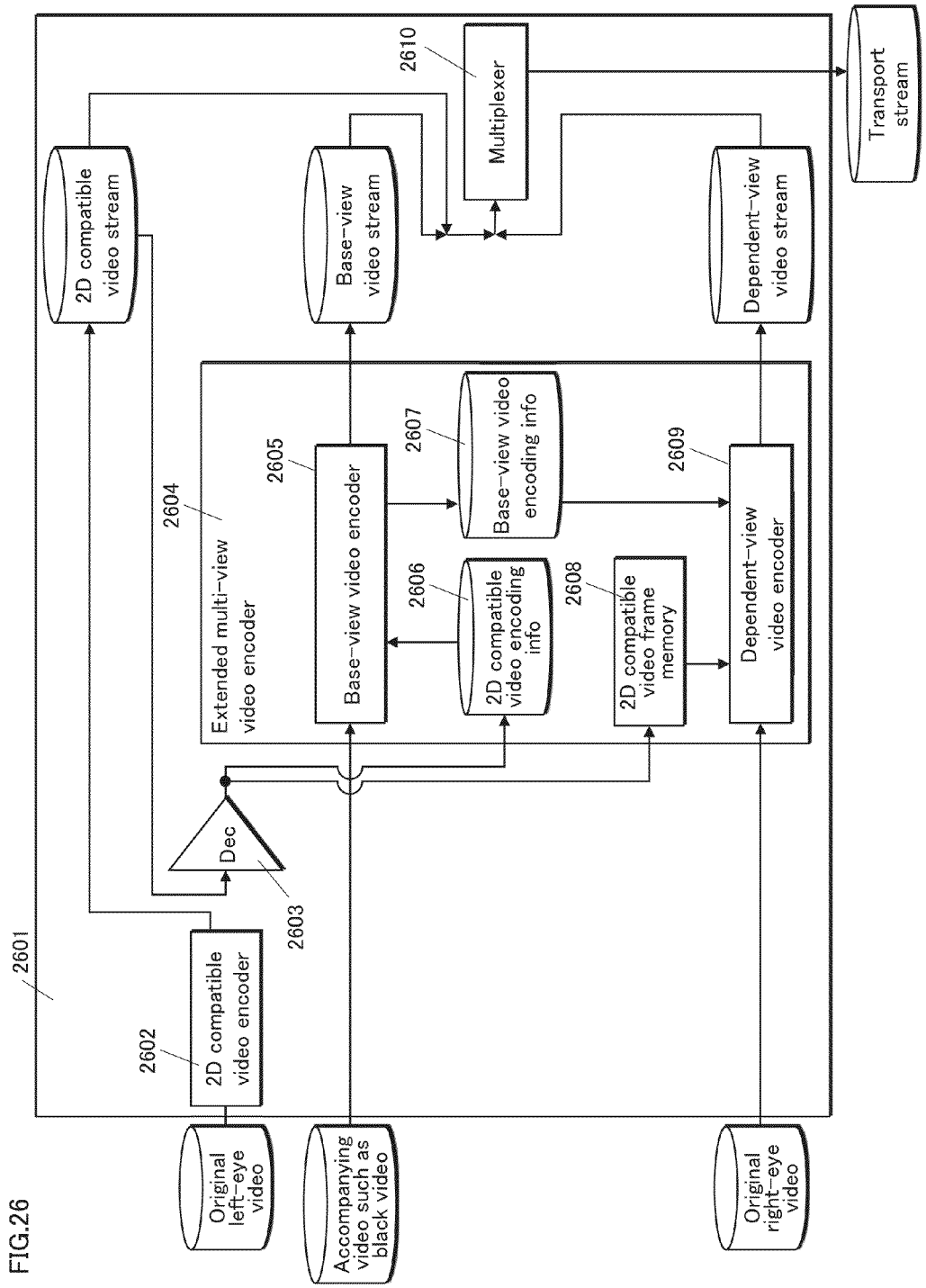
FIG. 26 illustrates the data creation device according to Embodiment 1.

FIG. 26 illustrates the functional structure of a data creation device 2601 according to the present embodiment.

The data creation device 2601 inputs (i) left-eye and right-eye image sequences constituting a 3D video and (ii) a black image sequence, and outputs a transport stream composed of a 2D compatible video stream, a base-view video stream, and a dependent-view video stream that conform to a data format described below.

The data creation device 2601 includes a 2D compatible video encoder 2602, a Dec (2D compatible video decoder) 2603, an extended multi-view video encoder 2604, and a multiplexer 2610.

The extended multi-view video encoder 2604 includes a base-view video encoder 2605, a 2D compatible video frame memory 2608, and a dependent-view video encoder 2609.

The 2D compatible video encoder 2602 inputs a left-eye image sequence, generates a 2D compatible video stream by compress-encoding the left-eye image sequence in the MPEG-2 format, and outputs the 2D compatible video stream.

The Dec 2603 decodes compress-encoded pictures in the 2D compatible video stream, and outputs decoded pictures resulted from the decoding and 2D compatible video encoding information 2606. It is to be noted here that the picture is an image constituting a frame or a field, and is one unit of encoding. The decoded pictures are stored in a 2D compatible video frame memory 2608 of the extended multi-view video encoder 2604. Also, the 2D compatible video encoding information 2606 is input into the base-view video encoder 2605.

The 2D compatible video encoding information 2606 includes: attribute information (resolution, aspect ratio, frame rate, specification of progressive or interlace, etc.) of the decoded 2D compatible video stream; picture attribute information (picture type, etc.) of the target picture; GOP (Group of Pictures) structure; and 2D compatible video frame memory management information.

The 2D compatible video frame memory management information is information that associates, with regard to decoded pictures stored in the 2D compatible video frame memory 2608, memory addresses, presentation order information (such as PTS (Presentation Time Stamp) and temporal_reference) and encode order information (such as an encode order of files and DTS (Decoding Time Stamp)) with each other.

The extended multi-view video encoder 2604 inputs and compress-encodes the decoded pictures and 2D compatible video encoding information output from the Dec 2603, right-eye images and black images, and outputs the base-view video stream and dependent-view video stream.

The base-view video encoder 2605 has a function to output, as the base-view video stream, data that has been compress-encoded in compliance with the MPEG-4 MVC format. More specifically, the base-view video encoder 2605 compress-encodes the black images in accordance with the 2D compatible video encoding information 2606, and outputs the base-view video stream and the base-view video encoding information 2607.

The base-view video encoding information 2607 includes: attribute information (resolution, aspect ratio, frame rate, specification of progressive or interlace, etc.) of the base-view video stream; picture attribute information (picture type, etc.) of the target picture; GOP structure; and base-view video frame memory management information.

The base-view video encoder 2605, when outputting the base-view video encoding information 2607, causes the attribute information of the base-view video stream to include the same values as the attribute information in the 2D compatible video encoding information 2606. Furthermore, the base-view video encoder 2605 compress-encodes each black image by determining the picture type of a picture having the same value of presentation time that is to be compress-encoded, in accordance with the picture attribute information (picture type, etc.) and the GOP structure included in the 2D compatible video encoding information 2606. For example, when the picture type of a picture at time "a" is I-picture according to the 2D compatible video encoding information 2606, and the picture is located at the head of a GOP, the base-view video encoder 2605 compress-encodes a black image having the same value of presentation time as the picture into an I-picture, and allocates it as a video access unit at the head of a GOP in the base-view video stream.

Also, when the picture type of a picture at time "b" is B-picture according to the 2D compatible video encoding information 2606, the base-view video encoder 2605 compress-encodes a black image having the same value of presentation time as the picture into a B-picture. When doing this, the base-view video encoder 2605 causes the DTS and PTS of the base-view video stream to match the DTS and PTS of a picture corresponding to a view having the same time in the 2D compatible video stream.

The base-view video frame memory management information is information that associates two syntax elements with each other, wherein the first one of the two syntax elements indicates a memory address in the frame memory 2608 of a decoded picture which is obtained by decoding a 2D compatible video stream based on the 2D compatible video frame memory management information, and presentation order information and encode order information of the decoded picture, and the second one of the two syntax elements is obtained by converting the first syntax element in conformance with the rules defined the compress-encoding method of the base-view video stream. The syntax elements are elements defining attribute information necessary for encoding by a compress-encoding method conforming to the MPEG-2 or MPEG-4 MVC format, and indicating, for example, header information such as macro block type, motion vector, and conversion coefficient.

The dependent-view video encoder 2609 has a function to generate the dependent-view video stream in the MPEG-4-MVC-compliant format. More specifically, the dependent-view video encoder 2609 compress-encodes the right-eye images based on information included in the base-view video encoding information 2607, and outputs the dependent-view video stream. Here, the dependent-view video encoder 2609 performs the compress-encoding by referencing, by the inter-view reference, the decoded pictures stored in the 2D compatible video frame memory. The inter-view reference means referencing a picture that represents a view from a different viewpoint. The dependent-view video encoder 2609 determines a reference picture ID to be used in the inter-view reference, based on the base-view video frame memory management information of the base-view video encoding information 2607. Also, the dependent-view video encoder 2609 sets the same values in the video attribute information of the dependent-view video stream as in the attribute information of the base-view video stream included in the base-view video encoding information 2607.

Furthermore, the dependent-view video encoder 2609 compress-encodes each right-eye image by determining the picture type of an encoding-target image, based on the picture attribute information (picture type, etc.) and the GOP structure stored in the base-view video encoding information 2607. For example, when the picture type of a picture at time "a" is I-picture according to the base-view video encoding information 2607, and the picture is located at the head of a GOP, the dependent-view video encoder 2609 compress-encodes a right-eye image by setting the picture type of a picture of the same time "a" as anchor picture, and allocates it as a video access unit at the head of a dependent GOP. It should be noted here that the anchor picture is a picture that does not reference any picture that precedes, in time, the picture, i.e. a picture from which a direct playback is possible. Also, if the picture type of a picture of time "b" stored in the base-view video encoding information 2607 is a B-picture, the dependent-view video encoder 2609 sets the picture type of the picture of the same time "b" to a B-picture and compress-encodes a right-eye image.

When performing the compress-encoding, the dependent-view video encoder 2609 causes the DTS and PTS of the dependent-view video stream to match the DTS and PTS of a picture corresponding to a view to be displayed at the same time in the base-view video stream.

The multiplexer 2610 converts the output 2D compatible video stream, and base-view and dependent-view video streams into PES (Packetized Elementary Stream) packets, divides the PES packets in units of TS packets, and outputs the resultant TS packets as a multiplexed transport stream.

Note that different PIDs are assigned to the 2D compatible video stream, base-view video stream, and dependent-view video stream so that the playback device can identify the respective video streams from the stream data of the multiplexed transport stream.

<1-2-2. Data Format>

The following describes the data format with reference to the attached drawings.

FIG. 22 illustrates video attributes to be matched between compress-encoding in the MPEG-2 format and compress-encoding in the MPEG-4 MVC format, and field names of the fields indicating the video attributes.

When a picture of the dependent-view video stream is decoded, for a picture of the 2D compatible video stream, which has been encoded by a different compress-encoding format, to be referenced easily, values of the video attributes indicating the resolution, aspect ratio, frame rate, specification of progressive or interlace, etc. illustrated in FIG. 22 are set to be the same between pictures of the different encoding formats.

Figure 25:
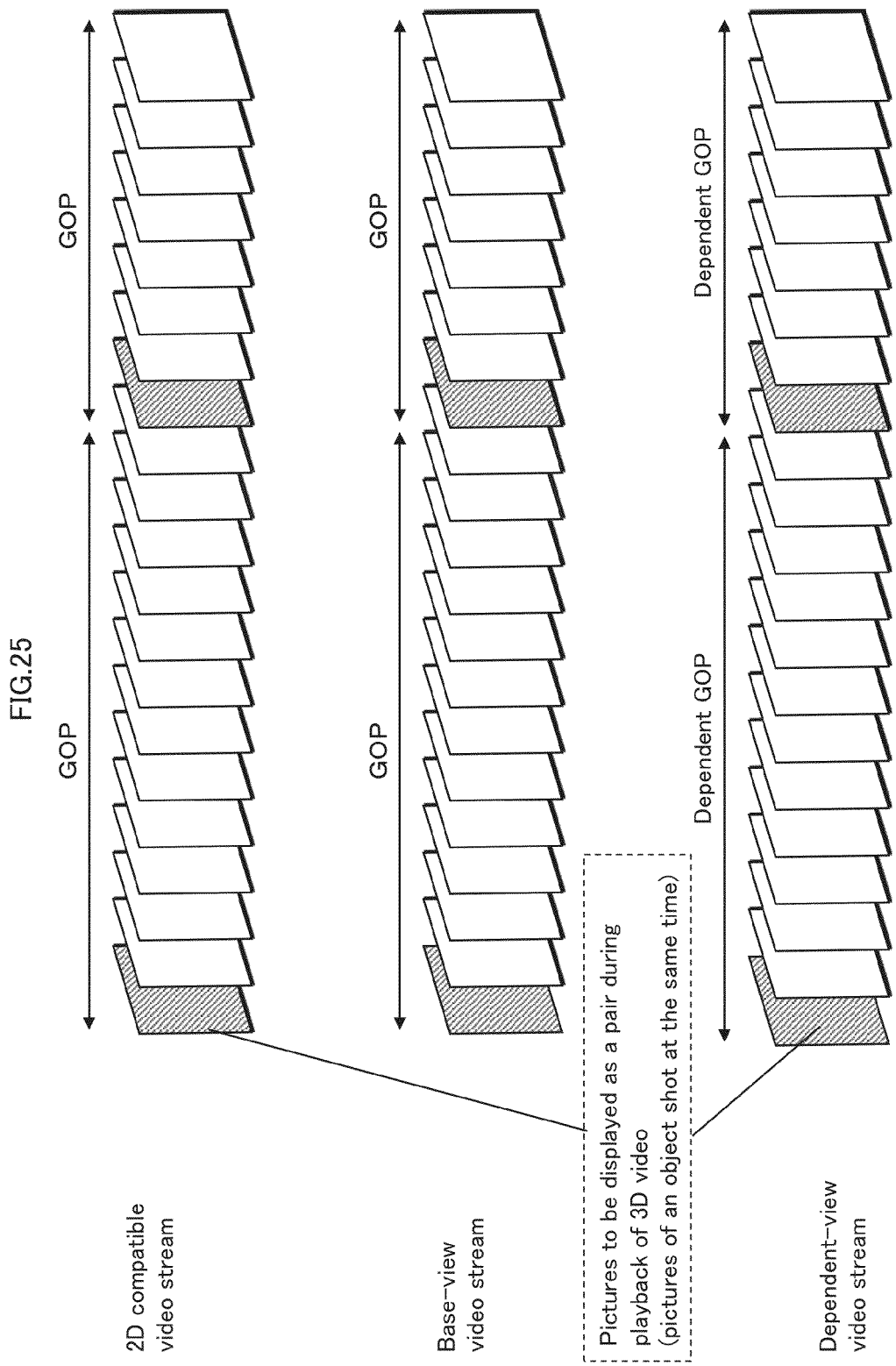
FIG. 25 illustrates the GOP structure in the 2D compatible video stream, the base-view video stream, and the dependent-view video stream according to the present embodiment.

FIG. 25 illustrates the GOP structure in the 2D compatible video stream, the base-view video stream, and the dependent-view video stream according to the present embodiment.

With this structure, a GOP in the 2D compatible video stream, in the base-view video stream, and in the dependent-view video stream each have the same number of pictures. That is to say, when a picture of the 2D compatible video stream is located at the head of a GOP, a picture of the base-view video stream having the same value of PTS and a picture of the dependent-view video stream having the same value of PTS need to located at the head of a GOP and at the head of a dependent GOP, respectively.

This structure simplifies the processing of a direct playback. This is because, if a picture of the 2D compatible video stream, which is specified when a direct playback is instructed, is an I picture, all the video streams can be decoded from that time.

When the transport stream is stored as a file, entry map information may be stored as management information to indicate where the picture at the head of a GOP is stored in the file. For example, in the Blu-ray Disc format, this entry map information is stored in a separate file as a management information file.

In the transport stream of the present embodiment, when the position of the picture at the head of each GOP in the 2D compatible video stream is registered in an entry map, the positions of the base view and the dependent view of the same time are also registered in the entry map. With this structure, referencing the entry map simplifies a direct playback of a 3D video.

Figure 36:
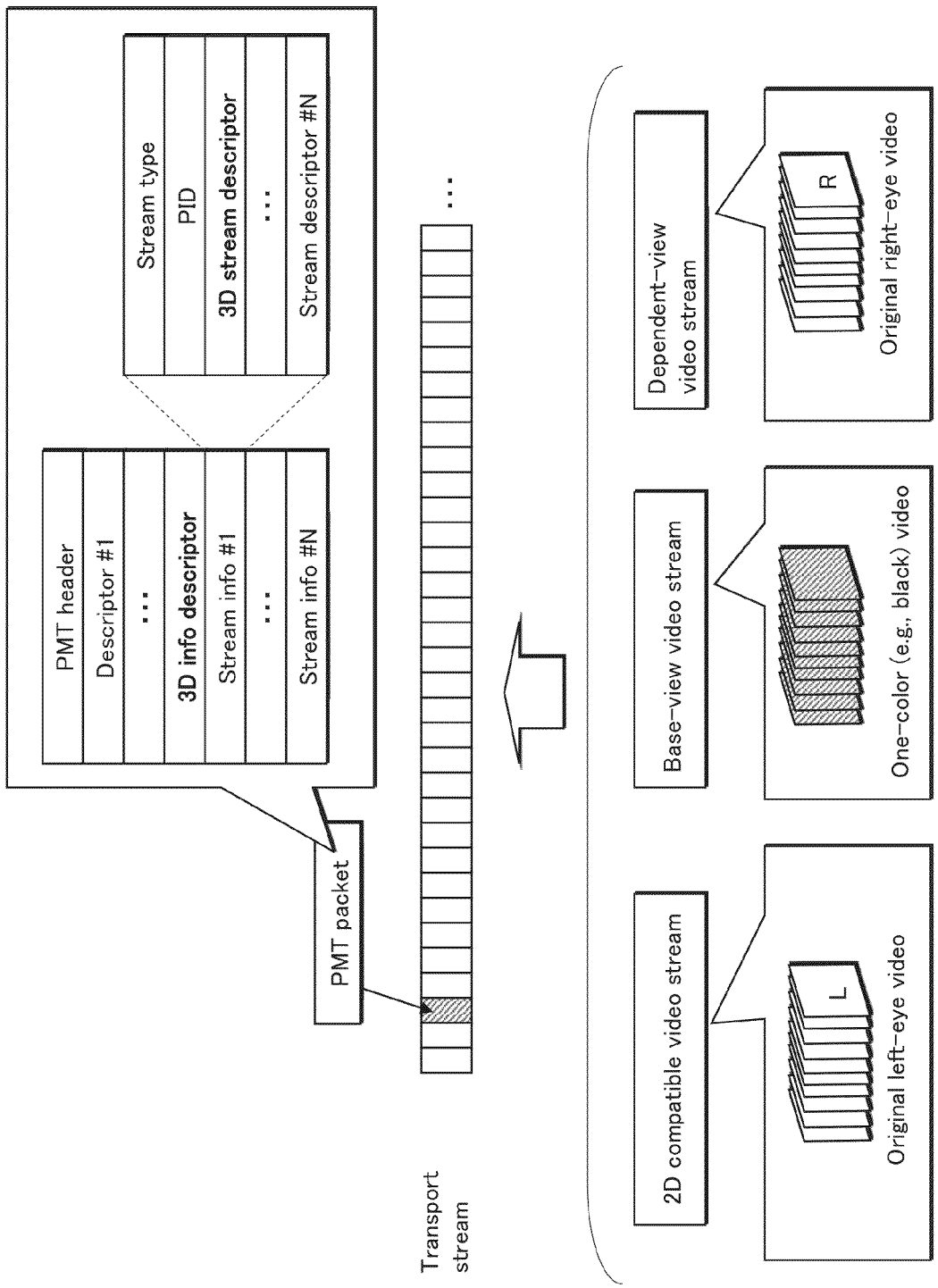
FIG. 36 illustrates the relation between the structure of the transport stream and the PMT packet in Embodiment 1.

FIG. 36 illustrates the relation between the structure of the transport stream and the PMT (Program Map Table) packet. In a transport stream including a stream of a 3D video, signaling information, which is used when the 3D video is decoded, is included in the system packet such as the PMT packet. As illustrated in FIG. 36, the PMT packet stores 3D information descriptor and 3D stream descriptor. The 3D information descriptor is used to signal the relation between video streams and the start and end of a 3D video playback in the present format. The 3D stream descriptor is set for each video stream.

FIG. 37 illustrates the structure of the 3D information descriptor.

The 3D information descriptor is composed of a playback format, a left-eye video type, a 2D compatible video PID, a base-view video PID, and a dependent-view video PID.

The playback format is information for signaling the playback method of the playback device.

Figure 38:
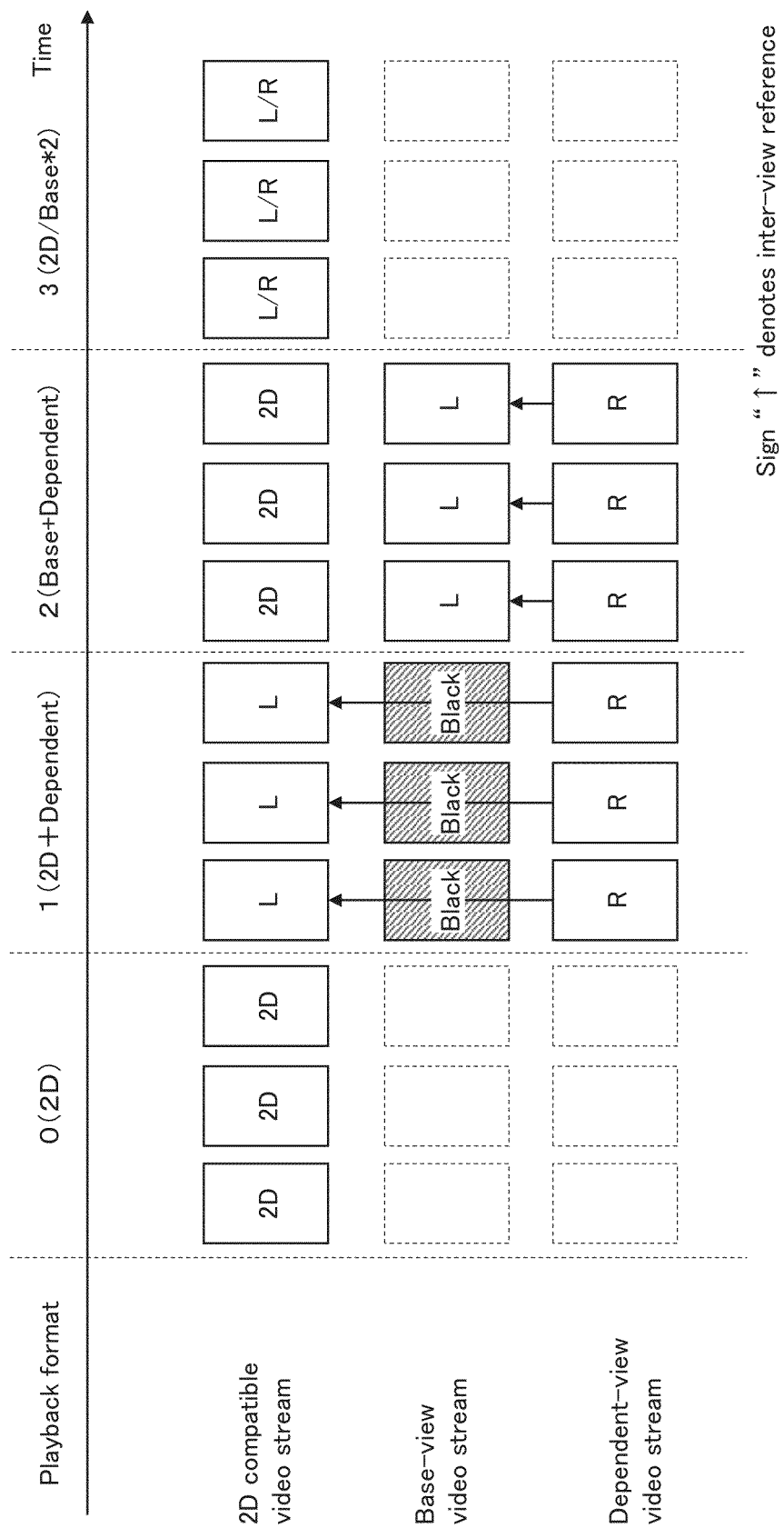
FIG. 38 illustrates the playback format by the 3D information descriptor.

The following describes the playback format with reference to FIG. 38.

When the playback format is set to "0", it indicates playback of a 2D video realized by playing back the 2D compatible video stream. In this case, the playback device performs playback of the 2D video by playing back only the 2D compatible video stream.

When the playback format is set to "1", it indicates playback of a 3D video realized by playing back the 2D compatible video stream and the dependent-view video stream (namely, the 3D video playback format explained in the present embodiment). In this case, the playback device performs playback of the 3D video by playing back the 2D compatible video stream, base-view video stream, and dependent-view video stream, by the playback method explained in the present embodiment. The 3D video image playback method of the present embodiment is described below.

When the playback format is set to "2", it indicates playback of a 3D video realized by playing back the base-view video stream and the dependent-view video stream. In other words, when the playback format is set to "2", it indicates that the 2D compatible video stream and the multi-view video stream constituting the 3D video have been generated by compress-encoding different videos and are not in a reference relationship. In this case, the playback device performs playback of the 3D video by playing back these video streams as the video streams that are obtained by the normal compress-encoding conforming to the MPEG-4 MVC format.

When the playback format is set to "3", it indicates a doubling playback realized by playing back the 2D compatible video stream or the base-view video stream, and the playback device performs the doubling playback. Doubling playback refers to outputting either a left-view picture or a right-view picture at a given time "a" to both the L and R planes. In the playback by this playback method, the user views the same screen images as when the 2D video is played back. However, a change of frame rate does not occur when the 3D video is played back. As a result, the re-authentication of the playback device is not necessary when the playback device is connected with a display or the like via the HDMI (High-Definition Multimedia Interface) or the like, and a seamless-connection playback is realized between a 2D video playback section and a 3D video playback section. This is an advantage produced by the playback method.

The left-eye video type is information indicating which of the two streams constituting the multi-view video stream stores the left-eye video images (the other video stream storing the right-view video images). When the playback format is set to "0", this field does not need to be referenced. When the playback format is set to "1", this field indicates which of the 2D compatible video and the dependent-view video represents the left-eye video images. That is to say, when the playback format is set to "1" and the left-eye video type to "0", it indicates that the 2D compatible video stream is the video stream representing the left-eye video images. When the playback format is set to "2" or "3", the playback device can similarly determine which video stream is a video stream representing the left-eye video images, by referencing the value set in the left-eye video type.

The 2D compatible video PID, the base-view video PID, and the dependent-view video PID indicate the PID of each video stream stored in the transport video stream. This information enables a decoding-target stream to be identified.

FIG. 39 illustrates the 3D stream descriptor.

The field name column of the 3D stream descriptor indicates names of fields: "base-view video type"; "reference-target type"; and "reference type".

The base-view video type indicates what video is compress-encoded in the base-view video stream. When the base-view video type is set to "0", it indicates that either the left-eye video or the right-eye video of the 3D video is compress-encoded in the base-view video stream; and when the base-view video type is set to "1", it indicates that the black-image video is compress-encoded in the base-view video stream, as a dummy video that is to be replaced with the 2D compatible video stream and is not output to a plane.

The reference target type indicates the type of the video stream that the dependent-view video stream references by the inter-view reference. When the reference target type is set to "0", it indicates that the dependent-view video stream references pictures of the base-view video stream by the inter-view reference; and when the reference target type is set to "1", it indicates that the dependent-view video stream references pictures of the 2D compatible video stream by the inter-view reference. That is to say, the case where the reference target type is set to "1" corresponds to the reference by the 3D video format of the present embodiment.

The reference type indicates whether or not the video stream is referenced by the inter-view reference. If the video stream is not referenced, the inter-view reference process can be skipped, thus reducing the load imposed on the decode process. Note that all or a part of the information included in the 3D information descriptor and the 3D stream descriptor may be stored as supplementary data or the like for each video stream, not in the PMT packets.

Figure 23:
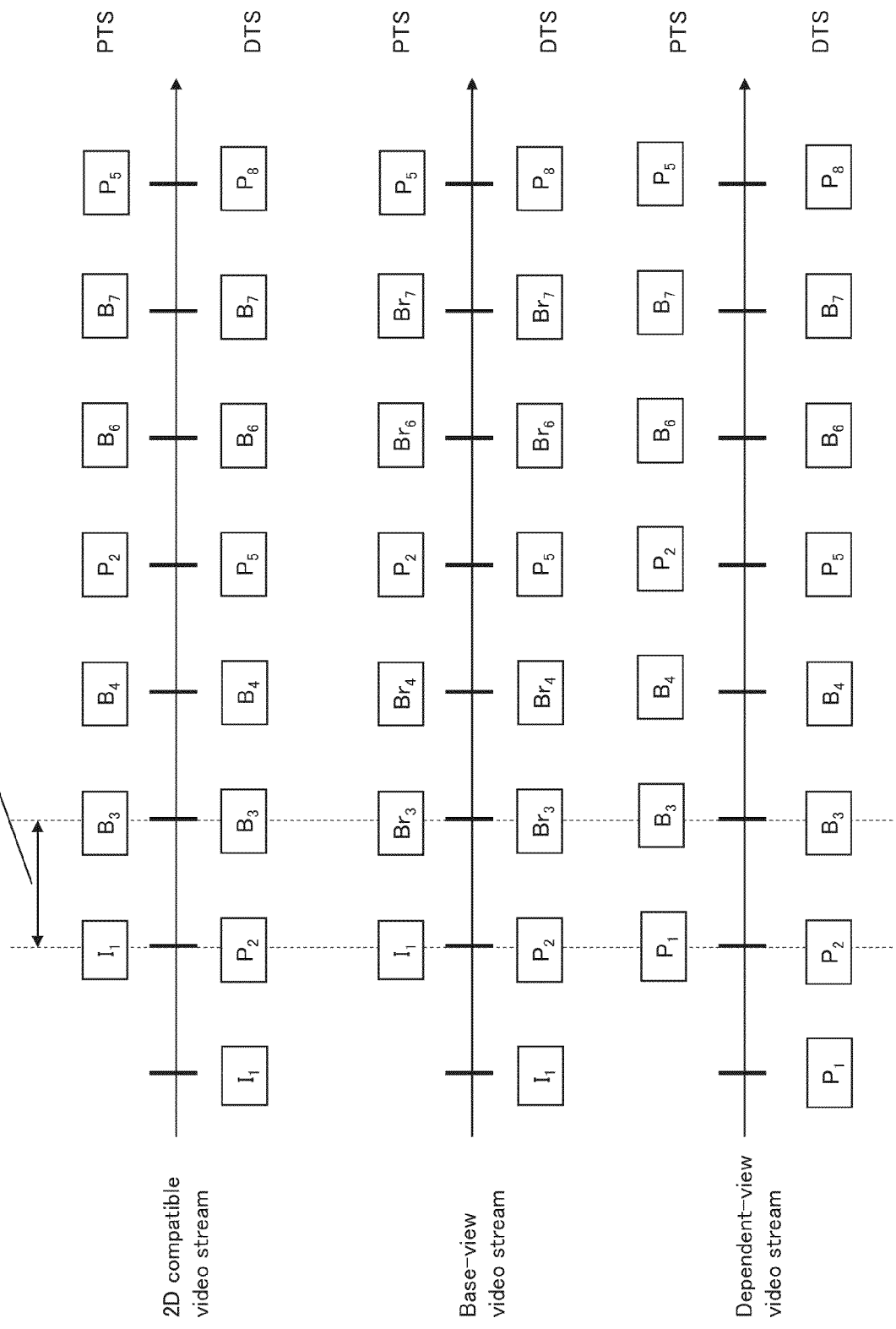
FIG. 23 illustrates one example of the relationship between the PTS, DTS, and picture type allocated to each video access unit in the 2D compatible video stream, the base-view video stream, and the dependent-view video stream in the transport stream.

FIG. 23 illustrates an example of the relationship between the picture type and the presentation time (PTS) and decode time (DTS) allocated to each video access unit in the 2D compatible video stream, the base-view video stream, and the dependent-view video stream in the transport stream.

The data creation device 2601 sets the same values of the DTS and PTS to the respective pictures of the 2D compatible video stream, which is generated by compress-encoding left-eye images of the same values of time, and the dependent-view video stream. Also, the data creation device 2601 sets the same values of the PTS, DTS and POC to the respective pictures of the base-view video stream and the dependent-view video stream to be played back at the same time.

In the inter-view reference by a picture of the dependent-view video stream, a picture of the base-view video stream having the same values of PTS, DTS and POC is referenced. More specifically, in the inter-view reference by a picture of the dependent-view video stream, a value indicating a base-view picture having the same value of POC is set in the picture reference ID (ref_idx_10 or ref_idx_11) that is specified by each macro block of the picture of the dependent-view video stream.

<1-2-3. Operation>

Figure 27:
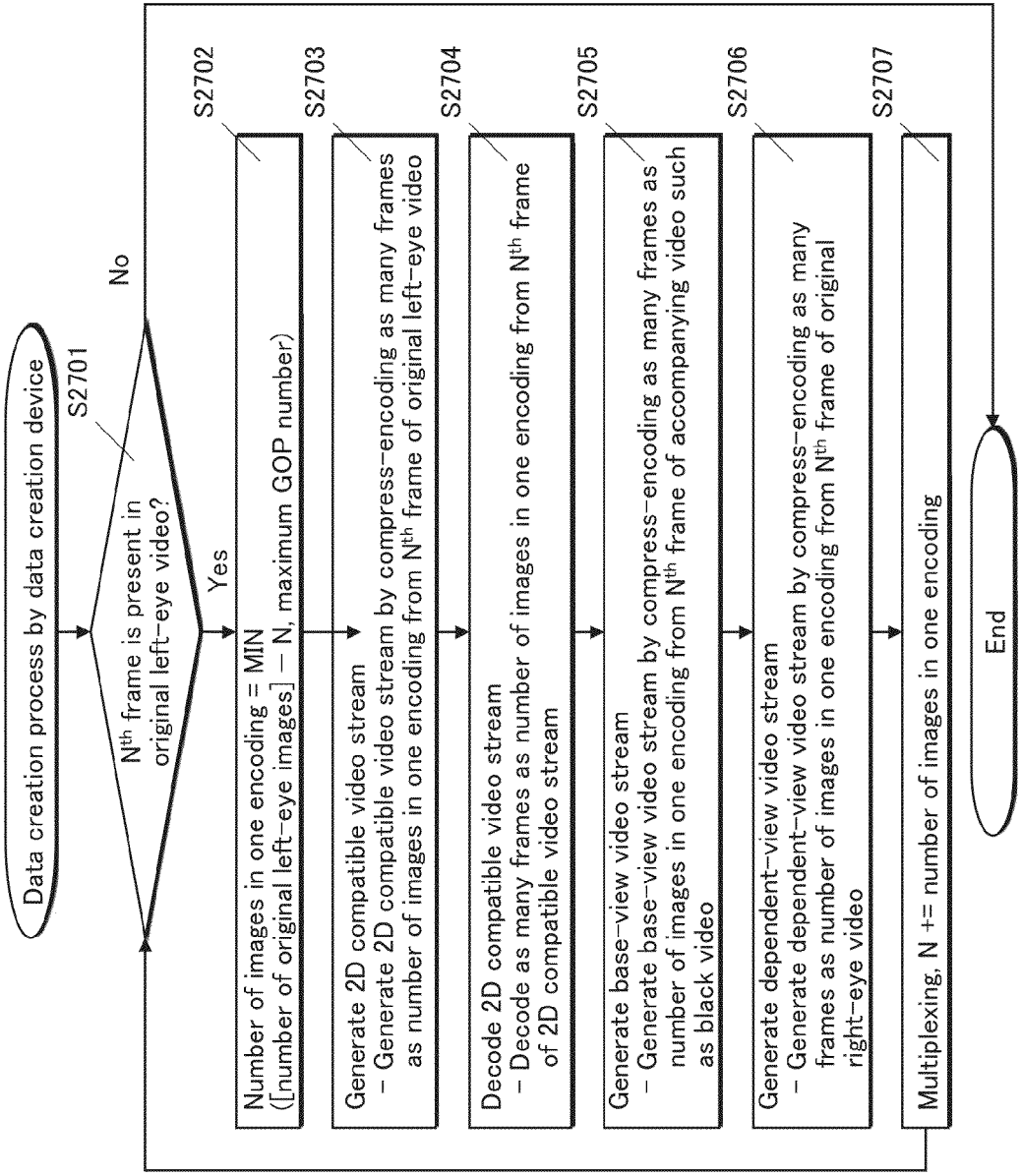
FIG. 27 illustrates the data creation flow of the data creation device according to Embodiment 1.

FIG. 27 illustrates the data creation flow of the data creation device 2601. The following describes the data creation flow.

A variable N is a variable storing a frame number of a frame image that is the target of compress-encoding.

First, the variable N is initialized (N=0). Then it is checked whether or not the $N^{th}$ frame is present in the left-eye images (step S2701). When it is judged that the $N^{th}$ frame is not present (step S2701: No), it is judged that there is no data to be compress-encoded, and the process is ended.

When it is judged that the $N^{th}$ frame is present (step S2701: Yes), the number of images to be compress-encoded in one-time execution of a compress-encoding flow (steps S2702 to S2706) (hereinafter referred to as "the number of images in one encoding") is determined (step S2702). The maximum number of video access units that can be set as one GOP (the maximum GOP number, for example, 30 frames) is set as the number of images in one encoding. With regard to the last GOP in a video stream, the number of frames to be encoded may be smaller than the maximum GOP number depending on the length of the input video stream. In that case, the number of remaining frames is set as the number of images in one encoding.

Subsequently, the 2D compatible video encoder 2602 generates a 2D compatible video stream in part in correspondence with the number of images in one encoding (step S2703). Starting from the $N^{th}$ frame of the left-eye images, the 2D compatible video encoder 2602 generates the 2D compatible video stream by compress-encoding as many frames as the number of images in one encoding, in accordance with the compress-encoding method of the 2D compatible video stream, and outputs the generated 2D compatible video stream.

Subsequently, the 2D compatible video decoder 2603 decodes the 2D compatible video stream in part in correspondence with the number of images in one encoding (step S2704). More specifically, the 2D compatible video decoder 2603 obtains decoded pictures by decoding as many compressed pictures of the 2D compatible video stream output in the step S2703 as the number of images in one encoding starting from the $N^{th}$ frame, and outputs the obtained decoded pictures and the 2D compatible video encoding information.

The base-view video encoder 2605 generates the base-view video stream in part in correspondence with the number of images in one encoding (step S2705). More specifically, the base-view video encoder 2605 sets attribute information (resolution, aspect ratio, frame rate, specification of progressive or interlace, etc.) of the base-view video stream, picture attribute information (picture type, etc.) of each picture in GOP, GOP (Group of Pictures) structure, and 2D compatible video frame memory management information, as the base-view video encoding information 2607, based on the 2D compatible video encoding information. The base-view video encoder 2605 then generates the base-view video stream in part by compress-encoding as many black images as the number of images in one encoding. The base-view video encoder 2605 also outputs the base-view video encoding information 2607 having been set as above.

Subsequently, the dependent-view video encoder 2609 generates the dependent-view video stream in part in correspondence with the number of images in one encoding (step S2706). More specifically, the dependent-view video encoder 2609 sets attribute information (resolution, aspect ratio, frame rate, specification of progressive or interlace, etc.) of the dependent-view video stream, picture attribute information (picture type, etc.) of each picture in GOP, GOP (Group of Pictures) structure, and 2D compatible video frame memory management information, based on the base-view video encoding information output in step S2705.

Furthermore, the dependent-view video encoder 2609 generates the dependent-view video stream in part by compress-encoding as many right-eye images starting from the $N^{th}$ frame as the number of images in one encoding, by the inter-picture predictive encoding by referencing decoded pictures of the 2D compatible video stream stored in the 2D compatible video frame memory 2608, which have the same values of presentation time as the target images, not referencing pictures of the base-view video stream.

The multiplexer 2610 converts the 2D compatible video stream, base-view video stream, and dependent-view video stream into PES packets. The multiplexer 2610 then divides the PES packets into TS packets and generates the transport stream by multiplexing the TS packets. Subsequently, the number of images in one encoding is added to N (step S2707).

Upon completion of the process in step S2707, the control returns to step S2701 and the process is repeated.

Note that the number of images in one encoding can be changed. When the number of images is to be reduced, it suffices to set the number of images in one encoding in step S2702 to a lower value. For example, when two images are reordered during a video encoding, it is possible to avoid the influence of the reordering by compress-encoding every four images. Suppose, for example, that in the encoding method, the number of images reordered is two, and that the picture types are I1, P4, B2, B3, P7, B5, B6, . . . (the numbers indicating presentation order). In the case where the number of images in one encoding is 3, picture P4 is not processed, and thus B2 and B3 cannot be compress-encoded. In the case where the number of images in one encoding is 4, picture P4 is processed, and B2 and B3 are compress-encoded. In this way, the number of images in one encoding may be set to an appropriate number within the maximum GOP number, for each one-time execution of compress-encoding flow, depending on the property of the images.

<1-3. Playback Device>
<1-3-1. Structure>

The following describes the structure of a playback device 2823 of the present embodiment that plays back 3D video images, with reference to drawings.

Figure 28:
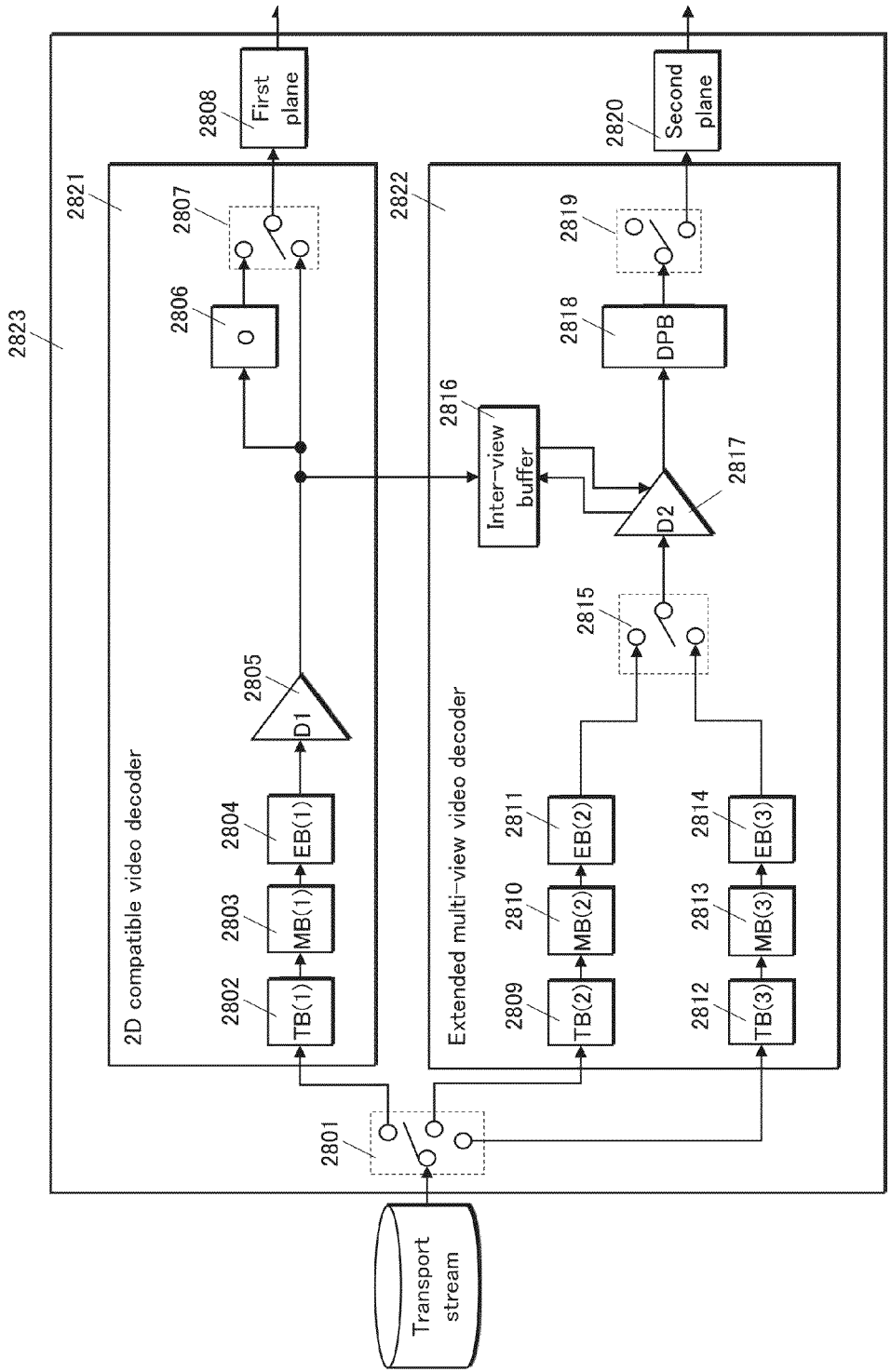
FIG. 28 illustrates the structure of the playback device for playing back the 3D video in Embodiment 1.

FIG. 28 is a block diagram illustrating the functional structure of the playback device 2823.

The playback device 2823 includes a PID filter 2801, a 2D compatible video decoder 2821, an extended multi-view video decoder 2822, a first plane 2808, and a second plane 2820.

The PID filter 2801 filters an input transport stream. More specifically, the PID filter 2801 transfers, among a plurality of TS packets, only TS packets whose PIDs match the PIDs of TS packets required for the playback, to the 2D compatible video decoder 2821 or the extended multi-view video decoder 2822, in accordance with the values of the PIDs.

The correspondence between the streams and the PIDs is indicated by the stream information of the PMT packet. Suppose, for example, that the PID of the 2D compatible video stream is 0x1011, the PID of the base-view video stream of the multi-view video stream is 0x1012, and the PID of the dependent-view video stream of the multi-view video stream is 0x1013. Then the PID filter 2801 references the PID of a target TS packet and transfers the TS packet to a corresponding decoder only when the PID of the TS packet matches any of the above-mentioned PIDs.

The first plane 2808 is a plane memory holding decoded pictures output from the 2D compatible video decoder 2821 in accordance with the values of the PTSs.

The second plane 2820 is a plane memory holding decoded pictures output from the extended multi-view video decoder 2822 in accordance with the values of the PTSs.

Next, the 2D compatible video decoder 2821 and the extended multi-view video decoder 2822 are described.

The 2D compatible video decoder 2821 basically has the same decoding function as the decoder in the MPEG-2 format providing a compress-encoding method of 2D images. The extended multi-view video decoder 2822 basically has the same decoding function as the decoder in the MPEG-4 MVC format providing a compress-encoding method of 3D images for realizing the inter-view reference. In the present embodiment, a video decoder 2901 is assumed to be a typical decoder conforming to the MPEG-2 compress-encoding method; and a multi-view video decoder 2902 is assumed to be a typical decoder conforming to the MPEG-4 MVC compress-encoding method.

Figure 29:
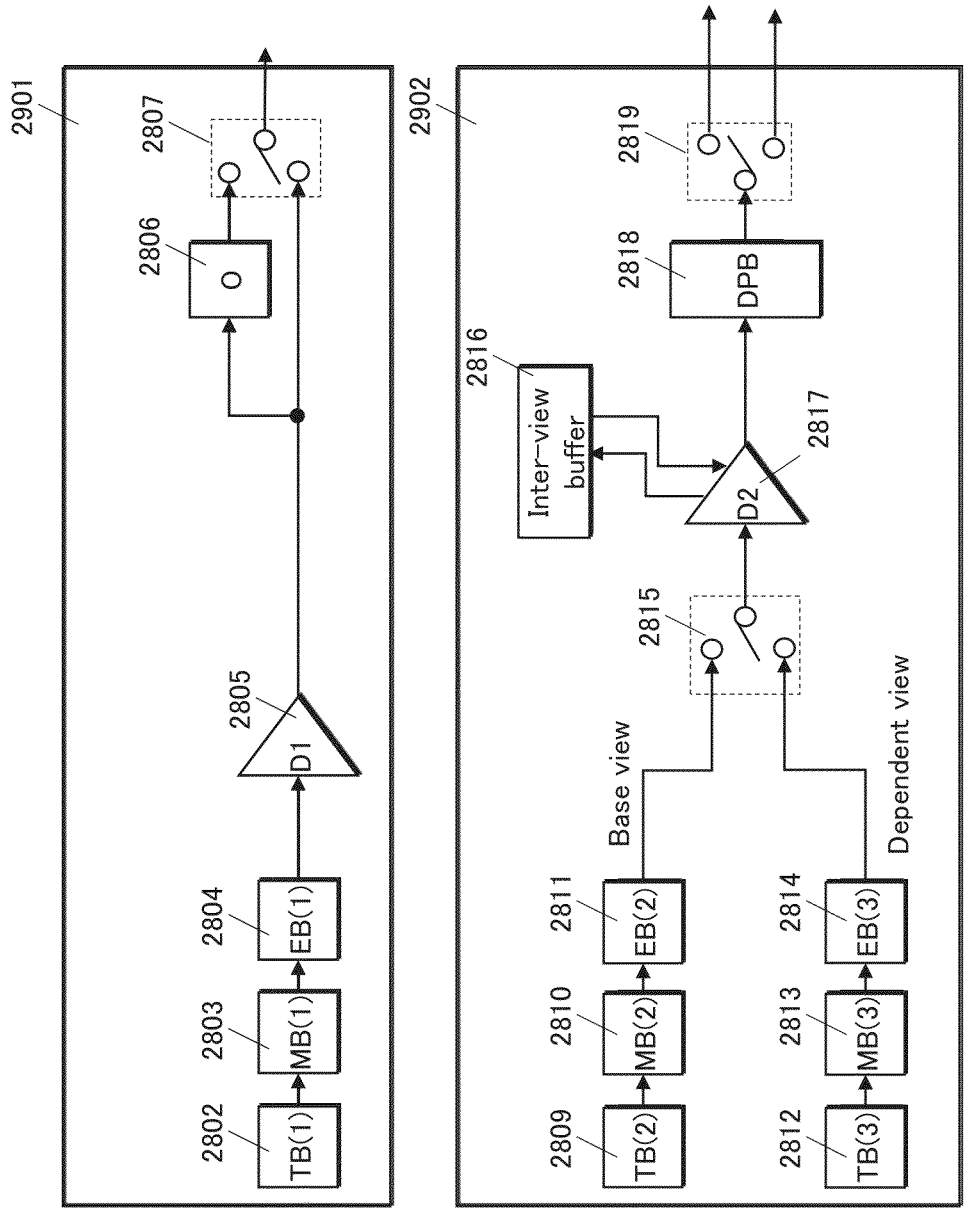
FIG. 29 illustrates a video decoder and a multi-view video decoder.

First, the following describes the video decoder 2901 and the multi-view video decoder 2902 with reference to FIG. 29. After that, the difference between the 2D compatible video decoder 2821 and the video decoder 2901, and the difference between the extended multi-view video decoder 2822 and the multi-view video decoder 2902 will be focused on.

As illustrated in FIG. 29, the video decoder 2901 includes a TB (Transport Stream Buffer) (1) 2802, an MB (Multiplexing Buffer) (1) 2803, an EB (Elementary Stream Buffer) (1) 2804, a D1 (2D compatible video decoder) 2805, and an O (Re-Ordering Buffer) 2806.

The TB(1) 2802 is a buffer that temporarily stores TS packets constituting a video stream, as output from the PID filter 2801.

The MB(1) 2803 is a buffer that, when a video stream is output from the TB(1) 2802 to the EB(1) 2804, stores PES packets temporarily. When data is transferred from the TB(1) 2802 to the MB(1) 2803, the TS header and adaptation field of each TS packet are removed.

The EB(1) 2804 is a buffer in which encoded pictures (I pictures, B pictures, and P pictures) are stored. When data is transferred from the MB(1) 2803 to the EB(1) 2804, the PES header is removed.

The D1(2805) creates pictures of frame images by decoding each video access unit of a video elementary stream at predetermined times specified by DTSs.

Each picture decoded by the D1 2805 is output to the plane 2808 or the O 2806. That is to say, when, as is the case with a P-picture or an I-picture, a picture has different values in DTS and PTS, the picture is output to the O 2806; and when, as is the case with a B-picture, a picture has the same value both in DTS and PTS, the picture is output to the plane 2808 as it is.

The O 2806 is a buffer in which the reordering is performed when the decoded picture has different values in DTS and PTS, namely, the picture is arranged at different positions in the decode order and presentation order. The D1 (2805) references the data of a picture stored in the O 2806, and performs the decode process.

The switch 2807 switches the decoded picture to be output to the plane 2808 between an image buffered in the O 2806 and a direct output from the D1 (2805).

The following describes the multi-view video decoder 2902.

As illustrated in FIG. 29, the multi-view video decoder 2902 includes a TB(2) 2809, an MB(2) 2810, an EB(2) 2811, a TB(3) 2812, an MB(3) 2813, an EB(3) 2814, a decoding switch 2815, an inter-view buffer 2816, a D2 (multi-view video decoder) 2817, a DPB (Decoded Picture Buffer) 2818, and an output plane switch 2819.

The TB(2) 2809, MB(2) 2810 and EB(2) 2811 have the same function as the TB(1) 2802, MB(1) 2803 and EB(1) 2804, respectively, but differ in that they store the base-view video stream.

The TB(3) 2812, MB(3) 2813 and EB(3) 2814 have the same function as the TB(1) 2802, MB(1) 2803 and EB(1) 2804, respectively, but differ in that they store the dependent-view video stream.

The switch 2815 extracts video access unit data, to which DTSs have been assigned, from the EB(2) 2811 and the EB(3) 2814 in accordance with the values of the DTSs, form a 3D video access unit, and transfers the 3D video access unit to the D2 2817.

The D2 2817 creates pictures of the frame images by decoding the 3D video access unit transferred via the switch 2815.

The decoded pictures of the base-view video created by the D2 2817 are temporarily stored in the inter-view buffer 2816. The D2 2817 decodes encoded pictures of the dependent-view video stream by referencing decoded pictures, which have the same values of PTSs as the encoded pictures of the dependent-view video stream, of the base-view video stream stored in the inter-view buffer 2816.

The multi-view video decoder 2902 creates a reference picture list, which is a list of pictures to be used in the inter-view reference, based on the picture type and syntax element of the pictures of the base-view video stream and the dependent-view video stream.

The D2 2817 transfers the decoded pictures of the base-view video stream stored in the inter-view buffer 2816 and the decoded pictures of the dependent-view video stream to the DPB 2818. The decoded pictures are output from the DPB 2818 in accordance with the values of PTSs via the output plane switch 2819.

The DPB 2818 is a buffer for temporarily storing the decoded pictures. The decoded pictures are referenced by the D2 2817 when it decodes the video access units, such as the P-pictures and B-pictures, by the inter-picture predictive encoding.

The output plane switch 2819 outputs the decoded pictures to appropriate planes. For example, in the case where the base-view video stream represents the left-eye images and the dependent-view video stream represents the right-eye images, the output plane switch 2819 outputs the decoded pictures of the base-view video stream to the left-eye image plane, and the decoded pictures of the dependent-view video stream to the right-eye image plane.

Next, the 2D compatible video decoder 2821 and the extended multi-view video decoder 2822 are described.

As described above, the 2D compatible video decoder 2821 has basically the same structure as the video decoder 2901. Therefore, a description of common functions is omitted, and only the differences are described.

As illustrated in FIG. 28, the 2D compatible video decoder 2821 transfers the decoded pictures created by the D1 2805 not only to the O 2806 and switch 2807, but also to the inter-view buffer 2816 of the extended multi-view video decoder 2822 based on the values of DTSs.

As described above, the extended multi-view video decoder 2822 has basically the same structure as the multi-view video decoder 2902. Therefore, a description of common functions is omitted, and only the differences are described.

The extended multi-view video decoder 2822 receives the pictures that are transferred from the 2D compatible video decoder 2821 in accordance with the values of DTSs, and stores the received pictures in an area of the inter-view buffer 2816 by writing the received pictures over the decoded pictures, which have the same values of PTS and DTS, of the base-view video stream that have already been decoded and stored in the area. With this structure, when decoding the encoded pictures of the dependent-view video stream, the extended multi-view video decoder 2822 references the decoded pictures of the 2D compatible video stream as if referencing the decoded pictures of the base-view video stream. With regard to the management of addresses of the inter-view buffer 2816, a conventional management of the decoded pictures of the base-view video stream can be used as it is.

The extended multi-view video decoder 2822 controls the output plane switch 2819 so as to output only pictures of the dependent-view video stream, among the video images stored in the DPB 2818, to the second plane 2820 in accordance with the values of PTSs. The pictures of the base-view video stream are not to be used for display, and thus are not output to a plane.

With this structure, pictures of the 2D compatible video stream are output from the 2D compatible video decoder 2821 to the first plane at the timing of the PTS, and pictures of the multi-view video stream and the dependent-view video stream are output from the extended multi-view video decoder 2822 to the second plane at the timing of the PTS.

This makes it possible to decode encoded pictures of the dependent-view video stream for the multi-view video stream by referencing decoded pictures of the 2D compatible video stream that has been compress-encoded by a different video compress-encoding method.

<1-3-2. Operation>

Figure 30:
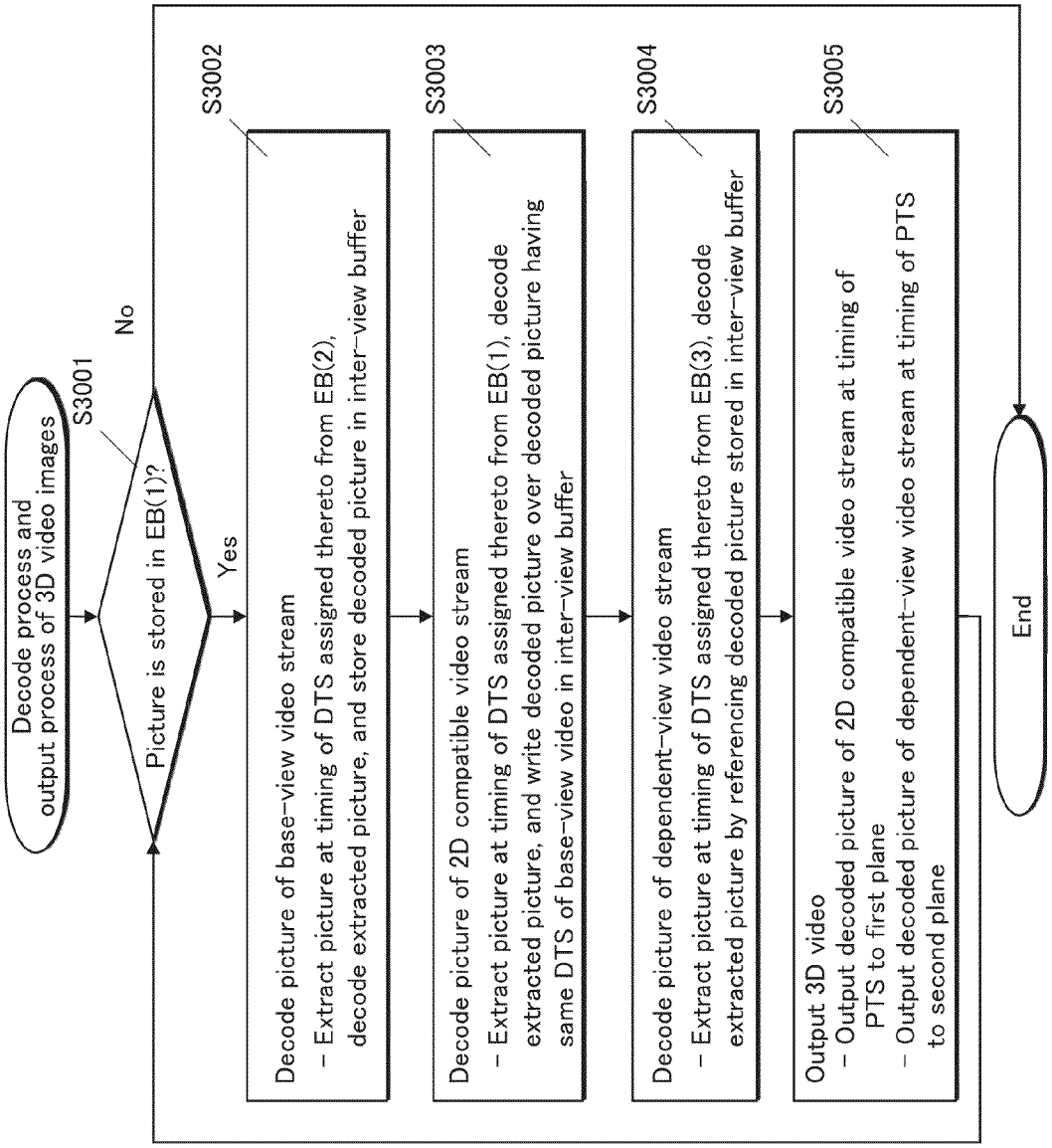
FIG. 30 is a flowchart illustrating the procedures of the decode process and output process of 3D video images performed by the playback device in Embodiment 1.

FIG. 30 is a flowchart illustrating the procedures of the decode process and output process of 3D video images performed by the playback device 2823.

The playback device 2823 judges whether or not a picture is stored in the EB(1) 2804 (step S3001). When it judges that no picture is stored in the EB(1) 2804 (step S3001: No), the playback device 2823 judges that the transfer of the video stream has been completed, and ends the process.

When it judges that a picture is stored in the EB(1) 2804 (step S3001: Yes), the playback device 2823 causes the extended multi-view video decoder 2822 to decode the base-view video stream (step S3002). More specifically, the extended multi-view video decoder 2822 extracts a picture at the timing of the DTS assigned thereto from the EB(2), decodes the extracted picture, and stores the decoded picture in the inter-view buffer 2816. The pictures stored in the inter-view buffer 2816 are managed in the same manner as in the conventional MPEG-4 MVC format, and thus the detailed description thereof is omitted, except that table information is held inside as the management information used to create the reference picture list, wherein the table information associates the PTSs and POCs with the data addresses of the inter-view buffer 2816 indicating the locations of the decoded pictures to be referenced.

Subsequently, the playback device 2823 causes the 2D compatible video decoder 2821 to decode the 2D compatible video stream (step S3003). More specifically, the 2D compatible video decoder 2821 extracts a picture at the timing of the DTS assigned thereto from the EB(1), and decodes the extracted picture. In this decoding, the decoded picture is transferred to the O 2806 and the switch 2807. The decoded picture is further transferred to the inter-view buffer 2816 as well.

The extended multi-view video decoder writes the transferred decoded picture over a decoded picture, which has the same values of PTS and DTS, of the base-view video stream stored in the inter-view buffer 2816.

Here, the overwriting process in a specific example is described with reference to FIG. 31.

Figure 31:
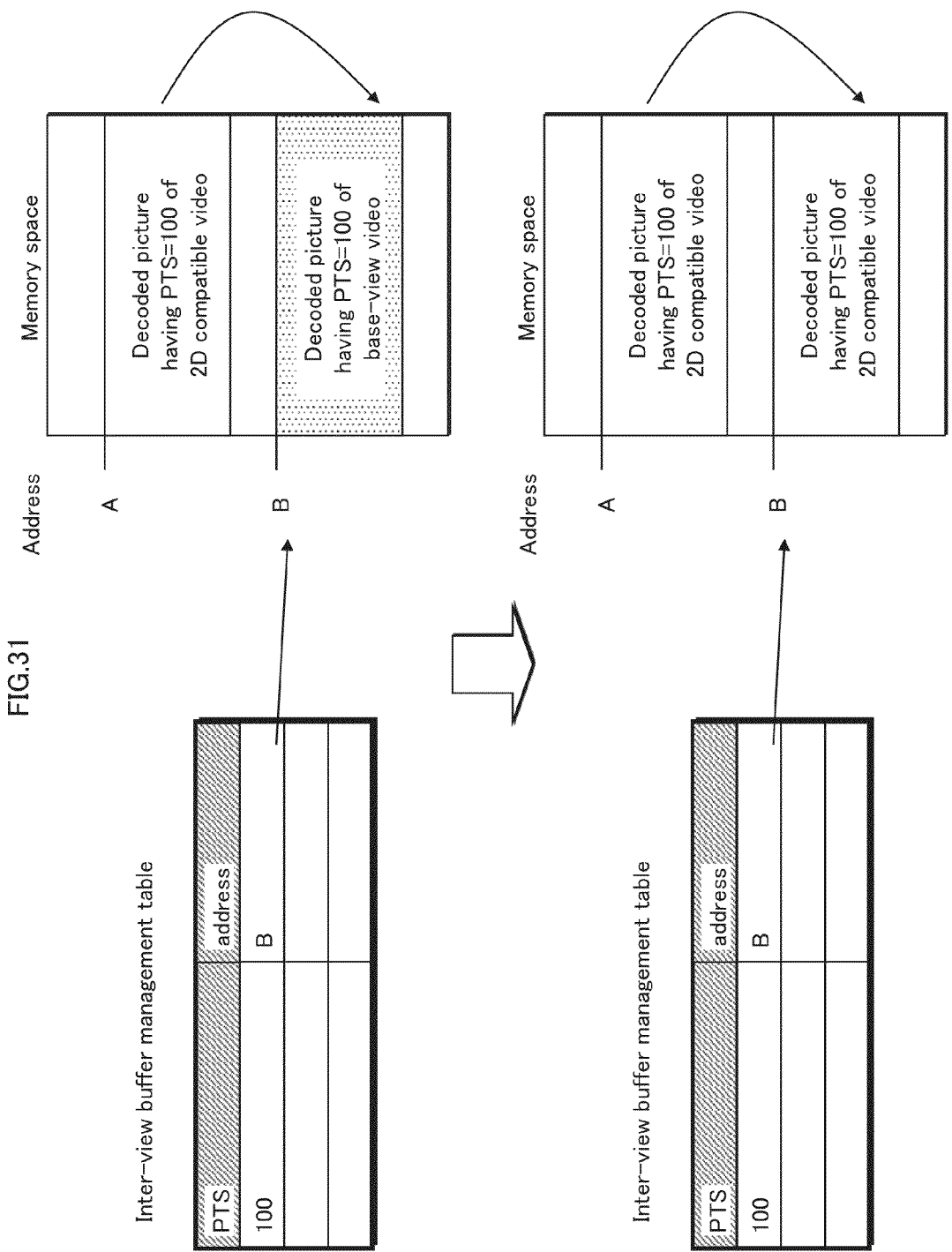
FIG. 31 illustrates a management of the inter-view buffer in the playback device for playing back the 3D video in Embodiment 1.

It is assumed here that, as illustrated in the upper portion of FIG. 31, the pictures stored in the inter-view buffer 2816 are managed based on the PTS and the memory address of the inter-view buffer 2816. The upper portion of FIG. 31 illustrates a state immediately after an encoded picture with PTS=100 of the base-view video stream is decoded, indicating that the decoded picture with PTS=100 of the base-view video stream is stored in a memory area that starts from address B.

Here, when the process of step S3003 is performed, the state changes as illustrated in the lower portion of FIG. 31 which indicates that a decoded picture with the same value of PTS of the 2D compatible video stream is written over the decoded picture with PTS=100 of the base-view video stream in the memory area starting from address B. This allows for the picture data alone to be overwritten, without a need to change the management information (for example, PTS) for managing pictures in the buffer. With this structure, the D2 2817 can decode the dependent-view video stream in the MPEG-4 MVC format by referencing the decoded pictures of the 2D compatible video stream in the same manner as the conventional manner of decoding the dependent-view video stream in the MPEG-4 MVC format.

Subsequently, the extended multi-view video decoder 2822 decodes the dependent-view video stream (step S3004). More specifically, the extended multi-view video decoder 2822 extracts a picture with a DTS at the timing of the DTS from the EB(3), and decodes the extracted picture of the dependent-view video stream by referencing a picture stored in the inter-view buffer 2816.

The picture referenced here is not a picture of the base-view video stream, but a picture of the 2D compatible video stream that has been written over the base-view video stream in step S3003.

The playback device 2823 outputs the decoded picture of the 2D compatible video stream at the timing of the PTS to the first plane 2808, and outputs the decoded picture of the dependent-view video stream at the timing of the PTS to the second plane 2820 (step S3005).

Here, since the decoding performed by the D1 2805 of the playback device 2823 is the same as the conventional decoding of a video stream in the MPEG-2 format, an LSI (Large Scale Integration) and software provided in an existing playback device conforming to the MPEG-2 format can be used. Also, since the decoding performed by the D2 2817 is the same as the conventional decoding of a video stream in the MPEG-4 MVC format, an LSI and software provided in an existing playback device conforming to the MPEG-4 MVC format can be used.

<Example of Use Form of Playback Device 2823>

The following describes one example of the use form of the playback device 2823 with reference to FIGS. 5A to 5D, taking, for example, a 3D digital TV 100 on which a 3D video of the video streams created by the data creation device 2601 is displayed, and a 2D digital TV 300 which does not support playback of a 3D video and on which only a 2D video is displayed.

As illustrated in FIG. 5A, the user views the 3D video by using the 3D digital TV 100 and 3D glasses 200.

The 3D digital TV 100 can display both the 2D and 3D videos, and displays the videos by playing back streams included in the received broadcast waves. More specifically, the 3D digital TV 100 plays back the 2D compatible video stream that has been compress-encoded in the MPEG-2 format, and plays back the base-view video stream and the dependent-view video stream for 3D that have been compress-encoded in compliance with the MPEG-4 MVC format.

The 3D digital TV 100 alternately displays a left-eye image and a right-eye image, wherein the left-eye image is obtained by decoding the 2D compatible video stream and the right-eye image is obtained by decoding the dependent-view video stream.

The user can view the video as a stereoscopic video by wearing the 3D glasses 200 and watching the video played back in this way through the 3D glasses.

FIG. 5B illustrates the state of the 3D glasses 200 when a left-eye image is displayed.

At the instant the left-eye image is displayed on the screen, in the 3D glasses 200, the liquid-crystal shutter for the left eye is in the light transmission state, and the liquid-crystal shutter for the right eye is in the light block state.

FIG. 5C illustrates the state of the 3D glasses 200 when a right-eye image is displayed.

At the instant the right-eye image is displayed on the screen, the liquid-crystal shutter for the right eye is in the light transmission state, and the liquid-crystal shutter for the left eye is in the light block state.

The 2D digital TV 300 illustrated in FIG. 5D supports playback of a 2D video, and plays back a 2D video that is obtained by decoding a 2D compatible video stream, among video streams included in the transport stream generated by the data creation device 2601.

<1-4. Modifications>

Although the present invention has been fully described by way of examples with reference to the accompanying drawings, the present invention is not limited to the data creation device and playback device described in the above embodiments, but the data creation device and playback device can be modified, for example, as follows.

Figure 32:
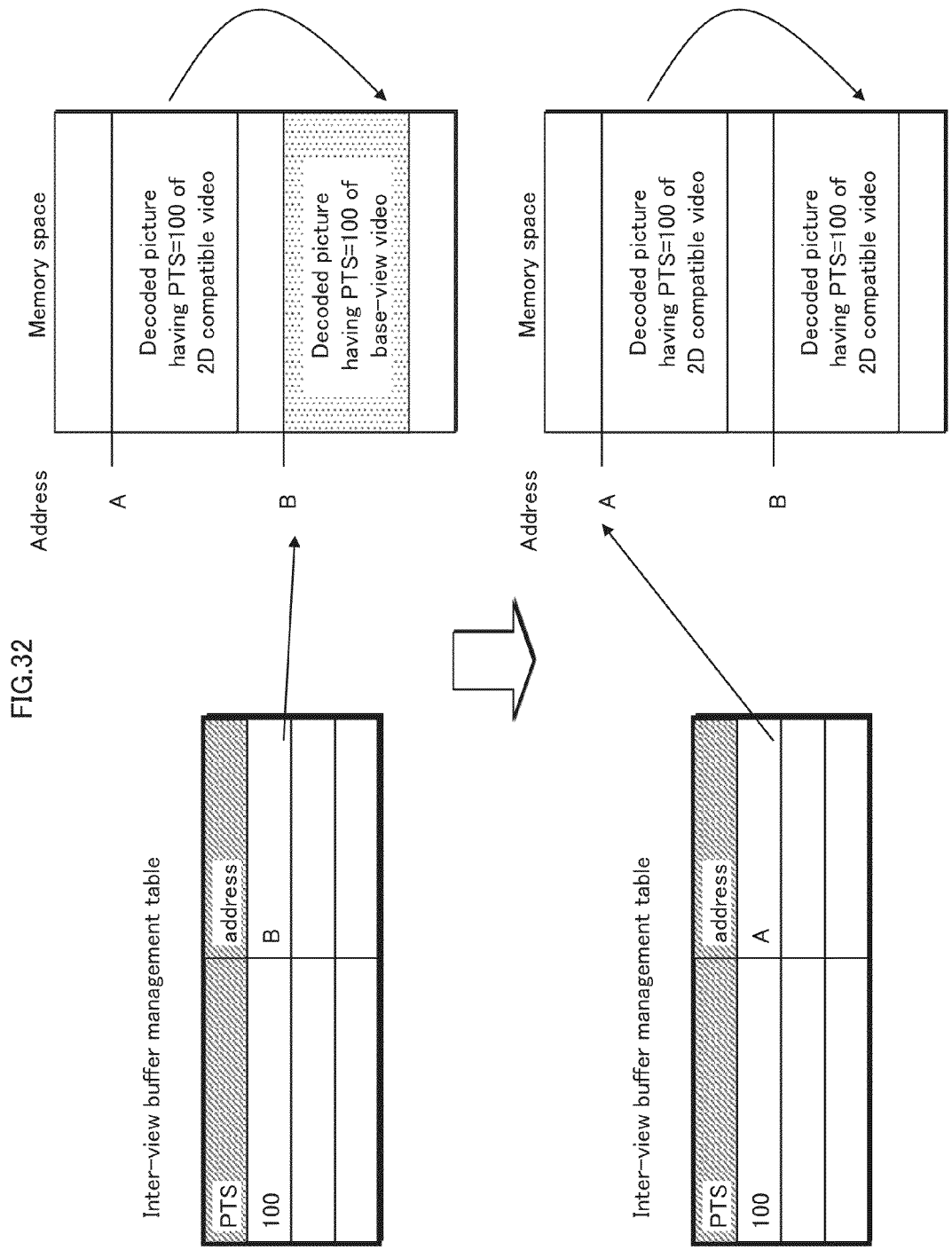
FIG. 32 illustrates a modification to the management of the inter-view buffer in the playback device for playing back the 3D video in Embodiment 1.

(1) In the above-described embodiment, the playback device, in step S3003, writes a decoded picture of the 2D compatible video stream over a decoded picture, which has the same value of PTS, of the base-view video stream stored in the inter-view buffer 2816. However, not limited to this, as indicated in the lower portion of FIG. 32, the address of the reference target may be changed, without overwriting the picture.

With this structure, the overwriting process can be omitted, and thus the load on the device can be reduced.

(2) In the above-described embodiment, the playback device stores decoded pictures of the base-view video stream in the DPB 2818. However, since the decoded pictures of the base-view video stream are not referenced, they may not be stored in the DPB 2818. This allows for a reduction in the size of the DPB 2818 corresponding to the amount of memory used for storage of pictures of the base-view video stream.

(3) In the above-described embodiment, the base-view video stream is compress-encoded and included in the transport stream, and the encoded pictures of the base-view video stream are decoded. However, not limited to this, the decoding of the encoded pictures of the base-view video stream may be omitted.

More specifically, the extended multi-view video decoder 2822 does not decode the encoded pictures of the base-view video stream, but analyzes the header information (for example, obtains the POC, picture type, ViewID, and information specifying whether or not reference is performed) and allocates an area of the inter-view buffer 2816 that is large enough to store one picture. The extended multi-view video decoder 2822 stores, into the allocated area, decoded pictures having the same values of PTS and DTS as those obtained by analyzing the header information, among the decoded pictures output from the 2D compatible video decoder.

This structure allows for decoding of pictures to be skipped, thus reducing the overall load on the playback processing.

Alternatively, a 2D compatible video stream may be generated such that it includes information necessary for a picture of the dependent-view video stream to reference a picture of the 2D compatible video stream by the inter-view reference, namely, information used by the extended multi-view video decoder to manage the inter-view buffer 2816.

More specifically, all or part of the syntax elements of the base-view video stream may be recorded in the supplementary data of the 2D compatible video stream. That is to say, the information that is used to manage the pictures stored in the inter-view buffer 2816 (such as the POC indicating a presentation order conforming to the MPEG-4 MVC format, slice type indicating the picture type, nal_ref_idc indicating reference/non reference of a picture, ref_pic_list_mvc_modification that is information used to create the base reference picture list, ViewID of the base-view video stream, and the MMCO command) and the like are recorded in the supplementary data of the 2D compatible video stream.

With this structure where the data of the 2D compatible video stream can be referenced from the dependent-view video stream directly, the base-view video stream does not need to be multiplexed in the transport stream.

In this case, as illustrated in FIG. 3, a picture of the dependent-view video stream conforming to the MPEG-4 MVC format directly references a picture of the video stream conforming to the MPEG-2 format.

It should be noted here that, when the base-view video stream conforming to the MPEG-4 MVC format is multiplexed in the transport stream, the format is almost the same as a conventional one, and the stream is well compatible with a conventional encoding device or playback device that conforms to the MPEG-4 MVC format. It is accordingly possible to realize, with minimum improvement, an encoding device and a playback device that conform to the video stream data of the present embodiment.

Figure 33:
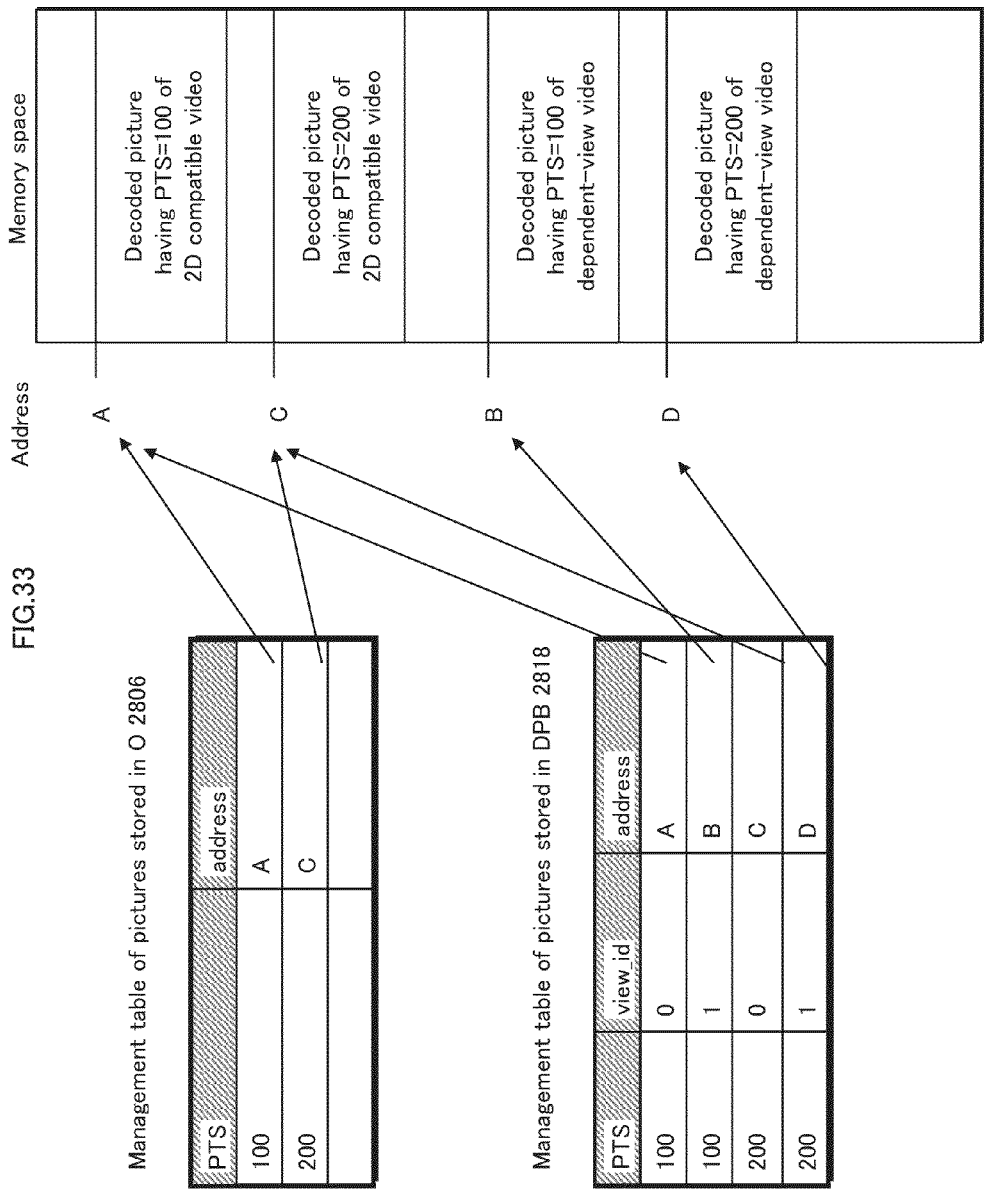
FIG. 33 illustrates how to share a buffer in the playback device for playing back the 3D video in Embodiment 1.

(4) In the playback device of the above-described embodiment, the O 2806 and the DPB 2818 are treated as separate memory areas. However, not limited to this, as illustrated in FIG. 33, a memory space may be shared. For example, in the case of FIG. 33, pictures with PTS=100 and PTS=200 of the 2D compatible video stream are written over pictures having the same values of PTS of the base-view video stream in the inter-view buffer 2816, in step S3003. In this process, when data is stored in the DPB 2818, only setting of the address of the reference-target picture in the management table in the DPB 2818 may be performed, and the overwriting of the picture may be omitted. More specifically, in the case of FIG. 33, the picture management table in the DPB 2818 is set such that addresses of the pictures with PTS=100 and PTS=200 of the base view (View ID=0) are the same as the addresses of decoded pictures with PTS=100 and PTS=200 of the 2D compatible video stream set in the management table in the O 2806.

This structure reduces the memory in size for storing the pictures.

(5) In the playback device of the above-described embodiment, the inter-view buffer 2816 and the DPB 2818 are treated as separate buffers. However, not limited to this, they may be provided as a same buffer. For example, when the two buffers are united into the DPB 2818, decoded pictures of the base-view video stream in the DPB 2818 may be replaced with decoded pictures of the 2D compatible video stream that have the same values of PTS and ViewID.

(6) In the above-described embodiment, the following restriction may be imposed on the compress-encoding process. That is to say, the restriction is that when at least one B-picture (or Br-picture) is included in the pictures having the same value of presentation time among pictures of the 2D compatible video stream, base-view video stream and dependent-view video stream, the picture type of the pictures having the same value of presentation time of the 2D compatible video stream, base-view video stream and dependent-view video stream must be set to the B-picture (or Br-picture). This structure simplifies the processing of a trick play (for example, a direct playback) when the playback device performs the trick play by selecting only I-pictures and P-pictures. FIG. 24 illustrates the trick play. The upper portion of FIG. 24 illustrates a case where the above restriction is not imposed. In this case, the third pictures in the presentation order in the 2D compatible video stream and the base-view video stream are both P-pictures (P3), but the third picture in the presentation order in the dependent-view video stream is a B-picture (B3).

In this case, in order to decode the dependent-view video stream, picture Br2 of the dependent-view video stream and picture Br2 of the base-view video stream need to be decoded. On the other hand, the lower portion of FIG. 24 illustrates a case where the above restriction is imposed.

In this case, the third picture in the presentation order is a P picture in all of the streams, i.e. the 2D compatible video stream, the base-view video stream, and the dependent-view video stream. It therefore suffices to decode only the I pictures and the P pictures in the video streams, thus facilitating the processing of the trick play that selects I pictures and P pictures.

(7) In the data creation device of the above-described embodiment, in the multiplexing process of the transport stream, different PIDs are assigned to respective video streams. However, not limited to this, the same PID may be assigned to both the base-view video stream and the dependent-view video stream.

With the above structure, it is possible to merge the access units of the respective video streams in conformance with the compress-encoding method of the multi-view video stream, and transfer the merged access units.

Figure 45:
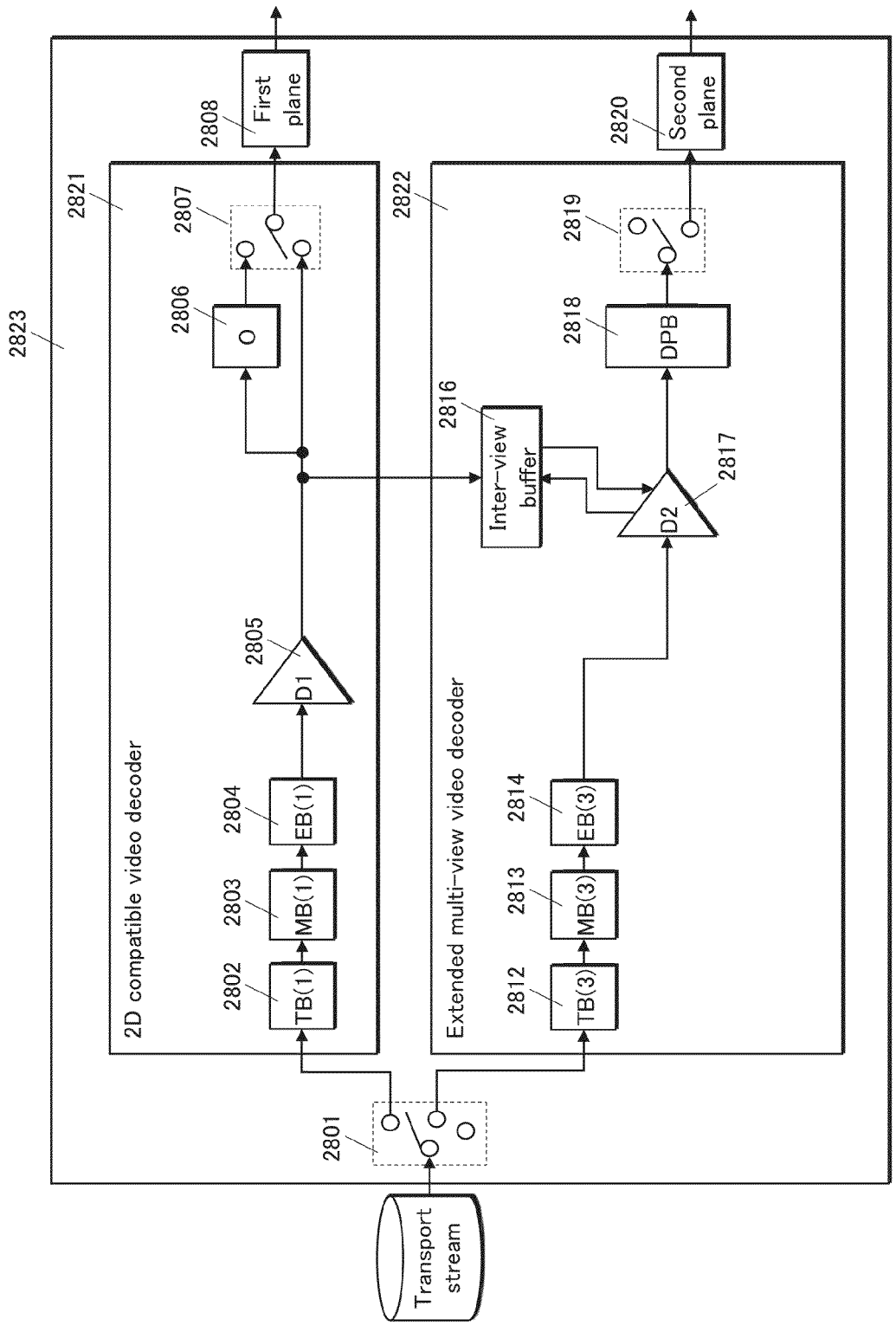
FIG. 45 illustrates the structure of the playback device for playing back the 3D video in the present embodiment when the base-view video stream and the dependent-view video stream are transferred in the same stream.

In this case, the base-view video stream and the dependent-view video stream are merged in conformance with the specifications of the compress-encoding method, and the playback device may be structured as illustrated in FIG. 45 in which the extended multi-view video decoder 2822 has one data transfer line.

Also, the base-view video stream and the dependent-view video stream may share the header information stored in the header (for example, sequence header, picture header) of each access unit storing pictures having the same time information. That is to say, the header information may be set only in the base-view video stream, and when the dependent-view video stream is decoded, the header information in the base-view video stream may be referenced. This makes it possible to omit the header information necessary for decoding, from the dependent-view video stream.

(8) In the data creation device of the above-described embodiment, as described above with reference to FIG. 23, pictures of the 2D compatible video stream and the dependent-view video stream having the same value of presentation time are set to have the same value of DTS, and pictures of the dependent-view video stream and the base-view video stream having the same value of presentation time are set to have the same value of DTS. However, pictures of different types of video streams having the same value of presentation time may not be set to have the same value of DTS. For example, as illustrated in FIG. 35, the values of DTS in the 2D compatible video stream may be set such that the pictures thereof are decoded earlier (by one frame, for example) than the pictures of the base-view video stream and the dependent-view video stream.

With this structure, the 2D compatible video stream can be decoded in advance. This makes it possible to perform the overwriting on the inter-view buffer and the decoding of pictures of the dependent-view video stream, with enough time.

Figure 35:
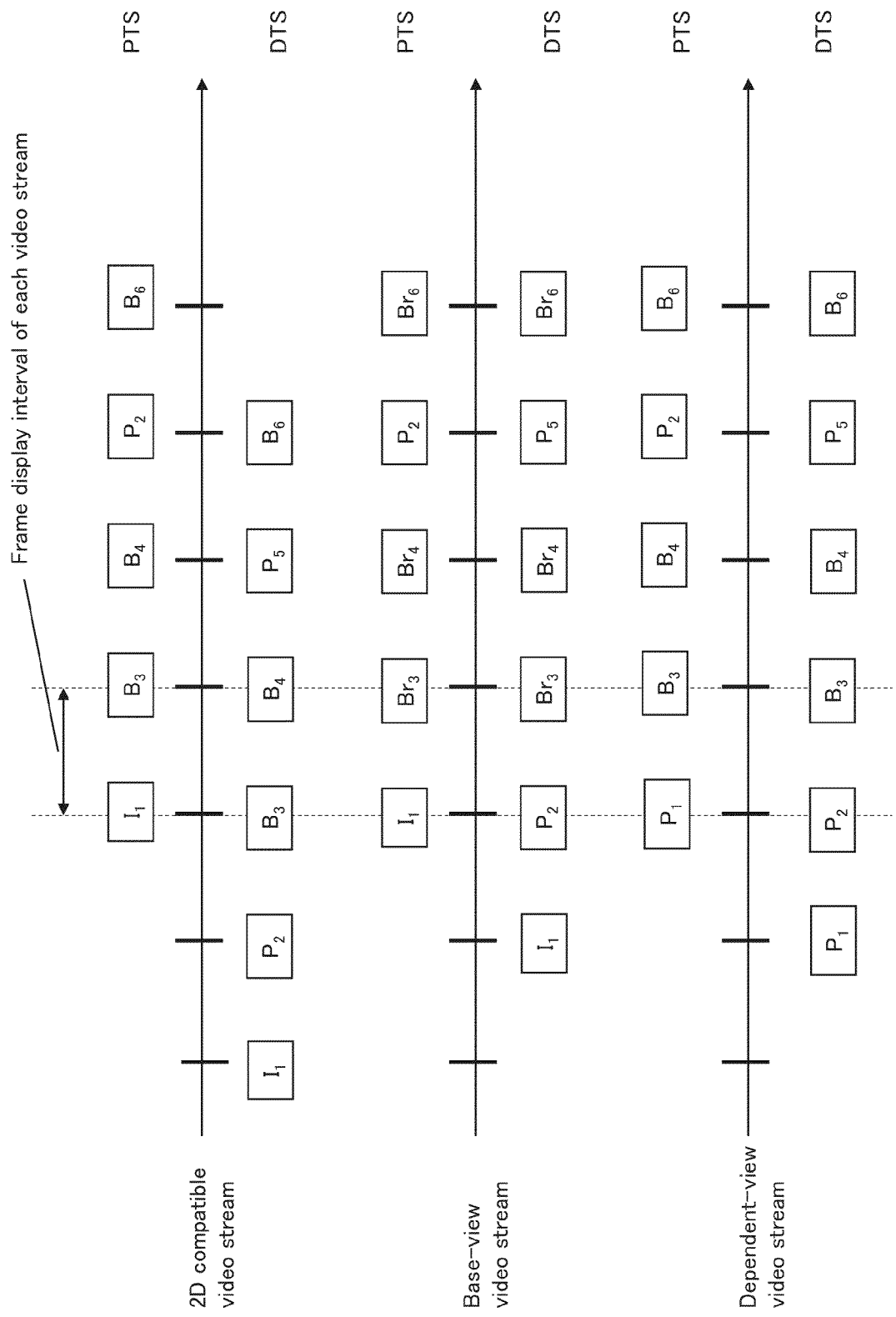
FIG. 35 illustrates a modification to the method of allocating the PTS and DTS to the transport stream for the 3D video in Embodiment 1.

Note that, in FIG. 35, pictures of the 2D compatible video stream and the dependent-view video stream storing disparity images of the same value of presentation time have the same value of PTS. However, to make it possible to decode the 2D compatible video stream in advance, the values of PTS in the 2D compatible video stream may be set to be earlier (by one frame, for example) than the pictures of the base-view video stream and the dependent-view video stream.

When different values of PTS are to be set between the 2D compatible video stream and the multi-view video stream, that is to say, for example, when the PTSs in the 2D compatible video stream are set to be earlier (by one frame, for example) than the PTSs in the dependent-view video stream, at the timing of replacing the pictures stored in the inter-view buffer, the pictures of the base-view video stream are replaced with pictures of the 2D compatible video stream whose PTSs are earlier by one frame than those of the base-view video stream.

Note that, when the PTS and DTS, which are assigned to the real data, are set as illustrated in FIG. 23, the values may be internally corrected such that the PTS and DTS of the pictures of the 2D compatible video stream become earlier before the decode process is performed.

Figure 34:
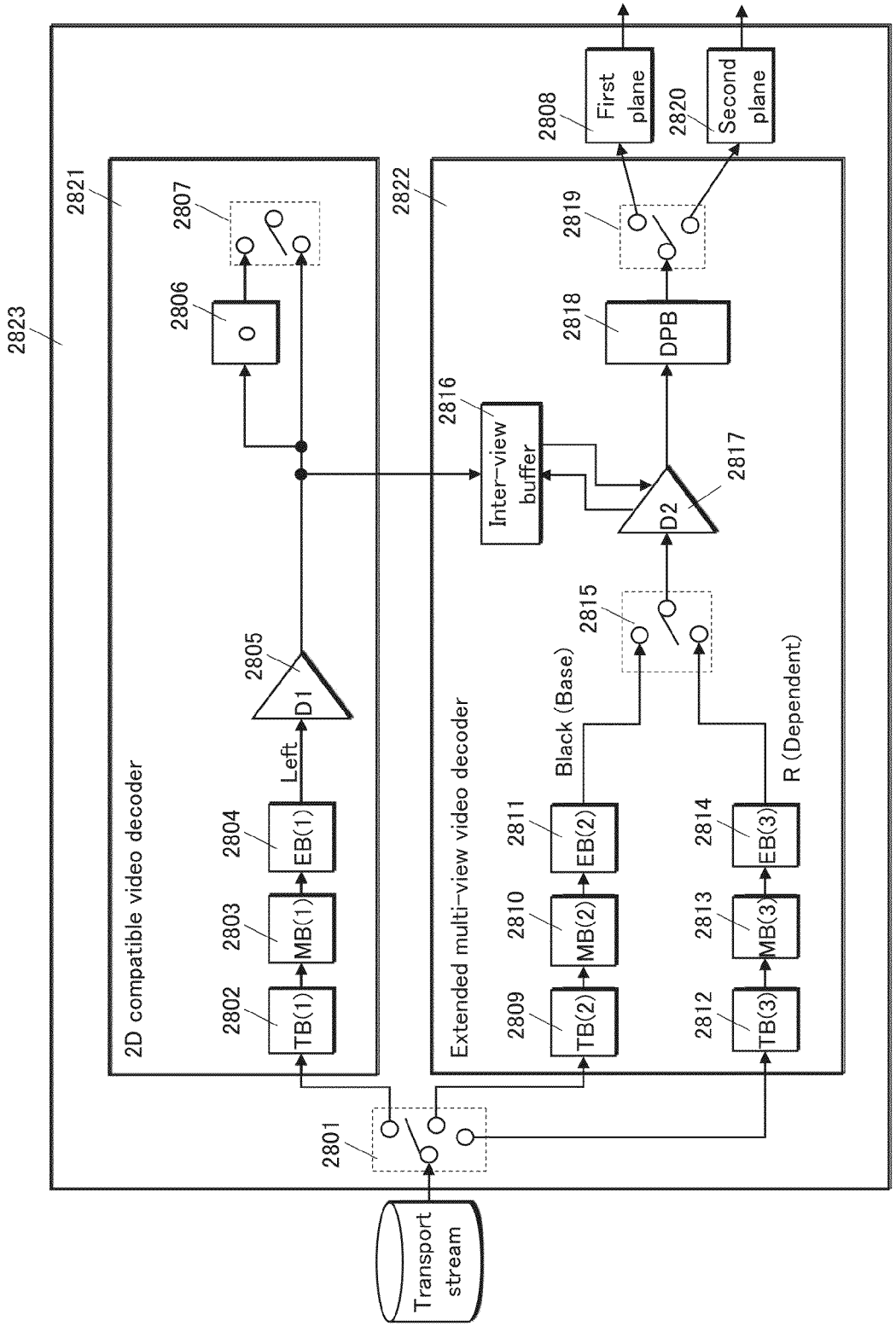
FIG. 34 illustrates a modification to the video output part in the playback device for playing back the 3D video in Embodiment 1.

(9) In the playback device of the above-described embodiment, in step S3005, the 2D compatible video decoder 2821 outputs the decoded picture of the 2D compatible video stream at the timing of the PTS to the first plane 2808. However, not limited to this, the extended multi-view video decoder 2822 may cause the output plane switch 2819 to output two types of video images, as illustrated in FIG. 34.

Adopting this structure allows for direct use of the mechanism for plane output to play back 3D video images using an existing multi-view video stream.

(10) In the above-described embodiment, the multiplex format has been described as a transport stream, but the multiplex format is not limited to this.

For example, the MP4 system format may be used as the multiplex format. More specifically, the input illustrated in FIG. 34 may be a file that has been multiplexed in conformance with MP4, and the input file may be demultiplexed into the 2D compatible video stream, base-view video stream and dependent-view video stream and decoded. The pictures of the dependent-view video stream are then decoded by referencing the pictures of the 2D compatible video stream that have been written over the pictures of the base-view video stream stored in the inter-view buffer 2816. While the MP4 system format does not include PTSs, header information (stts, stsz, and the like) in the MP4 system format may be used to identify time information for each access unit.

(11) In the above-described embodiment, the pictures referenced by the pictures of the dependent-view video stream are decoded pictures of the 2D compatible video stream, which is a different structure from the structure of the normal multi-view video stream. In view of this, the stream type and the stream_id included in the PES packet header may be set differently from the conventional multi-view video stream.

With this structure, the playback device can make a judgment on whether or not the 3D video playback format of the present embodiment is adopted by referencing the stream type and the stream_id, and change the playback method according to the judgment result.

(12) In the above-described embodiment, a playback format defined by descriptors is described with reference to FIG. 38. The playback format may be switched with a structure illustrated in FIG. 40.

Figure 40:
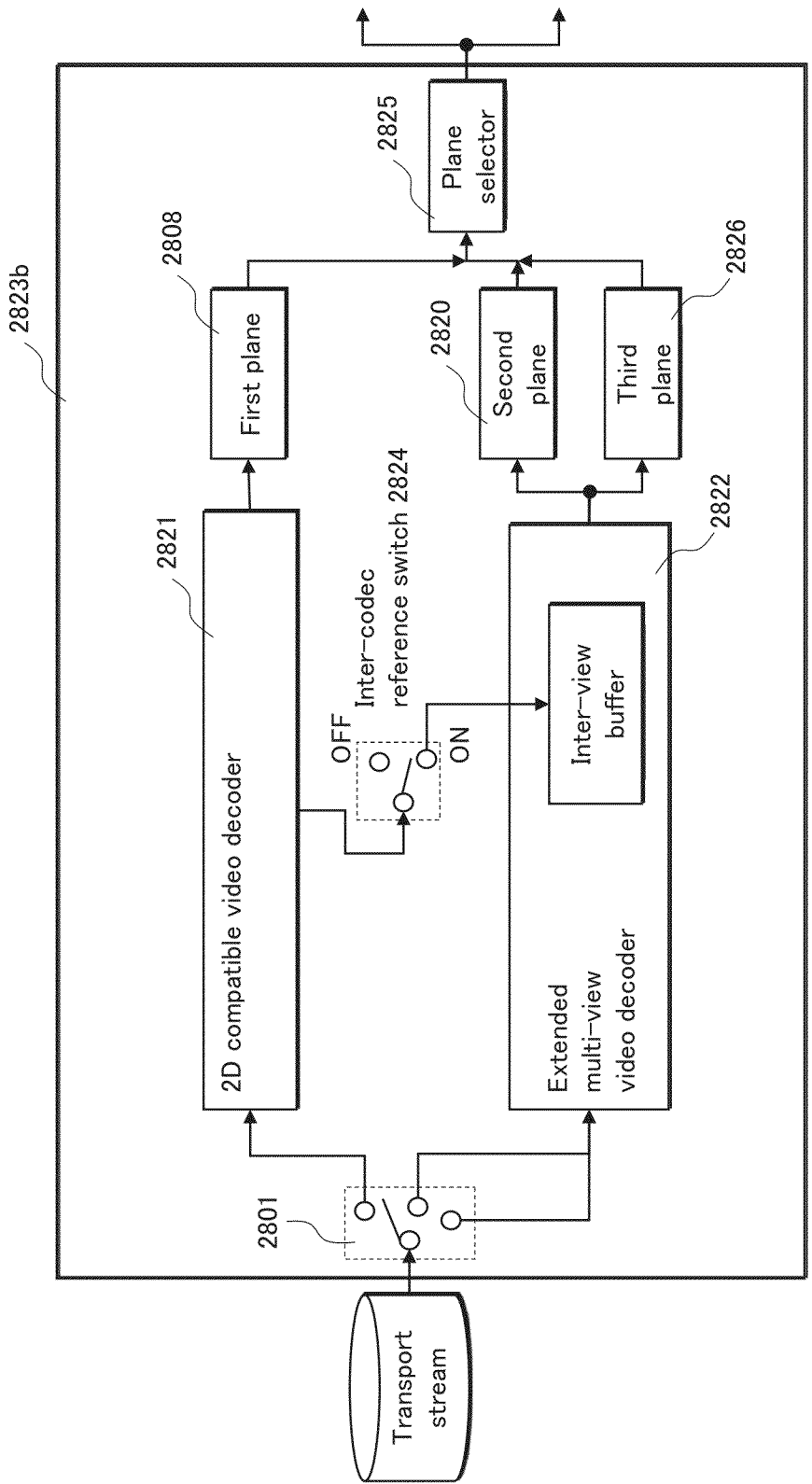
FIG. 40 illustrates a switching method according to a playback format in the playback device for playing back the 3D video in the present embodiment.

A playback device 2823*b* illustrated in FIG. 40 has basically the same structure as the playback device 2823 illustrated in FIG. 28, but differs in that it additionally includes an inter-codec reference switch 2824, a plane selector 2825, and a third plane 2826.

The inter-codec reference switch 2824, when ON, transfers data from the 2D compatible video decoder to the inter-view buffer in the extended multi-view video decoder as in step S3003, and when OFF, does not transfer data, as illustrated in FIG. 40.

The plane selector 2825 selects, from among a first plane 2808, a second plane 2820 and a third plane 2826, a plane to output a 2D video image, a plane to output a left-eye image of the 3D video image, and a plane to output a right-eye image of the 3D video image, wherein the first plane 2808 outputs pictures from the 2D compatible video decoder, the second plane 2820 outputs pictures of the base-view video stream from the extended multi-view video decoder, and the third plane 2826 outputs pictures of the dependent-view video stream from the extended multi-view video decoder.

The playback device 2823*b* changes the playback mode by switching the output of the inter-codec reference switch 2824 and switching the output of the plane selector 2825, in accordance with the playback format.

Figure 41:
FIG. 41 illustrates the relation among the playback format, inter-codec reference switch, and plane selector.

The following describes a specific method of switching among a plurality of playback formats with reference to FIG. 41, by using the example of the playback format illustrated in FIG. 38.

The lower portion of FIG. 41 illustrates switching between ON and OFF by the inter-codec reference switch 2824 and examples of planes selected by the plane selector 2825.

The playback device 2823*b* switches OFF the inter-codec reference switch 2824 when the playback format is set to "0". In connection with this, the plane selector 2825 selects the first plane 2808 for the 2D video image.

The playback device 2823*b* switches ON the inter-codec reference switch 2824 when the playback format is set to "1". In connection with this, the plane selector 2825 selects the first plane 2808 or the second plane 2820 for the left-eye image, and the third plane 2826 for the right-eye image.

The playback device 2823*b* switches OFF the inter-codec reference switch 2824 when the playback format is set to "2". In connection with this, the plane selector 2825 selects the second plane 2820 for the left-eye image, and the third plane 2826 for the right-eye image.

The playback device 2823*b* switches OFF the inter-codec reference switch 2824 when the playback format is set to "3". In connection with this, the plane selector 2825 selects the first plane 2808 for the left-eye image, and the first plane 2808 for the right-eye image.

Figure 42:
FIG. 42 illustrates the 2D transition period that is provided to allow for a smooth transition between playback formats.

(13) In the above-described embodiment, in the case where a transport stream, in which the playback format changes from a 3D video playback using the 2D compatible video stream and the dependent-view video stream to a 2D video playback using the 2D compatible video stream, is generated, some pictures of the 2D compatible video stream at the format change may be compress-encoded into the dependent-view video stream as well by taking into account the delay of the decode process, as illustrated in FIG. 42. The period in which some images of the 2D compatible video stream are compress-encoded into the dependent-view video stream is referred to as a 2D transition period, as indicated in the upper portion of FIG. 42. During the 2D transition period, 2D video images are played back regardless of which format is used, thus presenting a smooth image transition to the viewer. The 2D transition period may also be provided in the case of a playback format change from a 2D video playback to a 3D video playback. Furthermore, the 2D transition period may be provided for each case where the value set in "playback format", which signals the playback format as illustrated in FIG. 37, changes between "0" and any of "1", "2" and "3".

(14) As the values of "temporal_reference" which, included in each picture compress-encoded in the MPEG-2 format, indicates a presentation order of the picture, values of POC of pictures of the dependent-view video stream, which indicate the same values of presentation time, may be set.

With this structure, a video stream can be compress-encoded and decoded in the MPEG-2 format by using values within the video ES, without using PTS.

Alternatively, values of POC of pictures of the dependent-view video stream may be included in the user data in the pictures of the 2D compatible video stream that indicate the same values of presentation time.

This allows for the value of the temporal_reference to be set independently, thus increasing the degree of freedom during compress-encoding.

Figure 43:
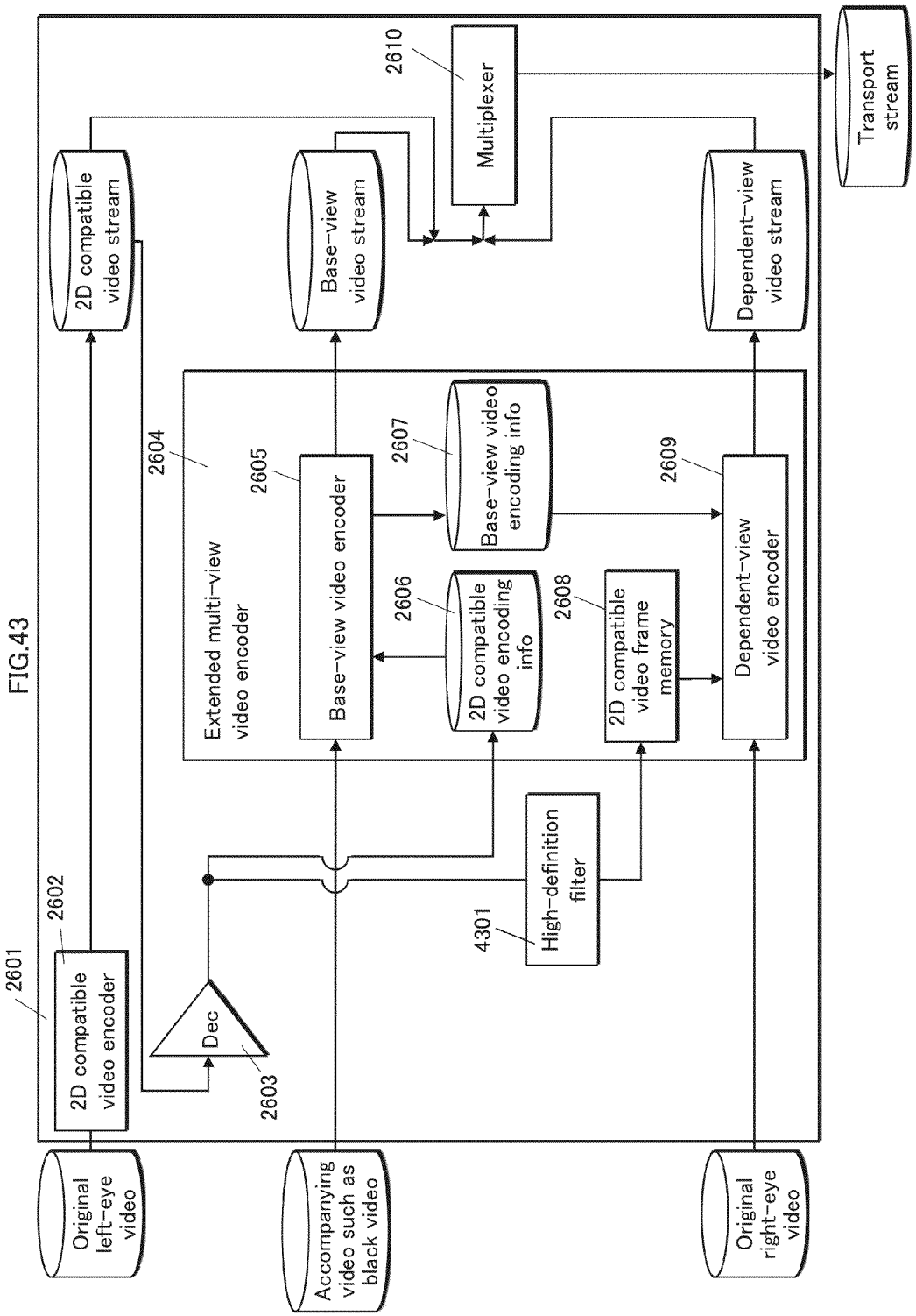
FIG. 43 illustrates the structure of the encoding device that applies a high-definition filter to the decoding result of the 2D compatible video stream.
Figure 44:
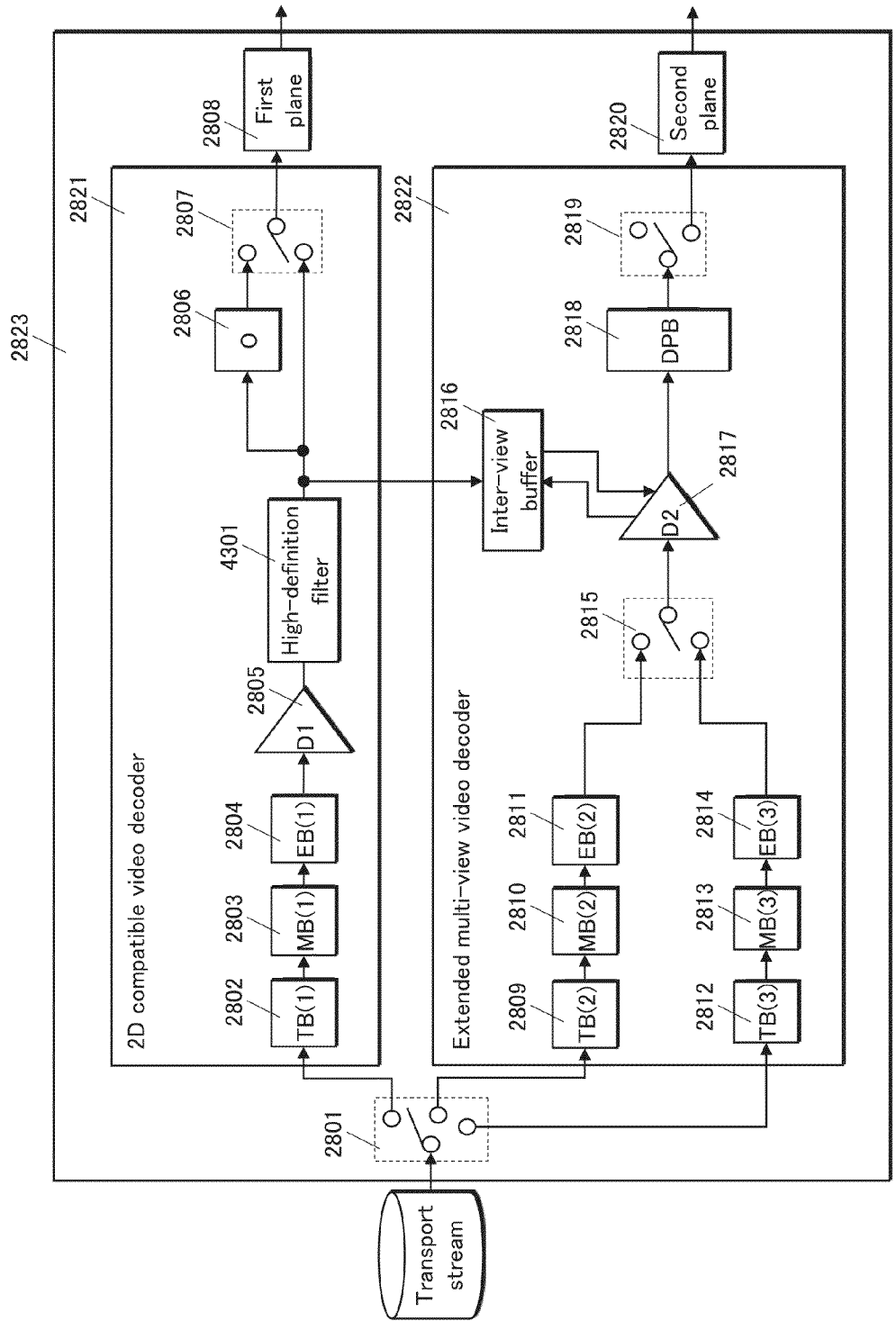
FIG. 44 illustrates the structure of the playback device that applies a high-definition filter to the decoding result of the 2D compatible video stream.

(15) In the above-described embodiment, a high-definition filter 4301 may be applied to the decoding result of the 2D compatible video stream as illustrated in FIGS. 43 and 44.

The high-definition filter 4301 is, for example, a deblocking filter to remove block noise as stipulated by MPEG-4 AVC. A flag indicating whether or not to apply the high-definition filter 4301 is prepared. For example, when the flag is set ON, the high-definition filter 4301 is applied, and when the flag is set OFF, the high-definition filter 4301 is not applied.

This flag may be included in, for example, a descriptor in the PMT or the supplementary data of a stream.

When the flag is set ON, the playback device applies the filter to decoding result data before the data is transferred to the inter-view buffer 2816.

Adopting this structure increases definition of 2D video images in the 2D compatible video stream. The structure also enables the dependent-view video stream to be decoded by referencing high-definition pictures, thus increasing definition of 3D video images. Furthermore, a plurality of high-definition filters 4301 may be provided, and it may be made possible to specify a filter type to select one of the plurality of high-definition filters 4301 depending on the intended use, not by setting a flag.

(16) In the above-described embodiment, one dependent-view video stream is used. However, not limited to this, a plurality of dependent-view video streams may be used.

In this case, the extended multi-view video stream may be configured to allow processing of a plurality of dependent-view streams. When replacing pictures stored in the inter-view buffer 2816 with pictures of the 2D compatible video stream, pictures having the same values of PTS of the base-view video stream may be replaced. Alternatively, the 2D compatible video stream may be configured to specify the replaced ViewID. In this way, the base-view pictures are not necessarily replaced; rather, pictures to be replaced may be selected from among pictures of a plurality of views.

Figure 46:
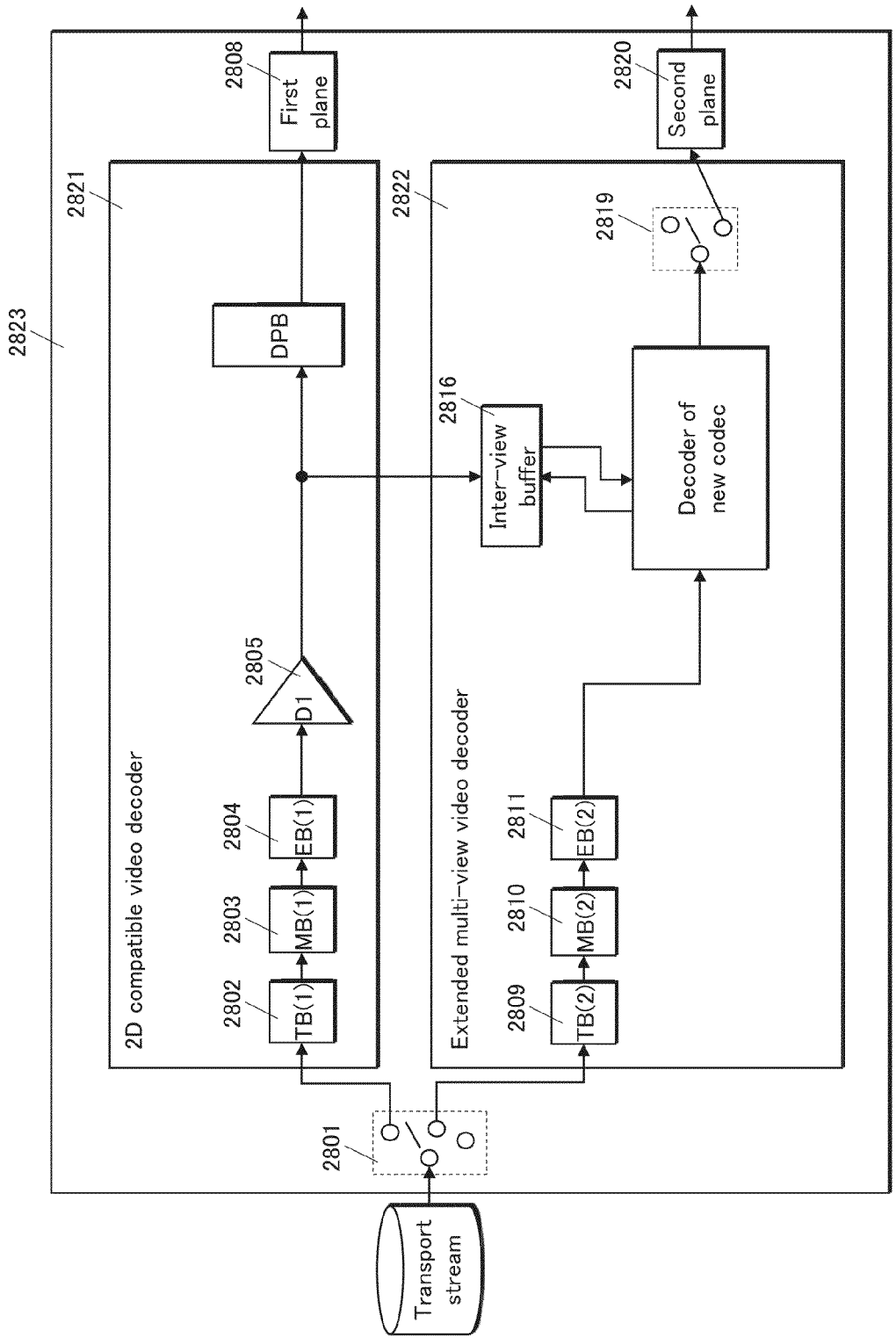
FIG. 46 illustrates the structure of the playback device when the base view is based on MPEG-4 AVC.

(17) In the above-described embodiment, the 2D compatible video stream is described as MPEG-2 video, and the multi-view video stream (including the base-view video stream and the dependent-view video stream) as MPEG-4 MVC video. However, of course, the type of codec is not limited to these examples. The playback device and data encoding device of the present embodiment can be adapted to the characteristics of the codec by changing the structure as necessary. For example, when the 2D compatible video stream is MPEG-4 AVC video, and the multi-view video stream is "new codec", the playback device may be structured as illustrated in FIG. 46, in which the O 2806 and the switch 2807 illustrated in FIG. 34 have been replaced with a DPB, and the pictures in the inter-view buffer 2816 may be managed in accordance with the structure of the "new codec".

(18) In the above-described embodiment, as a 3D video viewing method, the user wears 3D glasses provided with liquid crystal shutters. However, the 3D video viewing method is not limited to this method.

For example, a plurality of pairs of left-eye and right-eye pictures are arranged in rows within one screen. The pictures pass through hog-backed lenses, referred to as lenticular lenses, on the display screen. Pixels constituting the left-eye picture thus form an image for only the left eye, whereas pixels constituting the right-eye picture form an image for only the right eye, thereby showing the left and right eyes a disparity picture perceived in 3D. Not limited to the lenticular lens, a device with a similar function, such as a liquid crystal element, may be used.

Another method for stereoscopic viewing is a polarization method in which a longitudinal polarization filter is provided for left-view pixels, and a lateral polarization filter is provided for right-view pixels. The viewer looks at the display while wearing polarization glasses provided with a longitudinal polarization filter for the left eye and a lateral polarization filter for the right eye.

In addition to a method for preparing separate video images for the right eye and for the left eye, another method of stereoscopic viewing using parallax images is to prepare a separate depth map that indicates a depth value for each pixel in a 2D video image. Based on the depth map and the 2D video images, disparity images of a left-eye image and a right-eye image are generated.

FIG. 4 is a schematic diagram illustrating one example of generating disparity images of left-eye and right-eye images from a 2D video and a depth map.

The depth map includes depth values that respectively correspond to pixels constituting each image of a 2D video. In the example illustrated in FIG. 4, information indicating closeness (depth value "High") is assigned to a circular object in the 2D video, and information indicating remoteness (depth value "Low") is assigned to the other area in the 2D video. This information may be stored as a bit sequence for each pixel, or as an image (for example, a "black" portion of the image indicates that the depth is "Low", and a "white" portion of the image indicates that the depth is "High"). A disparity image can be created by adjusting the disparity amount of a 2D video based on the depth values included in the depth map. In the example illustrated in FIG. 4, the circular object in the 2D video has a "High" depth value, thus the disparity amount of the pixels constituting the circular object is increased when a disparity image is created. On the other hand, the other area in the 2D video has a "Low" depth value, thus left-eye and right-eye images are created by decreasing the disparity amount of the pixels constituting the area excluding the circular object. When the left-eye and right-eye images are displayed by the sequential segregation method or the like, a stereoscopic viewing is realized.

(19) In Embodiment 1, one dependent-view video stream is used. However, not limited to this, a plurality of dependent-view video streams may be used. For example, adopting the following structure makes it possible to realize a high-definition 3D video playback and restrict the bit rate of each dependent-view video stream to a low value.

Figure 99:
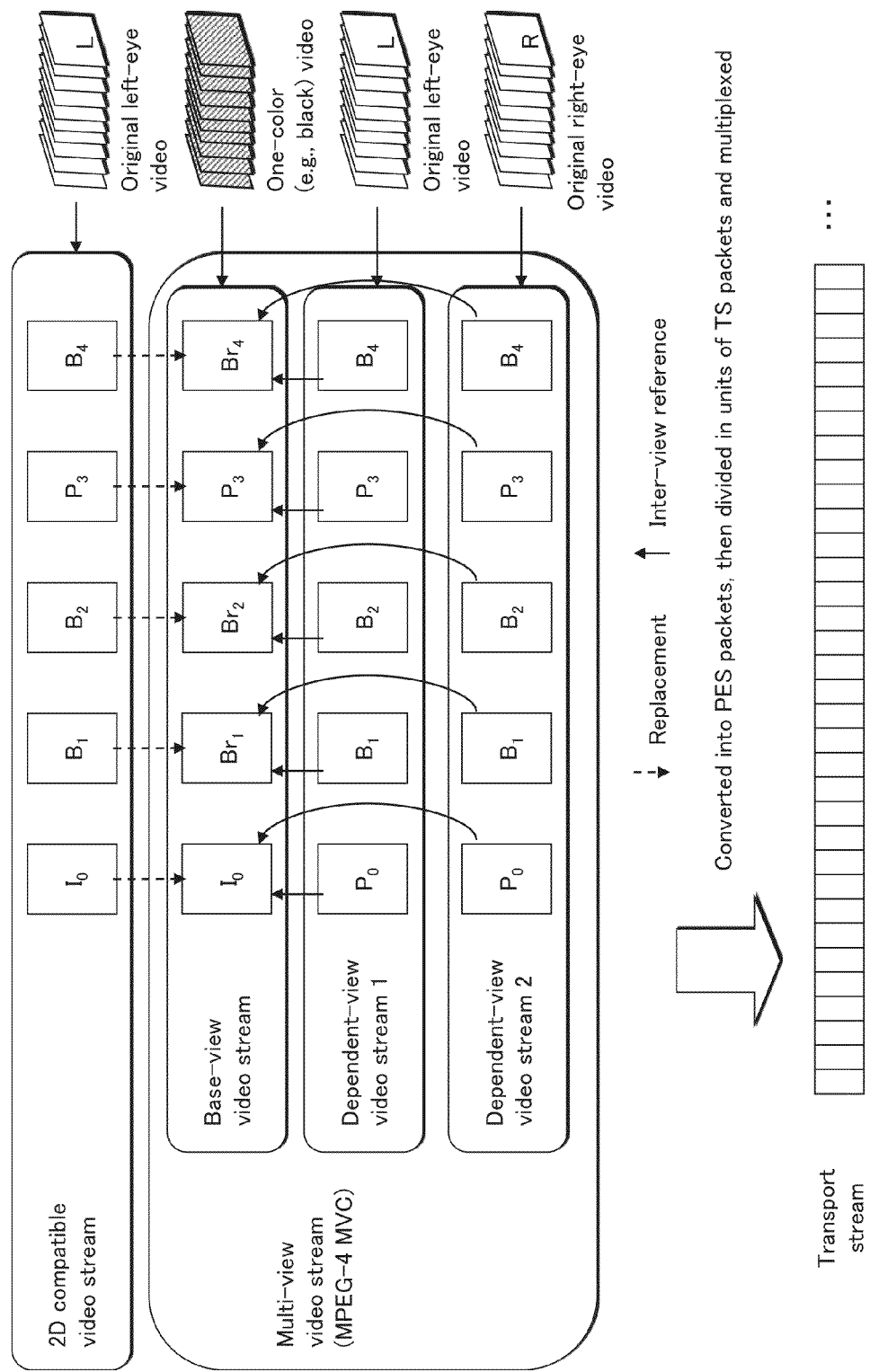
FIG. 99 illustrates the data structure in a modification of Embodiment 1.

FIG. 99 is a diagram illustrating an example case where two dependent-view video streams are used.

As illustrated in FIG. 99, a 2D compatible video stream is generated by compress-encoding a 2D video (corresponding to a left-eye video), a base-view video stream is generated by compress-encoding a black video, a dependent-view video stream 1 is generated by compress-encoding a left-eye video, and a dependent-view video stream 2 is generated by compress-encoding a right-eye video. It is assumed here that the left-eye video for the dependent-view video stream 1 and the right-eye video for the dependent-view video stream 2 are higher in image quality than the 2D video for the 2D compatible video stream. Each picture of the dependent-view video streams 1 and 2 is compress-encoded by referencing a decoded picture of the 2D compatible video stream. That is to say, the dependent-view video stream 1 equals in data amount to a difference between (i) the left-eye video that is higher in image quality than the 2D video contained in the 2D compatible video stream and (ii) the 2D video contained in the 2D compatible video stream. This reduces the data amount greatly compared with a case where a high-quality left-eye video is compress-encoded as it is. Similarly, the dependent-view video stream 2 equals in data amount to a difference between (i) the right-eye video that is higher in image quality than the 2D video contained in the 2D compatible video stream and (ii) the 2D video contained in the 2D compatible video stream. This reduces the data amount greatly compared with a case where a high-quality right-eye video is compress-encoded as it is.

The playback device side replaces the decoded pictures of the base-view video stream with decoded pictures having the same values of presentation time (PTS) of the 2D compatible video stream, and decodes the dependent-view video streams.

The following describes the present modification in more detail.

Figure 100:
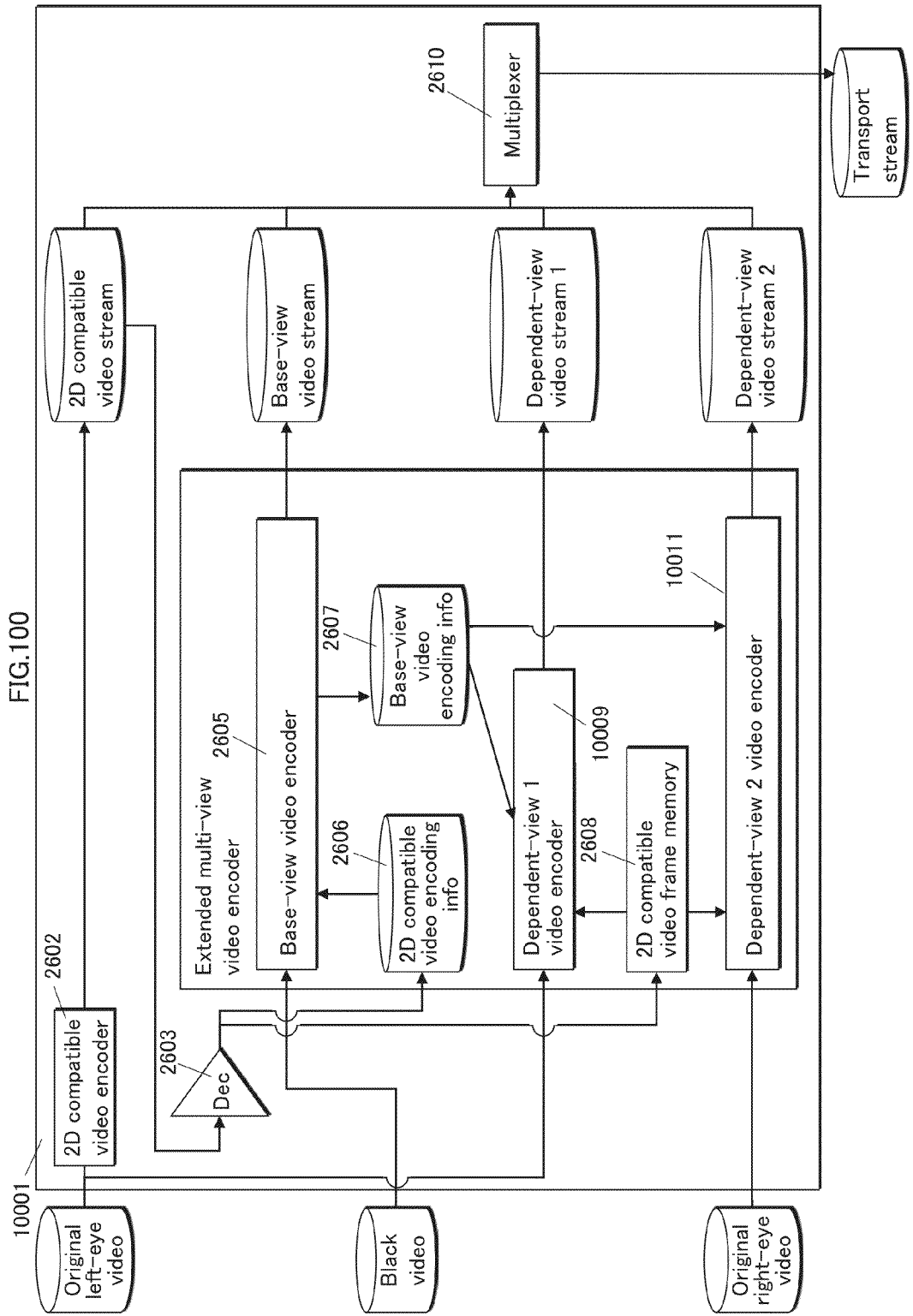
FIG. 100 illustrates the structure of the data creation device in a modification of Embodiment 1.

FIG. 100 illustrates the structure of a data creation device 10001 according to the present modification.

The data creation device 10001 has basically the same structure as the data creation device 2601, but differs in that it includes two dependent-view video encoders (10009, 10011). The following describes differences from the data creation device 2601.

A dependent-view 1 video encoder 10009 inputs an original left-eye video, compress-encodes the left-eye video in accordance with base-view video encoding information 2607, and outputs a dependent-view video stream 1. In this compress-encoding, the dependent-view 1 video encoder 10009 references a decoded picture having the same value of presentation time (PTS)/DTS of the 2D compatible video stream stored in the 2D compatible video frame memory 2608.

A dependent-view 2 video encoder 10011 inputs an original right-eye video, compress-encodes the right-eye video in accordance with base-view video encoding information 2607, and outputs a dependent-view video stream 2. In this compress-encoding, the dependent-view 2 video encoder 10011 references a decoded picture having the same value of presentation time (PTS)/DTS of the 2D compatible video stream stored in the 2D compatible video frame memory 2608.

Figure 101:
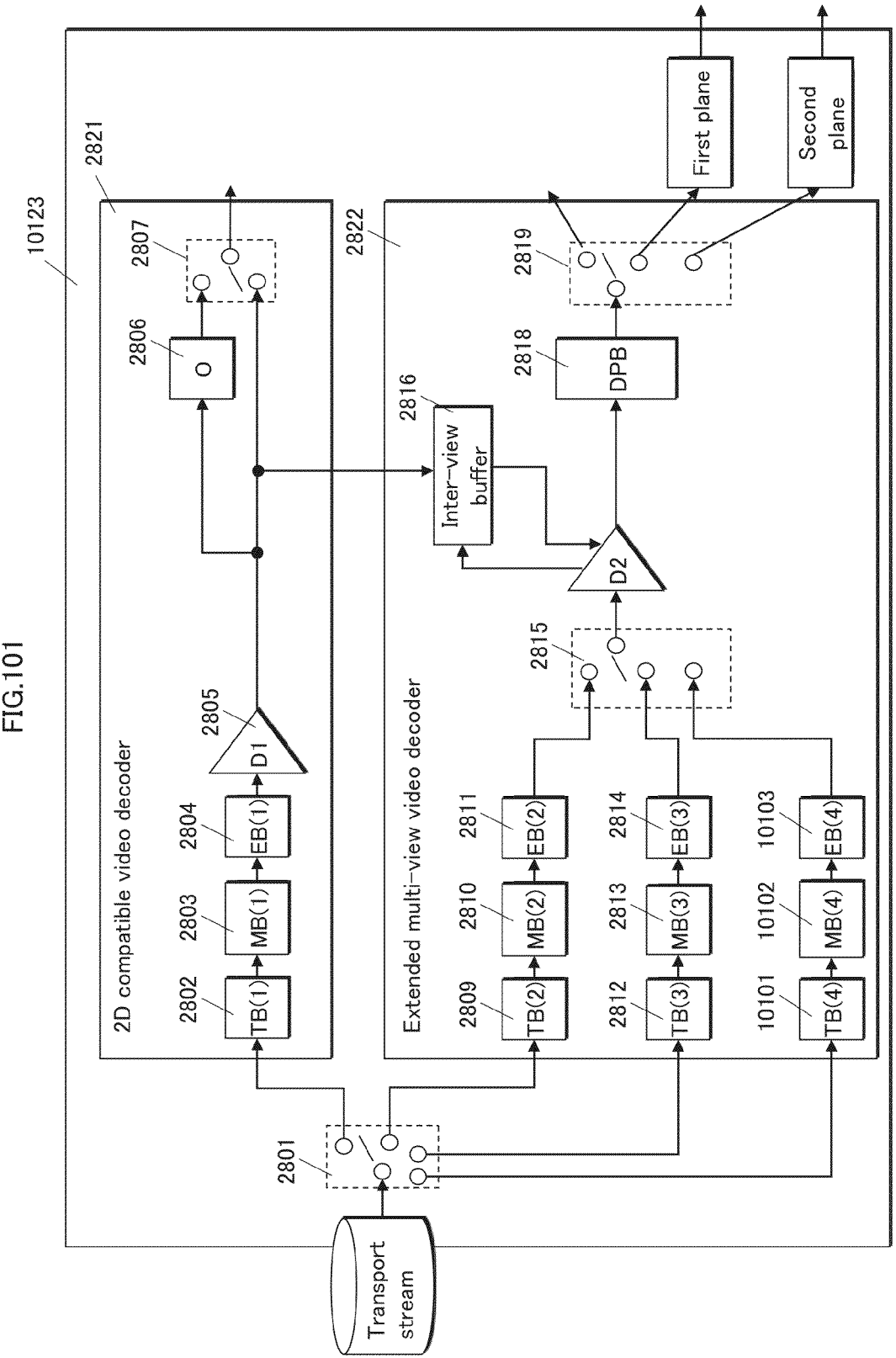
FIG. 101 illustrates the structure of the playback device in a modification of Embodiment 1.

FIG. 101 is a block diagram illustrating the structure of a playback device 10123 in the present modification.

The playback device 10123 has basically the same structure as the playback device 2823, and the following describes the differences therefrom. The playback device 10123 additionally includes TB(4), TB(4), and EB(4), and two dependent-view video streams are input to the multi-view video decoder. In the decoding process of the dependent-view video streams, pictures of the base-view video stream are replaced with pictures having the same values of presentation time of the 2D compatible video stream in the inter-view reference buffer 2816. Subsequently, the decoding process is performed by referencing the pictures after this replacement. The playback device 10123 plays back a 3D video by outputting the decoded pictures of the two dependent-view video streams as the 3D video.

(20) In Embodiment 1, the 2D compatible video stream is generated by encoding a progressive video. However, not limited to this, the 2D compatible video stream may be generated by encoding an interlaced video.

In the present modification, the 2D compatible video stream is generated by encoding an interlaced video, and the dependent-view video stream is generated by encoding a progressive video. The dependent-view video stream references pictures which are obtained by doubling the decoding results of the 2D compatible video stream in vertical size.

Figure 102:
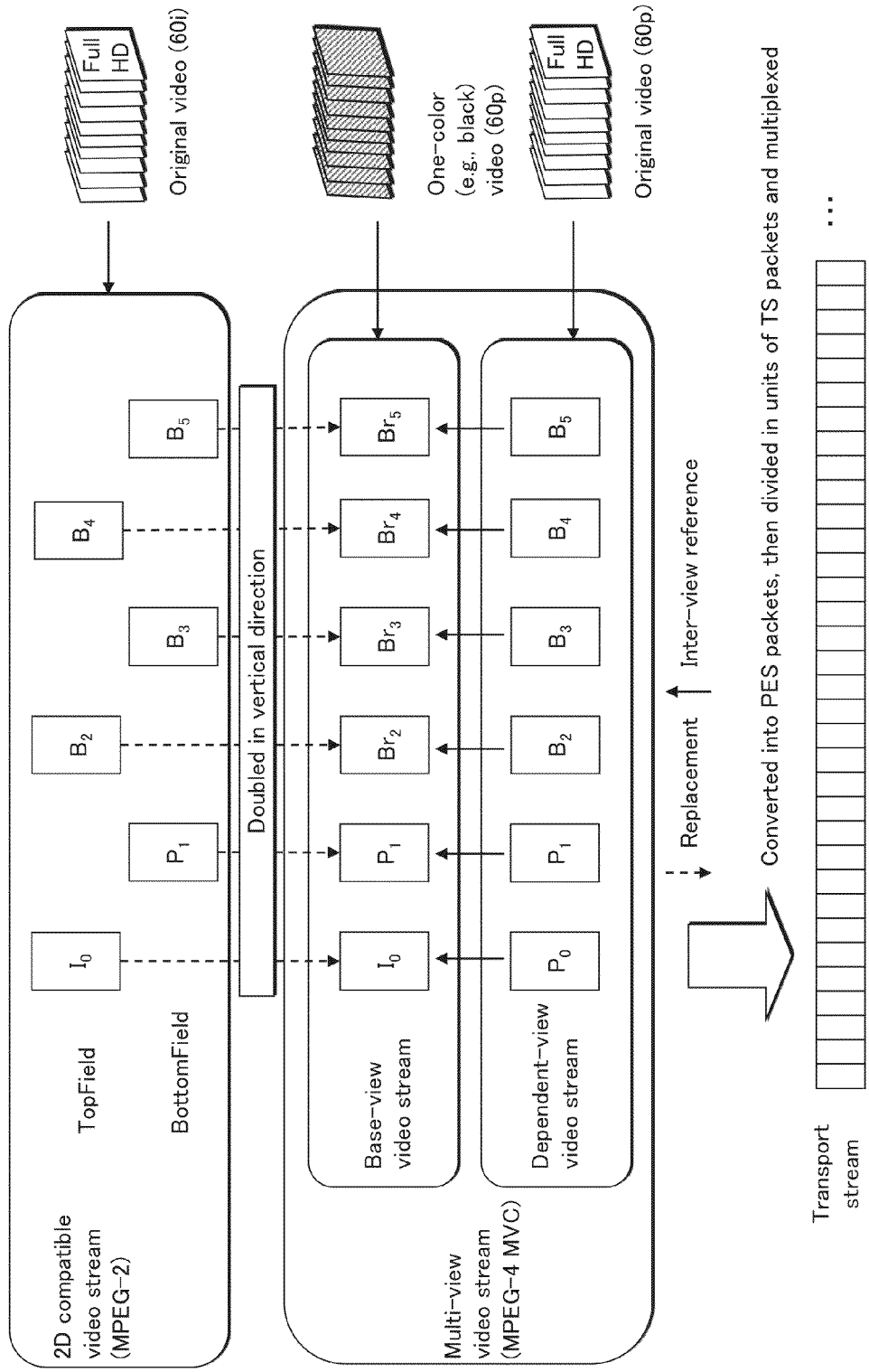
FIG. 102 illustrates the structure of the data creation device in a modification of Embodiment 1.

FIG. 102 illustrates the stream structure in the present modification.

The 2D compatible video stream is generated by compress-encoding Full HD interlaced video having a frame rate of 60 Hz (1080i/60i) that is composed of top-field pictures and bottom-field pictures. The base-view video stream of the multi-view video stream is generated by compress-encoding a Full HD progressive video having a frame rate of 60 Hz (1080/60p) that is composed of one-color (for example, black) video (hereinafter referred to as "black video") having been encoded at a low bit rate. The dependent-view video stream of the multi-view video stream is generated by compress-encoding a Full HD progressive video having a frame rate of 60 Hz (1080/60p) and having the same contents as the 2D compatible video stream.

The playback device replaces each decoded picture of the base-view video stream with a decoded picture having the same value of presentation time (PTS) of the 2D compatible video stream at the timing indicated by the DTS, so that the playback device can decode each picture of the dependent-view video stream by referencing a picture having the same value of presentation time of the 2D compatible video stream.

With the above structure, 2D interlaced video can be played back by playing back the 2D compatible video stream, and 2D progressive video can be played back by playing back the dependent-view video stream.

Figure 103:
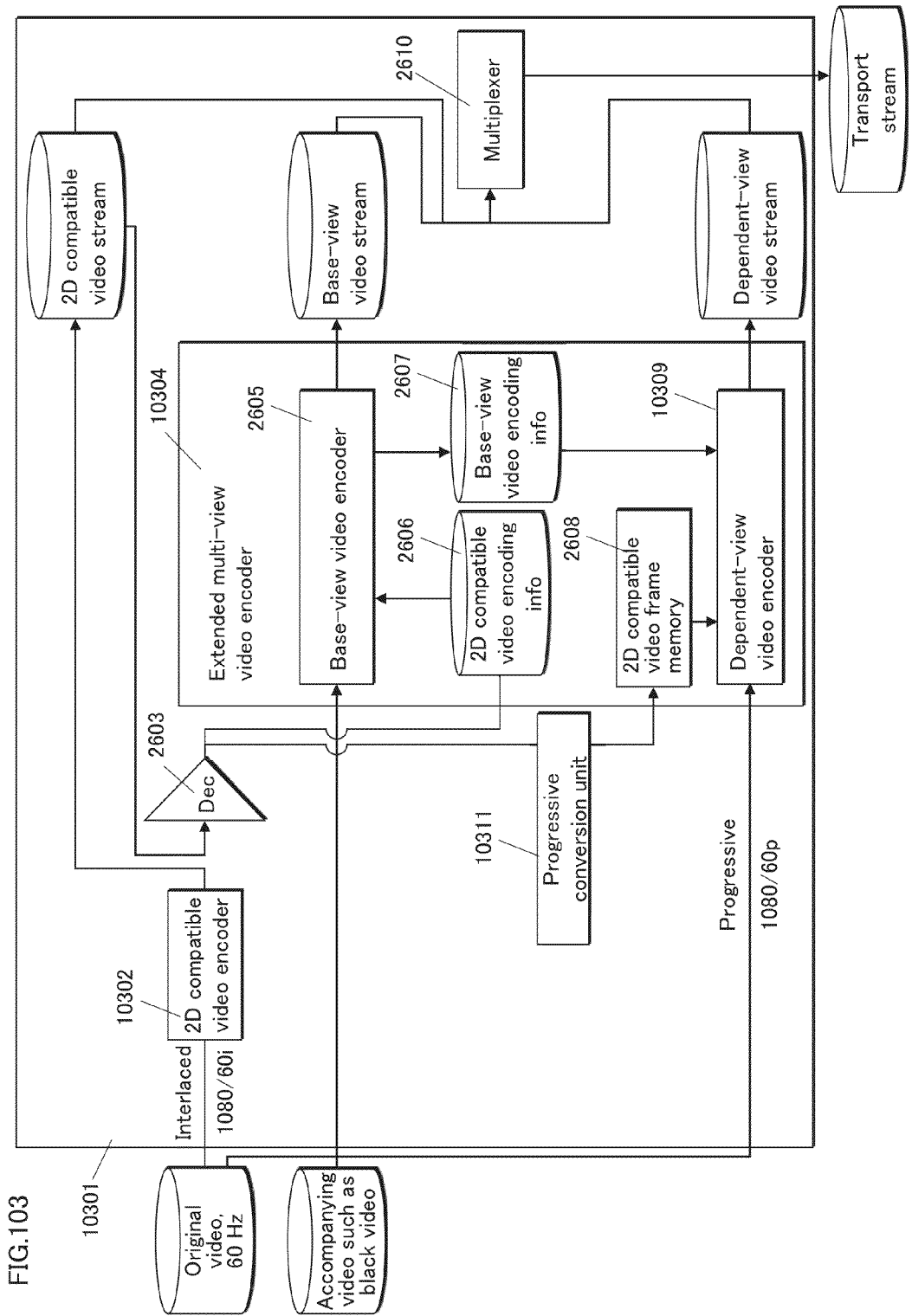
FIG. 103 illustrates the structure of the data creation device in a modification of Embodiment 1.

FIG. 103 illustrates the structure of a data creation device 10301 in the present modification. The data creation device 10301 basically has the same structure as the data creation device 2601, but differs therefrom in a 2D compatible video encoder 10302, a progressive conversion unit 10311, and a dependent-view video encoder 10309.

The 2D compatible video encoder 10302 generates the 2D compatible video stream by converting original progressive video having a frame rate of 60 Hz into interlaced video and encoding the interlaced video.

The progressive conversion unit 10311 converts interlaced video, which is obtained by decoding the 2D compatible video stream, into progressive video and stores the progressive video into the 2D compatible video frame memory 2608. The method for converting the interlaced video into the progressive video includes, for example, a method for interpolating scan lines between original scan lines aligning vertically, but is not limited to this method. For example, with regard to video having a small amount of motion, the scan lines at the same position of the preceding picture may be used as they are. Also, a different method may be selected for each scene such that, with regard to a portion having a small amount of motion in video, the scan lines at the same position of the preceding picture are used as they are, and with regard to a portion having a large amount of motion, scan lines are interpolated between original scan lines aligning vertically.

The dependent-view video encoder 10309 generates the dependent-view video stream by compress-encoding input progressive video based on the base-view video encoding information. In this compress-encoding, the dependent-view video encoder 10309 references, among pictures of the progressive video stored in the 2D compatible video frame memory 2608 by the progressive conversion unit 10311, a picture having the same value of presentation time as an encoding target picture by the inter-view reference.

Figure 104:
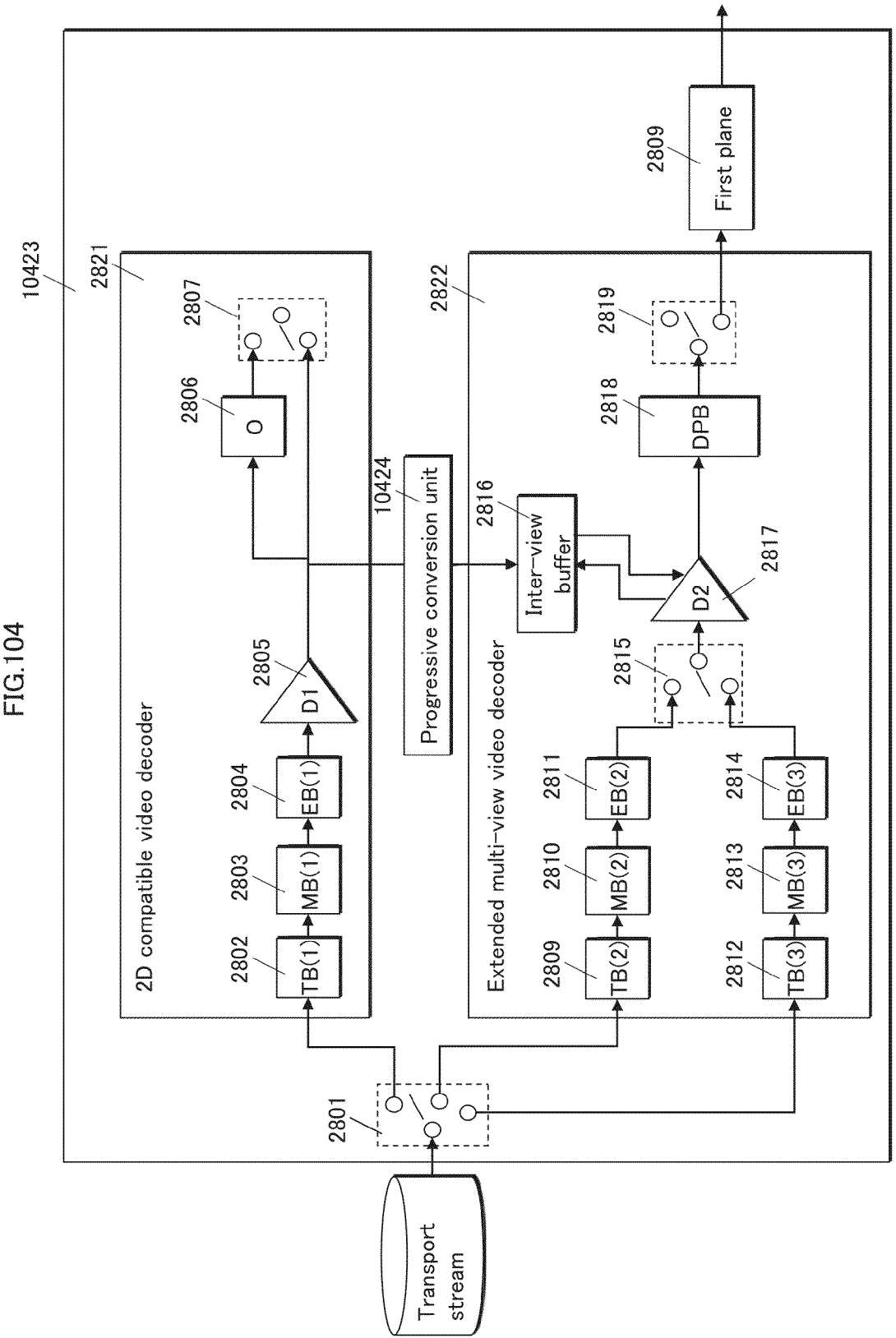
FIG. 104 illustrates the structure of the playback device in a modification of Embodiment 1.

FIG. 104 illustrates the structure of a playback device in the present modification.

A playback device 10423 outputs, as progressive video, decoded video of the dependent-view video stream. The playback device 10423 basically has the same structure as the playback device 2823, but differs therefrom in that it additionally has a progressive conversion unit 10424.

The progressive conversion unit 10424 converts the interlaced pictures decoded by the 2D compatible video compressed video image decoder 2805 into progressive pictures. The conversion into progressive video may be performed by the same method performed by the progressive conversion unit of the data creation device. For example, as described above, scan lines may be interpolated between original scan lines aligning vertically, constituting an interlaced picture. When each dependent-view video stream is decode, among pictures stored in the inter-view buffer 2816, a picture having the same value of presentation time as a decoding target picture is referenced.

Note that the progressive conversion method used by the progressive conversion unit 10424 of the playback device 10423 is not limited to the above-described method, but may be any other method. For example, when a scan line is interpolated between two scan lines aligning vertically, a pixel may be interpolated by using pixels aligning vertically and obliquely, not from pixels aligning vertically.

Also, when the progressive conversion unit 10311 of the data creation device 10301 has an option to use one of a plurality of methods to perform the conversion into progressive video, an optimum method may be selected and the conversion may be performed by using the selected method, and information indicating the selected method may be included, as a descriptor, in, for example, supplementary data of system packet or video stream. The progressive conversion unit 10424 of the playback device 10423 judges which progressive conversion method was used, based on the information of the descriptor, and uses the progressive conversion method.

With this structure, pictures to be referenced are converted into high-definition progressive pictures by an optimum method, and thus the dependent-view video stream that is compressed by referencing the high-definition pictures by the inter-view reference becomes high-definition, as well.

Furthermore, the interpolation may be performed by using not only a picture having the same value of presentation time, but also pictures having values of presentation time that precede and follow the presentation time of the target picture. In that case, the interpolation may be performed by using pictures stored in the O 2806 or DPB 2818 in the 2D compatible video decoder. In that case, information indicating which frame is used is stored in a progressive conversion method field of a descriptor.

(21) In the present embodiment, the inter-view reference is performed between the 2D compatible video stream and the multi-view video stream. However, not limited to this, the inter-view reference may be performed among a plurality of multi-view video streams.

Figure 105:
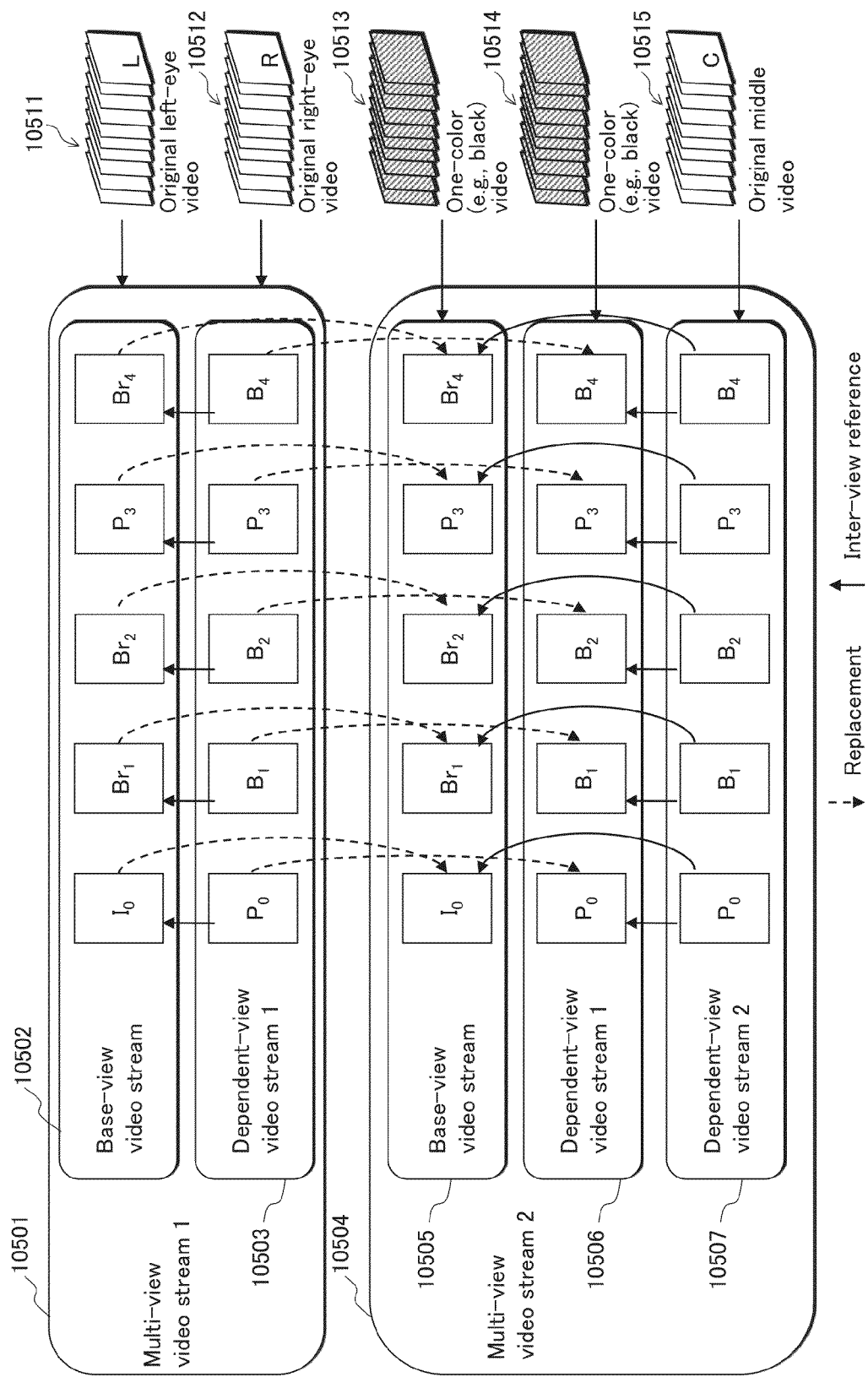
FIG. 105 illustrates the data structure in a modification of Embodiment 1.

FIG. 105 illustrates the stream structure in the present modification. The encoding targets include an original left-eye video 10511, an original right-eye video 10512, and an original middle video 10515 whose viewpoint is in the middle of the left and right eyes.

A multi-view video stream 1 10501 includes a base-view video stream 10502 and a dependent-view video stream 10503. The base-view video stream 10502 is generated by compress-encoding the original left-eye video 10511, and the dependent-view video stream 1 10503 is generated by compress-encoding the original right-eye video 10512.

Also, a multi-view video stream 2 10504 includes a base-view video stream 10505 and a dependent-view video stream 1 10506 and a dependent-view video stream 2 10507. The base-view video stream 10505 is generated by compress-encoding a one-color (e.g., black) video 10513, and the base-view video stream 10506 is generated by compress-encoding a one-color (e.g., black) video 10514. The dependent-view video stream 10507 is generated by encoding the original middle video 10515. It should be noted here that the original middle video 10515 is compress-encoded by referencing decoded pictures of the base-view video stream 10505 corresponding to the original left-eye video 10511, and decoded pictures of the dependent-view video stream 1 10506 corresponding to the original right-eye video 10512.

When the multi-view video stream 2 10504 is decoded, decoded pictures of the base-view video stream 10505 and dependent-view video stream 1 10506 of the multi-view video stream 2 10504 are replaced with decoded pictures of the base-view video stream 10502 and dependent-view video stream 1 10503 of the multi-view video stream 1 10501. Subsequently, the dependent-view video stream 2 10507 of the multi-view video stream 2 10504 is decoded by referencing the decoded pictures of the base-view video stream 10502 and dependent-view video stream 1 10503 of the multi-view video stream 1 10501.

Note that, for the multi-view video stream 1 and the multi-view video stream 2 to have different ViewIDs, information indicating correspondence in ViewID among a plurality of multi-view video streams may be included in system packet, supplementary data or the like.

FIG. 106 illustrates one example of matching information indicating correspondence among a plurality of streams. The matching information includes: information indicating a replacing stream and a replaced stream; and information indicating correspondence between ViewIDs of the replacing stream and ViewIDs of the replaced stream.

The playback device can recognize the correspondence between the replacing stream and the replaced stream by referencing the correspondence between ViewIDs of the plurality of multi-view video streams indicated by the matching information.

(22) In the present embodiment, as illustrated in FIG. 21, one-color (e.g., black) video is compress-encoded in order to compress the base-view video stream at a low bit rate. This, however, is because the method for replacing pictures in the inter-view buffer by different codecs is not defined in the codec of the multi-view video stream. For example, the method for replacing pictures in the inter-view buffer by different codecs may be defined, and information instructing to skip the video compression may be prepared in a Syntax element. In that case, information indicating which picture is to replace the replace-target picture (PID, PTS, DTS, POC or the like of the replacing picture) may be stored.

(23) In the present embodiment, the base-view video stream is generated by compress-encoding one-color (for example, black) video. However, not limited to this, the base-view video stream may be generated by compress-encoding differential video (difference between the 2D compatible video and the original left-eye video) that increases the image quality of the 2D compatible video stream. With the 2D compatible video stream whose image quality has been increased by using the differential video, encoding the dependent-view video stream by referencing the high-quality pictures can increase the image quality of the dependent-view video stream as well.

FIG. 86 illustrates the structure of video streams in the present modification.

The 2D compatible video stream is generated by compress-encoding the original left-eye video.

The multi-view video stream includes the base-view video stream and the dependent-view video stream. The base-view video stream is generated by compress-encoding the difference between the 2D compatible video and the original left-eye video. The dependent-view video stream is generated by compress-encoding the original right-eye video.

Figure 89:
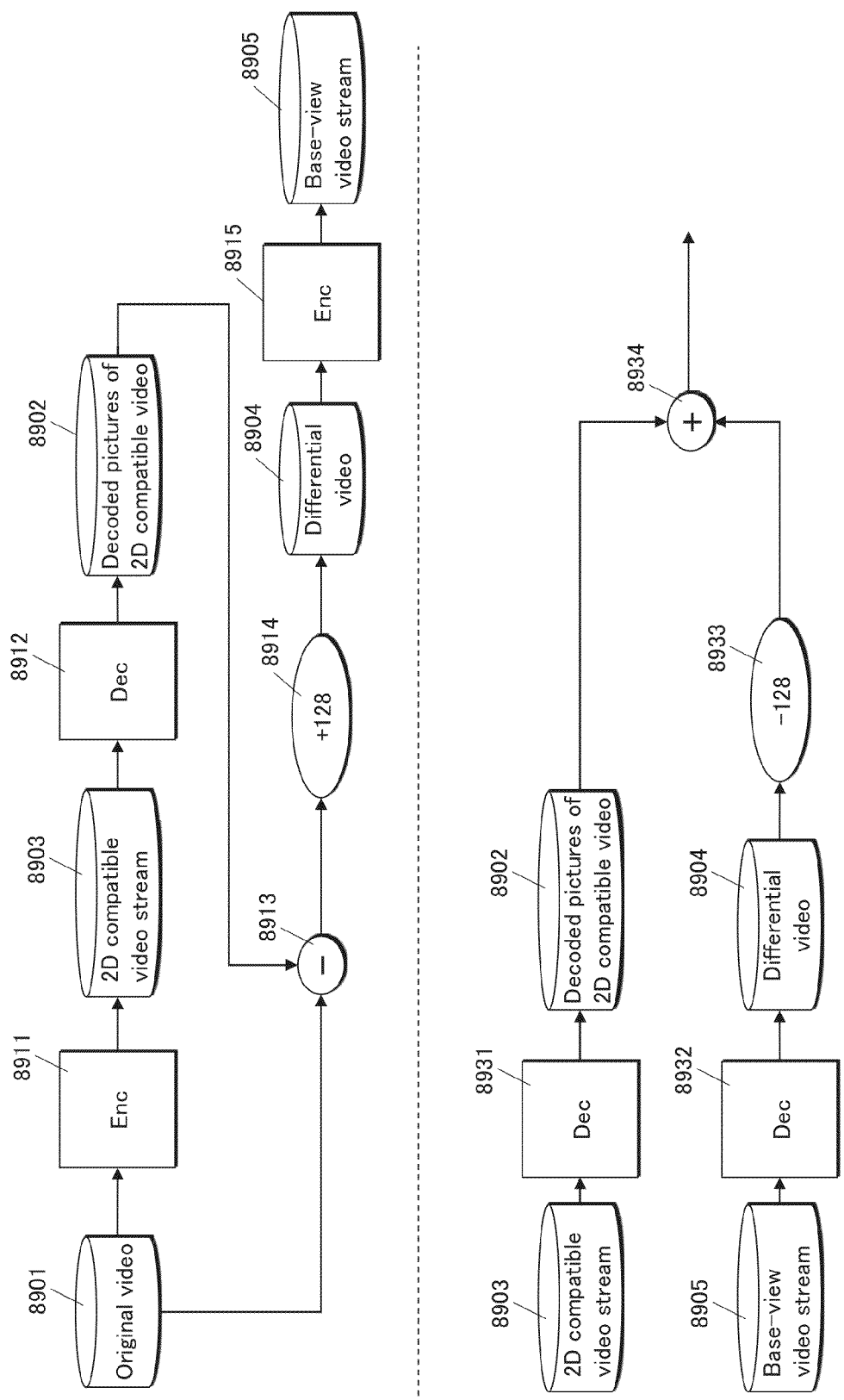
FIG. 89 illustrates an outline of the procedure for creating and playing back a differential video realizing the high-definition video.

The upper portion of FIG. 89 illustrates an outline of the procedure for creating the differential video.

First, the original video 8901 is compress-encoded (8911) to generate the 2D compatible video stream (8903). Subsequently, the 2D compatible video stream (8903) is decoded (8012) to obtain decoded pictures of the 2D compatible video (8902). Then a differential value (differential video) between each picture of the original video 8901 and each decoded picture of the 2D compatible video (8902) is calculated (8913), and the calculated differential value is added with a value 128 (8914). Here, the value 128 is added for the following reason. That is to say, if the differential value is calculated in a simple manner, signed information (in a range from −128 to +128 in the case of an 8-bit color, for example) is obtained and a bit representing the sign is required in addition. To cut the bit representing the sign, the calculation result is converted into a positive value by adding the value 128. Here, the difference between each picture of the original video 8901 and each decoded picture of the 2D compatible video 8902 has a small dynamic range, and is easy to produce a large compression effect.

The lower portion of FIG. 89 illustrates an outline of the procedure for compositing the differential video explained in the upper portion of FIG. 89.

First, the 2D compatible video stream 8903 is decoded to obtain decoded pictures of the 2D compatible video 8902. The base-view video stream 8905 is decoded to obtain the differential video 8904. Each picture of the differential video 8904 is added with "−128" to be brought back to signed information (8933). The signed information of each picture is composited with each decoded picture of the 2D compatible video 8902 in units of pixels (8934).

With the above structure, it is possible to increase the image quality of the 2D compatible video stream by using the differential video, and increase the image quality of the dependent-view video stream as well by using the high-quality pictures as reference images.

The following describes a data creation device and a playback device for this data structure.

Figure 87:
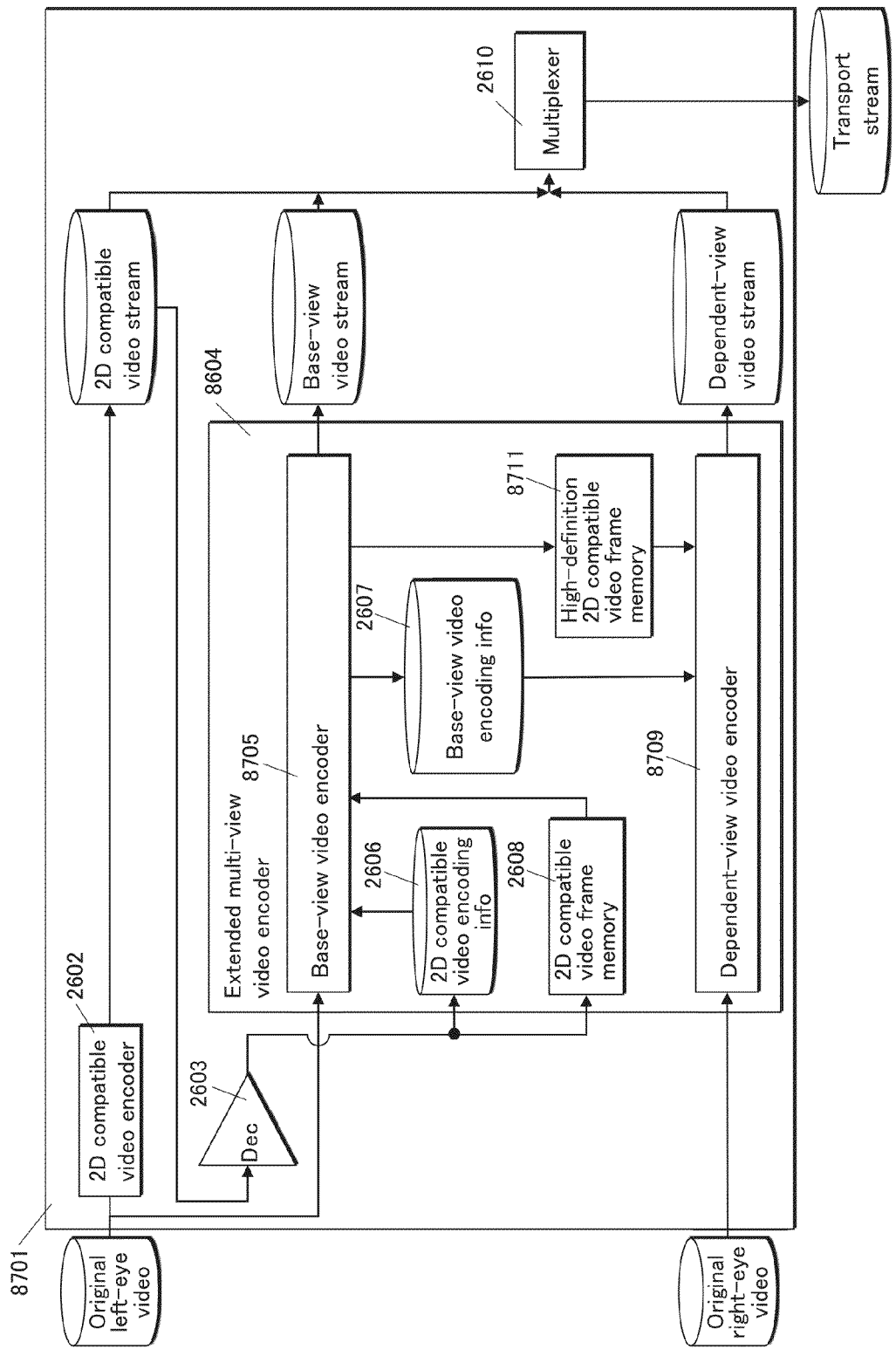
FIG. 87 illustrates the structure of the data creation device in a modification of Embodiment 1.

FIG. 87 illustrates the structure of the data creation device.

A data creation device 8701 basically has the same structure as the data creation device 2601, but differs therefrom in a base-view video encoder 8705 and a dependent-view video encoder 8709, and in that it additionally includes a high-definition 2D compatible video frame memory 8711.

The base-view video encoder 8705 compress-encodes the base-view video stream in a video codec for multi-view video stream (for example, MPEG-4 MVC), and generates the base-view video stream by compress-encoding the differential video representing differences between each picture of the original left-eye video and each decoded picture of the 2D compatible video stream in accordance with the 2D compatible video encoding information 2606. The base-view video encoder 8705 also outputs the base-view video encoding information 2607, and outputs the composite video of each decoded picture of the 2D compatible video stream and the differential video to a high-definition 2D compatible video frame memory 8711.

More specifically, the base-view video encoder 8705 first generates a differential video that represents the difference between the original left-eye video and each decoded picture of the 2D compatible video stream. The method for generating the differential video has already been explained with reference to the upper portion of FIG. 89. The differential video is then compress-encoded by determining the encoding method of the base-view video stream by referencing the 2D compatible video encoding information 2606. The method of compress-encoding the video is the same as the method described with regard to the base-view video encoder 2605. The base-view video encoder 8705 outputs the compress-encoded video stream as the base-view video stream and outputs video resulting from compositing the differential video obtained by decoding the base-view video stream with each decoded picture of the 2D compatible video stream to the high-definition 2D compatible video frame memory. The compositing method has already been explained with reference to the lower portion of FIG. 89.

The dependent-view video encoder 8709, having a function to compress-encode the dependent-view video stream in a video codec for multi-view video stream (for example, MPEG-4 MVC), compress-encodes the original right-eye video in accordance with the base-view video encoding information 2607 and outputs the dependent-view video stream. Here the dependent-view video encoder 8709 performs the compress-encoding by referencing, by the inter-view reference, the high-definition decoded pictures of the 2D compatible video stream stored in the high-definition 2D compatible video frame memory 8711. The method of compress-encoding is the same as that of the dependent-view video encoder 2609.

Figure 88:
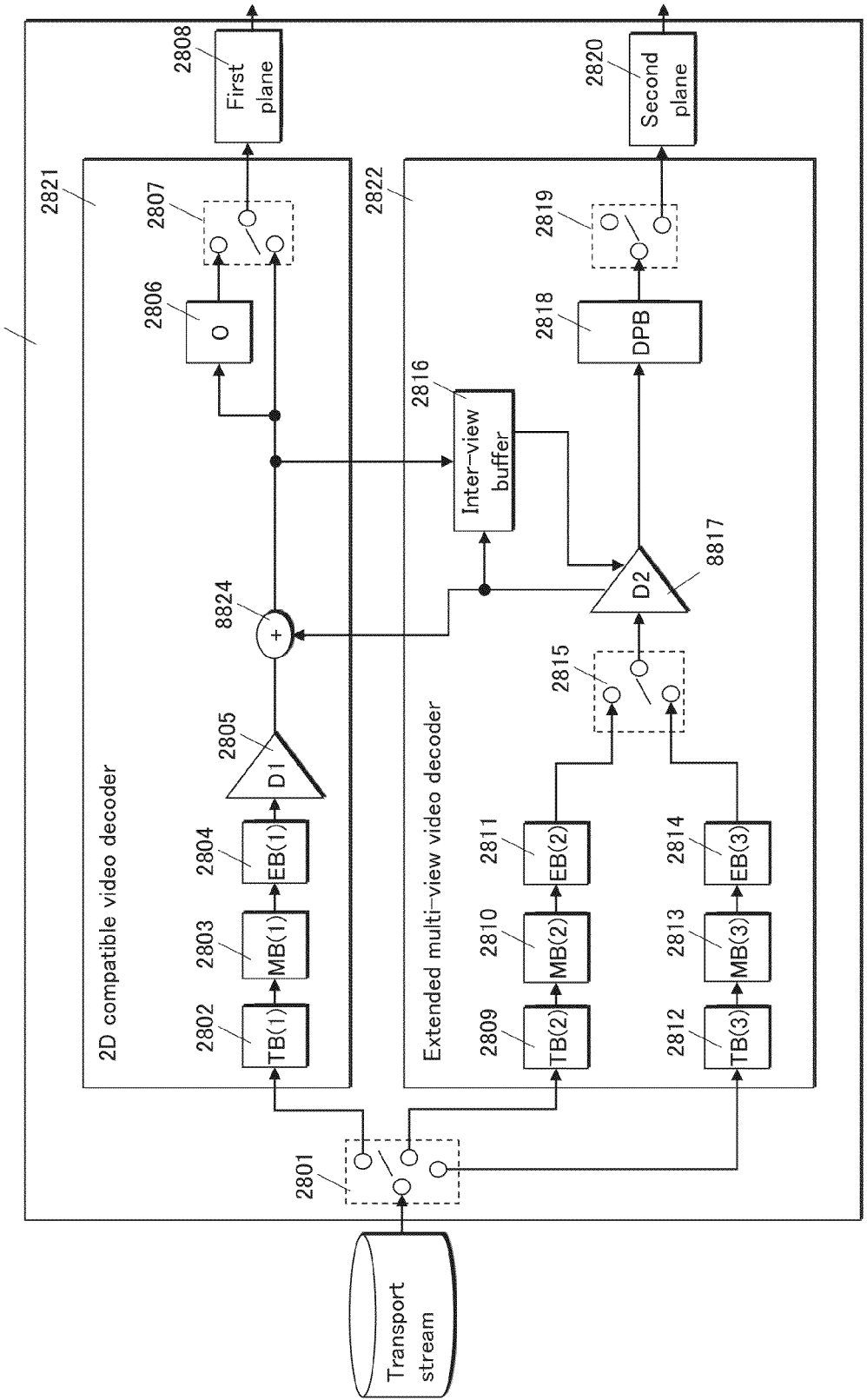
FIG. 88 illustrates the structure of the playback device in a modification of Embodiment 1.

FIG. 88 illustrates the structure of the playback device.

A playback device 8823 basically has the same structure as the playback device 2823, but differs therefrom in that it includes a multi-view video decoder 8817 in place of the multi-view video decoder 2817 and additionally includes a compositing unit 8824.

Upon decoding the base-view video stream, the multi-view video decoder 8817 transmits decoded pictures of the base-view video stream to the compositing unit 8824 as well.

The compositing unit 8824 composites the decoded pictures of the base-view video stream with the decoded pictures having the same values of DTS/PTS of the 2D compatible video stream. The compositing method has already been described with reference to FIG. 89.

The decoded pictures of the 2D compatible video stream, which have been made high-definition by the compositing, replace the decoded pictures having the same values of PTS of the base-view video stream in the inter-view reference buffer 2816. In this way, when decoding the dependent-view video stream, the high-definition decoded pictures of the 2D compatible video stream are referenced, thus making the decoded pictures of the dependent-view video stream high-definition as well.

(24) The data creation device and playback device in the above modification (23) may be simplified in structures as follows. The present modification relates to the dependent-view video stream, and in the present modification, not the decoded pictures of the 2D compatible video stream, which have been made high-definition by the compositing with the differential video as in the above modification (23), but the decoded pictures of the 2D compatible video stream before compositing are referenced. In this case, although the dependent-view video stream is not made high-definition as in the modification (23), the processing becomes easier.

Figure 97:
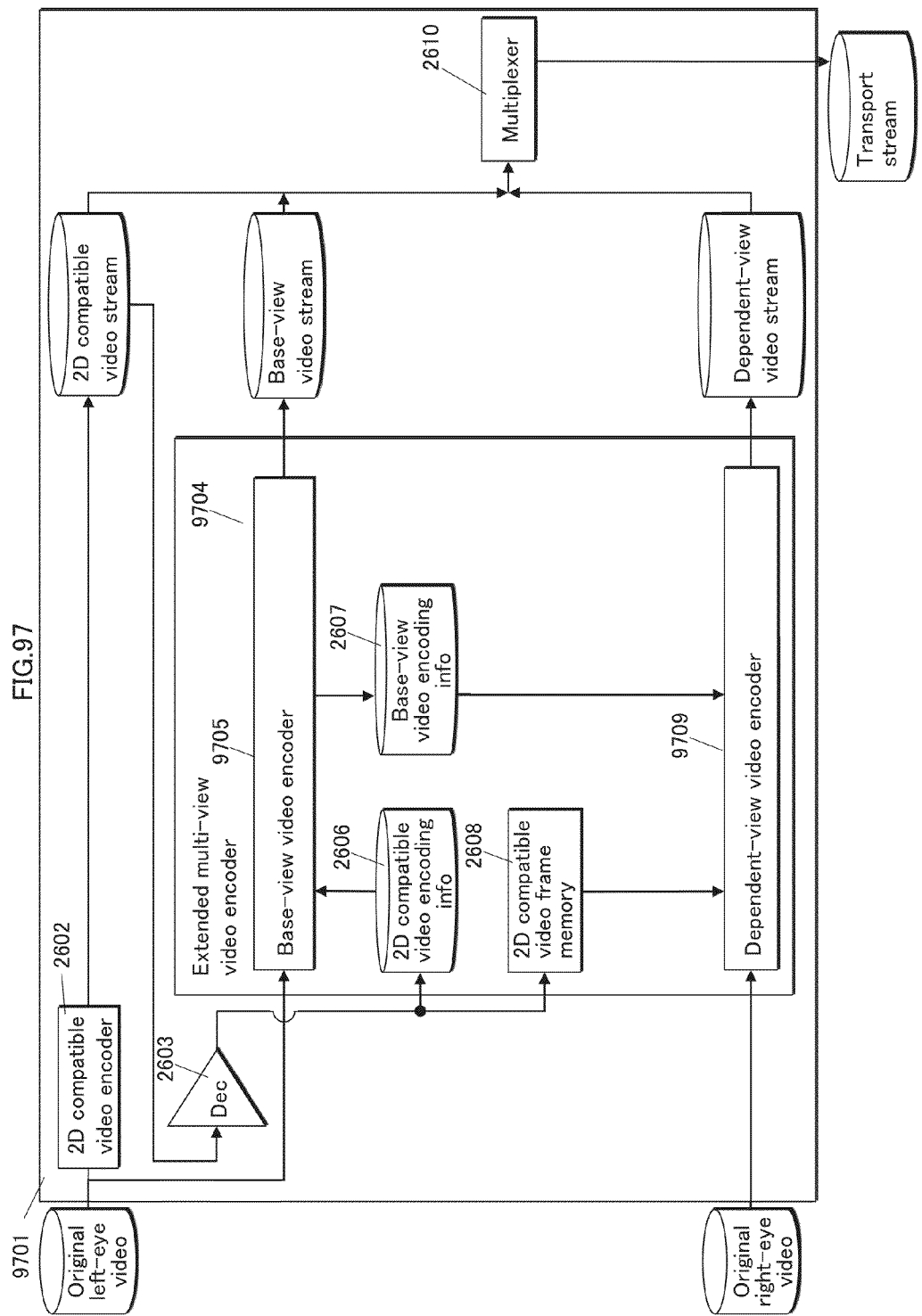
FIG. 97 illustrates the structure of the data creation device in a modification of Embodiment 1.

FIG. 97 illustrates the structure of a data creation device in the present modification.

A data creation device 9701 basically has the same structure as the data creation device 2601, but differs therefrom in a base-view video encoder 9705 and a dependent-view video encoder 9709.

The base-view video encoder 9705, having a function to compress-encode the base-view video stream in a video codec for multi-view video stream (for example, MPEG-4 MVC), and generates the base-view video stream by compress-encoding the differential video representing differences between each picture of the original left-eye video and each decoded picture of the 2D compatible video stream in accordance with the 2D compatible video encoding information, and outputs the base-view video encoding information and the decoded pictures of the 2D compatible video stream.

More specifically, the base-view video encoder 9705 first generates a differential video that represents the difference between the original left-eye video and each decoded picture of the 2D compatible video stream. The upper portion of FIG. 89 illustrates the method of generating the differential video. The base-view video encoder 9705 determines the encoding method of the base-view video stream based on the 2D compatible video encoding information 2606, and compress-encodes the differential video. The method of compress-encoding the video is the same as the method described with regard to the base-view video encoder 2605. The base-view video encoder 9705 outputs the compress-encoded video stream as the base-view video stream.

The dependent-view video encoder 9709, having a function to compress-encode the dependent-view video stream in a video codec for multi-view video stream (for example, MPEG-4 MVC), compress-encodes the original right-eye video in accordance with the base-view video encoding information 2607 and outputs the dependent-view video stream. Here the dependent-view video encoder 9709 performs the compress-encoding by referencing, by the inter-view reference, the decoded pictures of the 2D compatible video stream. The method of compress-encoding is the same as that of the dependent-view video encoder 2609.

Figure 98:
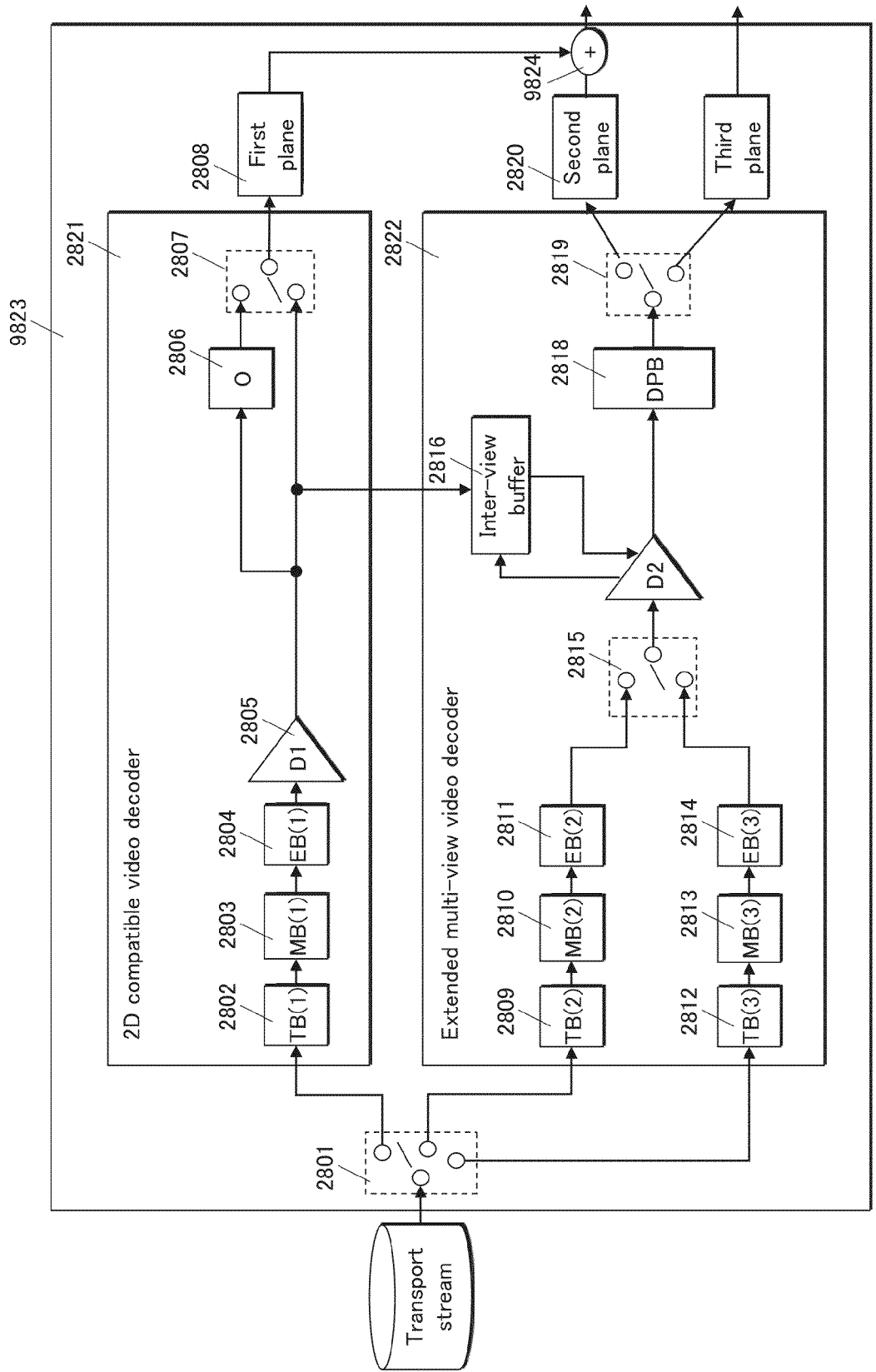
FIG. 98 illustrates the structure of the 3D video playback device in a modification of Embodiment 1.

FIG. 98 illustrates the structure of a playback device in the present modification.

The playback device 9823 basically has the same structure as the playback device 2823, but differs therefrom in that it additionally includes a compositing unit 9824.

The compositing unit 9824 composites (i) each decoded picture of the base-view video stream output from the second plane 2820 with (ii) each decoded picture having the same value of DTS/PTS of the 2D compatible video stream output from the first plane 2808 at the timing of PTS, and outputs a high-definition 2D compatible video which is obtained by the compositing process.

(25) In Embodiment 1, the right-eye images are stored in the dependent-view video stream. However, not limited to this structure, a depth map video may be stored. With this structure, a 3D video can be played back by using the depth map.

Figure 92:
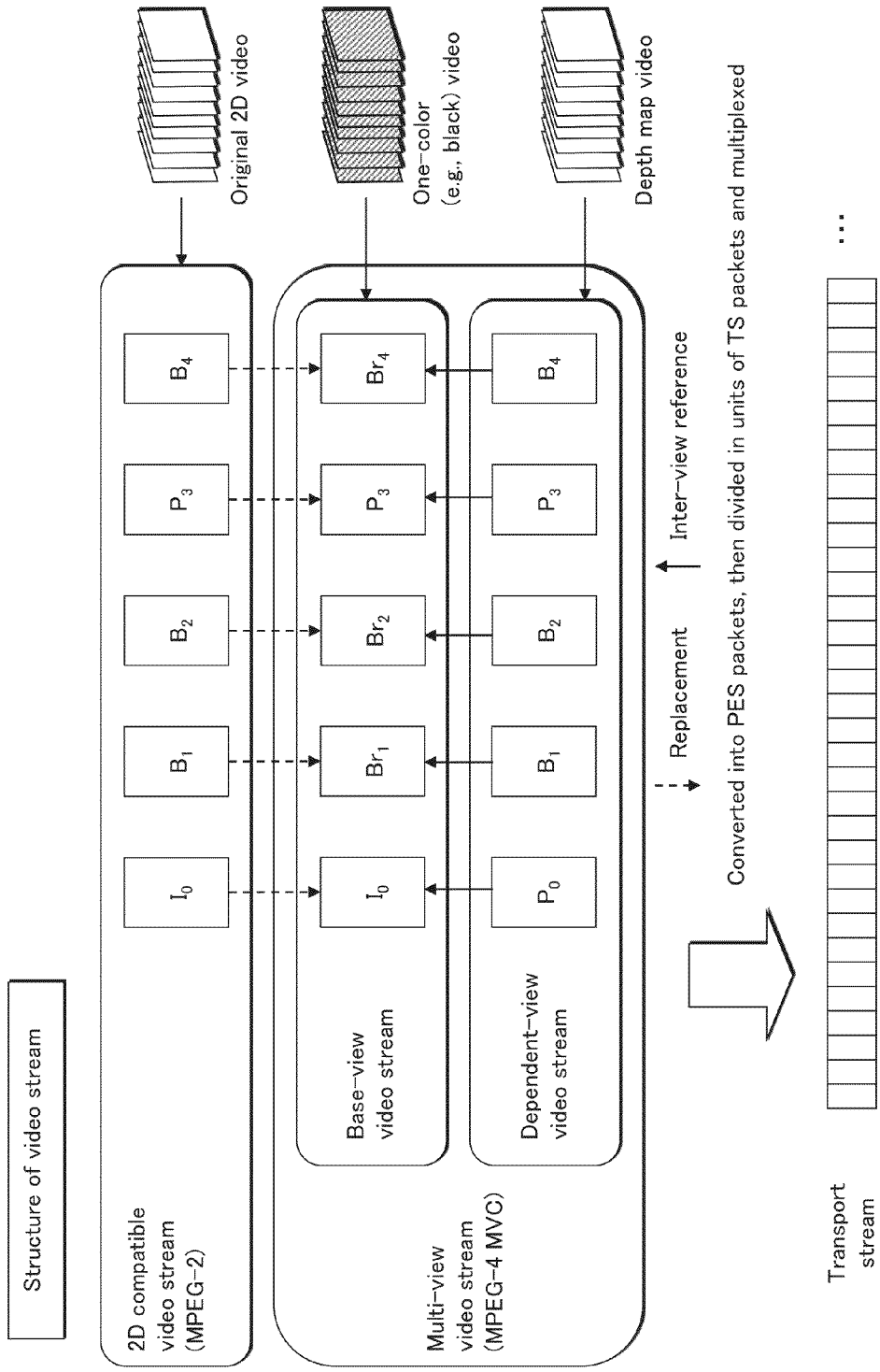
FIG. 92 illustrates the data structure in a modification of Embodiment 1.

FIG. 92 illustrates the structure of video streams in the present modification.

The depth map video is stored in the dependent-view video stream.

Also, a compress-encoded depth map video may be stored in the base-view video stream.

Figure 93:
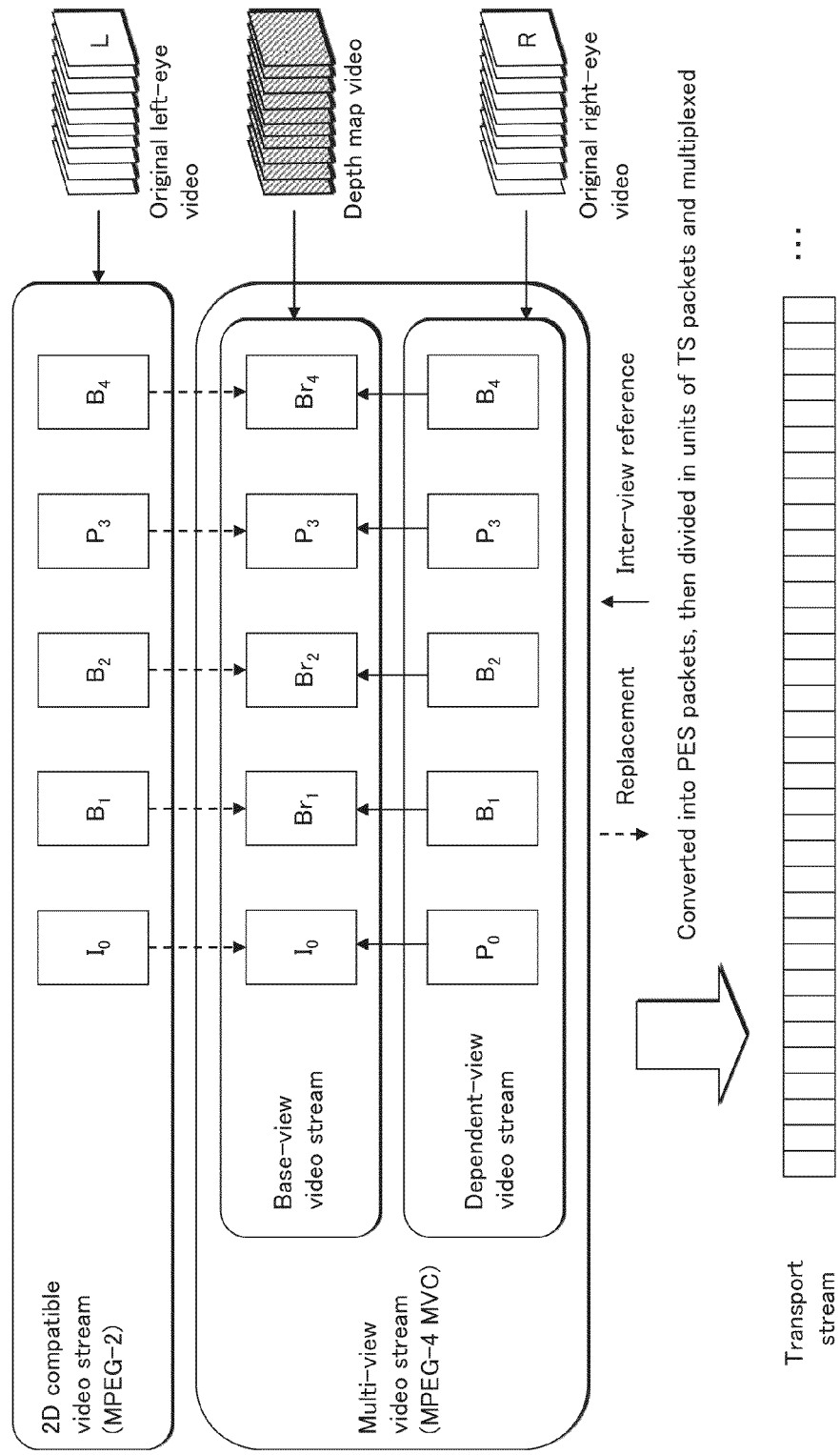
FIG. 93 illustrates the data structure in a modification of Embodiment 1.

FIG. 93 illustrates the structure of video streams in the case where a compress-encoded depth map video is stored in the base-view video stream in the present modification.

This enables a playback device, which plays back a 3D video by using a depth map video, to be structured to decode only the depth map video, and a playback device, which plays back a 3D video by using left-eye and right-eye videos, to be structured to realize the video playback described in Embodiment 1, making it possible for one data stream to support the 3D video playback of both the playback devices.

Figure 94:
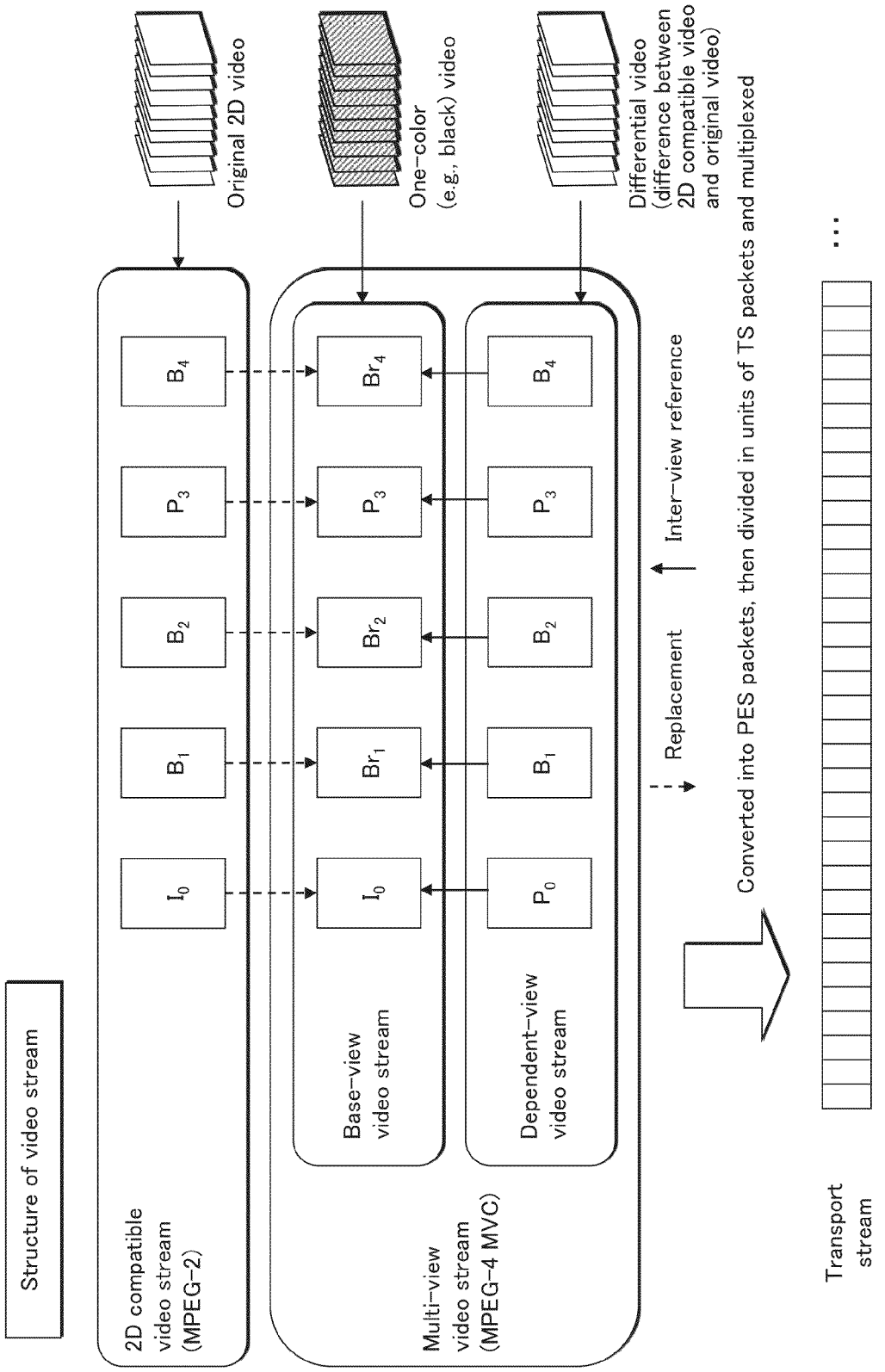
FIG. 94 illustrates the data structure in a modification of Embodiment 1.

(26) As a modification to Embodiment 1, as shown in FIG. 94, the differential video may be stored in the dependent-view video stream. This structure allows for playback of high-definition 2D video by decoding the video streams as described in Embodiment 1 and then compositing the decoded differential video with decoded pictures of the 2D compatible video stream.

<1-5. Supplementary Explanation>
<Explanation of Video Compression Technology>
<2D Video Compression Technology>

The following is a brief description of encoding based on MPEG-2, which is a standard for compress-encoding 2D video used in the data creation device and playback device in the present embodiment, and MPEG-4 AVC (an compress-encoding method on which the MPEG-4 MVC format is based).

According to this compress-encoding method, video data is encoded by compressing the data amount by using the redundancy in the video image in the spatial and time directions.

One method that takes advantage of the redundancy of the video is inter-picture predictive encoding. According to the inter-picture predictive encoding, when a certain picture is encoded, another picture to be displayed before or after said certain picture is designated as a reference picture. Subsequently, the amount of motion from the reference picture is detected, and a difference between a motion-compensated picture and an encoding-target picture is compress-encoded.

FIG. 1 illustrates the reference relationship among pictures in a video stream. In the example illustrated in FIG. 1, picture P3 is compress-encoded by referencing picture I0, and pictures B1 and B2 are compress-encoded by referencing pictures I0 and P3. In this way, a compress-encoding with high compression rate can be realized by using the time and spatial redundancy.

<3D Video Compression Technology>

The following is a brief description of how to play back 3D video on a display or the like by using disparity images, and a compress-encoding in the MPEG-4 MVC format which is a multi-view encoding format.

In a stereoscopic viewing method using disparity images, the stereoscopic viewing is realized by preparing a right-eye image (R image) and a left-eye image (L image) and performing a control such that the right and left eyes of the user receive only the right-eye image and the left-eye image, respectively.

A video composed of the right-eye images are called right-view video, and a video composed of the left-eye images are called left-view video.

Figure 13:
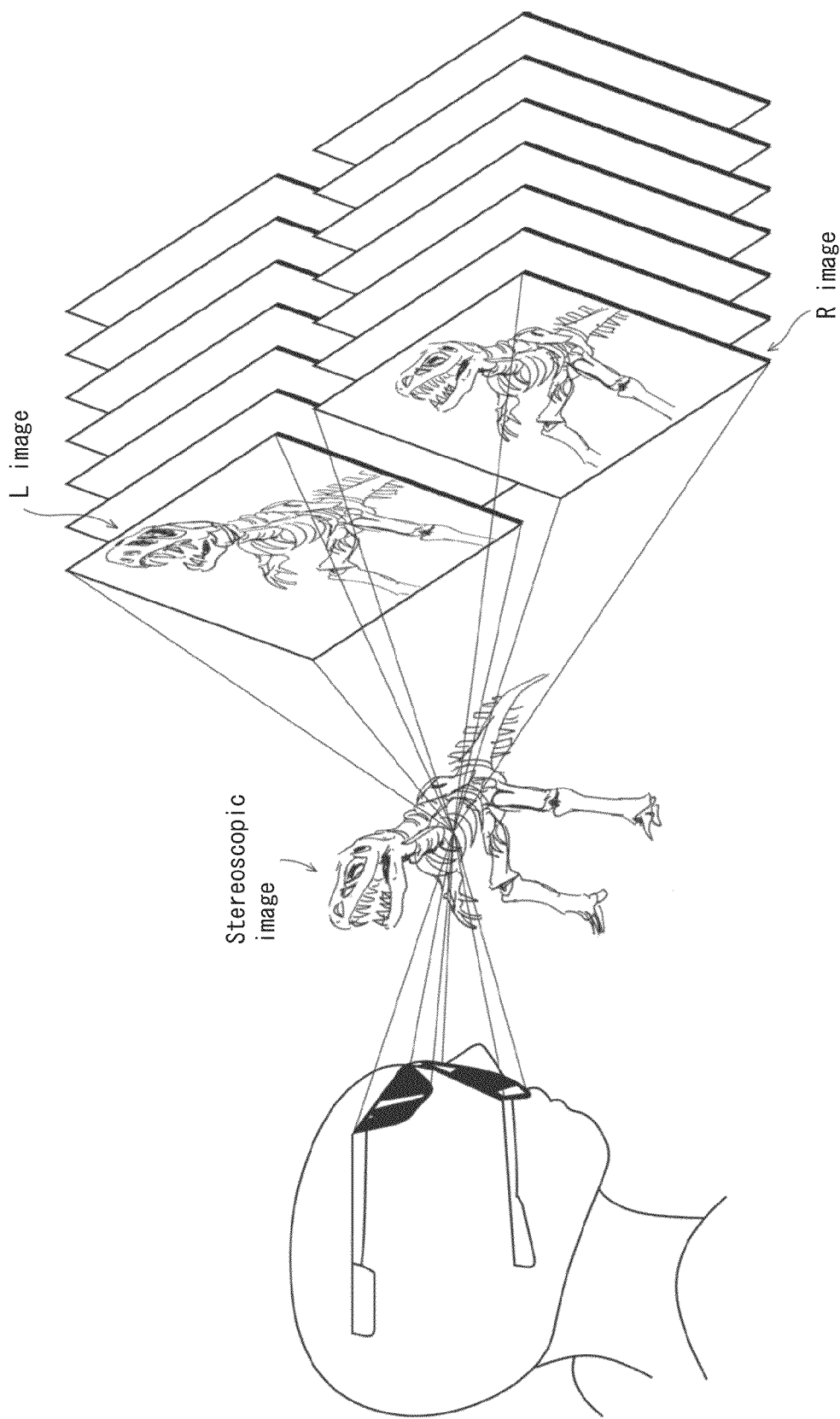
FIG. 13 illustrates an example of how a stereoscopic image is displayed.

FIG. 13 illustrates an example of how a stereoscopic image is displayed. FIG. 13 illustrates an example of displaying left-eye images and right-eye images of a dinosaur skeleton. The 3D glasses are used to transmit and block light to the right and left eyes repeatedly. This allows for left and right scenes to be overlaid within the viewer's brain due to the afterimage phenomenon of the eyes, causing the viewer to perceive a stereoscopic image as existing along a line extending from the user's face.

The 3D video methods for compress-encoding the left-view and right-view videos include the frame compatible method and the multi-view encoding method.

Figure 14:
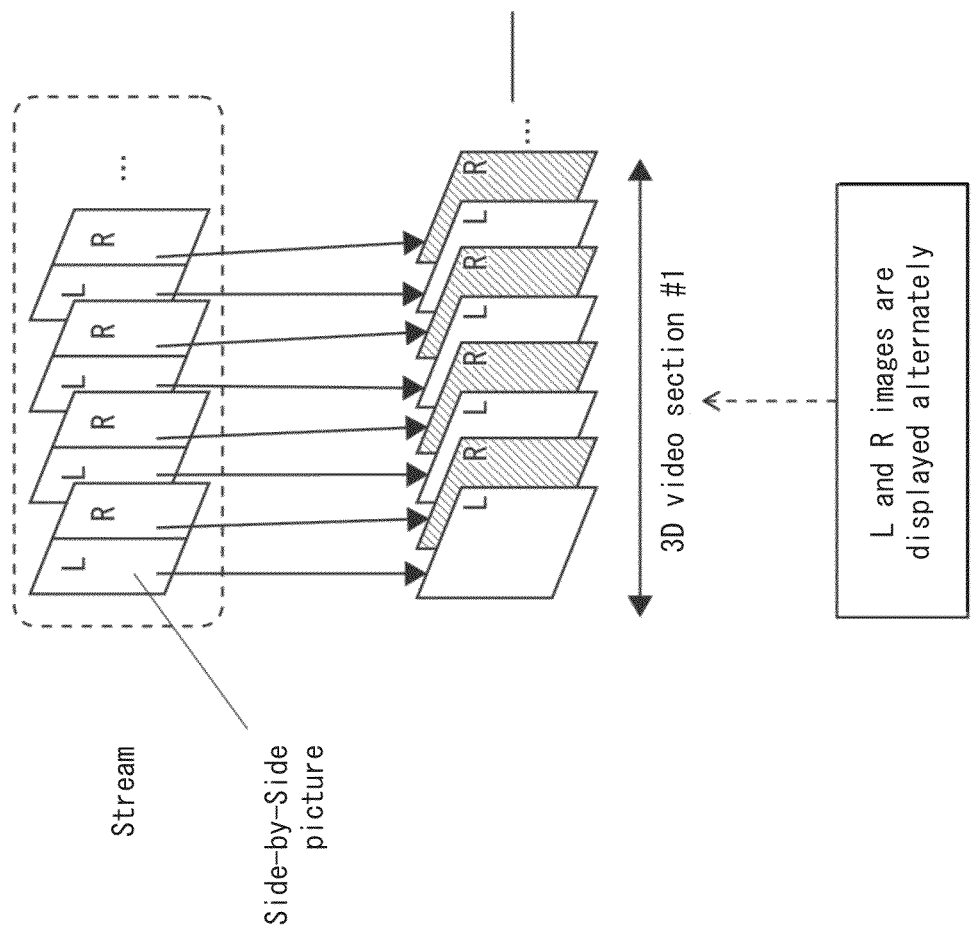
FIG. 14 illustrates the Side-by-Side format.

According to the frame compatible method, pictures corresponding to images of the same time in the left-view and right-view videos are thinned out or reduced and then combined into one picture, and the combined picture is compress-encoded. One example of this is the Side-by-Side method illustrated in FIG. 14. According to the Side-by-Side method, the pictures corresponding to images of the same time in the left-view and right-view videos are each reduced to ½ in size horizontally, and are arranged in parallel horizontally to be combined into one picture. The video composed of the combined pictures is compress-encoded by a compress-encoding method for 2D video (for example, MPEG-2), thereby a video stream is generated. On the other hand, when the video stream is played back, the video stream is decoded based on the same compress-encoding method as when the video stream is generated. The decoded pictures are divided into left and right images, the left and right images are extended double in size horizontally, thereby pictures corresponding to the left-view and right-view videos are obtained. The stereoscopic image as illustrated in FIG. 13 is realized when the obtained pictures for the left- and right-view videos (L image and R image) are alternately displayed.

On the other hand, according to the multi-view encoding method, the pictures for the left-view and right-view videos are independently compress-encoded, without being combined into one picture.

On the other hand, according to the multi-view encoding method, the pictures for the left-view and right-view videos are independently compress-encoded, without being combined into one picture.

FIG. 2 illustrates encoding in the MPEG-4 MVC format which is a multi-view encoding format.

The multi-view video stream in the MPEG-4 MVC format includes the base-view video stream and the dependent-view video stream. The base-view video stream can be played back by a playback device for playing back a video stream in the conventional MPEG-4 AVC format. The dependent-view video stream is processed at the same time as the base-view video stream such that videos of different viewpoints are played back.

The base-view video stream is compress-encoded by the inter-picture predictive coding by using only the redundancy between images of the same viewpoint, without referencing images of different viewpoints, as illustrated in FIG. 2.

On the other hand, when the dependent-view video stream is referenced, in addition to the inter-picture predictive coding in which images of the same viewpoint are referenced, the inter-picture predictive coding that uses the redundancy between images of different viewpoints is used.

Each picture of the dependent-view video stream is compress-encoded by referencing a picture, which is of the same time as said each picture, of the base-view video stream.

The arrows in FIG. 2 indicate reference relationship. For example, picture P0, the starting P-picture of the dependent-view video stream, references picture I0 that is an I-picture of the base-view video stream. Also, picture B1 that is a B-picture of the dependent-view video stream references picture Br1 that is a Br-picture of the base-view video stream. Also, picture P3, which is the second P-picture of the dependent-view video stream, references picture P3 that is a P-picture of the base-view video stream.

Since the base-view video stream does not reference a picture of the dependent-view video stream, the base-view video stream can be decoded and played back independently.

On the other hand, the dependent-view video stream is decoded by referencing the base-view video stream, and thus cannot be played back independently. However, in the inter-picture predictive coding, each picture constituting the dependent view is encoded by referencing each picture of the same time of another viewpoint of the base view. In general, pictures of the same time belonging to the left-eye and right-eye images have similarity (are highly correlated with each other). As a result, by compress-encoding the differences therebetween, it is possible to reduce the data amount of the dependent-view video stream greatly compared with the base-view video stream.

<Stream Data>

In the data transfer using broadcast waves for digital TV, digital streams conforming to the MPEG-2 transport stream format are transferred.

The MPEG-2 transport stream is a standard for transferring a stream in which various streams such as a video stream and an audio stream are multiplexed. The MPEG-2 transport stream has been standardized by the ISO/IEC13818-1 and the ITU-T Recommendation H222.0.

FIG. 6 illustrates the structure of a digital stream in the MPEG-2 transport stream format.

As illustrated in FIG. 6, a transport stream 513 is obtained by multiplexing TS (Transport Stream) packets 503 of video, TS packets 506 of audio, and TS packets 509 of a subtitle stream. The video TS packets 503 store a main video of a broadcast program, the audio TS packets 506 store main and secondary audio parts of the broadcast program, and the subtitle stream TS packets 509 store subtitle information of the broadcast program.

A video frame sequence 501 is compress-encoded by a video encoding method such as MPEG-2 or MPEG-4 AVC. An audio frame sequence 504 is compress-encoded by an audio encoding method such as Dolby AC-3, MPEG-2 AAC, MPEG-4 AAC, or HE-AAC.

Each stream included in the transport stream is identified by a stream ID called PID. It is possible for a playback device to extract a processing target stream by extracting packets having the same PID. Information indicating correspondence between PIDs and streams is stored in a descriptor in a PMT packet which is explained below.

To generate a transport stream, first a video frame sequence 501 composed of a plurality of video frames and an audio frame sequence 504 composed of a plurality of audio frames are converted into PES packet sequences 502 and 505, respectively. Next, the PES packet sequences 502 and 505 are converted into TS packet sequences 503 and 506, respectively. Similarly, data of a subtitle stream 507 is converted into a PES packet sequence 508, and further into a TS packet sequence 509. An MPEG-2 transport stream 513 is formed by multiplexing these TS packets into one stream. The PES packet and the TS packet are described below.

<Data Structure of Video Stream>

The following explains the data structure of the video stream obtained by compress-encoding images by the above-described encoding method.

Figure 7:
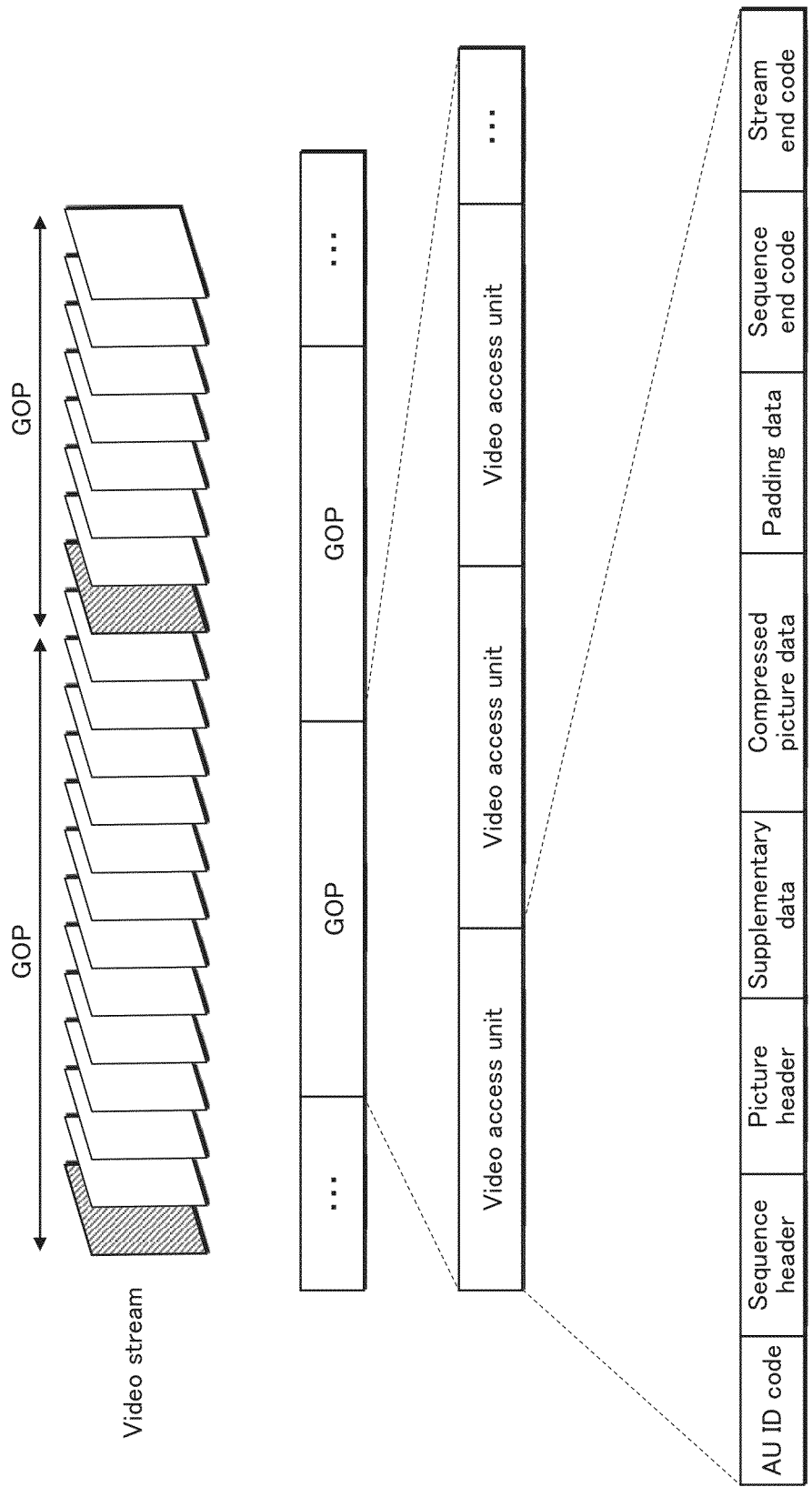
FIG. 7 illustrates the structure of video stream.

The video stream is data having such a hierarchical structure as illustrated in FIG. 7. The video stream is composed of a plurality of GOPs. The GOP is treated as the basic unit in the compress-encoding process, which makes it possible to edit video or perform a random access.

A GOP is composed of one or more video access units. A video access unit is a unit of storage of compress-encoded data in a picture, storing one frame in the case of the frame structure, and one field in the case of the field structure. Each video access unit includes an AU ID code, a sequence header, a picture header, supplementary data, compressed picture data, padding data, sequence end code, and stream end code. In the case of MPEG-4 AVC, each piece of data is stored in a unit called an NAL unit.

The AU ID code is a code indicating the head of the access unit.

The sequence header is a header storing information, such as resolution, frame rate, aspect ratio, and bit rate, that are common through the whole playback sequence composed of a plurality of video access units.

The picture header is a header storing information such as an encoding method through the whole picture.

The supplementary data is additional information, such as character information of the closed caption displayed on TV in synchronization with the video and the GOP structure information, that are not necessarily required for decoding compressed pictures.

The compressed picture data stores data of compress-encoded pictures.

The padding data stores data for maintaining the format. For example, the padding data is used as stuffing data for keeping a predetermined bit rate.

The sequence end code is data indicating the end of a playback sequence.

The stream end code is data indicating the end of a bitstream.

The data structures of the AU ID code, sequence header, picture header, supplementary data, compressed picture data, padding data, sequence end code, and stream end code are different depending on the video encoding method.

For example, in the case of MPEG-4 AVC, the AU identification code corresponds to an Access Unit Delimiter (AUD), the sequence header to a Sequence Parameter Set (SPS), the picture header to a Picture Parameter Set (PPS), the compressed picture data to a plurality of slices, the supplementary data to Supplemental Enhancement Information (SEI), the padding data to Filler Data, the sequence end code to an End of Sequence, and the stream end code to an End of Stream.

Also, in the case of the MPEG-2 format, the sequence header corresponds to the sequence_Header, sequence_extension, group_of_picture_header, the picture header to the picture_header, picture_coding_extension, the compressed picture data to a plurality of slices, the supplementary data to the user_data, and the sequence end code to the sequence_end_code. Although the AU ID code is not present in the above, it is possible to determine a boundary between access units by using the start code of each header.

The above data of the attribute information are not always necessary. For example, when encoding is performed, the sequence header is necessary only in the video access unit at the head of the GOP, not added in other video access units. Also, it is possible to omit a picture header in a video access unit, by causing the video access unit to reference a picture header in a video access unit that precedes the present video access unit in the encoding order.

Also, as illustrated in FIG. 16, in the video access unit at the head of the GOP, data of I-picture is stored as compressed picture data, and the AU identification code, sequence header, picture header and compressed picture data are stored without fail. The supplementary data, padding data, sequence end code, and stream end code are stored as necessary. On the other hand, the video access units other than the video access unit at the head of GOP store, without fail, the AU ID code and compressed picture data, and store the supplementary data, padding data, sequence end code, and stream end code as necessary.

Figure 10:
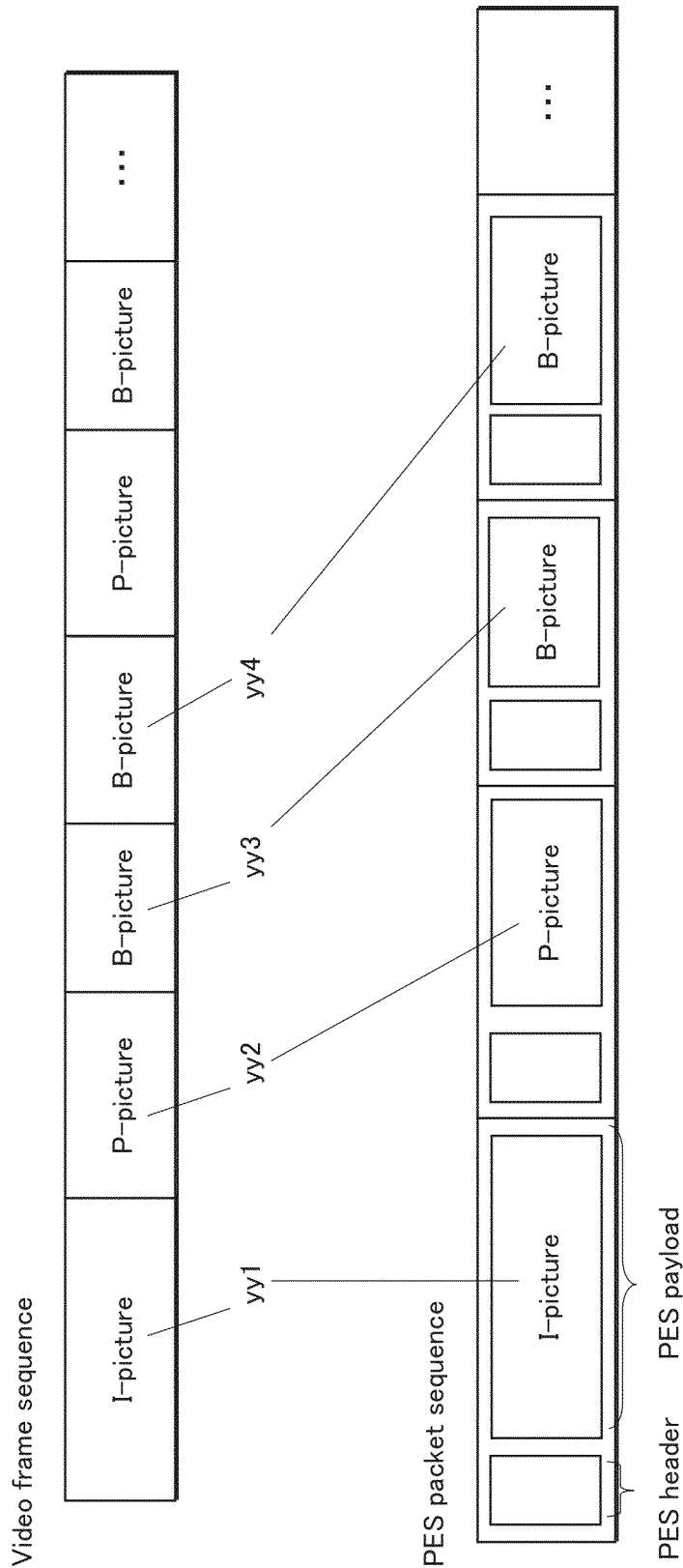
FIG. 10 illustrates the structure of the PES packet.

FIG. 10 illustrates how the video stream is stored in the PES packet sequence.

The first row of FIG. 10 indicates a video frame sequence of the video stream. The second row of FIG. 10 indicates a PES packet sequence.

As indicated by arrows yy1, yy2, yy3 and yy1 in FIG. 10, the I-pictures, B-pictures and P-pictures, which are a plurality of video presentation units in the video stream, are separated from each other and stored in the payloads of the PES packets. Each PES packet includes a PES header storing a PTS and a DTS, wherein the PTS indicates a presentation time of a picture, and the DTS indicates a decode time of the picture.

Figure 11:
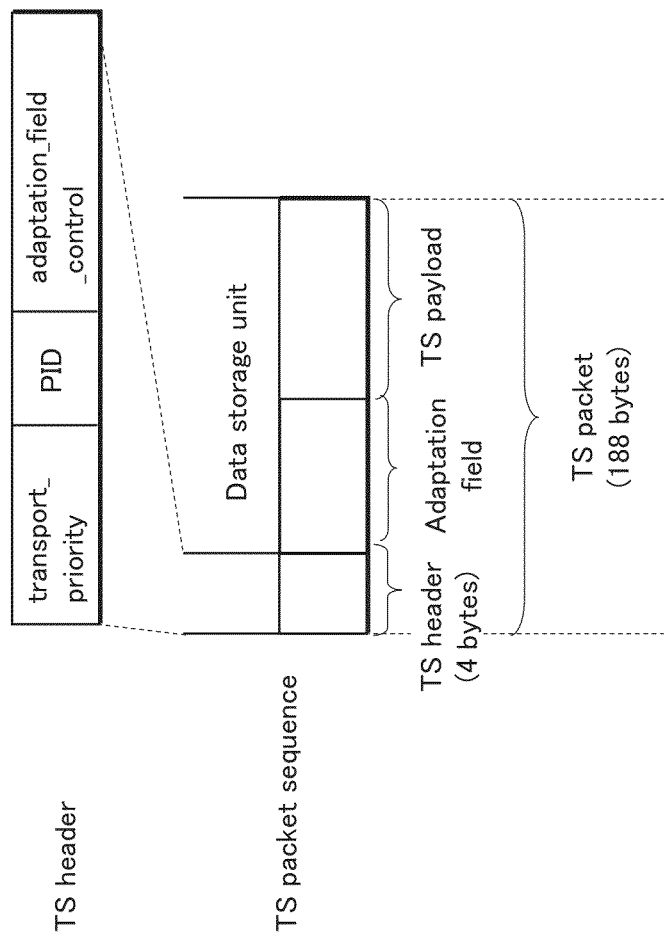
FIG. 11 illustrates the data structure of the TS packet in a TS packet sequence constituting a transport stream.

FIG. 11 illustrates the data structure of the TS packet in a TS packet sequence constituting a transport stream.

The TS packet is a packet having a fixed length of 188 bytes and includes a TS header of four bytes, an adaptation field, and a TS payload. The TS header includes a transport_priority, a PID, and an adaptaion_field_control. The PID is an ID identifying the stream multiplexed in the transport stream, as described above.

The transport_priority is information for identifying a type of a packet in TS packets having the same PID.

The adaptaion_field_control is information for controlling the structure of the adaptation field and the TS payload. There is a case where either of the adaptation field and the TS payload is present, and a case where both of the adaptation field and the TS payload are present. The adaptaion_field_control indicates one among these cases.

When the adaptaion_field_control has a value "1", it indicates that only the TS payload is present; when the adaptaion_field_control has a value "2", it indicates that only the adaptaion_field is present; and when the adaptaion_field_control has a value "3", it indicates that both of the adaptation field and the TS payload are present.

The adaptation field is an area for storing information such as PCR (Program Clock Reference), and storing stuffing data so that the TS packet has the fixed length of 188 bytes. The TS payload stores a PES packet in a divided form.

The transport stream includes, as well as the TS packets constituting video, audio, and subtitle streams, TS packets constituting PAT (Program Association Table), PMT, and PCR. These packets are called PSI (Program Specific Information).

The PAT indicates a PID of a PMT used in the transport stream, and the PID of the PAT itself is "0".

Figure 12:
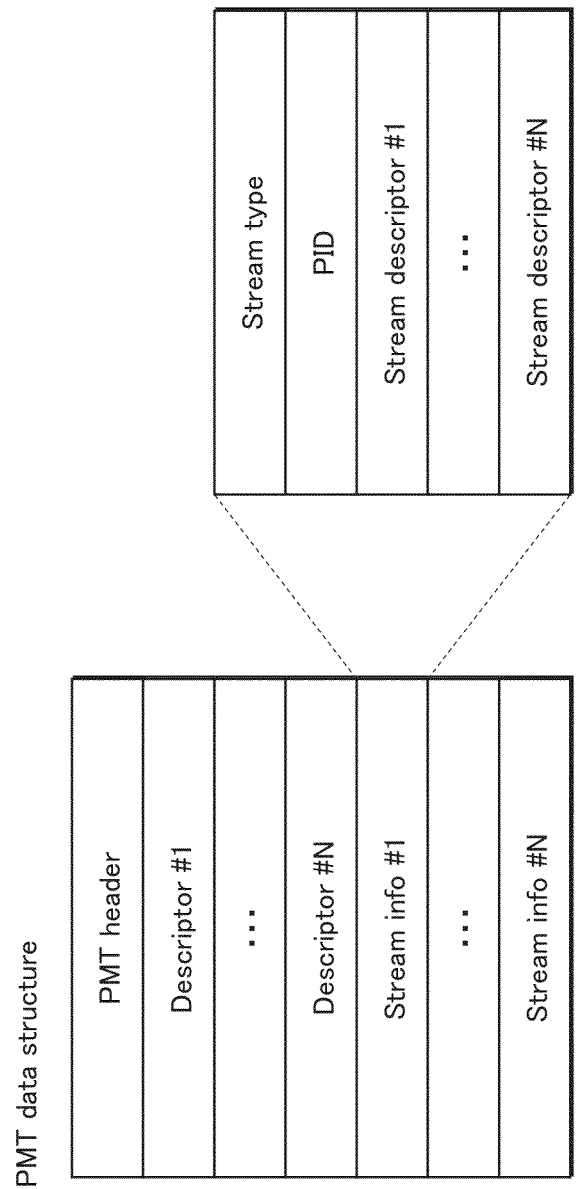
FIG. 12 illustrates the data structure of the PMT.

FIG. 12 illustrates the data structure of the PMT.

The PMT includes: a PMT header; various descriptors pertaining to the transport stream; and stream information pertaining to streams of video, audio, subtitle, etc. contained in the transport stream.

The PMT header stores information such as the length of data included in the PMT.

Information such as copy control information, which indicates whether or not copying a stream such as a video stream or an audio stream is permitted, is recorded in the descriptors pertaining to the transport stream.

Each piece of stream information pertaining to each stream includes: a stream type for identifying the compress-encoding method of the stream; the PID of the stream; and a plurality of stream descriptors in which attribute information of the stream (frame rate, aspect ratio, etc.) is described.

Each PCR packet has information of an STC time corresponding to a time at which the PCR packet is transferred to the decoder, so that a time at which a TS packet arrives at the decoder can be synchronized with an STC (System Time Clock) which is a time axis of PTS and DTS.

Encoding methods conforming to the MPEG-2 or MPEG-4 MVC make it possible to change an actually displayed area within a compress-encoded frame area.

As a result, when a picture of the dependent-view video stream in the MPEG-4 MVC format is decoded by referencing, by the inter-view reference, a picture of a video stream in the MPEG-2 format, the attribute information needs to be adjusted such that the views of the same time have values indicating the same cropping area and scaling area.

Figure 8:
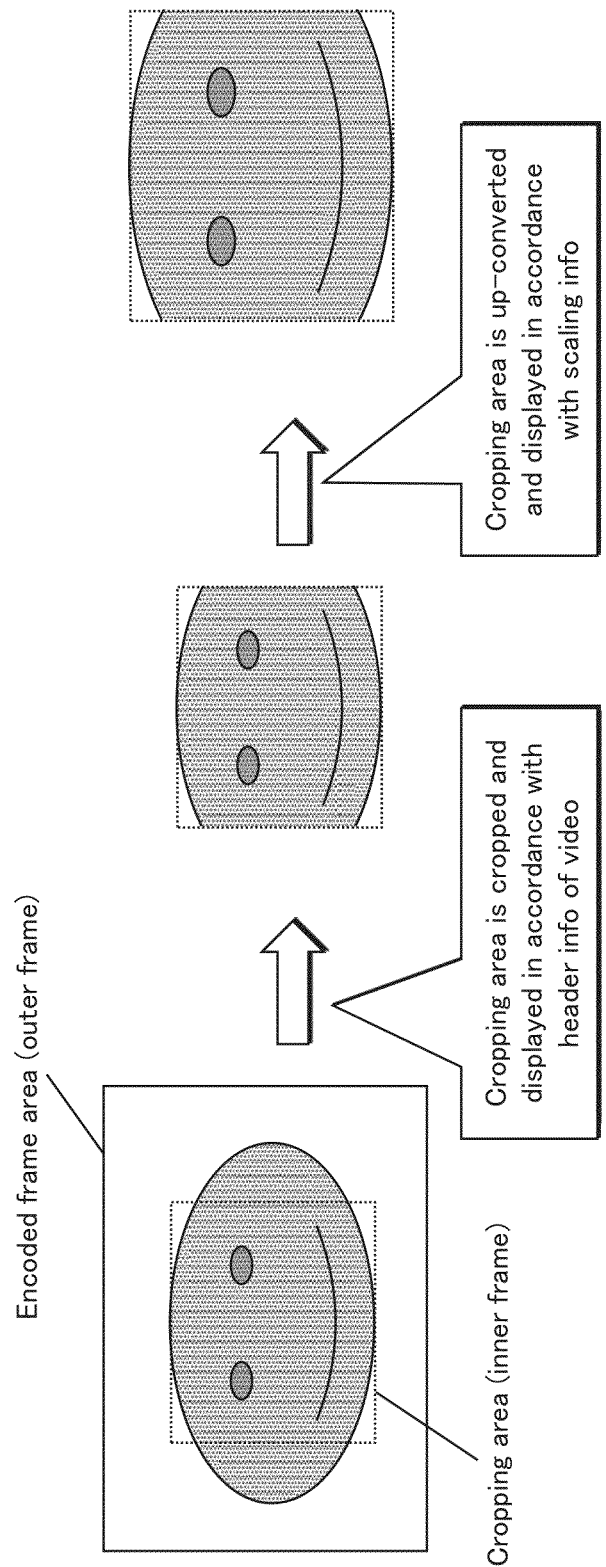
FIG. 8 illustrates cropping area information and scaling information.

The following describes cropping area information and scaling information with reference to FIG. 8.

As illustrated in FIG. 8, an actually displayed area among a compress-encoded frame area can be specified as a cropping area. In the MPEG-4 AVC, the area is specified by using the frame_cropping information stored in the SPS. In the frame_cropping information, as illustrated in the left portion of FIG. 9, respective differences between the upper lines, lower lines, left lines, and right lines of the cropping area and the compress-encoded frame area are specified as the upper, lower, left, and right crop amounts. More specifically, when the cropping area is specified, the frame_cropping_flag is set to "1", and the upper, lower, left, and right crop amounts are specified in the frame_crop_top_offset, frame_crop_bottom_offset, frame_crop_left_offset, and frame_crop_right_offset, respectively.

Figure 9:
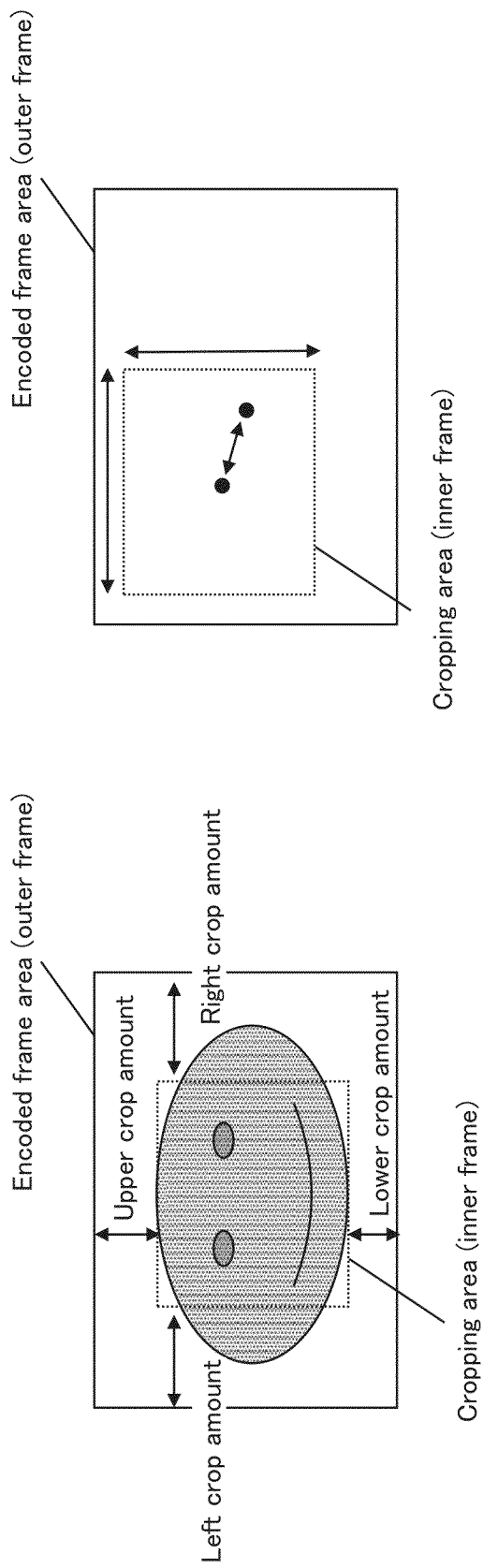
FIG. 9 illustrates specific methods for specifying the cropping area information and scaling information.

In the case of the MPEG-2 format, as illustrated in the right portion of FIG. 9, the cropping area is specified by the vertical and horizontal sizes of the cropping area (the display_horizontal_size and the display_vertical_size of the sequence_display_extension) and information indicating the difference between the center of the compress-encoded frame area and the center of the cropping area (the frame_centre_horizontal_offset and the frame_centre_vertical_offset of the picture_display_extension). Furthermore, an aspect ratio is set as the scaling information that indicates the scaling method by which the cropping area is actually displayed on the TV or the like. The playback device up-converts the cropping area by using the aspect ratio having been set as the scaling information and displays the up-converted cropping area. In the case of the MPEG-4 AVC, information of the aspect ratio (aspect_ratio_idc) is stored in the SPS, as the scaling information. For example, to display a 1440×1080 cropping area by expanding it to a size of 1920×1080, the aspect ratio is specified as 4:3. With this specification of the aspect ratio, the horizontal size is up-converted 4/3 times (1440×4/3=1920), and a 1920×1080 cropping area expanded from 1440×1080 is displayed.

In the case of the MPEG-2 format, similarly, attribute information including the information of aspect ratio (aspect_ratio_information) is stored in the sequence_header, and a process similar to the above process can be realized by setting the attribute information to appropriate values.

<Data Structure of Video Stream in MPEG-4 MVC Format>

The following describes the video stream in the MPEG-4 MVC format.

Figure 15:
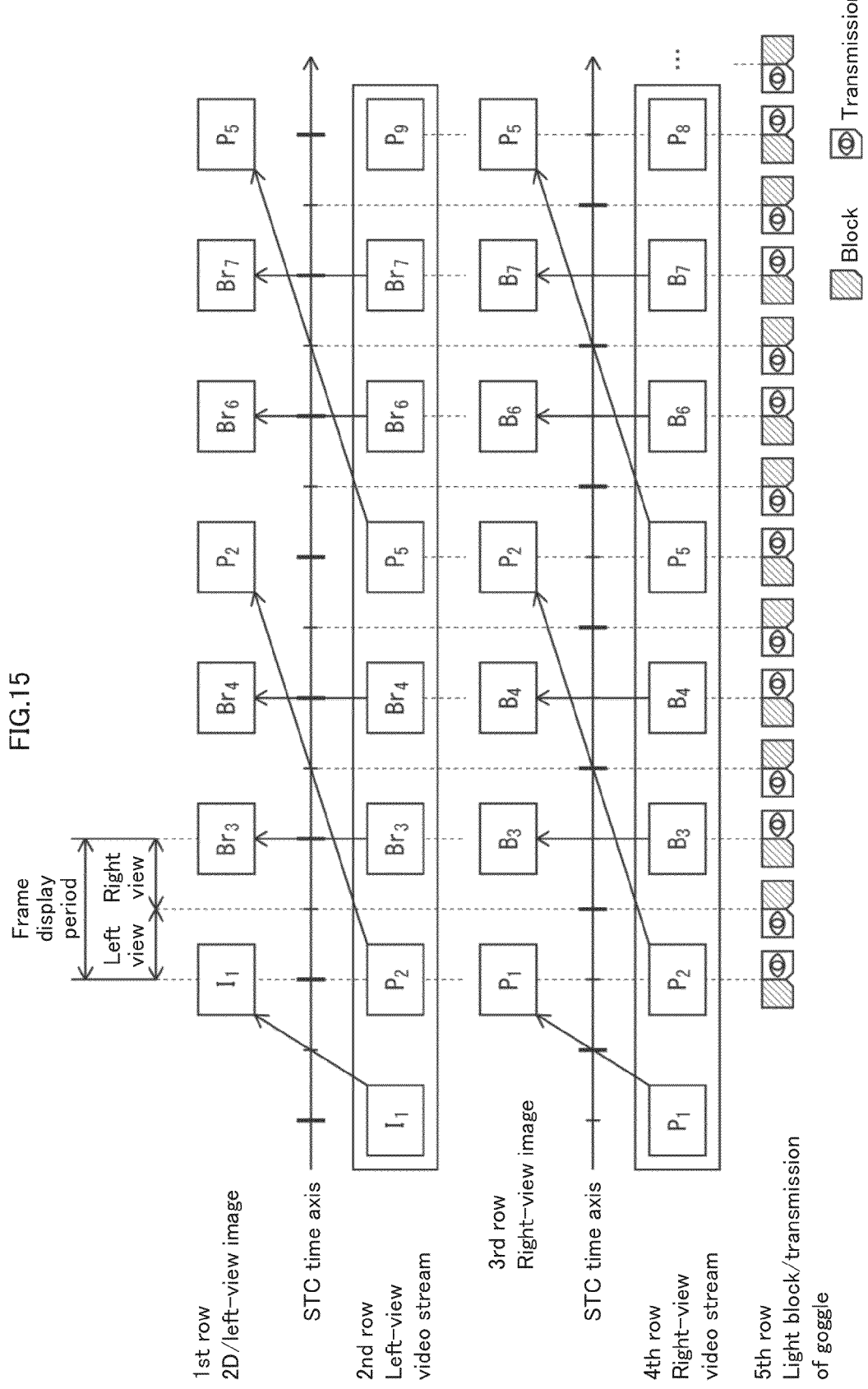
FIG. 15 illustrates a stereoscopic viewing by the multi-view encoding format.

FIG. 15 illustrates one example of the internal structure of the video stream in the MPEG-4 MVC format.

As illustrated in FIG. 15, the pictures constituting the right-view video stream are compress-encoded by referencing corresponding pictures, which have the same display times, of the left-view video stream. Pictures P1 and P2 of the right-view video stream are compress-encoded by referencing pictures I1 and P2 of the left-view video stream, and pictures B3, B4, B6, B7 of the right-view video stream are compress-encoded by referencing pictures Br3, Br4, Br6, Br7 of the left-view video stream.

The second row of FIG. 15 illustrates the internal structure of the left-view video stream. The left-view video stream includes pictures I1, P2, Br3, Br4, P5, Br6, Br7, and P9. These pictures have been obtained by decoding encoded pictures in the order of the time set in the DTS.

The first row illustrates left-eye images to be displayed on a display device or the like. The left-eye images are displayed by displaying the decoded pictures I1, P2, Br3, Br4, P5, Br6, Br7, and P9 in the order of the time set in the PTS, namely, in the order of I1, Br3, Br4, P2, Br6, Br7, and P5.

The fourth row of FIG. 15 illustrates the internal structure of the right-view video stream. The right-view video stream includes pictures P1, P2, B3, B4, P5, B6, B7, and P8. These pictures have been obtained by decoding encoded pictures in the order of the time set in the DTS.

The third row illustrates right-eye images to be displayed on a display device or the like. The right-eye images are displayed by displaying the decoded pictures P1, P2, B3, B4, P5, B6, B7, and P8 in the order of the time set in the PTS, namely, in the order of P1, B3, B4, P2, B6, B7, and P5. It should be noted here that either of a left-eye image and a right-eye image whose PTSs have the same value of time is displayed with a delay of half the interval between times of two consecutive PTSs.

The fifth row illustrates how the state of the 3D glasses 200 changes. As illustrated in the fifth row, when the left-eye image is viewed, the shutter for the right eye is closed, and when the right-eye image is viewed, the shutter for the left eye is closed.

The following describes the relationship between access units in the base-view video stream and the dependent-view video stream.

Figure 17:
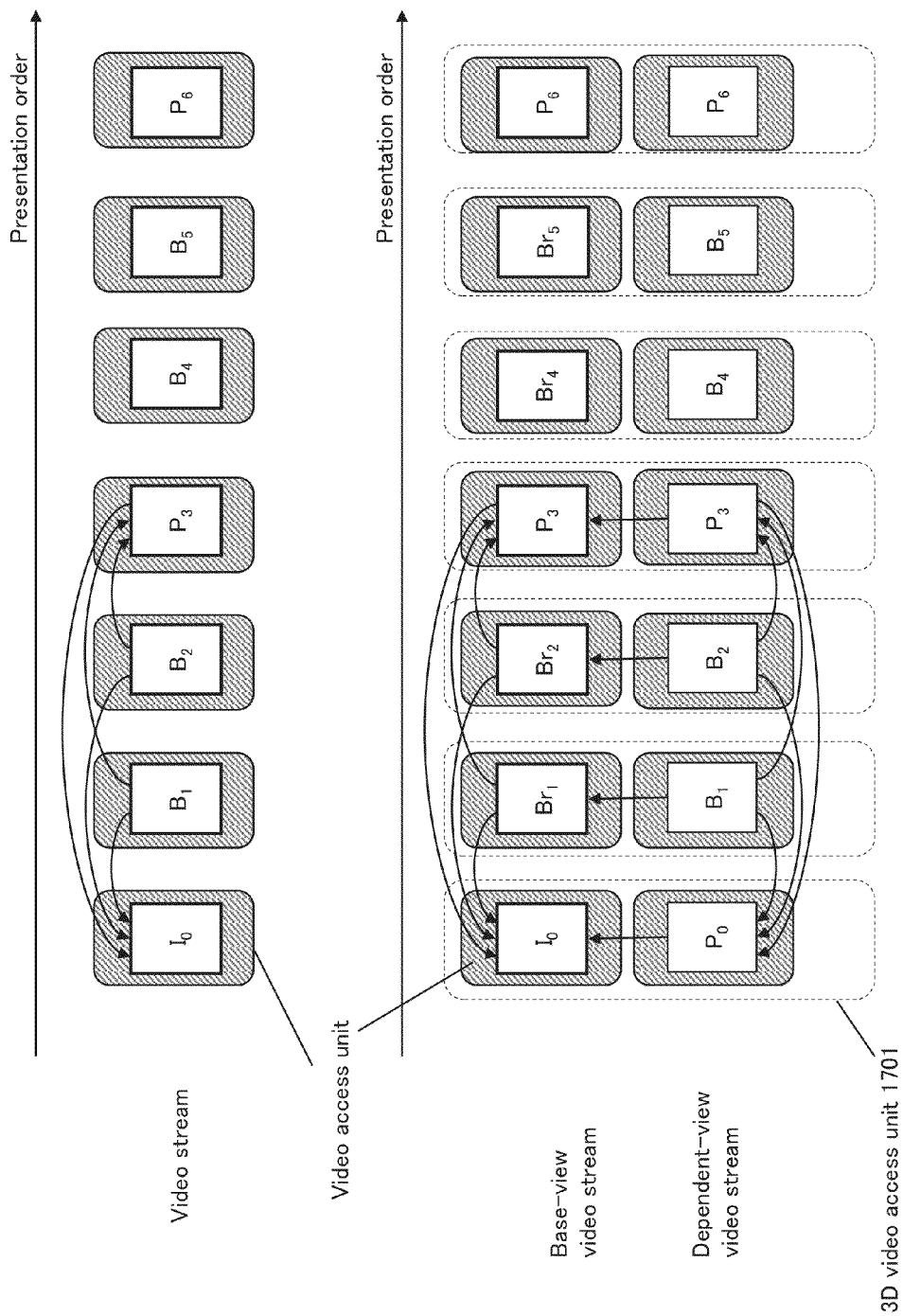
FIG. 17 illustrates the relationship among the video access units and pictures constituting the base-view video stream and right-eye video stream.

FIG. 17 illustrates the relationship among the video access units and pictures constituting the base-view video stream and dependent-view video stream. As described above, each picture of the base-view video stream functions as a video access unit, as illustrated in the upper portion of FIG. 17.

Similarly each picture of the dependent-view video stream functions as a video access unit, as illustrated in the lower portion of FIG. 17, but has a different data structure.

A 3D video access unit 1701 is composed of a video access unit of the base-view video stream and a video access unit of the dependent-view video stream that have the same value of PTS. The playback device performs decoding in units of 3D video access units.

Figure 18:
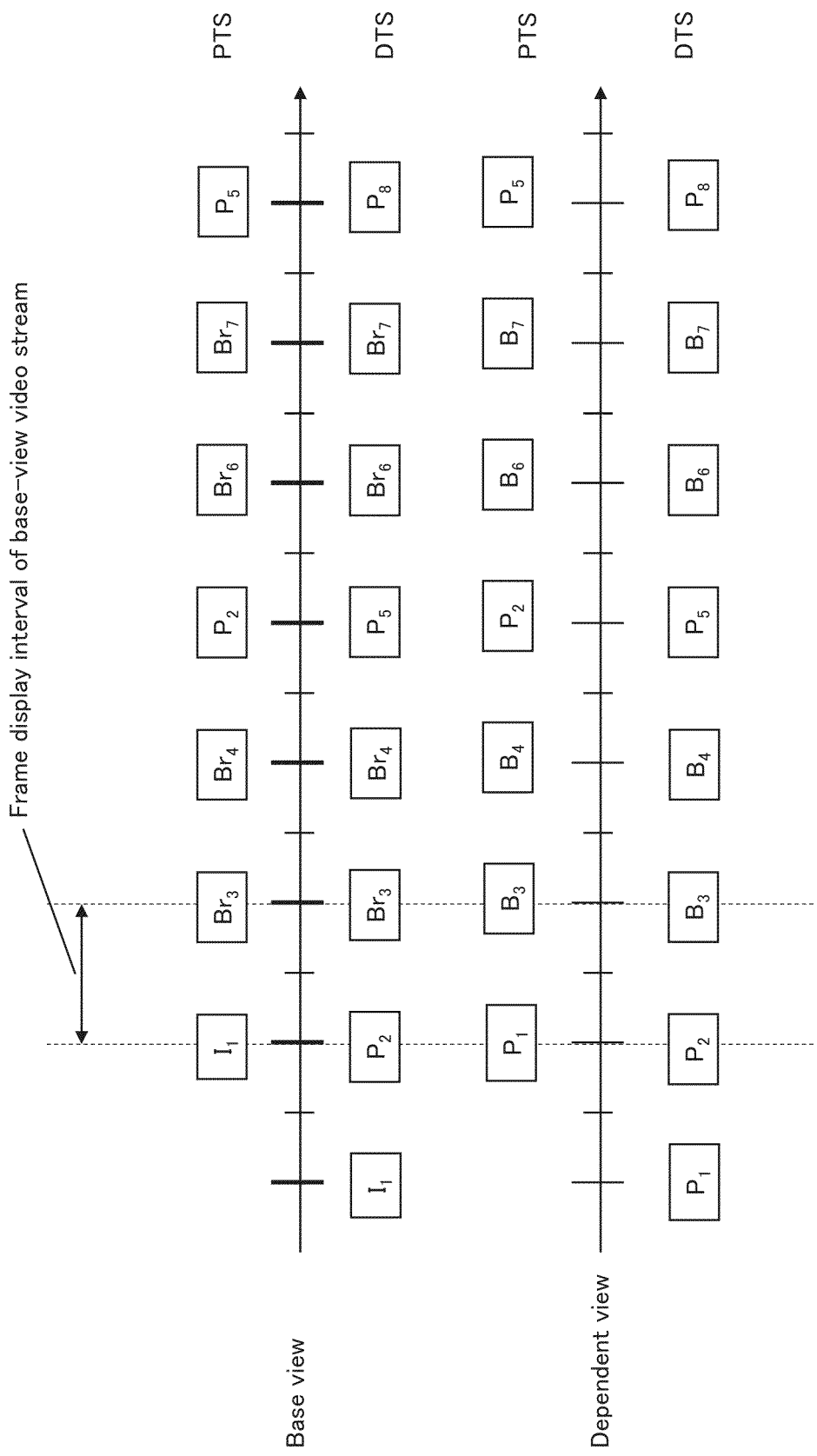
FIG. 18 illustrates one example of the relationship between PTSs and DTSs assigned to the video access units constituting the base-view video stream and the dependent-view video stream included in the video stream.

FIG. 18 illustrates one example of the relationship between PTSs and DTSs assigned to the video access units constituting the base-view video stream and the dependent-view video stream included in the video stream.

The pictures included in the base-view and dependent-view video streams storing disparity images representing views of the same time are set such that the DTS and PTS thereof have the same value.

With this structure, when decoding pictures included in the base-view and dependent-view video streams, the playback device can decode the pictures in units of 3D video access units and display the decoded pictures.

Figure 19:
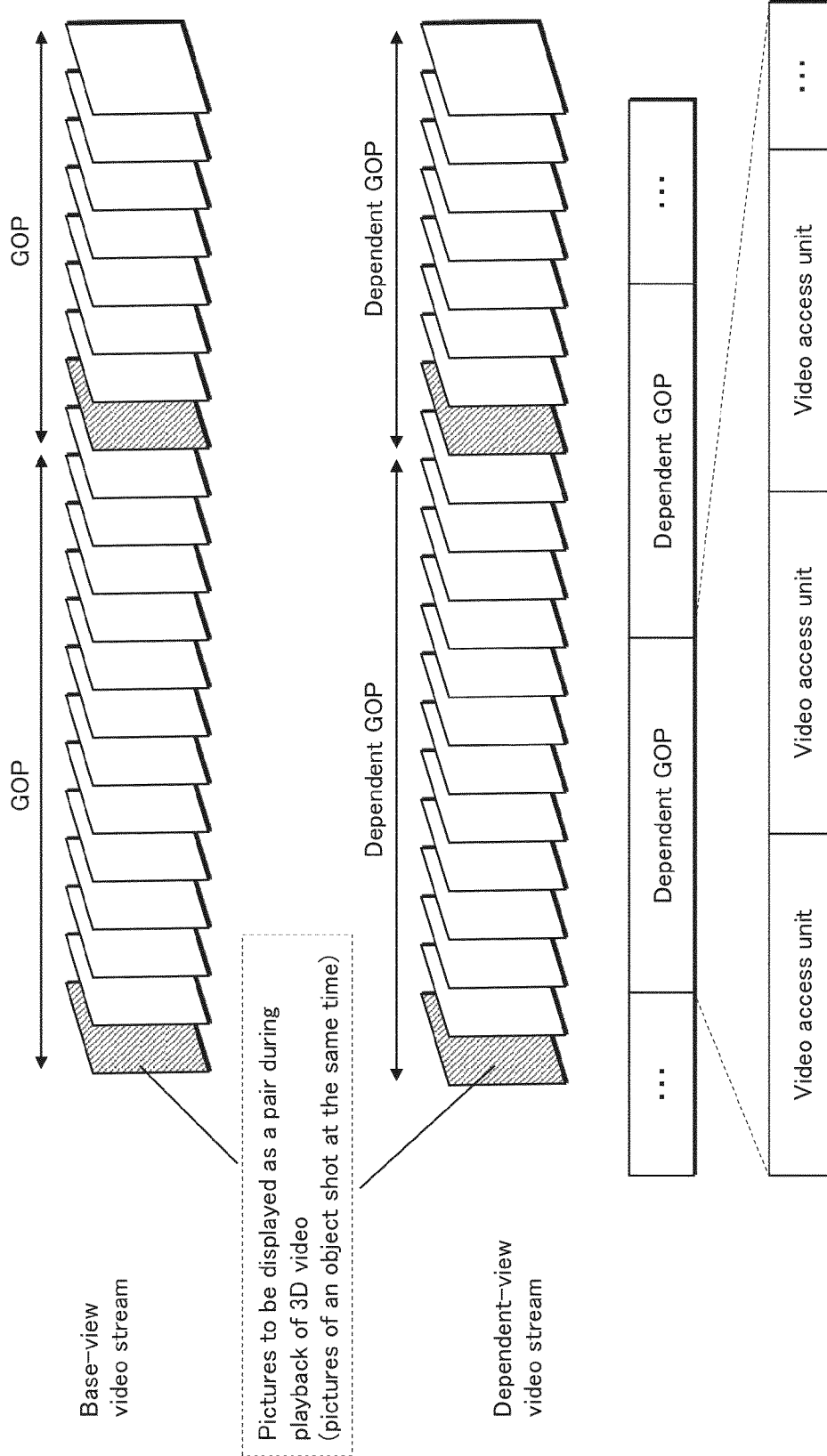
FIG. 19 illustrates the GOP structure of the base-view video stream and the dependent-view video stream.

FIG. 19 illustrates the GOP structure of the base-view video stream and the dependent-view video stream.

The GOP structure of the base-view video stream is the same as the structure of a conventional video stream and is composed of a plurality of video access units.

The dependent-view video stream is composed of a plurality of dependent GOPs.

When playing back 3D video, a picture at the head of a dependent GOP is a picture displayed as a pair with an I-picture at the head of a GOP of the base-view video stream and has the same value of PTS as the I-picture at the head of the GOP of the base-view video stream.

FIG. 20 illustrates the data structure of video access units included in the dependent GOP.

As illustrated in FIG. 20, a video access unit at the head of a dependent GOP stores data of a picture displayed at the same time as an I-picture at the head of a GOP of the base-view video stream, and stores a sub AU ID code, a sub sequence header, a picture header and compressed picture data without fail. The supplementary data, padding data, sequence end code, and stream end code are stored as necessary.

The sub AU ID code is a starting code indicating the starting position of an access unit.

The sub sequence header is a header storing information, such as resolution, frame rate, aspect ratio, and bit rate, that are common through the whole playback sequence composed of a plurality of video access units. The values of the frame rate, resolution and aspect ratio in the sub sequence header are the same as the frame rate, resolution and aspect ratio of the sequence header included in the video access unit at the head of a GOP of the base-view video stream.

The video access units other than the video access unit at the head of a GOP store, without fail, the sub AU ID code and compressed picture data. The supplementary data, padding data, sequence end code, and stream end code are stored as necessary.

2. Embodiment 2

<2-1 Summary>

In Embodiment 1, the multi-view video stream for 3D video is structured to have a low bit rate by realizing the inter-view reference between video streams that have been compress-encoded by different codecs, while being structured to have playback compatibility with the conventional 2D video. In the present embodiment, the conventional 2D video is made high-definition as one example of high-grade video and the high-definition 2D video is transmitted via the multi-view video stream structured to have a low bit rate by realizing the inter-view reference between video streams that have been compress-encoded by different codecs, while being structured to have playback compatibility with the conventional 2D video. Here, "high-definition" refers to such an image quality as is close to that of an original video image. For example, it refers to an image quality with less compression distortions, such as block noise, that may occur during video compression. In the present embodiment, as one example of a high-definition video image, a video image encoded at a high bit rate is used. The video image quality depends on the bit rate at which the encoding is performed. The higher the bit rate is, the higher the image quality is, namely, the closer to the original video image the video image is. This is because when the bit rate is low, a fast-moving scene or the like cannot be compressed or encoded completely and a block noise may occur.

The present embodiment is the same as Embodiment 1 in basic structure of the data structure, data creation device, data creation method, playback device, and playback method. Accordingly, the following description is centered on the differences from Embodiment 1. The terms used in Embodiment 1 are also used in the present embodiment, unless it is explicitly stated otherwise. The following describes the present embodiment in detail.

<2-2. Data Used>

First, the data structure for encoding high-definition video in the present embodiment is explained.

<2-2-1. Transport Stream>

Figure 48:
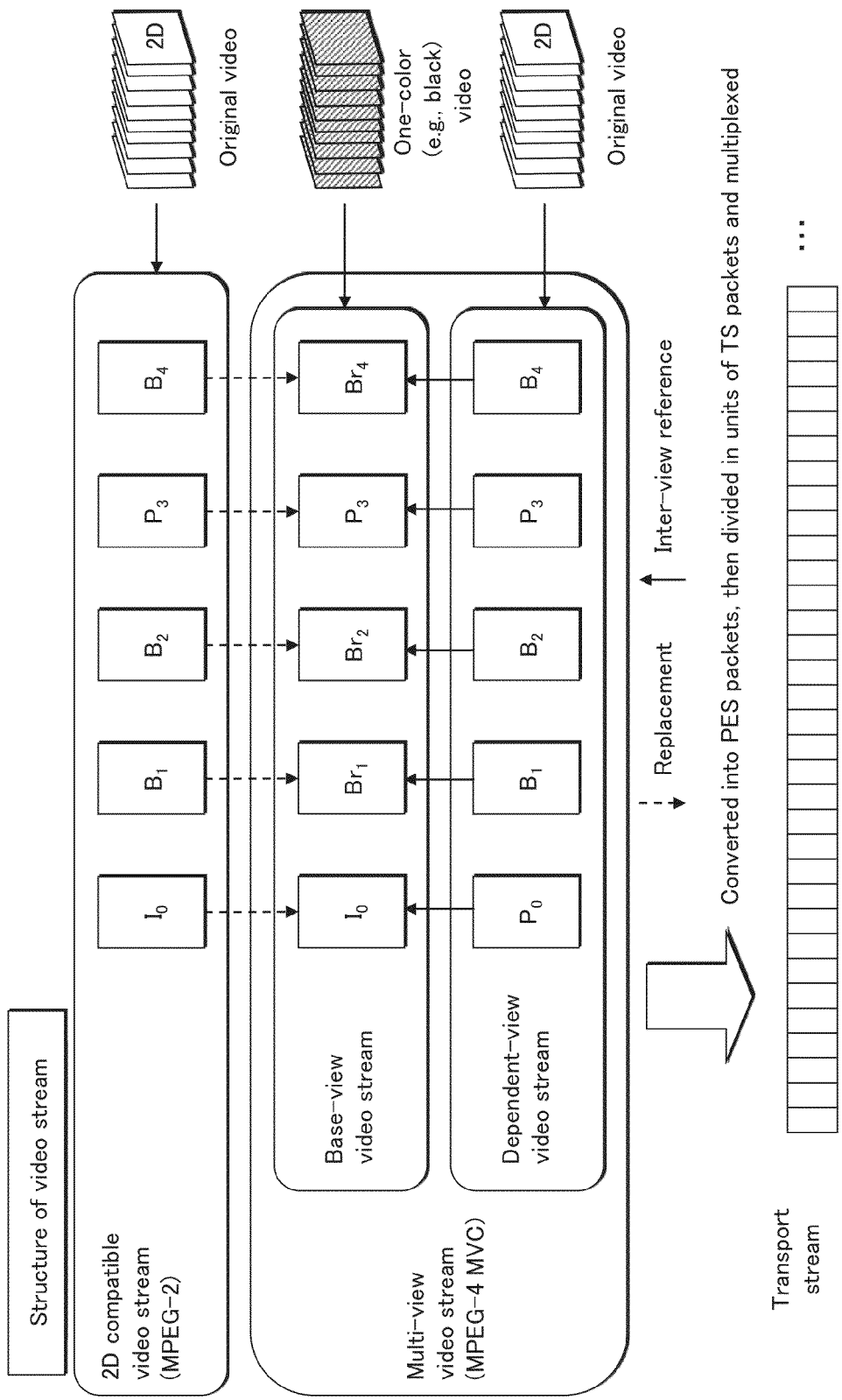
FIG. 48 illustrates the data structure of the transport stream in Embodiment 2.

FIG. 48 illustrates the data included in the transport stream of the present embodiment.

Multiplexed in the transport stream of the present embodiment are a 2D compatible video stream, and a base-view video stream and a dependent-view video stream of a multi-view video stream, after being converted into PES packets and then divided into TS packets for storage.

The 2D compatible video stream is a video stream structured in a format such that it can be played back as 2D video by a playback device dedicated to 2D video, as explained with reference to FIG. 7 and the like. In the present embodiment, the 2D compatible video stream is a video stream encoded by a codec for the MPEG-2 video. The multi-view video stream is a video stream encoded by a codec for realizing the inter-view reference, as described above. In the present embodiment, the multi-view video stream is obtained by compress-encoding an original high-definition video by a codec for the MPEG-4 MVC video.

The right side of FIG. 48 illustrates which video source is compress-encoded into each video stream.

The 2D compatible video stream is generated by compress-encoding original video that has a normal image quality.

The base-view video stream is generated by compress-encoding a black video at a low bit rate in accordance with the MPEG-4 MVC video codec. The dependent-view video stream is generated by compress-encoding an original high-definition video. Here the dependent-view video stream is compressed by using the inter-view reference. The pictures referenced by the inter-view reference are not the pictures having the same value of presentation time (PTS) of the base-view video stream, but the decoded pictures having the same value of presentation time (PTS) of the 2D compatible video stream. That is to say, the dependent-view video stream is generated by compress-encoding a differential video representing the differences between (i) a video obtained by compress-encoding a higher-definition video in accordance with a codec for higher definition than the MPEG-2 video codec and (ii) a video obtained by compress-encoding an original video in accordance with the MPEG-2 video codec. The decoding side replaces the decoded pictures (black images) of the base-view video stream with the decoded pictures (restored MPEG-2 video images) having the same values of presentation time of the 2D compatible video stream, and decodes the pictures (high-definition images) having the same values of presentation time of the dependent-view video stream by referencing the pictures after the replacement (restored MPEG-2 video images).

With the above structure, the base-view video stream is obtained by compress-encoding the black images, and the dependent-view video stream is obtained by compressing only differences between "decoded pictures of the 2D compatible video stream" and "pictures of high-definition video". This allows for a higher-definition video than the conventional 2D video to be structured at a low bit rate.

Here, due to the above-described structure where pictures of the dependent-view video stream reference pictures of the 2D compatible video stream, video attribute values such as "resolution", "aspect ratio", "frame rate", and "progressive or interlace" are set to be the same between the 2D compatible video stream and the multi-view video stream. The attribute values have already been explained with reference to FIG. 22.

<2-2-2. PMT Packet>

FIG. 50 illustrates the PMT packets contained in the transport stream. In the transport stream for transmission of high-definition video, signaling information to be used in decoding of the high-definition video is included in the system packet such as the PMT packet. The signaling information includes a high-definition information descriptor and a high-definition stream descriptor. The high-definition information descriptor is used to signal the relation between video streams and the start and end of a high-definition video playback. The high-definition stream descriptor is set for each video stream.

(1) High-Definition Information Descriptor

FIG. 51 illustrates the structure of the high-definition information descriptor.

The high-definition information descriptor includes a high-definition playback format, 2D compatible video PID, base-view video PID, and dependent-view video PID.

The high-definition playback format is information for signaling the playback method of the high-definition playback device. When the high-definition playback format is set to 0, it indicates that 2D video is played back by playing back the 2D compatible video; when the high-definition playback format is set to 1, it indicates that high-definition video is played back (in the high-definition video storage format described in the present embodiment) by playing back the 2D compatible video and the dependent-view video; when the high-definition playback format is set to 2, it indicates that high-definition video is played back by playing back the base-view video and the dependent-view video; and when the high-definition playback format is set to 3, it indicates that high-definition video is played back by playing back the base-view video.

The following describes a specific example of signaling the playback format, with reference to FIG. 52.

Upon receiving 0 as the value of high-definition playback format, the playback device plays back only the 2D compatible video stream as 2D video. Upon receiving 1 as the value of high-definition playback format, the playback device performs playback of high-definition video by playing back the 2D compatible video stream, base-view video stream, and dependent-view video stream by the playback method explained in the present embodiment. When 2 is received as the value of high-definition playback format, the 2D compatible video stream and the multi-view video stream representing the high-definition video are generated by compress-encoding different videos, and thus are not in the reference relationship. Furthermore, the base-view video stream and the dependent-view video stream are obtained by compressing video streams by a normal multi-view codec. Accordingly, the playback device plays back high-definition video by playing back the multi-view video stream including the base-view and dependent-view video streams. Upon receiving 3 as the value of high-definition playback format, the playback device performs playback of high-definition video by playing back the base-view video stream.

The 2D compatible video PID, the base-view video PID, and the dependent-view video PID indicate the PID of each video stream stored in the transport video stream. The playback device can determine the PID of the stream that is to be decoded, by using these information.

(2) High-Definition Stream Descriptor

FIG. 53 illustrates the structure of the high-definition stream descriptor.

The high-definition stream descriptor contains a base-view video type, a reference-target type, and a referenced type.

The base-view video type indicates the type of video images encoded in the base-view video stream. When the base-view video type is set to 0, it indicates that video storing basic video of high-definition video has been compress-encoded; and when the base-view video type is set to 1, it indicates that dummy video, which includes accompanying video such as black video and is to be replaced with 2D compatible video and is not output to a plane, has been compress-encoded.

The reference-target type indicates the type of the video stream that the dependent-view video stream references by the inter-view reference. When the reference-target type is set to 0, it indicates that pictures of the base-view video stream are referenced by the inter-view reference; and when the reference-target type is set to 1, it indicates that pictures of the 2D compatible video stream are referenced by the inter-view reference.

The reference type indicates whether or not the video stream is referenced by the inter-view reference. If the video stream is not referenced, the inter-view reference process can be skipped, thus simplifying the implementation.

Note that all or a portion of the information in the high-definition information descriptor and the high-definition stream descriptor may be stored as supplementary data or the like for each video stream rather than being stored in PMT packets.

<2-2-3. PTS, DTS, GOP>

The relationship between the picture type and the presentation time (PTS) and decode time (DTS) allocated to each video access unit in the 2D compatible video stream, the base-view video stream, and the dependent-view video stream in the transport stream is the same as the relationship for the 2D compatible video stream, the base-view video stream, and the dependent-view video stream in Embodiment 1.

The GOP structure of the 2D compatible video stream, the base-view video stream, and the dependent-view video stream is also the same as the GOP structure of the 2D compatible video stream, the base-view video stream, and the dependent-view video stream in Embodiment 1.

Note that the explanation having been made with reference to FIGS. 23 to 25 and the supplementary explanation thereof are also applied to the present embodiment.

<2-2-4. Use Form of Streams>

Figure 49:
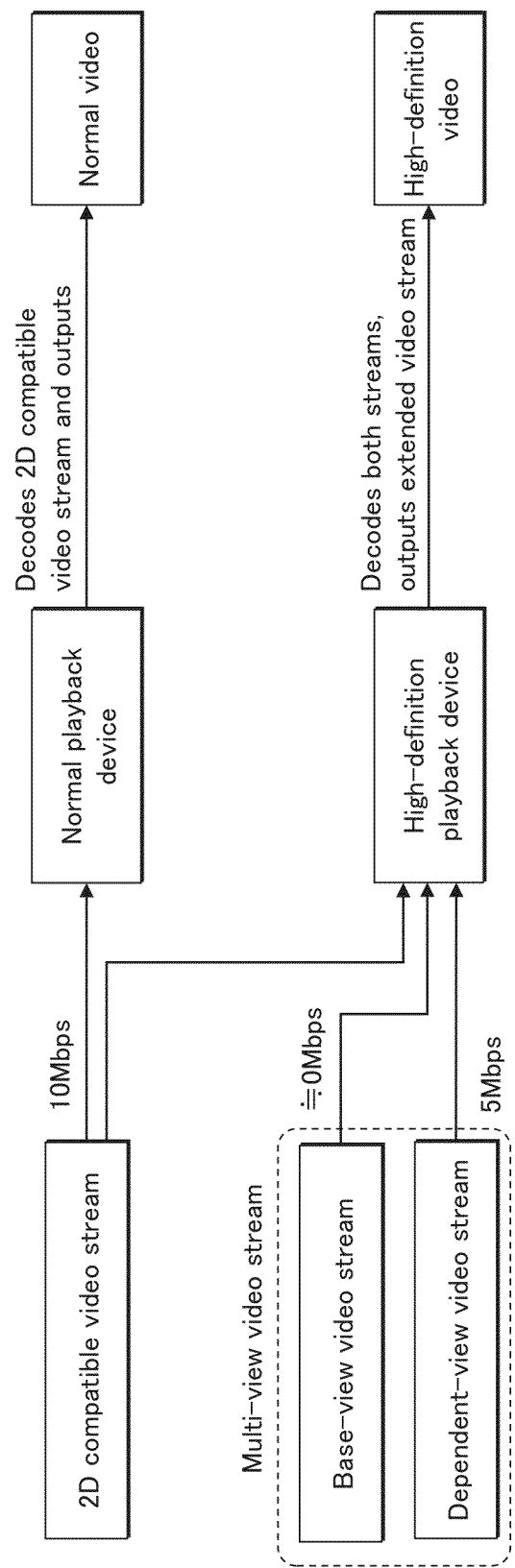
FIG. 49 illustrates a use form according to Embodiment 2.

The following describes the use form of the streams with reference to FIG. 49.

In FIG. 49, the normal playback device is a device that can play back only the conventional 2D compatible video stream. The normal playback device can play back streams having a bit rate of up to 10 Mbps. The normal playback device is assumed to be of a type that has already become popular in the market and plays back streams that are distributed via broadcast waves or the like. On the other hand, the high-definition playback device is the playback device of the present embodiment, and has a function to decode the multi-view video stream as well as the 2D compatible video stream. Suppose here that a transport stream having the structure explained with reference to FIG. 48 is broadcast while the above two types of playback devices are present.

The normal playback device plays back the normal 2D video by decoding the 2D compatible video stream in the transport stream. On the other hand, the high-definition playback device decodes both the 2D compatible video stream and the multi-view video stream in the transport stream. When decoding the dependent-view video stream in the multi-view video stream, the high-definition playback device replaces decoded pictures of the base-view video stream with decoded pictures having the same values of presentation time of the 2D compatible video stream. The high-definition playback device then decodes pictures of the dependent-view video stream by referencing the decoded pictures having the same values of presentation time of the 2D compatible video stream, which are the pictures after the replacement. The decoded pictures of the dependent-view video stream are obtained by adding a difference between pictures of the high-definition video and pictures of the 2D compatible video stream to the pictures of the 2D compatible video stream. That is to say, the decoded pictures of the dependent-view video stream are the pictures of the high-definition video. Thus outputting the dependent-view video stream in this way allows for playback of video images with higher definition than the results of decoding the 2D compatible video stream.

With the above structure, when the dependent-view video stream is decoded, information such as PTS included in the base-view video stream is referenced, but the pictures themselves are not. This makes it possible to greatly reduce the bit rate by compress-encoding video having high compression rate such as video composed of black images.

As described above, by performing the inter-view reference between streams that have been compress-encoded by different codecs, it is possible to structure an extended video stream for high-definition video at a low bit rate (5 Mbps in the example illustrated in FIG. 49), while maintaining the playback compatibility with the normal playback device that has already become popular in the market, and broadcast the extended video stream so that the playback device side can decode and play back the video stream.

<2-3. Data Creation Device>

The following describes the data creation device of the present embodiment.

<2-3-1. Structure>

Figure 54:
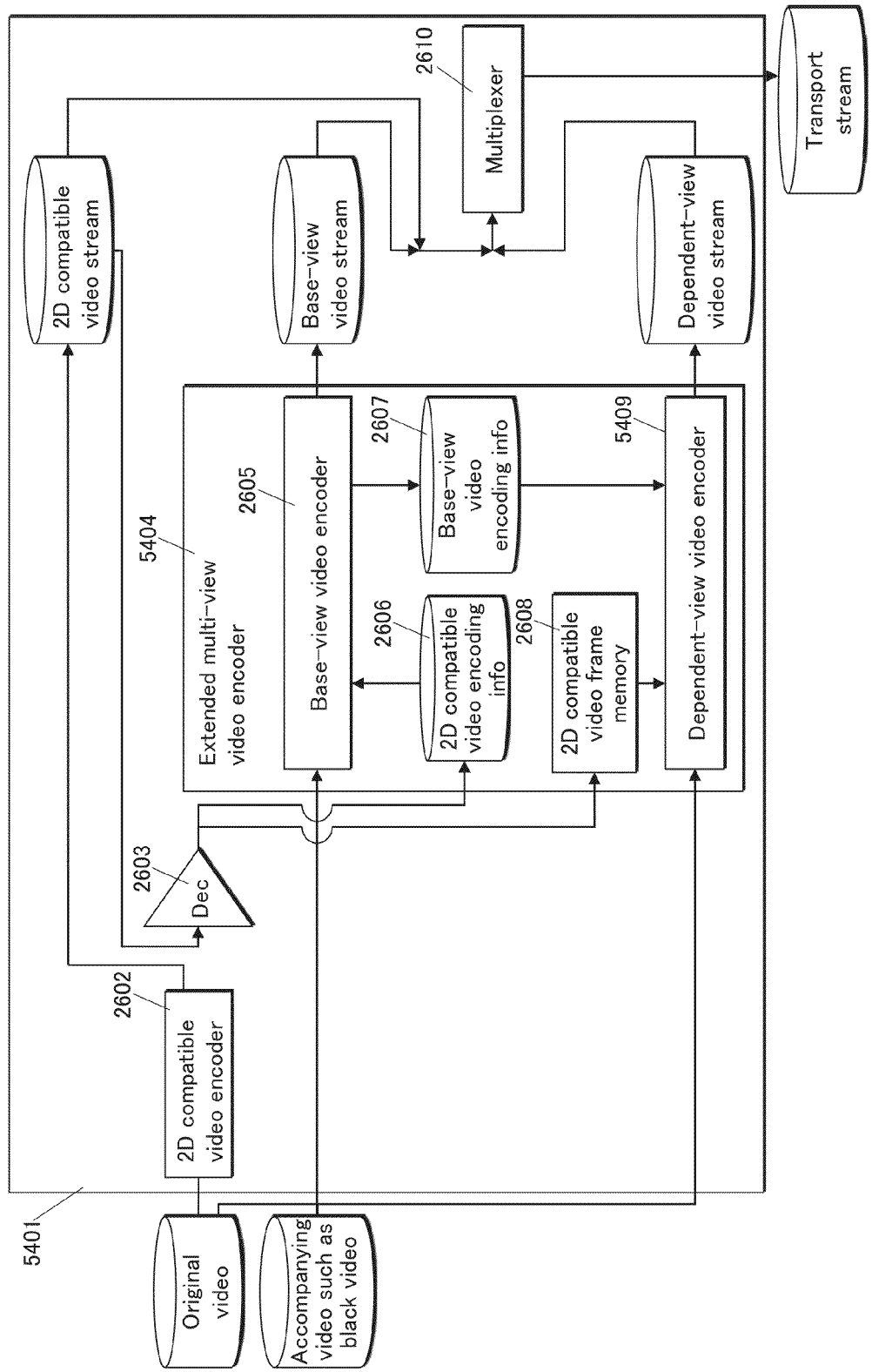
FIG. 54 illustrates the structure of the data creation device in Embodiment 2.

FIG. 54 illustrates the structure of a data creation device 5401 as a video encoding device of the present embodiment.

The data creation device 5401 has basically the same structure as the data creation device 2601 of Embodiment 1 illustrated in FIG. 26. However, since they receive different input data, in FIG. 54, "original left-eye video" and "original right-eye video" in FIG. 26 have been replaced with 2D "original video". The following description centers on the differences from the data creation device 2601 of Embodiment 1.

The data creation device 5401 differs from the data creation device 2601 of Embodiment 1 in that a dependent-view video encoder 5409 in an extended multi-view video encoder 5404 differs in structure from the counterpart in Embodiment 1.

The dependent-view video encoder 5409 encodes input of a high-grade original video, not one half of videos (original left-eye and right-eye videos) constituting 3D video. In the compress-encoding process, the dependent-view video encoder 5409 performs the compression process by referencing, by the inter-view reference, decoded pictures (of the 2D compatible video stream) stored in the 2D compatible video frame memory 2608.

<2-3-2. Operation>

Figure 55:
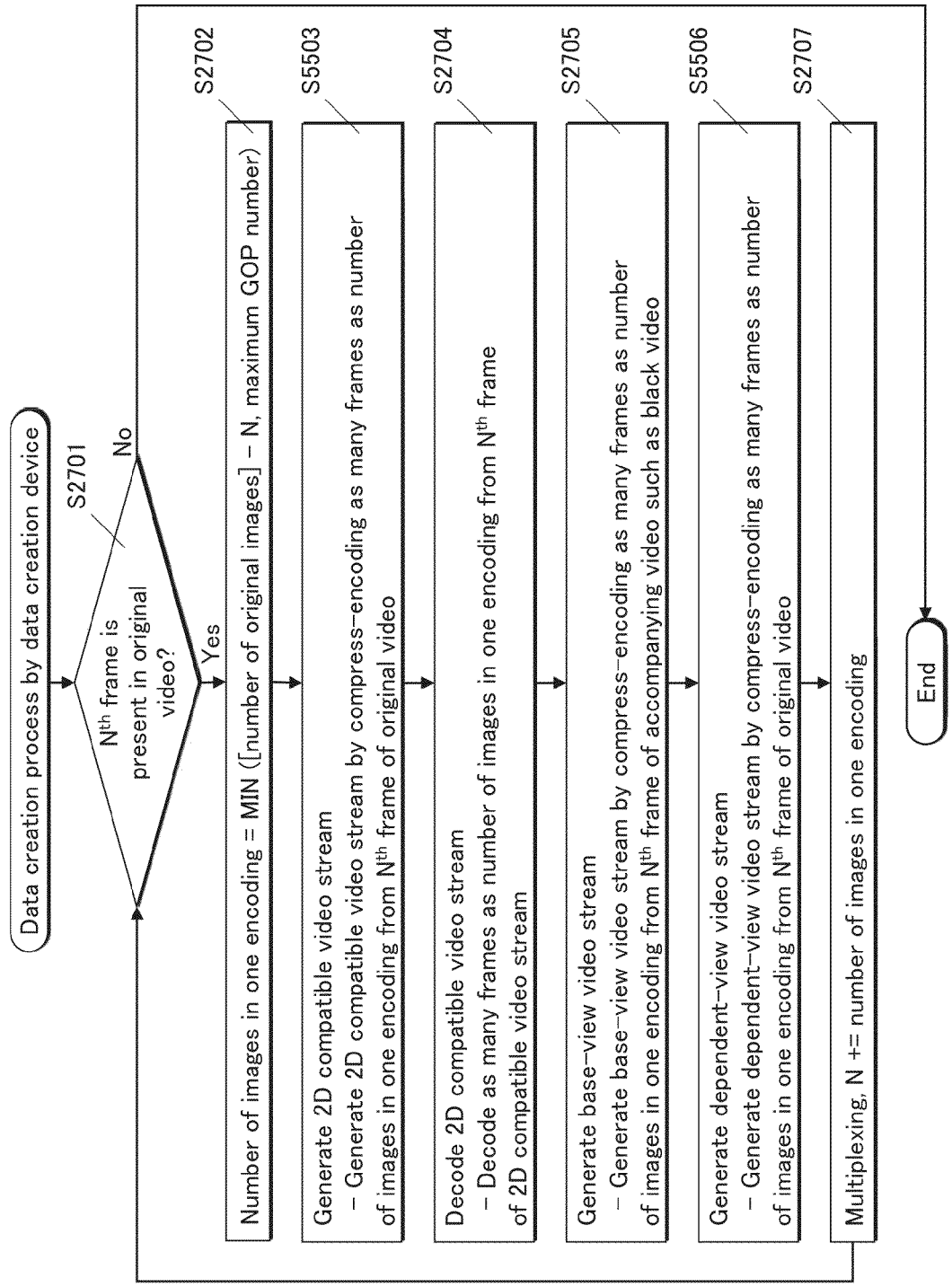
FIG. 55 is a flowchart illustrating the data creation flow by the data creation device in Embodiment 2.

FIG. 55 is a flowchart illustrating the data creation process performed by the data creation device 5401.

The data creation flow illustrated in FIG. 55 is approximately the same as the data creation flow of the data creation device 2601 explained with reference to FIG. 27 in Embodiment 1. However, since the data creation device 5401 increases the image quality of the 2D video, steps S2703 and S2706 in FIG. 27 have been replaced with steps S5503 and S5506 in FIG. 55, respectively. More specifically, in FIG. 55, "original left-eye video" and "original right-eye video" in FIG. 27 have been replaced with 2D "original video".

<2-4. Playback Device>

The following describes a playback device as a video playback device for playing back the high-definition video in the present embodiment.

<2-4-1. Structure>

Figure 56:
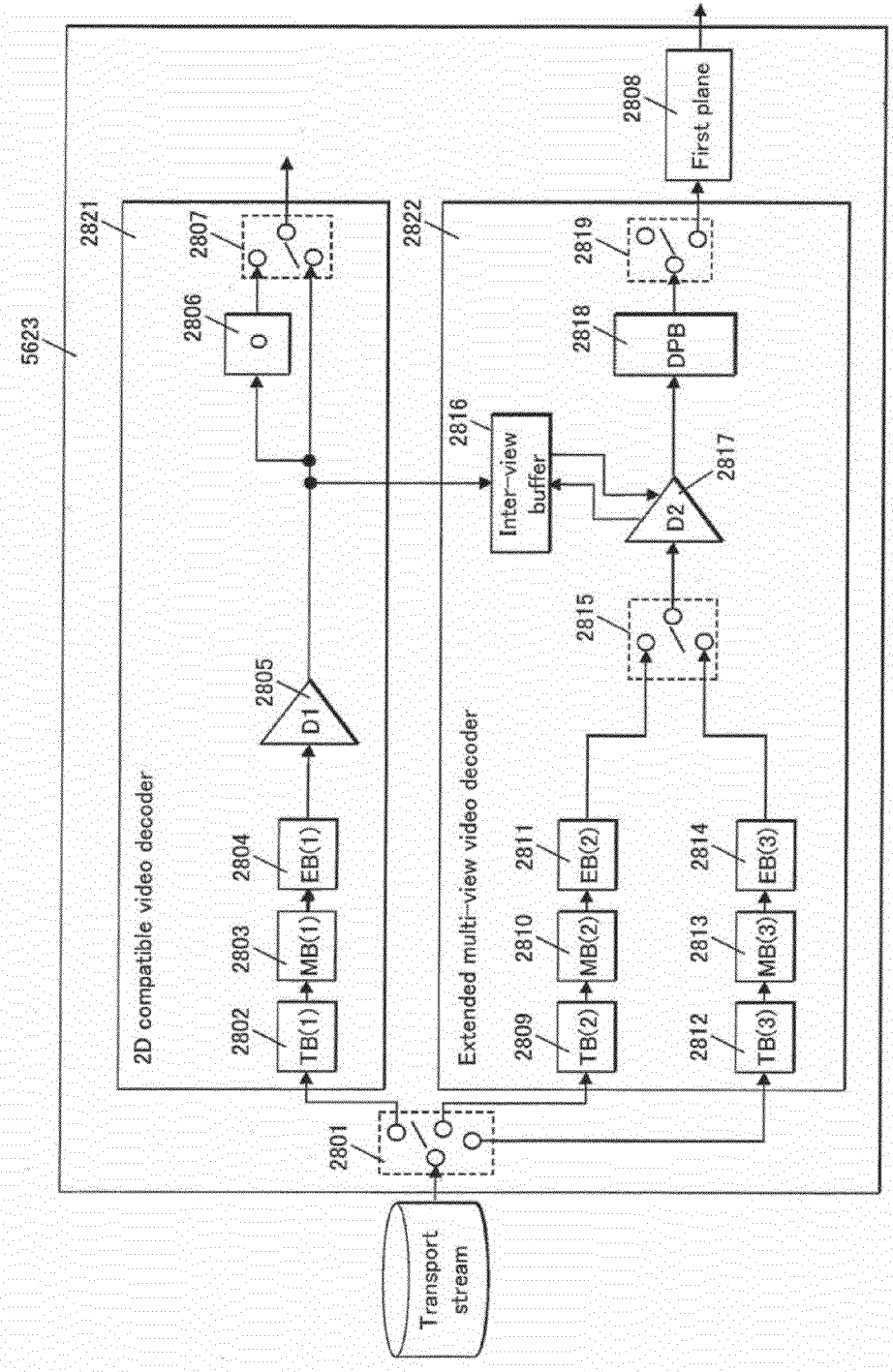
FIG. 56 illustrates the playback device for playing back high-definition video in Embodiment 2.

FIG. 56 illustrates the structure of a playback device 5623 according to the present embodiment.

The playback device 5623 has basically the same structure as the 3D video playback device 2823 of Embodiment 1 illustrated in FIG. 28. However, since the playback device 5623 does not need to output the 3D video composed of the left-eye and right-eye videos as the playback device 2823 in Embodiment 1, the playback device 5623 includes only one output plane, a first plane 2808, and the 2D compatible video decoder 2821 does not output data to a plane, but merely discards it. The other structural elements of the playback device 5623 are the same as those of the playback device 2823.

<2-4-2. Operation>

Figure 57:
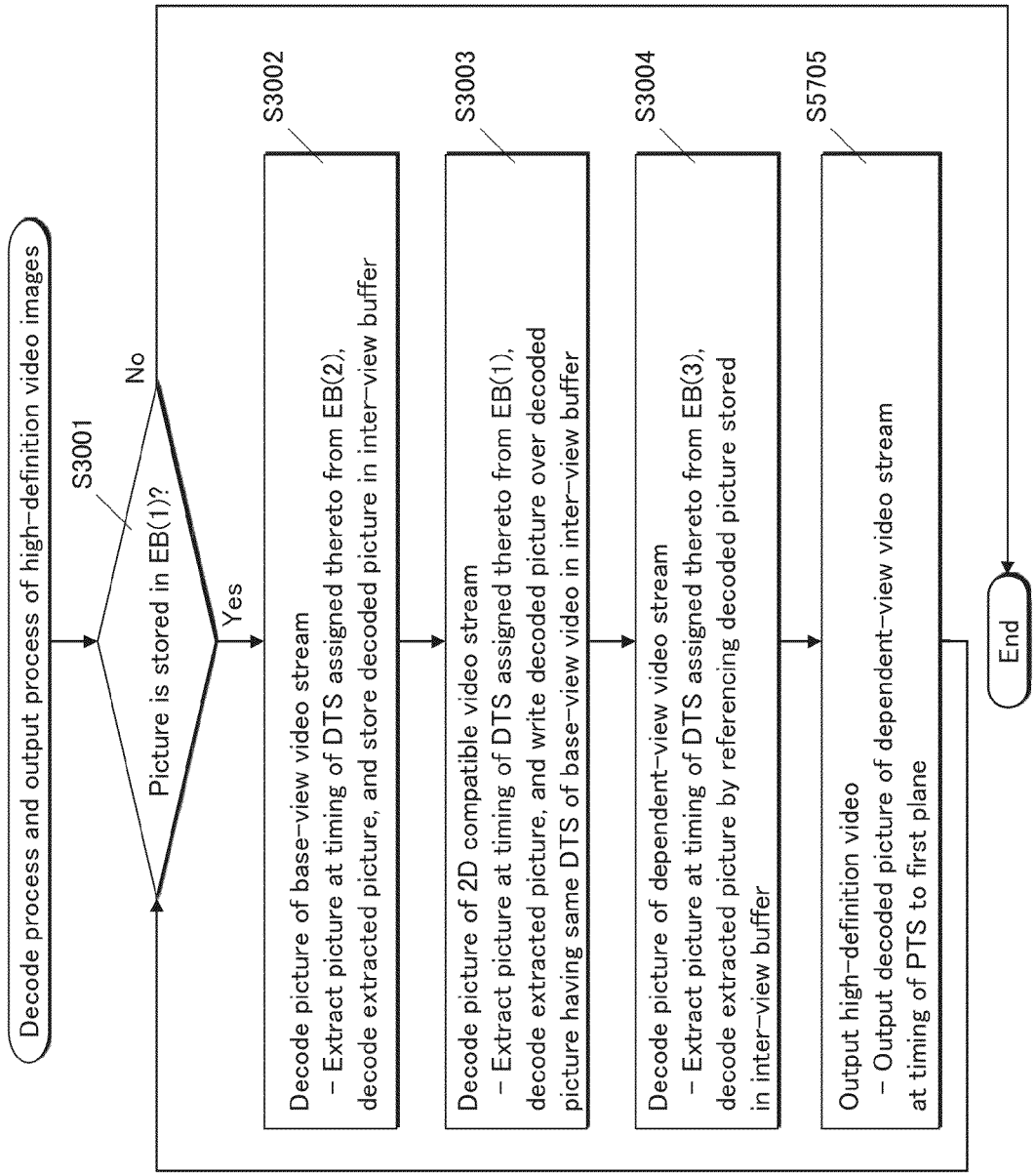
FIG. 57 is a flowchart illustrating the decode process and output process performed by the playback device for playing back high-definition video in Embodiment 2.

FIG. 57 is a flowchart illustrating the decode process and output process performed by the playback device 5623 having the above structure.

The flowchart illustrated in FIG. 57 is approximately the same as the decode process and output process of 3D video images performed by the playback device 2823, explained with reference to FIG. 30 in Embodiment 1. However, the two flowcharts differ from each other in step of the output process, and step S3005 in FIG. 30 has been replaced with step S5705 in FIG. 57 explained in the following. Since the present embodiment is aimed to make the 2D video high-definition and there is no need to output the 2D compatible video stream to a plane, in step S5705, the playback device outputs only the decoded picture of the dependent-view video stream at the timing of the PTS to the first plane 2808.

<2-5. Supplementary Explanation on Effects>

Figure 47:
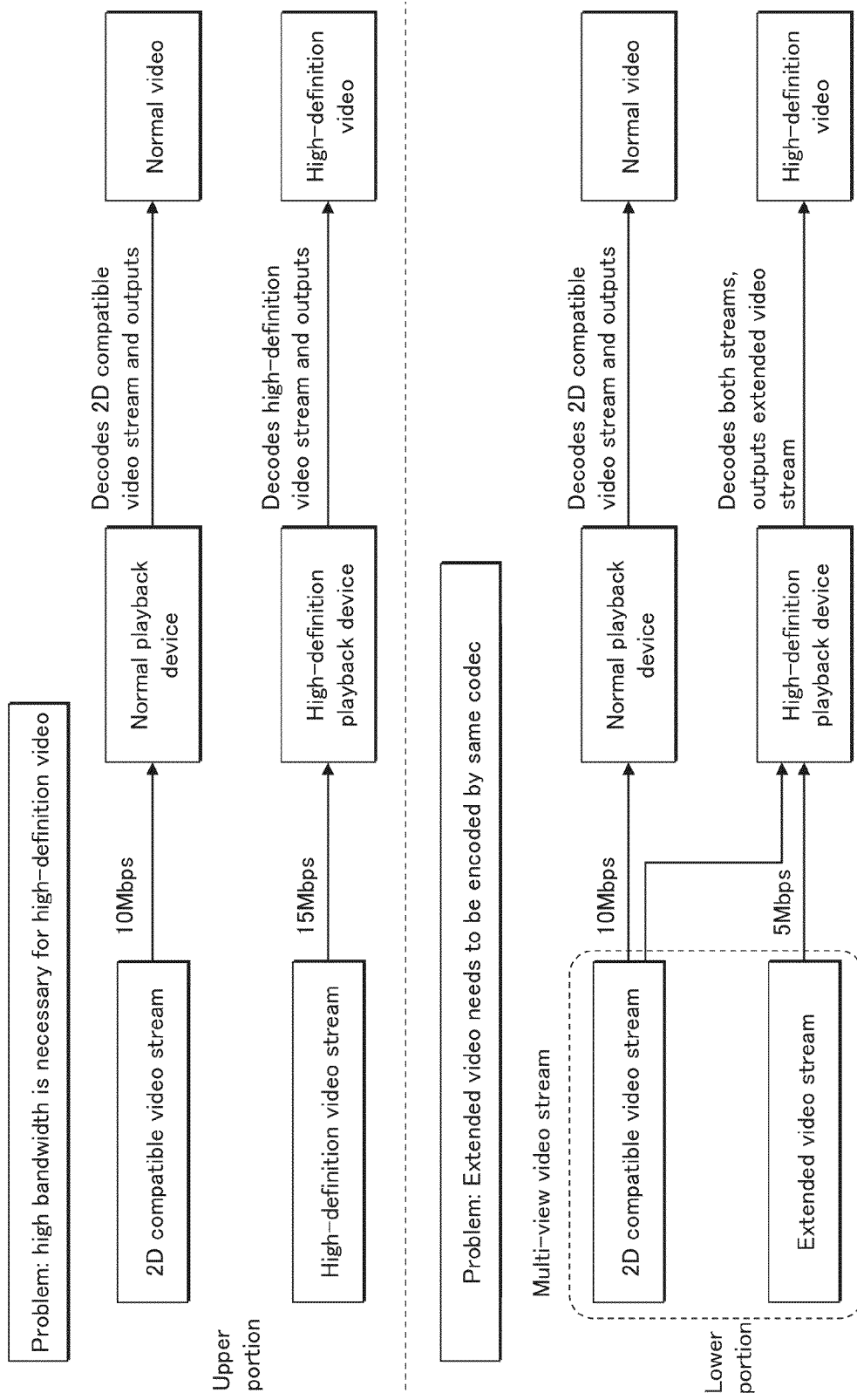
FIG. 47 illustrates the problems in realizing high-definition video according to Embodiment 2.

The following describes the effects produced by the present embodiment, with reference to FIG. 47.

First, the upper portion of FIG. 47 is described. In FIG. 47, the normal playback device is a playback device that can play back only the 2D compatible video stream. The normal playback device can play back streams having a bit rate of up to 10 Mbps. The normal playback device is assumed to be of a type that has already become popular in the market and plays back streams that are distributed via broadcast waves or the like. On the other hand, the high-definition playback device is a playback device that can play back a high-definition video stream storing encoded video that is higher in image quality than the 2D compatible video stream. In the example in the upper portion of FIG. 47, the 2D compatible video stream has a bit rate of 10 Mbps and the high-definition video stream, which stores compressed video that is obtained by compressing the same video by the same codec as those for the 2D compatible video stream, has a bit rate of 15 Mbps. To enable the high-definition playback device to decode and output a high-definition video stream, while maintaining the compatibility with a normal playback device by allowing for the normal playback device to decode and output the 2D compatible video stream, it is necessary to broadcast data in which both the 2D compatible video stream and the high-definition video stream are multiplexed, and thus a transfer bandwidth including at least a sum of bit rates of both video streams and higher than the conventional one is required. In the case of the upper portion of FIG. 47, it is necessary to transfer the 2D compatible video stream and the high-definition video stream at the same time at a bit rate of 25 Mbps in which 10 Mbps is for the 2D compatible video stream and 15 Mbps is for the high-definition video stream.

The lower portion of FIG. 47 illustrates an example case where a multi-view encoding method is adopted to reduce the required transfer bandwidth and solve the above problem of the upper portion of FIG. 47. In this case, the 2D compatible video stream is encoded as the base-view video stream. Furthermore, the extended video stream is the dependent-view video stream that has been compress-encoded by referencing pictures of the base-view video stream. The extended video stream compresses differences between the original video and the decoding result of the 2D compatible video stream. With this structure, the multi-view video stream realizes high-definition video at a low bit rate, compared with the case where the 2D compatible video stream and the high-definition video stream are transferred at the same time as illustrated in the upper portion of FIG. 47. More specifically, as illustrated in the lower portion of FIG. 47, when the 2D compatible video stream has a bit rate of 10 Mbps, the extended video stream has a bit rate of 5 Mbps since it has been compressed by referencing pictures of the 2D compatible video stream.

The high-definition playback device decodes the 2D compatible video stream included in the multi-view video stream, and decodes the extended video stream by referencing the decoded 2D compatible video stream, thus can decode and play back high-definition video.

However, the structure illustrated in the lower portion of FIG. 47 has a restriction that the extended video stream and the 2D compatible video stream need to be encoded by the same video codec. Accordingly, both video streams need to be compressed in a multi-view video encoding format such as the MPEG-4 MVC format.

If both video streams are compressed in this way, the compatibility with normal playback devices that have already been popular in the market is lost. In view of this, it is difficult to adopt the structure illustrated in the lower portion of FIG. 47.

On the other hand, as explained earlier, the present embodiment realizes playback of high-definition video by a high-definition playback device, by realizing the inter-view reference between video streams that have been compress-encoded by different codecs, while maintaining playback compatibility with normal playback devices that have already been popular in the market. Furthermore, the extended video stream is structured to have a low bit rate, reducing the bandwidth that is required for transferring the streams.

<2-6. Modifications to Present Embodiment>

(1) The contents of Embodiment 1 and the modifications are also applied to the present embodiment as long as the contents do not contradict the structure and the like of the present embodiment.

(2) In the present embodiment, a structure for selecting one high-definition playback format from among a plurality of high-definition playback formats is explained with reference to the description of the high-definition playback format field included in the high-definition information descriptor illustrated in FIG. 51. The method of switching among a plurality of high-definition playback formats can be implemented easily by adopting the structure that has already been explained with reference to FIG. 40.

By changing the "inter-codec reference switch" and the "plane selector" in accordance with the high-definition playback format included in the high-definition information descriptor illustrated in FIG. 51, the playback device can easily change the playback mode.

Figure 58:
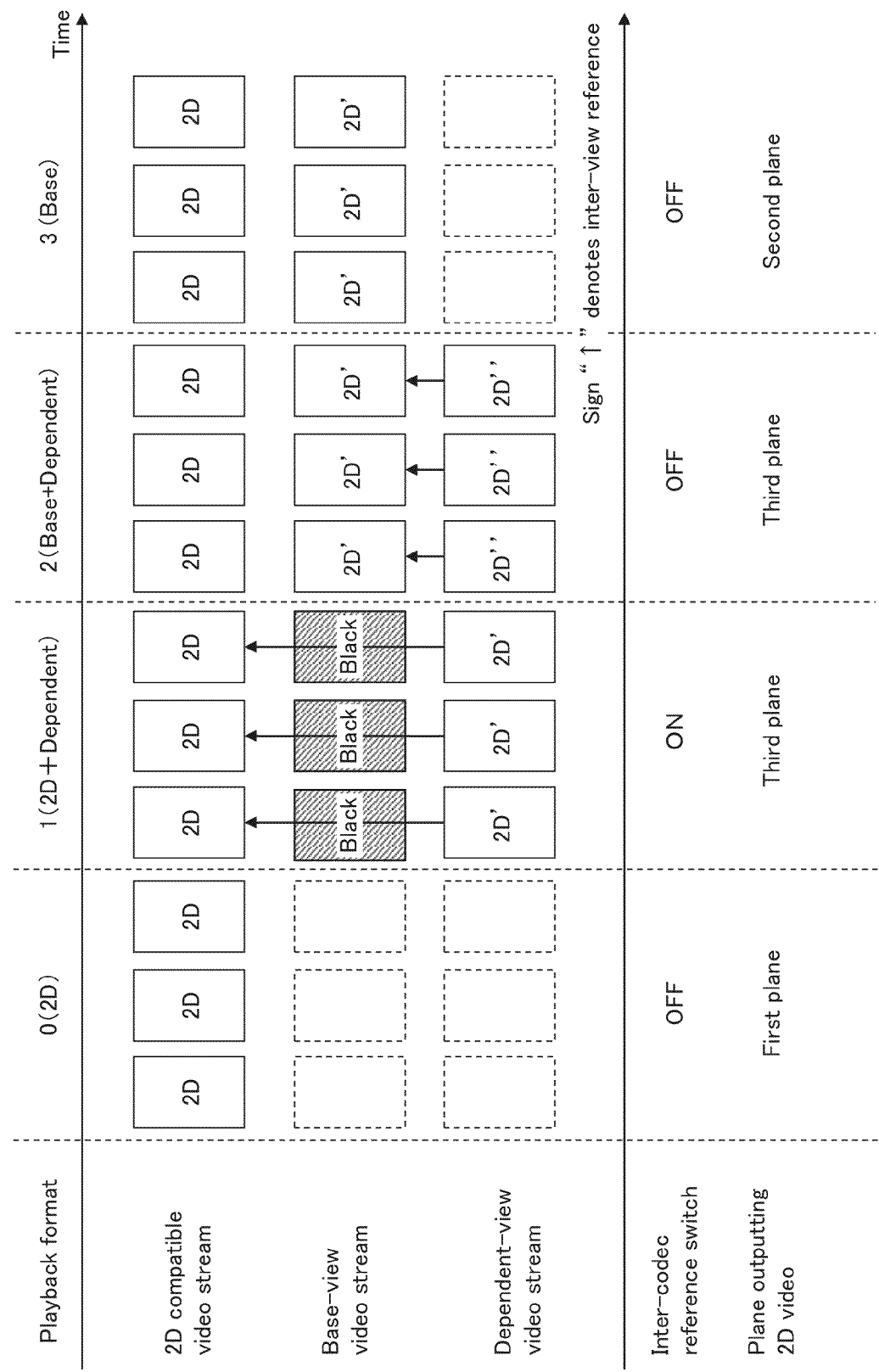
FIG. 58 illustrates the relation among the high-definition playback format, inter-codec reference switch, and plane selector.

The lower portion of FIG. 58 illustrates how to set the inter-codec reference switch and plane selector in the case of the high-definition playback format illustrated in FIG. 52. When the high-definition playback format field is set to "0", in the high-definition playback device, the inter-codec reference switch is set OFF and the plane selector is set to select the first plane for the 2D video. When the high-definition playback format field is set to "1", the inter-codec reference switch is set ON and the plane selector is set to select the third plane for the 2D video. When the high-definition playback format field is set to "2", the inter-codec reference switch is set OFF and the plane selector is set to select the third plane for the 2D video. When the high-definition playback format field is set to "3", the inter-codec reference switch is set OFF and the plane selector is set to select the second plane for the 2D video. In this way, by switching only the inter-codec reference switch and plane selector, the playback device can change the high-definition playback format easily.

3. Embodiment 3

<3-1 Summary>

In Embodiment 1, the multi-view video stream for 3D video is structured to have a low bit rate by realizing the inter-view reference between video streams that have been compress-encoded by different codecs, while being structured to have playback compatibility with the conventional 2D video. In the present embodiment, the conventional 2D video has improved color reproducibility (is made high-color-depth) as one example of high-grade video and the high-definition 2D video is transmitted via the multi-view video stream structured to have a low bit rate by realizing the inter-view reference between video streams that have been compress-encoded by different codecs, while being structured to have playback compatibility with the conventional 2D video. Here, the improved color reproducibility refers to the addition of more accurate gradient information to color information compressed by a conventional video codec. Normal video codecs represent color information by eight-bit colors. In the case of the RGB color, a total of 24 bits, with 8 bits (depth levels 0 to 255) assigned to each of R, G and B, are used to display approximately 16,770,000 colors. However, since there are a great deal of colors that cannot be represented by 8-bit color depth, some users may consider that video images displayed with use of the 8-bit color depth are low in image quality. In view of this, in the present embodiment, video whose color is represented by the 12-bit color depth is used as one example of high-color-depth video.

Figure 59:
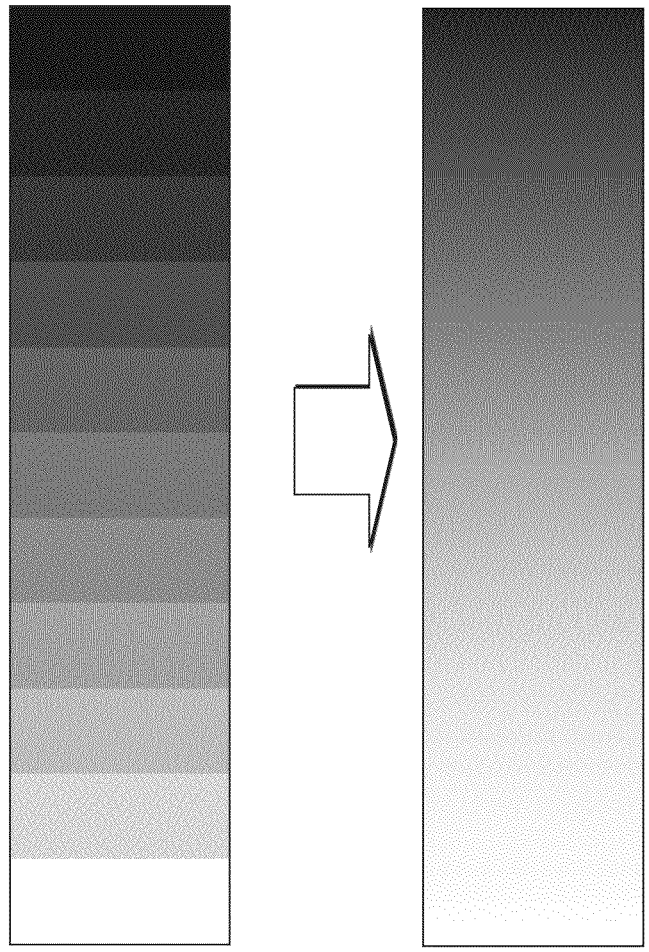
FIG. 59 illustrates the difference between images represented with a high color depth and a low color depth.

For example, as illustrated in FIG. 59, when the color in video images of CG (computer graphics) or cartoon is represented by a low color depth, the color change in a gradational portion is displayed in a step-like manner, as illustrated in the upper portion of FIG. 59. If the color is represented by a higher color depth such as 12-bit color depth instead of the 8-bit color depth, the gradational portion is represented in a smooth manner, as illustrated in the lower portion of FIG. 59. Hereinafter, video having high color depth is referred to as "high-color-depth video", and increasing the color depth by increasing the amount of information of the color of the video is referred to as making high-color-depth video.

The basic structure of the data structure, data creation device, data creation method, playback device, and playback method in the present embodiment is the same as in Embodiment 1, and the following description centers on the differences from Embodiment 1. The terms used in Embodiment 1 are also used in the present embodiment, unless it is explicitely stated otherwise.

The following describes an overview of the procedures for encoding and decoding for making high-color-depth video.

Figure 61:
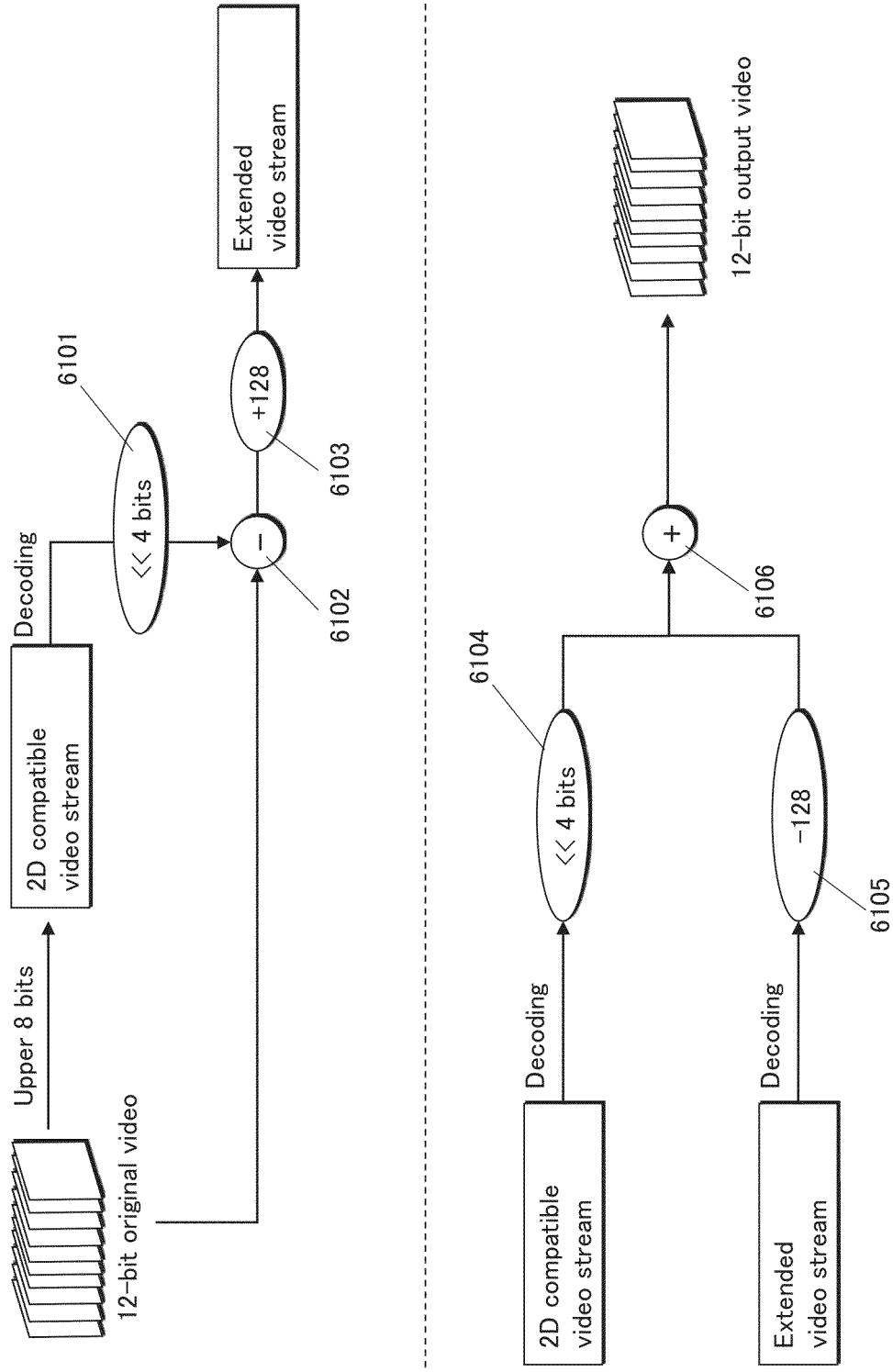
FIG. 61 illustrates a method for creating an extended video stream realizing high-color-depth video, and a method for compositing video streams by using the extended video stream realizing high-color-depth video.

FIG. 61 illustrates an overview of the procedures for encoding and decoding for making high-color-depth video.

The upper portion of FIG. 61 illustrates an overview of the procedure for generating the encoded 2D compatible video stream and extended video stream. Here a high-color-depth video is assumed to be, as one example, an original video having the 12-bit color depth. First, each upper-eight-bit portion is extracted from the 12-bit images constituting the original video, and the extracted 8-bit video images are compress-encoded into the 2D compatible video stream. The 2D compatible video stream is then decoded, each video image of the decoded 2D compatible video stream is shifted upwards by four bits (6101), and the differential value between the result and each video image of the 12-bit original video is calculated (6102). The differential value takes the range of the signed 7-bit value (−127 to +128). The differential value is added with 128 to be made to a positive value (6103), and the resultant 2D compatible video stream is compress-encoded into the extended video stream.

The lower portion of FIG. 61 illustrates an overview of the procedure for decoding the above-described 2D compatible video stream and extended video stream.

First, the 2D compatible video stream is decoded, and the color value of each pixel is shifted upwards by four bits (6104). Next, the extended video stream is decoded, and the color value of each pixel is converted to a signed value by subtracting 128 therefrom (6105). These video images are then added together (6106) to output a high-color-depth video. This makes it possible to encode/decode videos by using the conventional 8-bit encoder/decoder. Also, the extended video stream is a differential video between a 12-bit video and an 8-bit video (to be exact, a video obtained by decoding a compress-encoded 8-bit 2D compatible video stream), representing video having less change, and thus can be compress-encoded with high efficiency. Furthermore, since multi-view video encoding is used, pictures of the 2D compatible video stream can be referenced. The following describes the present embodiment in detail.

<3-2. Data Format>

First, the data structure for encoding high-color-depth video in the present embodiment is explained.

<3-2-1. Transport Stream>

Figure 62:
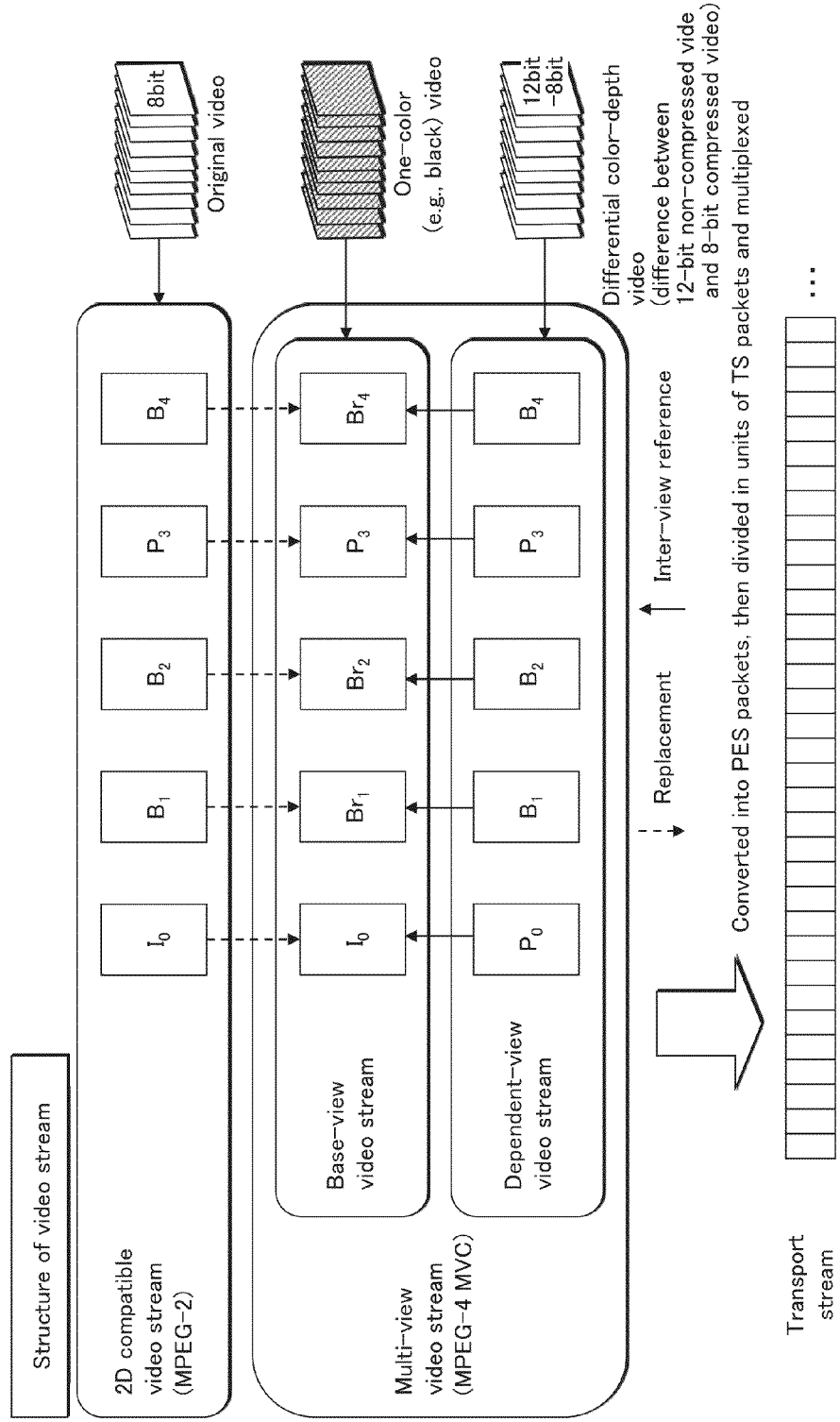
FIG. 62 illustrates the data structure of the transport stream in Embodiment 3.

FIG. 62 illustrates the data included in the transport stream of the present embodiment.

Multiplexed in the transport stream of the present embodiment are a 2D compatible video stream, and a base-view video stream and a dependent-view video stream of a multi-view video stream, after being converted into PES packets and then divided into TS packets for storage.

The 2D compatible video stream is a video stream structured in a format such that it can be played back as 2D video by a playback device dedicated to 2D video, as explained with reference to FIG. 7 and the like. In the present embodiment, the 2D compatible video stream is a video stream encoded by a codec for the MPEG-2 video. The multi-view video stream is, as described above, a video stream encoded by a codec for realizing the inter-view reference. In the present embodiment, the codec is assumed to be MPEG-4 MVC.

The right side of FIG. 62 indicates which video source is compress-encoded into each video stream.

The 2D compatible video stream has been compress-encoded by a codec for the MPEG-2 video to have an 8-bit color depth.

The base-view video stream is generated by compress-encoding a black video at a low bit rate in accordance with the MPEG-4 MVC video codec.

The dependent-view video stream is obtained by compress-encoding a differential video representing a difference between a 12-bit original video and decoded images of the 2D compatible video stream (an 8-bit non-compressed video). The differential video is generated by the procedure explained with reference to FIG. 61. In the following, the differential video is referred to as a "differential color-depth video". The differential color-depth video has been compress-encoded by the codec for MPEG-4 MVC video. Here the dependent-view video stream is compressed by referencing pictures by the inter-view reference. The pictures referenced by the inter-view reference are not the pictures having the same value of presentation time (PTS) of the base-view video stream, but the decoded pictures having the same value of presentation time (PTS) of the 2D compatible video stream. The decoding side replaces the decoded pictures (black images) of the base-view video stream with the decoded pictures (8-bit non-compressed video images) having the same values of presentation time of the 2D compatible video stream, and decodes the pictures (12-bit original video images) having the same values of presentation time of the dependent-view video stream by referencing the pictures after the replacement (8-bit non-compressed video images).

With this structure, since the dependent-view video stream is obtained by compress-encoding the differential color-depth video, the bit rate of the streams as a whole is reduced, and a video that is higher in color depth than the 2D compatible video stream can be provided.

Here, due to the above-described structure where pictures of the dependent-view video stream reference pictures of the 2D compatible video stream, values of the video attributes such as "resolution", "aspect ratio", "frame rate", and "progressive or interlace" are set to be the same between the 2D compatible video stream and the multi-view video stream. The attribute values have already been explained with reference to FIG. 22.

<3-2-2. PMT Packet>

Figure 63:
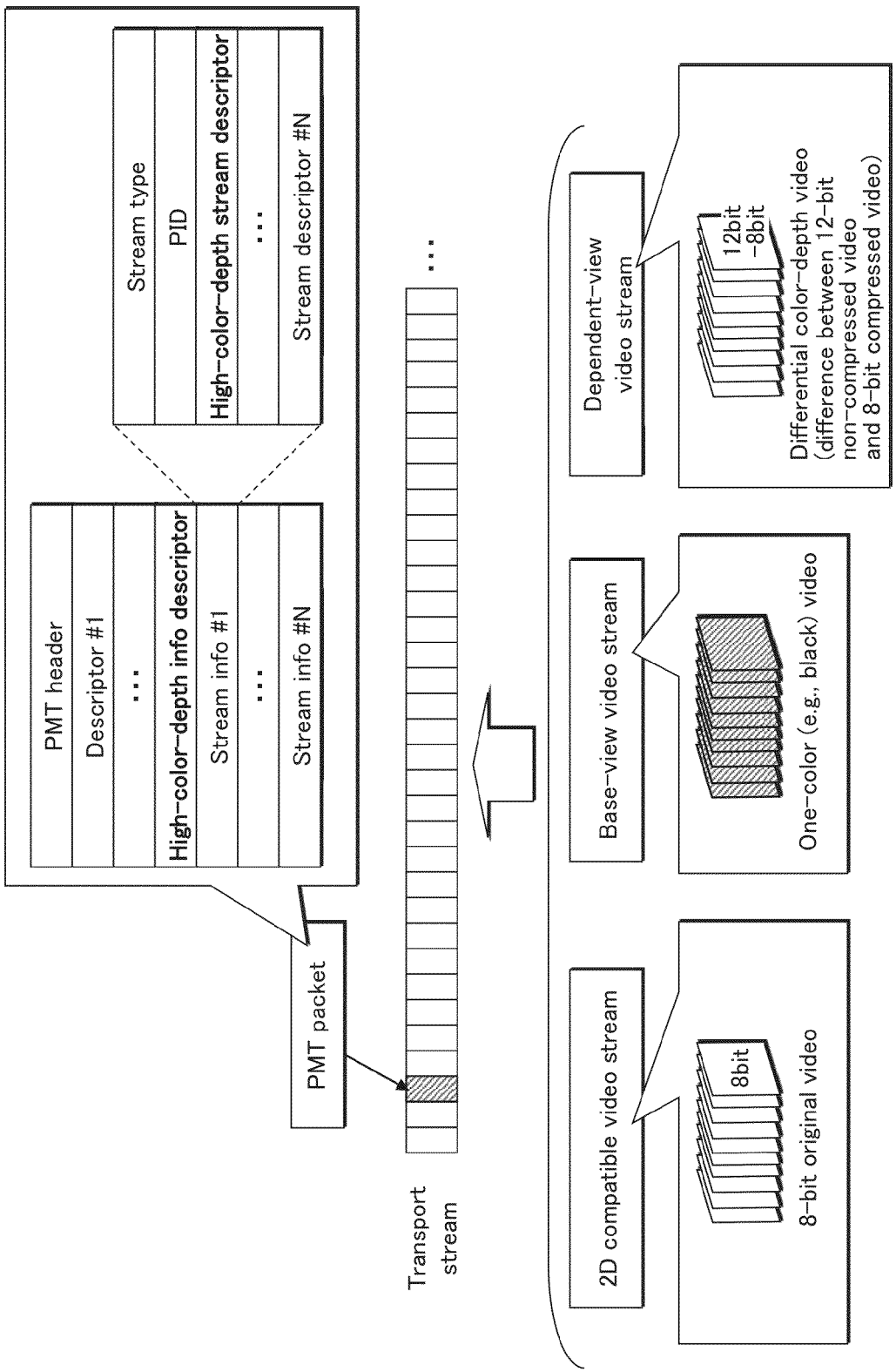
FIG. 63 illustrates the relation between the structure of the transport stream and the PMT packets in Embodiment 3.

FIG. 63 illustrates the PMT packets contained in the transport stream.

In the transport stream for transmission of high-color-depth video, signaling information to be used in decoding of the high-color-depth video is included in the system packet such as the PMT packet. The signaling information includes a high-color-depth information descriptor and a high-color-depth stream descriptor. The high-color-depth information descriptor is used to signal the relation between video streams and the start and end of a high-color-depth video playback. The high-color-depth stream descriptor is set for each video stream.

The high-color-depth information descriptor and the high-color-depth stream descriptor are explained by replacing "high-definition" with "high-color-depth" in the explanation of the high-definition information descriptor and the high-definition stream descriptor that has been made with reference to FIGS. 50, 51 and 53, and further description thereof is omitted.

Note that the high-color-depth descriptor may include a field storing the size of the color depth of high-color-depth video in the dependent-view video stream. With this structure, when a stream is generated, values may be set in advance for each of the 10-bit, 12-bit, 14-bit, and 16-bit colors such that the high-color-depth playback device side can change the structure of the compositing processing unit by referencing the values set in the field.

Note that the explanation of PTS, DTS and GOP, the explanation having been made with reference to FIGS. 23 to 25 and the supplementary explanation thereof are also applied to the present embodiment.

<3-2-4. Use Form of Streams>

Figure 64:
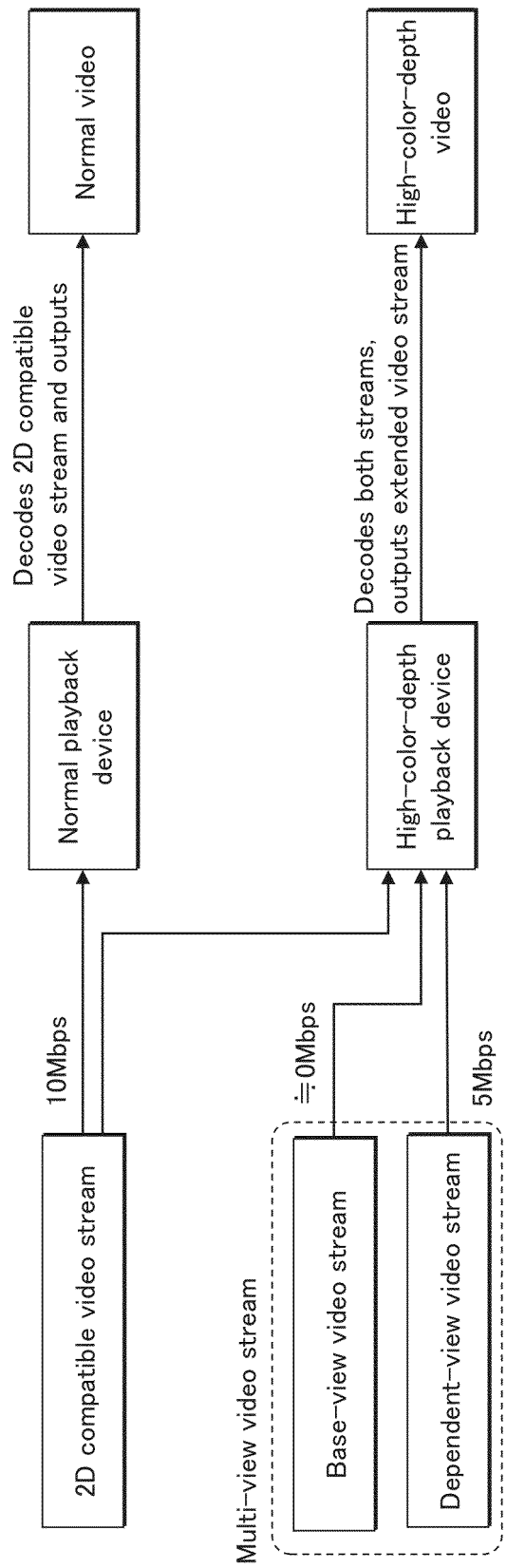
FIG. 64 illustrates a use form according to Embodiment 3.

The following describes the use form of the streams with reference to FIG. 64.

In FIG. 64, the normal playback device is a device that can play back only the 2D compatible video stream. The normal playback device can play back streams having a bit rate of up to 10 Mbps. The normal playback device is assumed to be of a type that has already become popular in the market and plays back streams that are distributed via broadcast waves or the like. On the other hand, the high-color-depth playback device decodes both the 2D compatible video stream and the multi-view video stream. Suppose here that a transport stream having the structure explained with reference to FIG. 62 is broadcast while the above two types of playback devices are present.

The normal playback device plays back the normal 2D video by decoding the 2D compatible video stream in the transport stream. On the other hand, the high-color-depth playback device is the playback device of the present embodiment, and decodes both the 2D compatible video stream and the multi-view video stream. When decoding the dependent-view video stream in the multi-view video stream, the high-color-depth playback device replaces decoded pictures of the base-view video stream with decoded pictures having the same values of presentation time of the 2D compatible video stream, as illustrated in the lower portion of FIG. 61. The high-color-depth playback device then decodes pictures of the dependent-view video stream by referencing the decoded pictures having the same values of presentation time of the 2D compatible video stream, which are the pictures after the replacement. The decoded pictures of the dependent-view video stream are obtained by adding a difference between pictures of the high-color-depth video and pictures of the 2D compatible video stream to the pictures of the 2D compatible video stream. That is to say, the decoded pictures of the dependent-view video stream are the pictures of the high-color-depth video. Thus outputting the dependent-view video stream in this way allows for playback of video images with higher color depth than the results of decoding the 2D compatible video stream.

With the above structure, when the dependent-view video stream is decoded, information such as PTS included in the base-view video stream is referenced, but the pictures themselves are not. This makes it possible to greatly reduce the bit rate by compress-encoding video having high compression rate such as video composed of black images.

As described above, by performing the inter-view reference between streams that have been compress-encoded by different codecs, it is possible to broadcast an extended video stream for high-color-depth video at a low bit rate (5 Mbps in the example illustrated in FIG. 64), while maintaining the playback compatibility with the normal playback device that has already become popular in the market such that the playback device side can decode and play back the video stream.

<3-3. Data Creation Device>

The following describes the data creation device of the present embodiment.

<3-3-1. Structure>

Figure 65:
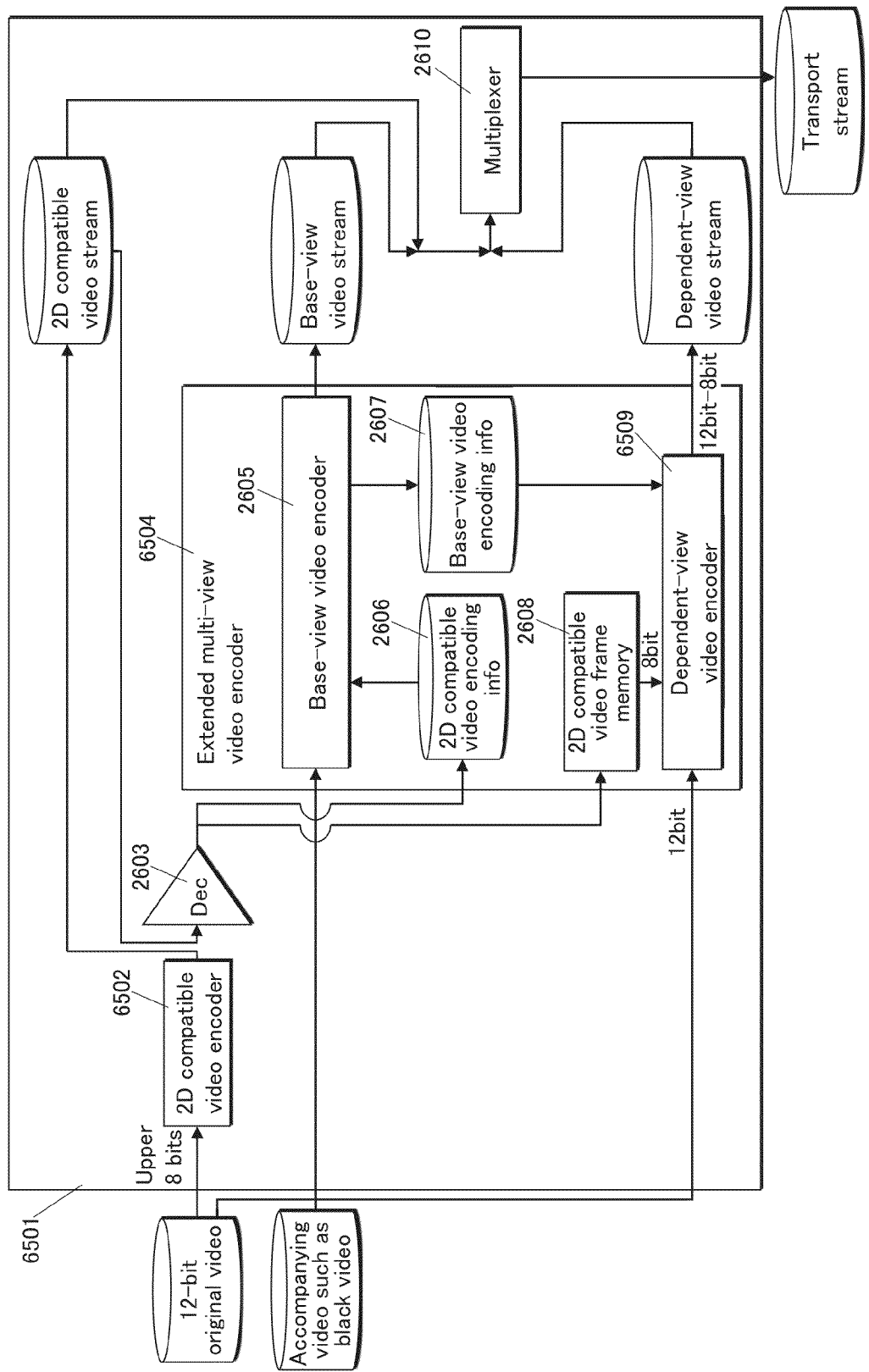
FIG. 65 illustrates the structure of the data creation device in Embodiment 3.

FIG. 65 illustrates the structure of a data creation device 6501 as a video encoding device of the present embodiment.

The data creation device 6501 has basically the same structure as the data creation device 2601 of Embodiment 1 illustrated in FIG. 26. However, since they receive different input data, in FIG. 65, "original left-eye video" and "original right-eye video" in FIG. 26 have been replaced with 2D high-color-depth "12-bit original video". The following description centers on the differences from the data creation device 2601 of Embodiment 1.

In the data creation device 6501, a 2D compatible video encoder 6502, and a dependent-view video encoder 6509 in an extended multi-view video encoder 6504 differ in structure from the counterparts of the data creation device 2601.

The 2D compatible video encoder 6502 inputs upper eight bits of each 12-bit original video image, and compress-encodes the input in accordance with a 2D compatible video codec. When the codec is for MPEG-2 video, the 2D compatible video encoder 6502 compress-encodes the input video in the MPEG-2 video stream format and outputs a 2D compatible video stream.

The dependent-view video encoder 6509 encodes input of a 12-bit original video, not one half of videos (original left-eye and right-eye videos) constituting 3D video. The video to be compress-encoded here is a differential color-depth video representing the difference between a 12-bit original video and an 8-bit compressed video (a result of decoding the 2D compatible video stream stored in the 2D compatible video frame memory 2608). The differential color-depth video is generated by the procedure illustrated in the upper portion of FIG. 61. In the compression process, the dependent-view video encoder 6509 performs compression by referencing, by the inter-view reference, decoded pictures of the 2D compatible video stream stored in the 2D compatible video frame memory 2608.

<3-3-2. Operation>

Figure 66:
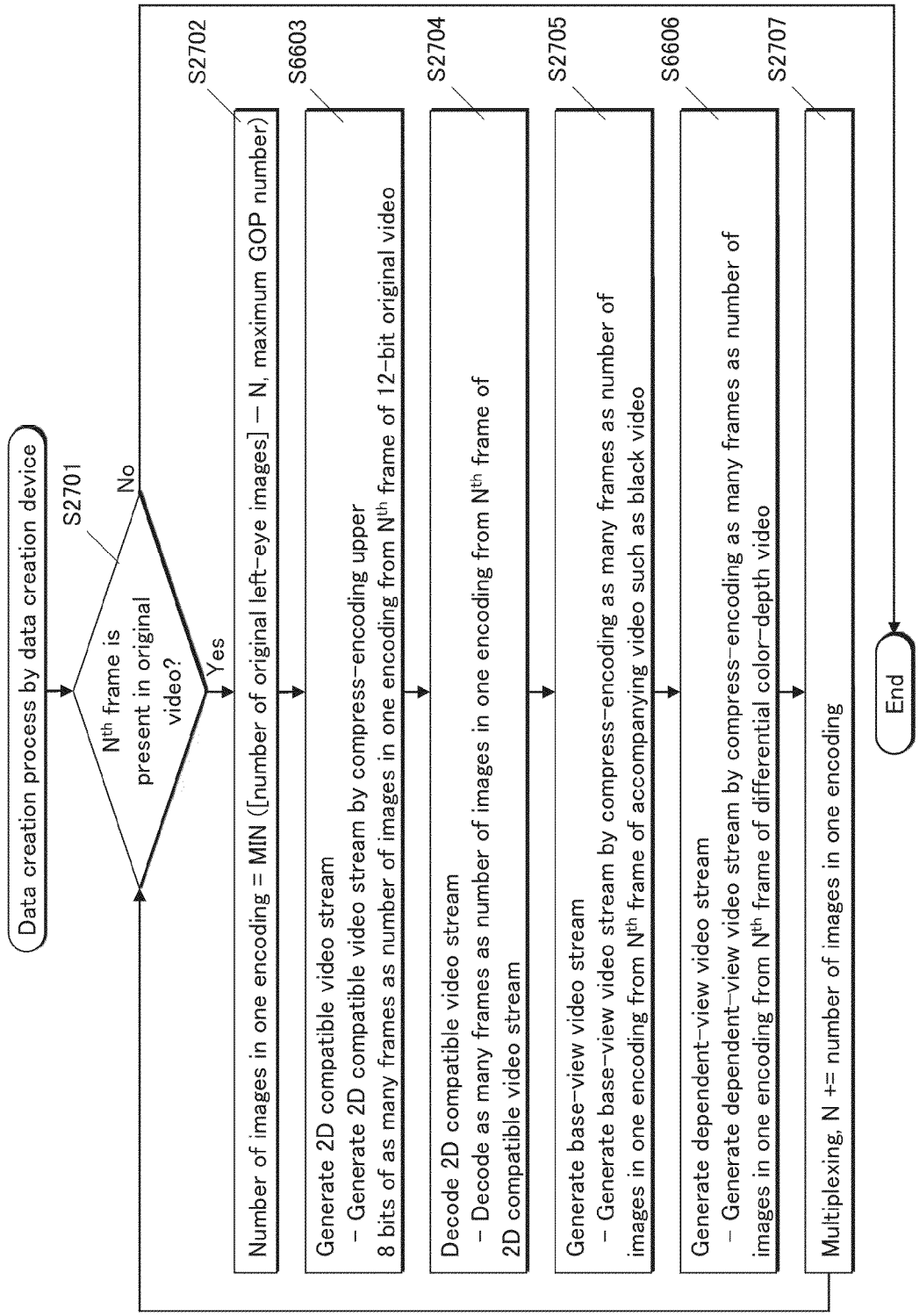
FIG. 66 is a flowchart illustrating the data creation flow by the data creation device in Embodiment 3.

FIG. 66 illustrates the data creation flow of the data creation device 6501.

The data creation flow illustrated in FIG. 66 is approximately the same as the data creation flow of the data creation device 2601 explained in Embodiment 1 with reference to FIG. 27. However, the data creation device 6501 makes high-color-depth video based on 2D video, and in FIG. 66, steps S2703 and S2706 in FIG. 27 have been replaced with steps S6603 and S6606, respectively.

In step S6603, the 2D compatible video encoder 6502 generates as many pictures of a 2D compatible video stream as the number of images in one encoding. More specifically, the 2D compatible video encoder 6502 generates a 2D compatible video stream by compress-encoding the upper eight bits of each of as many frames starting from the Nth frame of the 12-bit original video as the number of images in one encoding, by the codec for the 2D compatible video stream, and outputs the generated 2D compatible video stream. The control then proceeds to step S2704.

In step S6606, the dependent-view video encoder 6509 generates as many pictures of the dependent-view video stream as the number of images in one encoding. More specifically, the video attributes, picture structure and the like are determined based on the base-view video encoding information, and the dependent-view video encoder 6509 generates the dependent-view video stream by compress-encoding each of as many frames starting from the Nth frame of the differential color-depth video as the number of images in one encoding, by referencing pictures stored in the 2D compatible video frame memory 2608 by the inter-view reference, wherein the differential color-depth video represents the difference between the 12-bit original video and the 8-bit compressed video (the results of decoding the 2D compatible video stream stored in the 2D compatible video frame memory 2608). The control then proceeds to step S2707.

<3-4. Playback Device>

The following describes a playback device as a video playback device for playing back the high-color-depth video in the present embodiment.

<3-4-1. Structure>

Figure 67:
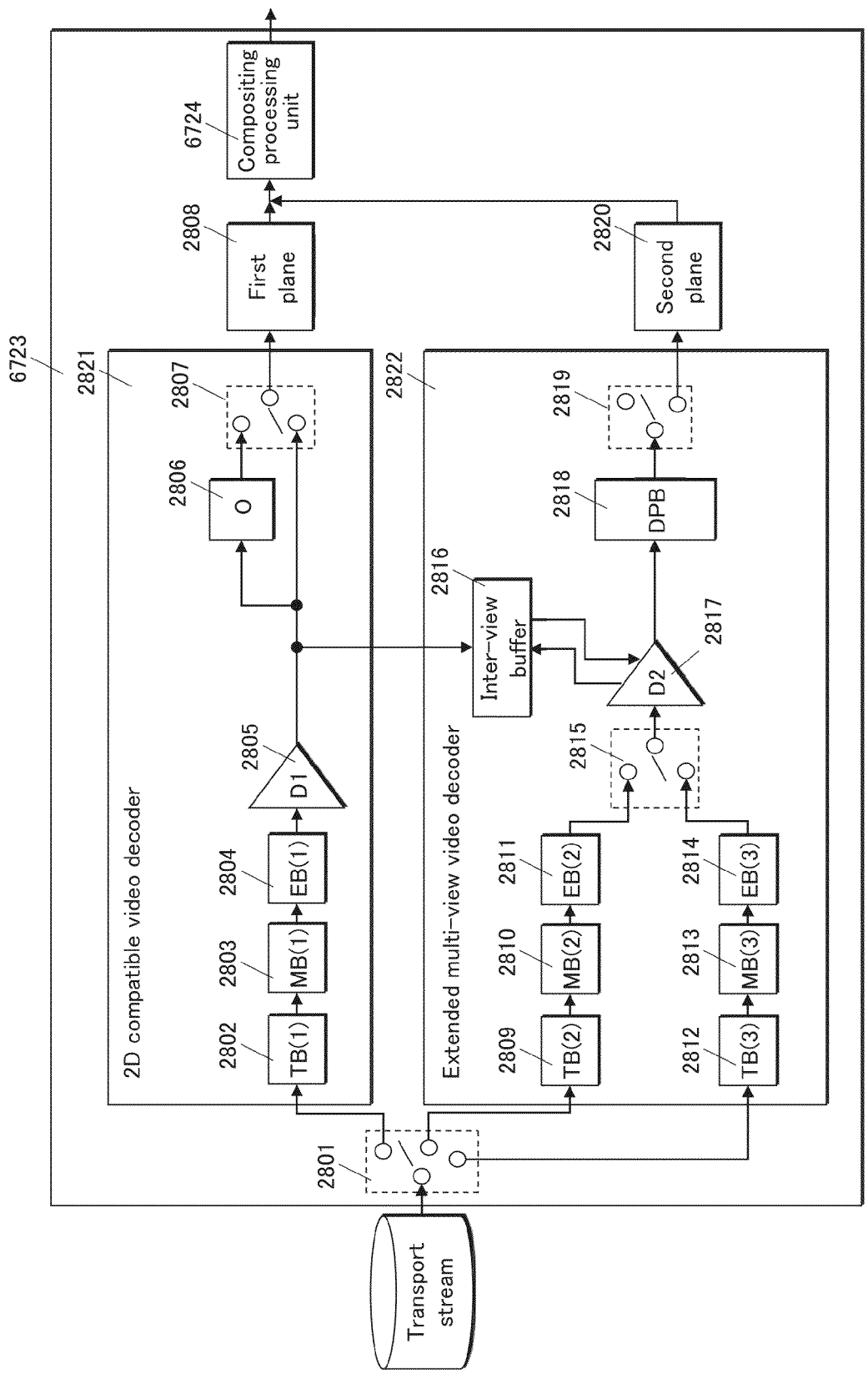
FIG. 67 illustrates the playback device for playing back high-color-depth video in Embodiment 3.

FIG. 67 illustrates the structure of a playback device 6723 according to the present embodiment.

The playback device 6723 has basically the same structure as the 3D video playback device 2823 of Embodiment 1 illustrated in FIG. 28. However, the playback device 6723 has a function to make high-color-depth video based on 2D video, and the structure illustrated in FIG. 67 additionally includes a compositing processing unit 6724 that composites a plane output from the 2D compatible video decoder with a plane output from the extended multi-view video decoder, compared with FIG. 28.

The compositing processing unit 6724 performs a compositing process of compositing the first plane with the second plane. The compositing process is performed in accordance with the procedure illustrated in FIG. 61. First, the compositing processing unit 6724 shifts the color value of each pixel in the decoded pictures of the 2D compatible video stream stored in the first plane 2808, upwards by four bits. Next, the compositing processing unit 6724 converts the color value of each pixel in the decoded pictures of the dependent-view video stream stored in the second plane 2820 into a signed value by subtracting 128 therefrom. The compositing processing unit 6724 then adds these video images and outputs a high-color-depth video.

<3-4-2. Operation>

Figure 68:
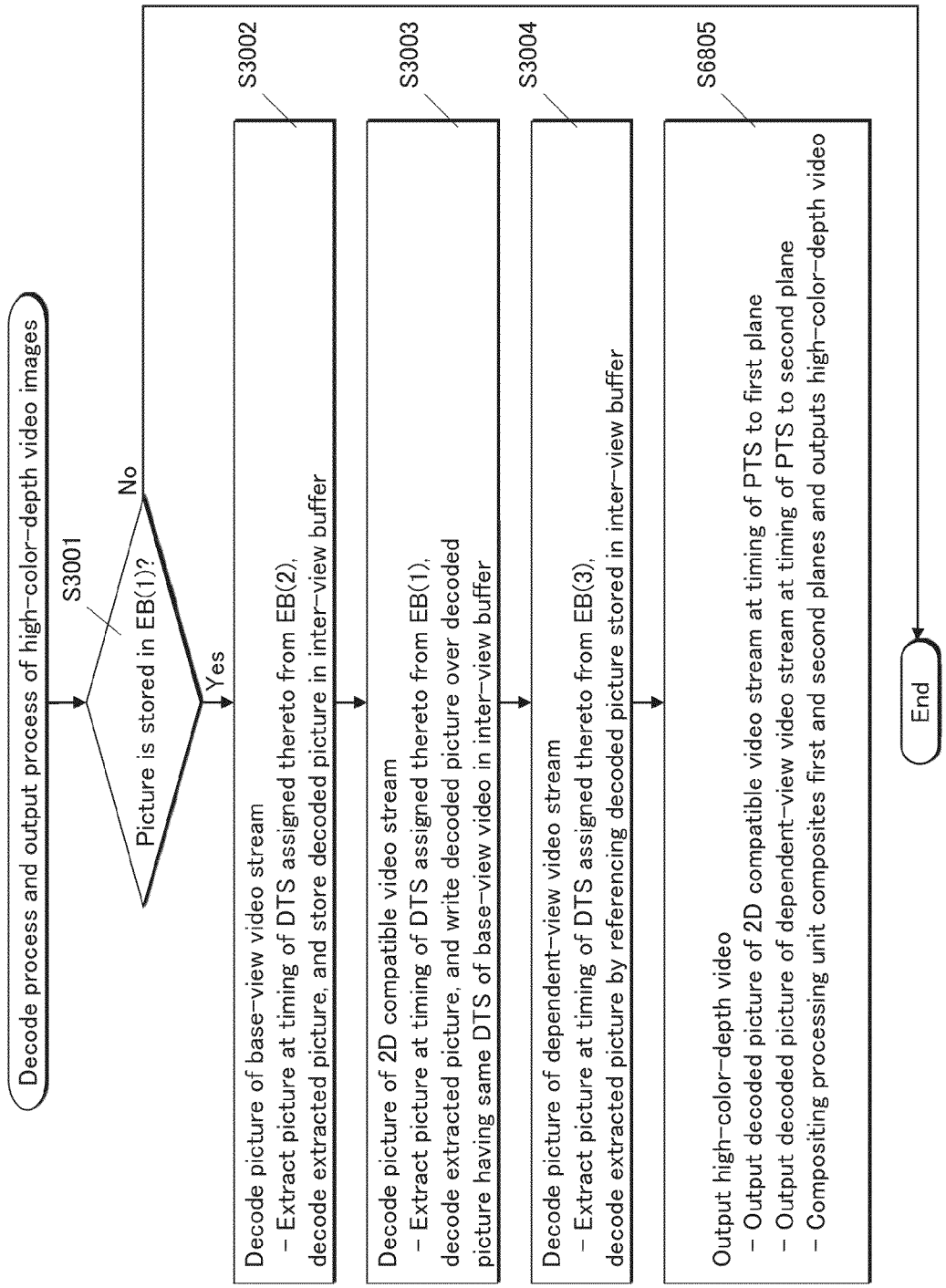
FIG. 68 is a flowchart illustrating the decode process and output process performed by the playback device for playing back high-color-depth video in Embodiment 3.

FIG. 68 is a flowchart illustrating the procedures of the decode process and output process during playback of high-color-depth video by the playback device 6723.

The flowchart illustrated in FIG. 68 is approximately the same as the flowchart explained in Embodiment 1 with reference to FIG. 30. However, in FIG. 68, step S3005 of the output process has been replaced with step S6805.

In step S6805, the playback device 6723 outputs the decoded picture of the 2D compatible video stream at the timing of PTS to the first plane 2808, and outputs the decoded picture of the dependent-view video stream at the timing of PTS to the second plane 2820. The compositing processing unit 6724 performs the compositing process and outputs a high-color-depth video. The method of compositing processing is as described above and is thus omitted here.

<3-5. Supplementary Explanation on Effects>

Figure 60:
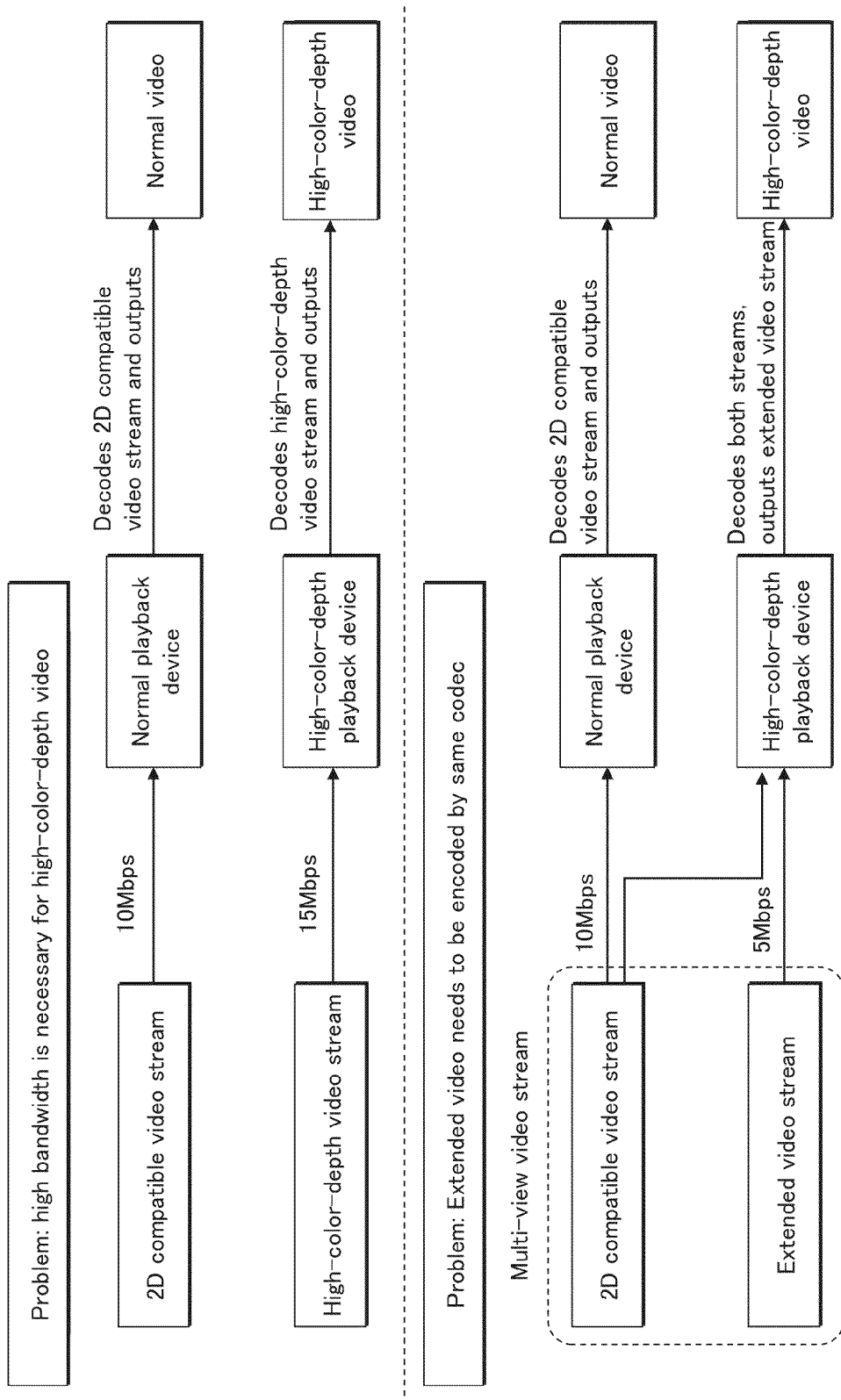
FIG. 60 illustrates the problems in realizing high-color-depth video according to Embodiment 3.

The following describes the effects produced by the present embodiment, with reference to FIG. 60.

First, a description is given with reference to the upper portion of FIG. 60. In FIG. 60, the normal playback device is a device that can play back only the 2D compatible video stream. The normal playback device can play back streams having a bit rate of up to 10 Mbps. The normal playback device is assumed to be of a type that has already become popular in the market and plays back streams that are distributed via broadcast waves or the like. On the other hand, the high-color-depth playback device is a playback device that can play back a high-color-depth video stream storing encoded video that is higher in color depth than the 2D compatible video stream. In the example in the upper portion of FIG. 60, the 2D compatible video stream has a bit rate of 10 Mbps and the high-color-depth video stream, which stores compressed video that is obtained by compressing the same video by the same codec as those for the 2D compatible video stream, has a bit rate of 15 Mbps. To enable the high-color-depth playback device to decode and output a high-color-depth video stream, while maintaining the compatibility with a normal playback device by allowing for the normal playback device to decode and output the 2D compatible video stream, it is necessary to broadcast data in which both the 2D compatible video stream and the high-color-depth video stream are multiplexed, and thus a transfer bandwidth including at least a sum of bit rates of both video streams and higher than the conventional one is required. In the case of the upper portion of FIG. 60, it is necessary to transfer the 2D compatible video stream and the high-color-depth video stream at the same time at a bit rate of 25 Mbps in which 10 Mbps is for the 2D compatible video stream and 15 Mbps is for the high-color-depth video stream.

The lower portion of FIG. 60 illustrates an example case where a multi-view encoding method is adopted to reduce the required transfer bandwidth and solve the above problem of the upper portion of FIG. 60. In FIG. 60, the 2D compatible video stream represents an 8-bit color video and has been encoded as the base-view video stream. Also, the extended video stream is a dependent-view video stream that is obtained by compress-encoding a differential video representing a difference between the 2D compatible video stream and an original high-color-depth video (for example, a 12-bit color video). The dependent-view video stream is compress-encoded by referencing pictures of the base-view video stream.

However, the structure illustrated in the lower portion of FIG. 60 has a restriction that the extended video stream and the 2D compatible video stream need to be encoded by the same video codec. Accordingly, both video streams need to be compressed in a multi-view video encoding format such as the MPEG-4 MVC format.

If both video streams are compressed in this way, the compatibility with normal playback devices that have already been popular in the market is lost. In view of this, it is difficult to adopt the structure illustrated in the lower portion of FIG. 60.

On the other hand, as explained earlier, the present embodiment realizes playback of high-color-depth video by a high-color-depth playback device, by realizing the inter-view reference between video streams that have been compress-encoded by different codecs, while maintaining playback compatibility with normal playback devices that have already been popular in the market. Furthermore, the extended video stream is structured to have a low bit rate, reducing the bandwidth that is required for transferring the streams.

<3-6. Modifications of Present Embodiment>

(1) The contents of Embodiment 1 and the modifications are also applied to the present embodiment as long as the contents do not contradict the structure and the like of the present embodiment.

(2) In the present embodiment, a structure for selecting one high-color-depth playback format from among a plurality of high-color-depth playback formats is explained with reference to the description of the high-color-depth playback format field included in the high-color-depth descriptor. The method of switching among a plurality of high-color-depth playback formats may be implemented easily by adopting the following structure.

Figure 69:
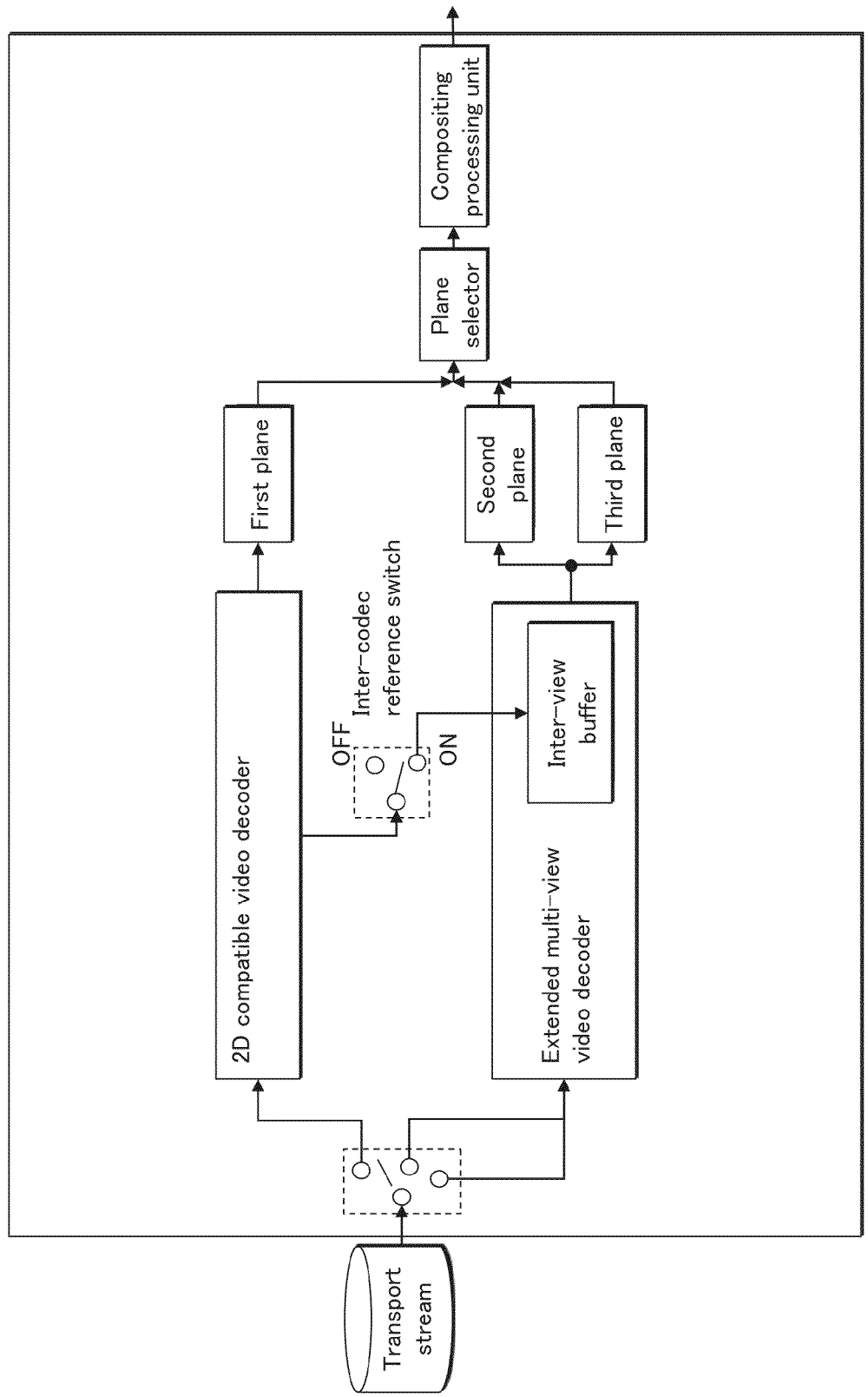
FIG. 69 illustrates a switching method according to a high-color-depth playback format in the playback device for playing back the high-color-depth video in Embodiment 3.

FIG. 69 is a block diagram illustrating the structure of a playback device in the present modification.

A playback device illustrated in FIG. 69 has basically the same structure as the playback device illustrated in FIG. 67, but differs in that it additionally includes an inter-codec reference switch and a plane selector and that the compositing processing unit is added with a switch function to control ON and OFF of a function.

When the inter-codec reference switch is set ON, it connects the 2D compatible video decoder to the inter-view reference buffer in the extended multi-view video decoder, allowing for data to be transferred from the 2D compatible video decoder to the inter-view reference buffer in the extended multi-view video decoder, as explained in step S3003. On the other hand, when the inter-codec reference switch is set OFF, it does not connect the 2D compatible video decoder with the inter-view reference buffer in the extended multi-view video decoder, not allowing for data to be transferred therethrough.

The plane selector selects which of the following planes to output to the compositing processing unit: the first plane, to which the 2D compatible video decoder outputs picture data; the second plane, to which the extended multi-view video decoder outputs pictures of the base-view video stream; and the third plane, to which the extended multi-view video decoder outputs pictures of the dependent-view video stream. By changing the setting in the "inter-codec reference switch" and "plane selector" in accordance with the high-color-depth information descriptor, the playback device can easily change the playback mode.

Figure 70:
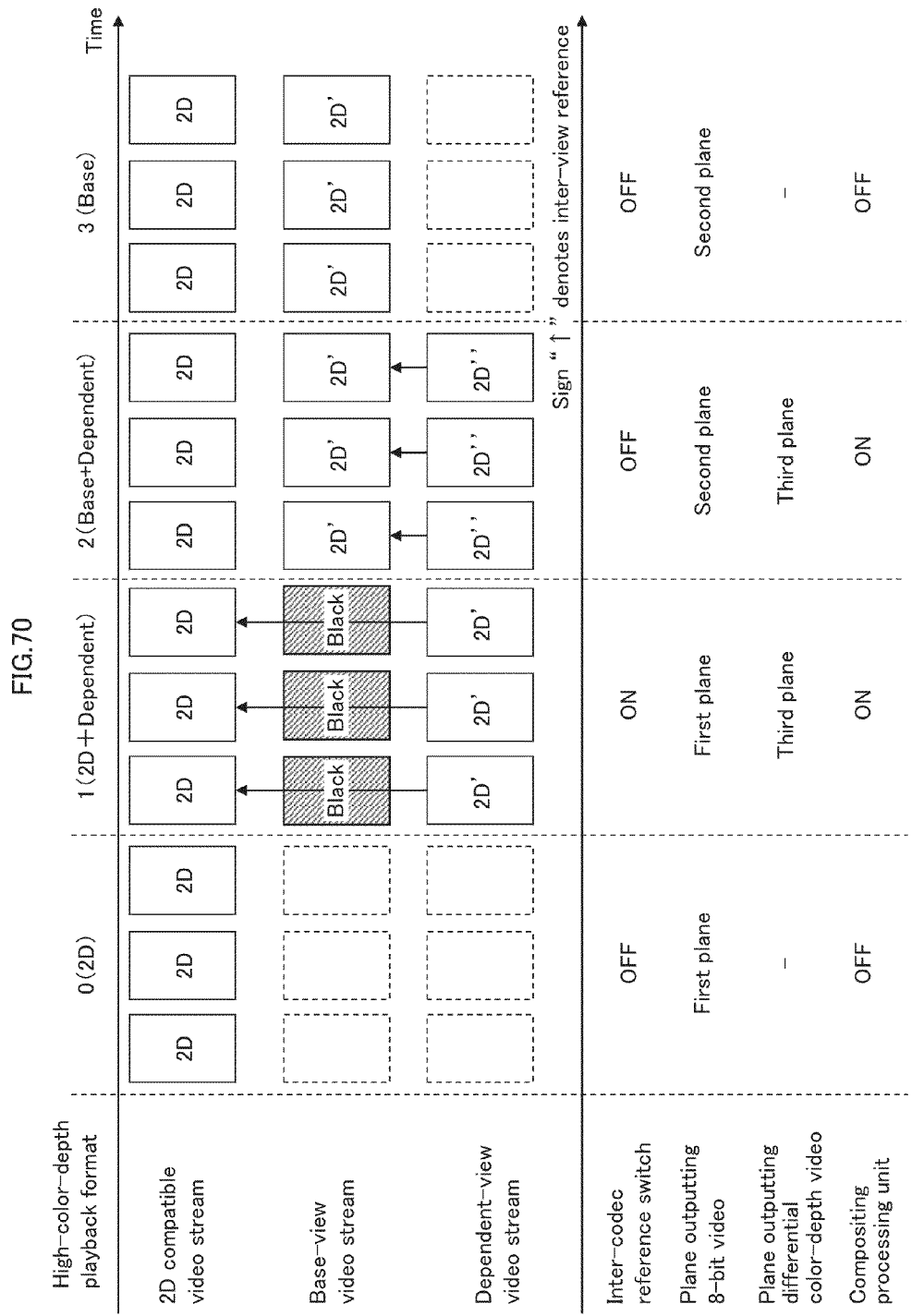
FIG. 70 illustrates the relation among the high-color-depth playback format, inter-codec reference switch, and plane selector.

FIG. 70 illustrates the signaling in a high-color-depth playback format.

The lower portion of FIG. 70 illustrates switching between ON and OFF by the inter-codec reference switch, and settings in the plane selector and the switch in the compositing processing unit in the high-color-depth playback device, when the 2D compatible video stream, base-view video stream, and dependent-view video stream are received in accordance with the setting in the high-color-depth playback format.

When the high-color-depth playback format is set to "0", the high-color-depth playback device switches OFF the inter-codec reference switch, causes the plane selector to select the first plane for outputting 8-bit video, and switches OFF the function of the compositing processing unit.

When the high-color-depth playback format is set to "1", the high-color-depth playback device switches ON the inter-codec reference switch, causes the plane selector to select the first plane for outputting 8-bit video and the third plane for outputting differential color-depth video, and switches ON the function of the compositing processing unit. When the high-color-depth playback format is set to "2", the high-color-depth playback device switches OFF the inter-codec reference switch, causes the plane selector to select the second plane for outputting 8-bit video and the third plane for outputting differential color-depth video, and switches ON the function of the compositing processing unit. When the high-color-depth playback format is set to "3", the high-color-depth playback device switches OFF the inter-codec reference switch, causes the plane selector to select the second plane for outputting 8-bit video, and switches OFF the function of the compositing processing unit. In this way, by changing only the inter-codec reference switch, plane selector, and the switch in the compositing processing unit, it is possible to change the playback format in the playback device easily.

(3) In the present embodiment, 12-bit video is used as one example of the high-color-depth video. However, not limited to this, the high-color-depth video may be any video as far as it has a color depth that is higher than the normal color depth. Furthermore, the effective amount of bits in the high-color-depth original video may be set to be variable. For example, in 12-bit original video, the effective amount of bits may be changed by scene, so that for example a certain scene has 10 effective bits, whereas another scene has 12 effective bits. In this case, in the compositing process illustrated in FIG. 61, the bit shift amount of the 2D compatible video stream may be made variable, and a bit shift may be applied to the extended video stream to extract the effective color-depth portion.

For example, when 10 bits among 12 bits are effective, each video image may be shifted upwards by two bits, in place of by four bits in 6101 of FIG. 61. Subsequently, the 12-bit original video is converted into 10-bit video by shifting each video image downwards by two bits, and a differencial video between the two 10-bit videos is created (6102). The decoding side performs 2-bit shift instead of 4-bit upward shift in 6104. Each video image of the extended video stream is shifted downwards by two bits, and then is added with each decoded picture of the 2D compatible video stream (6106). In this case, in FIG. 61, 512 is added instead of 128 in the addition process 6103, and 512 is subtracted instead of 128 in the addition process 6105.

(4) In the present embodiment, the base-view video stream is generated by compress-encoding one-color (e.g., black) images. However, not limited to this, the base-view video stream may be generated by compress-encoding a differential video for making the 2D compatible video stream high-definition (for example, differences between upper eight bits of the 12-bit original video and the 2D compatible video stream).

The method of generating and compositing such differential video is described in FIG. 89.

Figure 90:
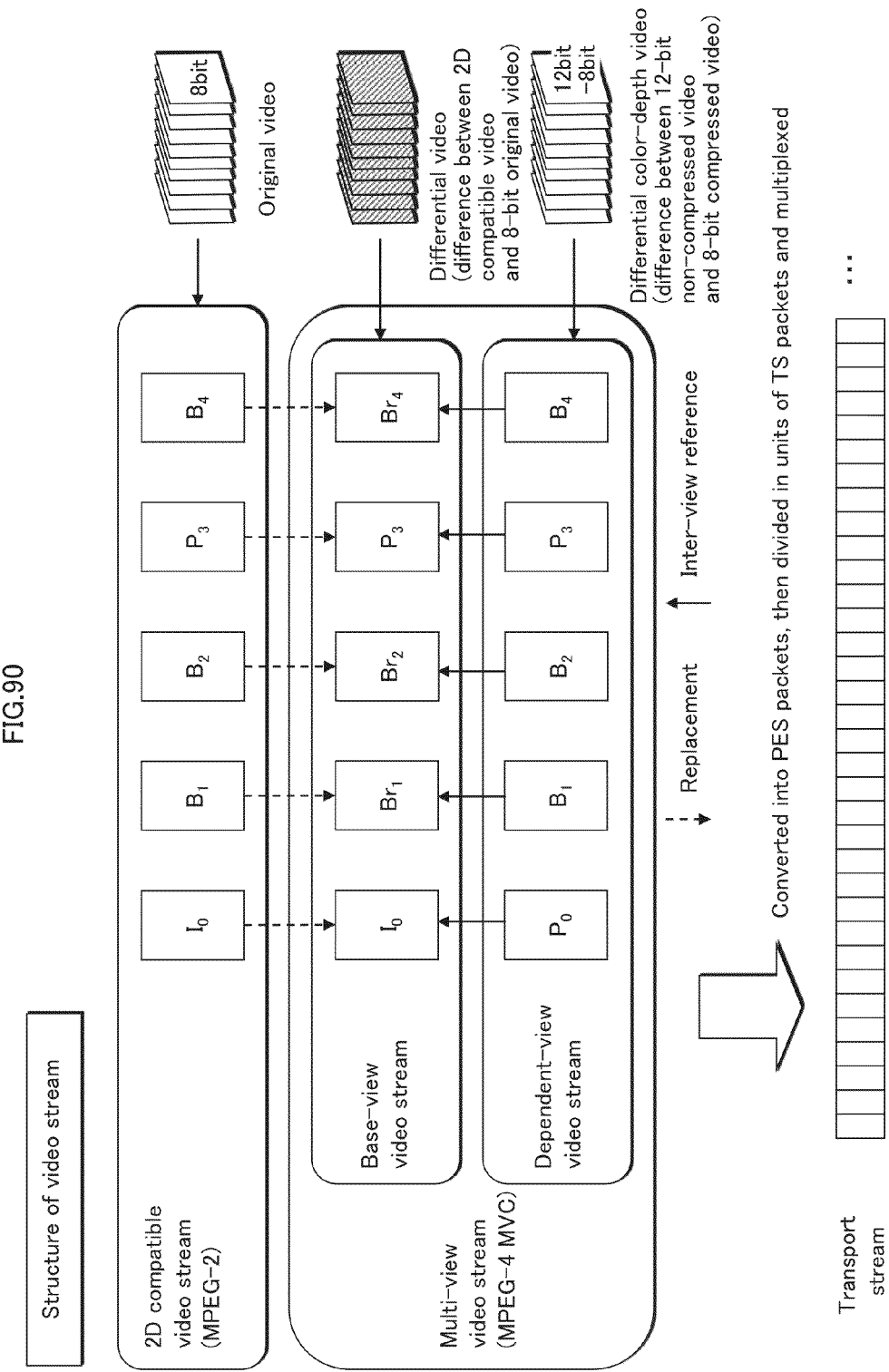
FIG. 90 illustrates the data structure in a modification of Embodiment 3.

FIG. 90 illustrates the structure of video streams in the present modification. More specifically, on the data creation device side, the base-view video encoder may generate the base-view video stream by compress-encoding a differential video between an 8-bit original video and the 2D compatible video stream. Furthermore, the dependent-view video encoder may compress-encode pictures by referencing pictures of a high-definition 2D video that is generated by compositing decoded pictures of the 2D compatible video stream with the differential video.

In the playback device side, the base-view video decoder transfers the decoded pictures to the 2D compatible video decoder. The 2D compatible video decoder composites the pictures obtained by decoding the 2D compatible video with the pictures decoded by the base-view video decoder. The dependent-view video decoder decodes the dependent-view video stream by referencing the pictures obtained by the compositing process. This structure provides higher definition to the high-color-depth video described in Embodiment 3.

4. Embodiment 4

<4-1 Summary>

In Embodiment 1, the multi-view video stream for 3D video is structured to have a low bit rate by realizing the inter-view reference between video streams that have been compress-encoded by different codecs, while being structured to have playback compatibility with the conventional 2D video. In the present embodiment, the conventional 2D video has improved resolution (is made high-resolution) as one example of high-grade video and the high-definition 2D video is transmitted via the multi-view video stream structured to have a low bit rate by realizing the inter-view reference between video streams that have been compress-encoded by different codecs, while being structured to have playback compatibility with the conventional 2D video. One example of making high-resolution video is the case where a 2D video, which conforms to Full HD and has a resolution of 1920×1080, is converted into a high-resolution video that has a resolution of 4K2K (3840×2160).

The basic structure of the data structure, data creation device, data creation method, playback device, and playback method of the present embodiment is the same as in Embodiment 1, and the following description centers on the differences from Embodiment 1. The terms used in Embodiment 1 are also used in the present embodiment, unless it is explicitely stated otherwise.

The following describes an overview of the procedures for encoding and decoding for making high-resolution video.

Figure 72:
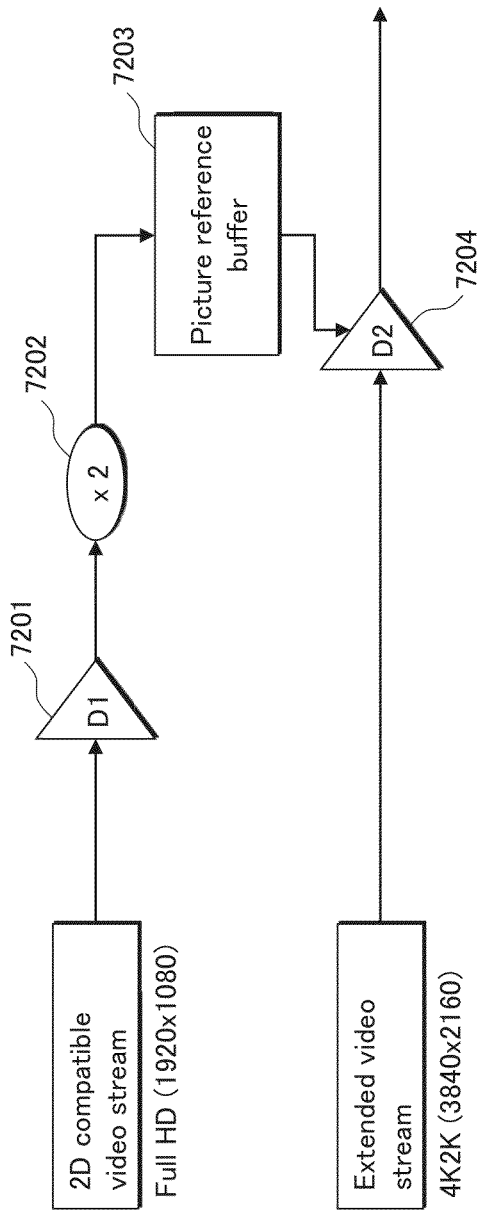
FIG. 72 illustrates the structure of the scalable encoding format.

FIG. 72 illustrates an overview of the procedures for encoding for making high-resolution video.

The 2D compatible video stream is decoded by D1 7201, up-converted to twice the height and width by the ×2 7202, and stored in the picture reference buffer 7203.

The extended video stream is decoded by D2 7204 by referencing scaled (up-converted) pictures stored in the picture reference buffer 7203. In this case, the 2D compatible video stream is encoded as the base video images. The 2D compatible video stream stores compress-encoded Full HD video images. The extended video stream stores compress-encoded 4K2K high-resolution video images. The extended video stream is compress-encoded by referencing pictures of a video that has been scaled to high resolution from the decoded 2D compatible video stream (from Full HD to 4K2K). As described above, by referencing pictures of the 2D compatible video stream, it is possible to lower the bit rate of the extended video stream.

Figure 75:
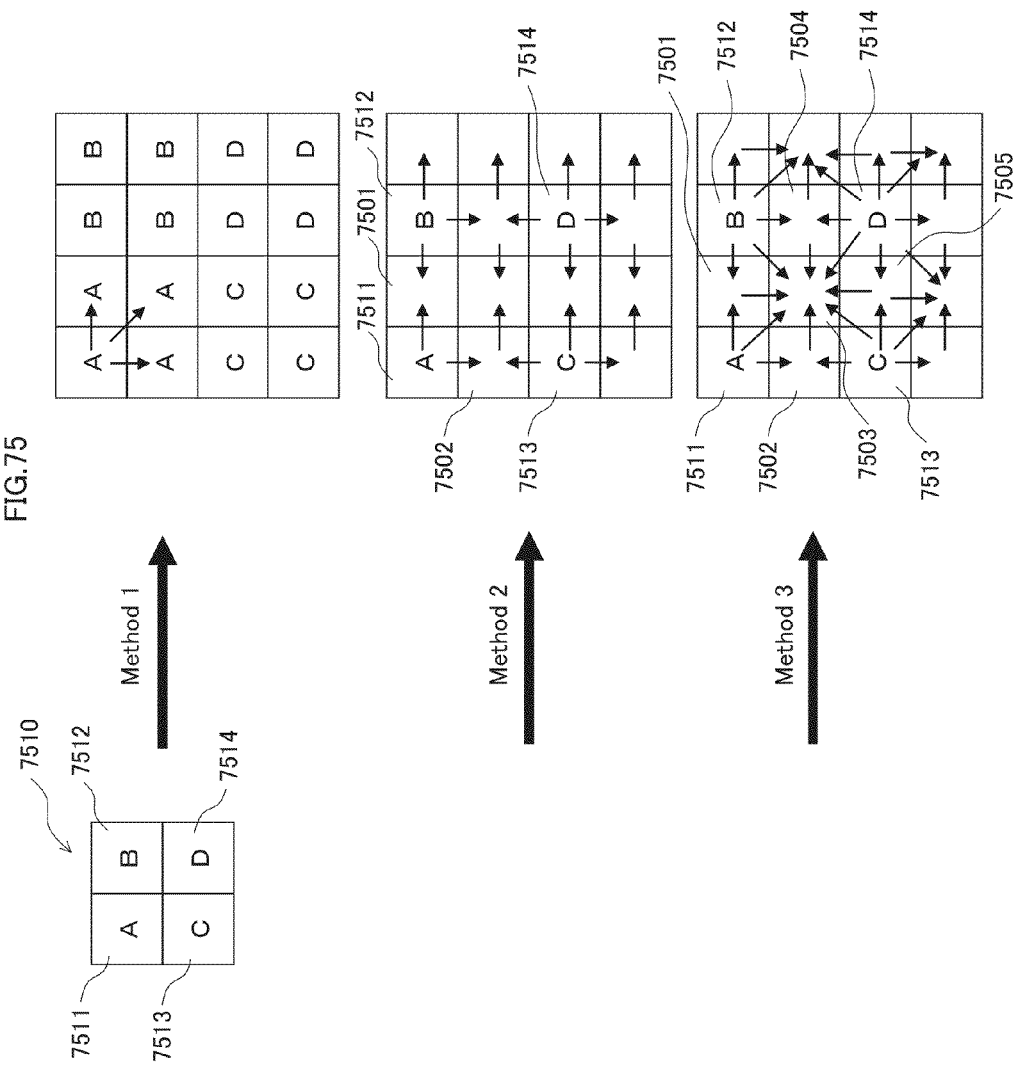
FIG. 75 illustrates the scaling method.

FIG. 75 illustrates the scaling.

A pixel set 7510 is composed of four pixels 7511 to 7514 arranged in a matrix of two rows and two columns. Here a case of generating a pixel set composed of 16 pixels by doubling the pixel set 7510 vertically and horizontally is considered.

The method 1 is simply to double the two pixels to four pixels vertically and horizontally.

The method 2 is to insert a pixel between two pixels arranged vertically or horizontally, the pixel having an intermediate value of the values of the two pixels. For example, the pixel 7501 becomes an intermediate color between the colors of the pixels 7511 and 7512 arranged horizontally, and a pixel 7502 becomes an intermediate color between the colors of the pixels 7511 and 7513 arranged vertically.

The method 3 is to calculate an intermediate color based on all of the pixels surrounding a pixel horizontally, vertically, and diagonally. For example, a pixel 7503 becomes an intermediate color among the colors of the surrounding pixels 7511, 7501, 7512, 7502, 7504, 7513, 7505, and 7514.

The playback device performs the up-converting by a scaling method selected from a plurality of scaling methods as described above.

<4-2. Data Format>

First, the data structure for encoding high-resolution video in the present embodiment is explained.

<4-2-1. Transport Stream>

Figure 73:
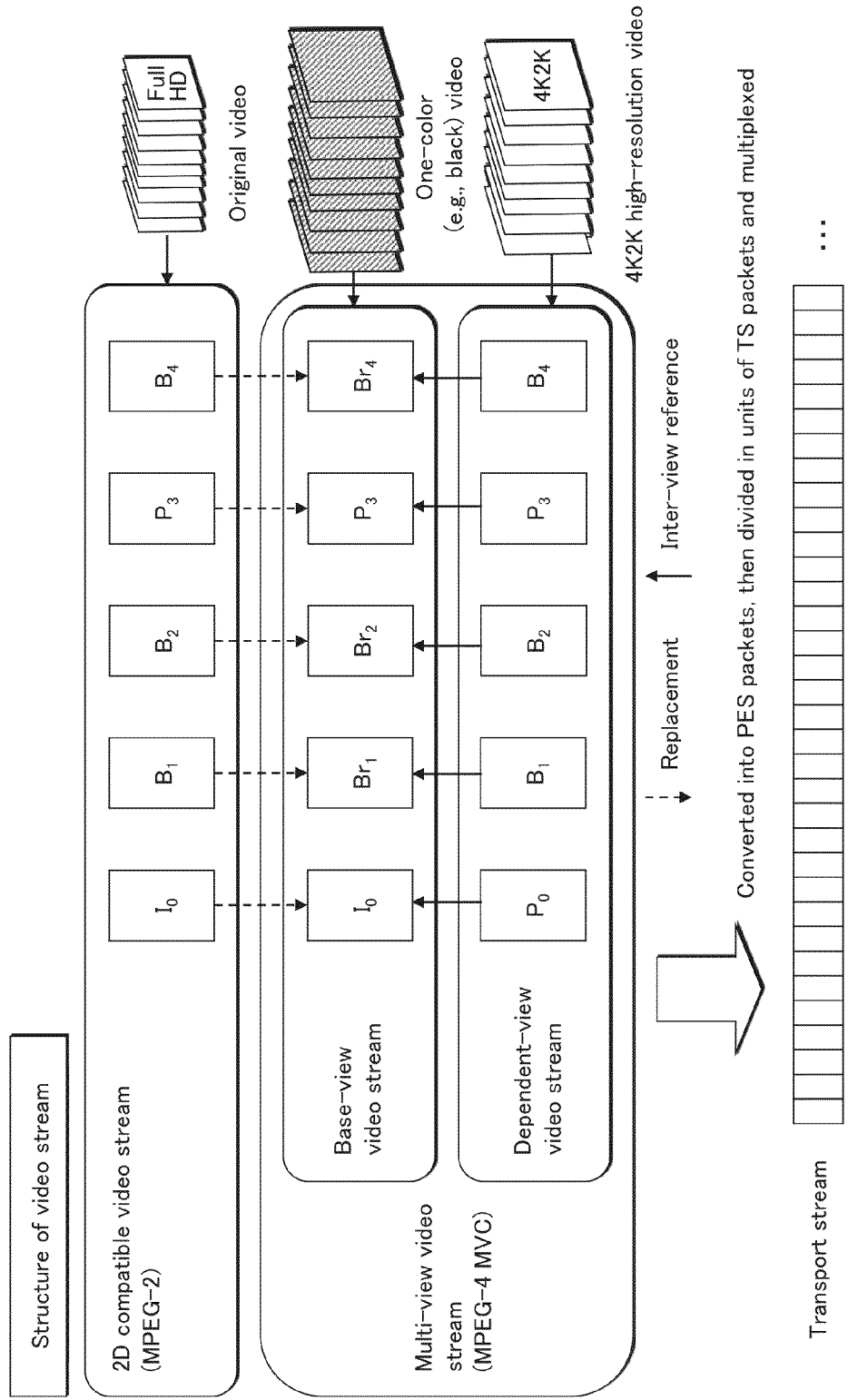
FIG. 73 illustrates the data structure of the transport stream in Embodiment 4.

FIG. 73 illustrates the data included in the transport stream of the present embodiment.

Multiplexed in the transport stream of the present embodiment are a 2D compatible video stream, and a base-view video stream and a dependent-view video stream of a multi-view video stream, after being converted into PES packets and then divided into TS packets for storage.

The 2D compatible video stream is a video stream structured in a format such that it can be played back as 2D video by a playback device dedicated to 2D video, as explained with reference to FIG. 7 and the like. In the present embodiment, the 2D compatible video stream is a video stream encoded by a codec for the MPEG-2 video. The multi-view video stream is, as described above, a video stream encoded by a codec for realizing the inter-view reference. In the present embodiment, the codec is assumed to be MPEG-4 MVC.

The right side of FIG. 73 indicates which video source is compress-encoded into each video stream.

In the 2D compatible video stream, Full HD original video is compress-encoded in accordance with the MPEG-2 video codec.

The base-view video stream is generated by compress-encoding a 4K2K black video at a low bit rate in accordance with the MPEG-4 MVC video codec.

The dependent-view video stream is generated by compress-encoding a high-resolution 4K2K original video in accordance with the MPEG-4 MVC video codec.

Here the dependent-view video stream is compressed by referencing pictures by the inter-view reference. The pictures referenced by the inter-view reference are not the pictures having the same value of presentation time (PTS) of the base-view video stream, but the decoded pictures having the same value of presentation time (PTS) of the 2D compatible video stream. The decoding side replaces the decoded pictures (black images) of the base-view video stream with the decoded pictures (Full HD) having the same values of presentation time of the 2D compatible video stream, and decodes the pictures (4K2K) having the same values of presentation time of the dependent-view video stream by referencing the pictures after the replacement (Full HD).

With this structure, since pictures of the dependent-view video stream are obtained by referencing pictures of a 4K2K video up-scaled from the "decoded pictures of the 2D compatible video stream", the bit rate of the streams as a whole is reduced, and a video that is higher in resolution than the 2D compatible video stream can be provided.

Here, due to the above-described structure where pictures of the dependent-view video stream reference pictures of the 2D compatible video stream, values of the attributes such as "aspect ratio", "frame rate", and "progressive or interlace" are set to be the same among the video streams. The attribute values have already been explained with reference to FIG. 22. Note that "resolution" is excluded from the fields in FIG. 22 in the present embodiment.

<4-2-2. PMT Packet>

Figure 74:
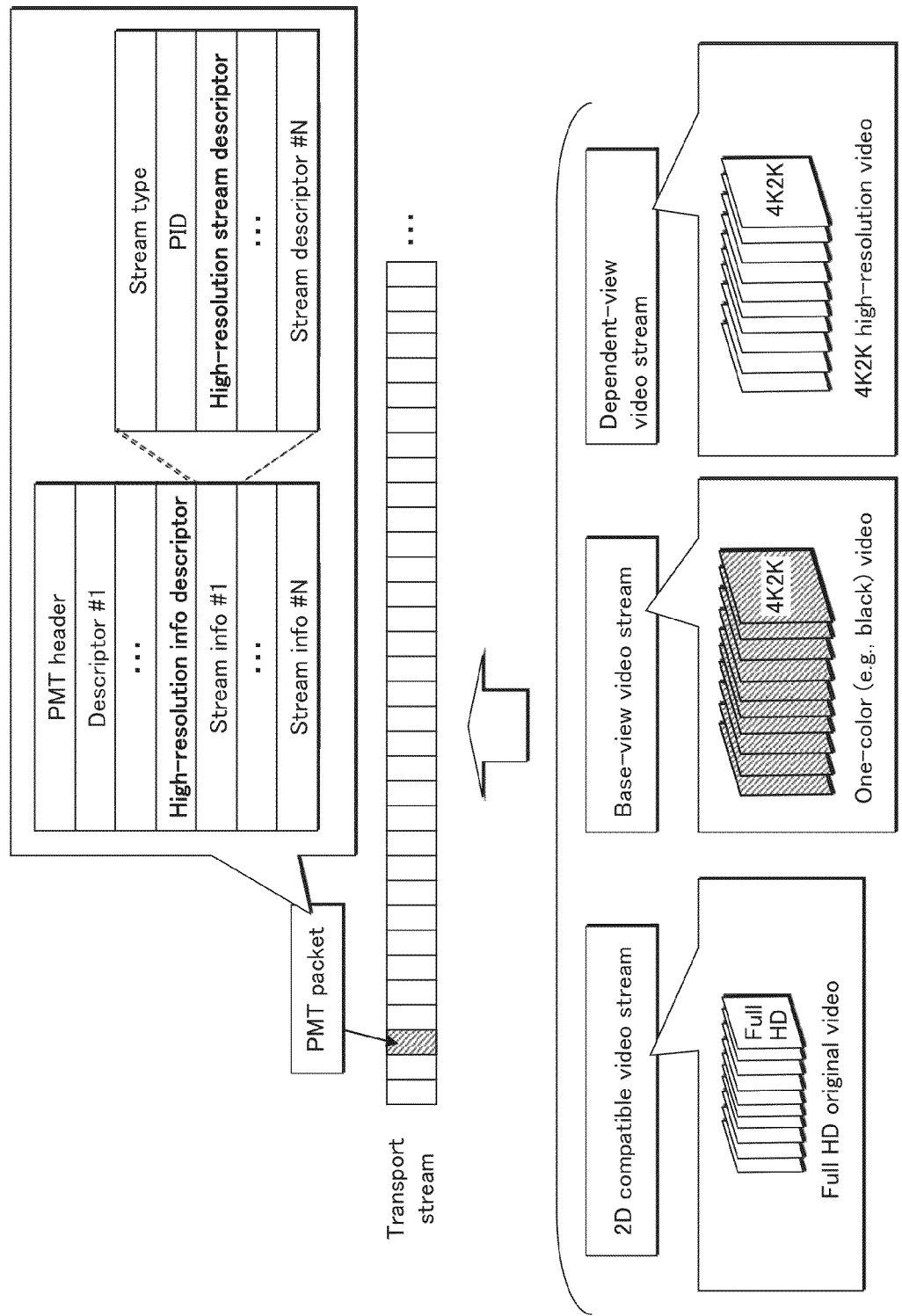
FIG. 74 illustrates the relation between the structure of the transport stream and the PMT packets in Embodiment 4.

FIG. 74 illustrates the PMT packets contained in the transport stream.

In the transport stream for transmission of high-resolution video, signaling information to be used in decoding the high-resolution video is included in the system packet such as the PMT packet. The signaling information includes a high-resolution information descriptor and a high-resolution stream descriptor. The high-resolution information descriptor signals the relationship between video streams, the start and end of playback of high-resolution video under the present format and the like. The high-resolution stream descriptor is set for each video stream.

The high-resolution information descriptor and the high-resolution stream descriptor respectively have almost the same structure as the high-definition information descriptor and the high-definition stream descriptor.

The high-resolution information descriptor and the high-resolution stream descriptor are explained by replacing "high-definition" with "high-resolution" in the explanation of the high-definition information descriptor and the high-definition stream descriptor that has been made with reference to FIGS. 50, 51 and 53, and further description thereof is omitted.

Note that information on the resolution of each stream may be stored in the high-resolution information descriptor. With this structure, the high-resolution playback device can determine the decoding method and scaling method of each stream by referring to the descriptor information.

Note that the scaling method may be set in the high-resolution information descriptor. There are a plurality of scaling methods as described with reference to FIG. 75. Thus information indicating which scaling method is to be selected from among a plurality of scaling methods is stored in the descriptor. With this structure, the high-resolution playback device can determine the decoding method and scaling method of each stream by referring to the descriptor information.

Note that the explanation of PTS, DTS and GOP, the explanation having been made with reference to FIGS. 23 to 25 and the supplementary explanation thereof are also applied to the present embodiment.

<4-2-4. Use Form of Streams>

Figure 76:
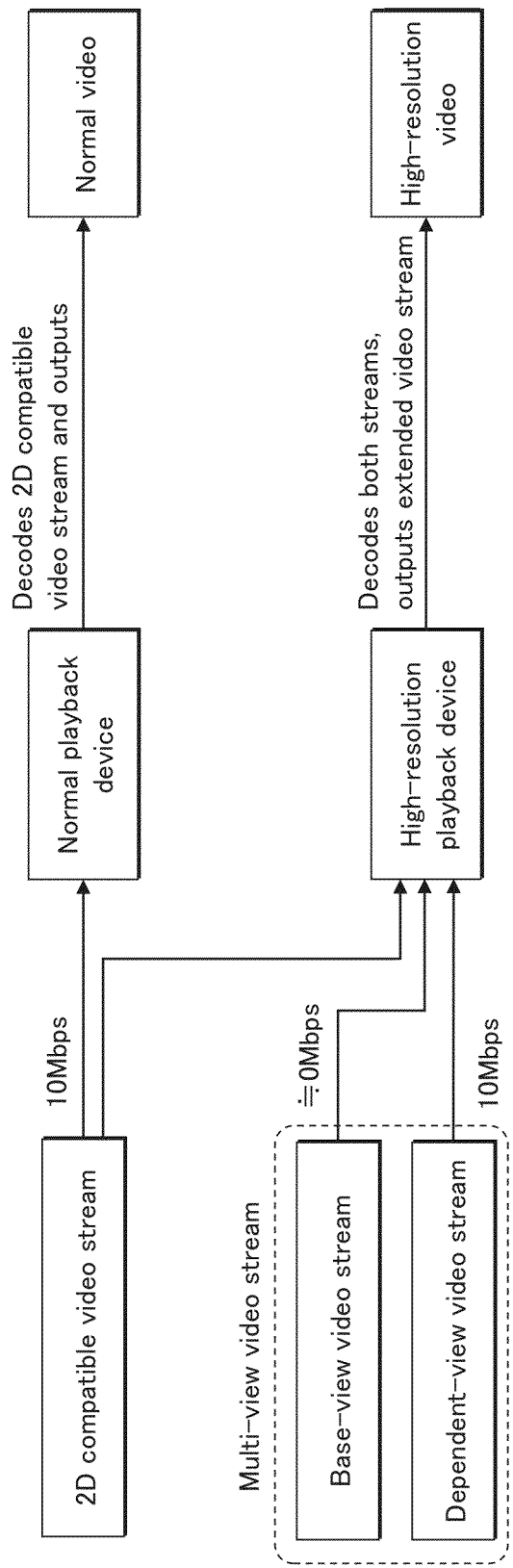
FIG. 76 illustrates a use form according to Embodiment 4.

The following describes the use form of the streams with reference to FIG. 76.

In FIG. 76, the normal playback device is a device that can play back only the 2D compatible video stream. The normal playback device can play back streams having a bit rate of up to 10 Mbps. The normal playback device is assumed to be of a type that has already become popular in the market and plays back streams that are distributed via broadcast waves or the like. On the other hand, the high-resolution playback device has a function to decode both the 2D compatible video stream and the multi-view video stream. Suppose here that a transport stream having the structure explained with reference to FIG. 73 is broadcast while the above two types of playback devices are present.

The normal playback device plays back normal 2D video by decoding and outputting the 2D compatible video stream. On the other hand, the high-resolution playback device decodes both the 2D compatible video stream and the multi-view video stream. The high-resolution playback device replaces decoded pictures of the base-view video stream with pictures obtained by scaling decoded pictures having the same value of presentation time of the 2D compatible video stream, and decodes pictures of the dependent-view video stream by referencing pictures having the same value of presentation time after the replacement.

This makes it possible to play back high-resolution video by decoding the dependent-view video stream. Also, generating the base-view video stream by compress-encoding one-color (e.g., black) images makes it possible to reduce the bit rate greatly.

As described above, by performing the inter-view reference between streams that have been compress-encoded by different codecs, it is possible to broadcast an extended video stream for high-resolution video at a low bit rate (10 Mbps in the example illustrated in FIG. 76), while maintaining the playback compatibility with the normal playback device that has already become popular in the market such that the playback device side can decode and play back the video stream.

<4-3. Data Creation Device>

The following describes the data creation device of the present embodiment.

<4-3-1. Structure>

Figure 77:
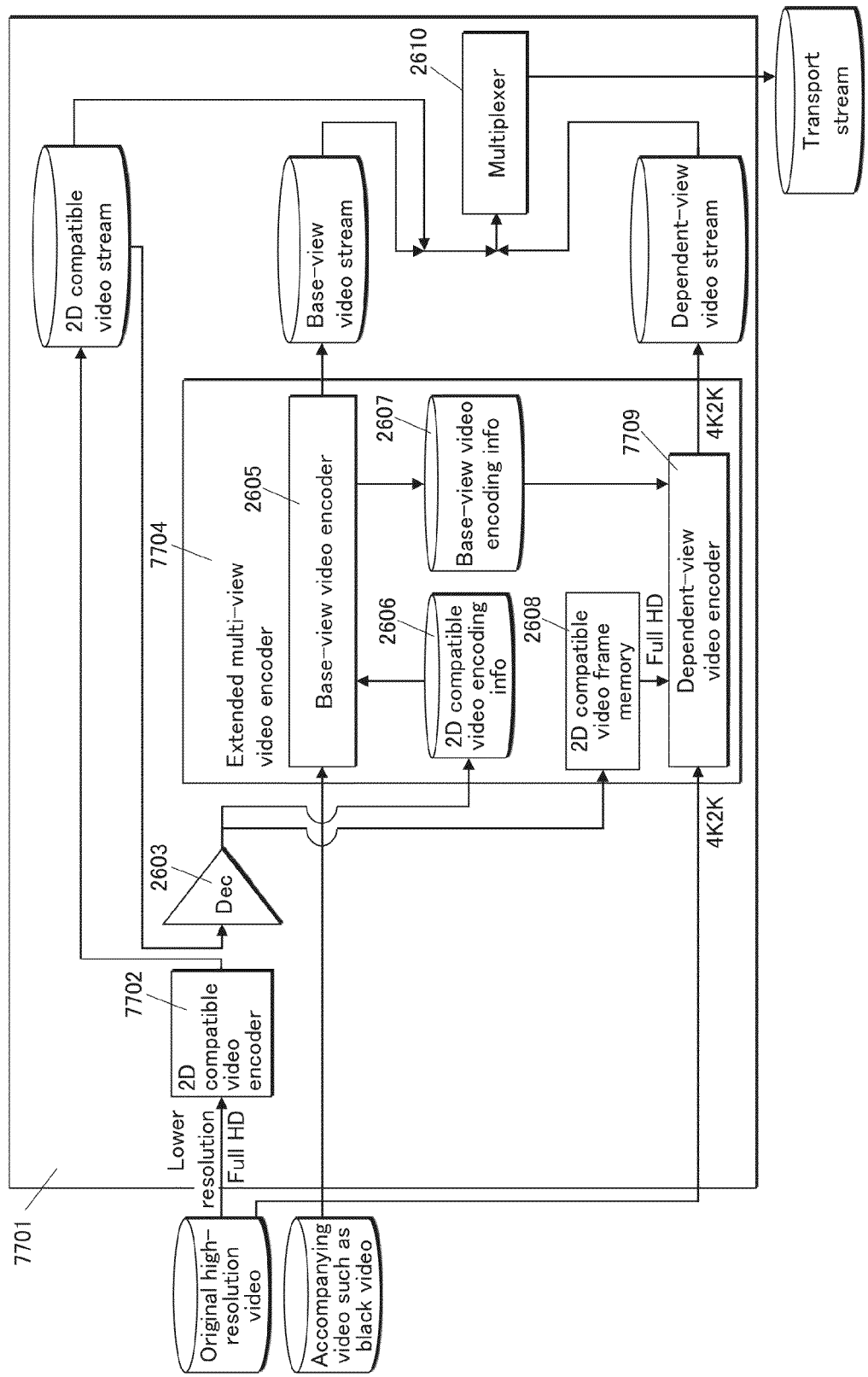
FIG. 77 illustrates the structure of the data creation device in Embodiment 4.

FIG. 77 illustrates the structure of a data creation device 7701 as a video encoding device of the present embodiment.

The data creation device 7701 has basically the same structure as the data creation device 2601 of Embodiment 1 illustrated in FIG. 26. However, since they receive different input data, in FIG. 77, "original left-eye video" and "original right-eye video" in FIG. 26 have been replaced with 2D "original high-resolution video (in this example, the resolution is assumed to be 4K2K)". The following description centers on the differences from the data creation device 2601 of Embodiment 1.

The data creation device 7701 differs from the data creation device 2601 in structure of a 2D compatible video encoder 7702 and a dependent-view video encoder 7709 in an extended multi-view video encoder 7704.

The 2D compatible video encoder 7702 generates a 2D compatible video stream by compress-encoding a video that is obtained by converting an input high-resolution video into low resolution (in this example, Full HD), using a codec for the 2D compatible video. When the codec is for MPEG-2 video, the 2D compatible video encoder 7702 compress-encodes the input video in the MPEG-2 video stream format and outputs a 2D compatible video stream.

The dependent-view video encoder 7709 encodes input of an original high-resolution video, not one half of videos (original left-eye and right-eye videos) constituting 3D video. In the compression process, the dependent-view video encoder 7709 performs compression by referencing, by the inter-view reference, decoded pictures of the 2D compatible video stream stored in the 2D compatible video frame memory 2608.

<4-3-2. Operation>

Figure 78:
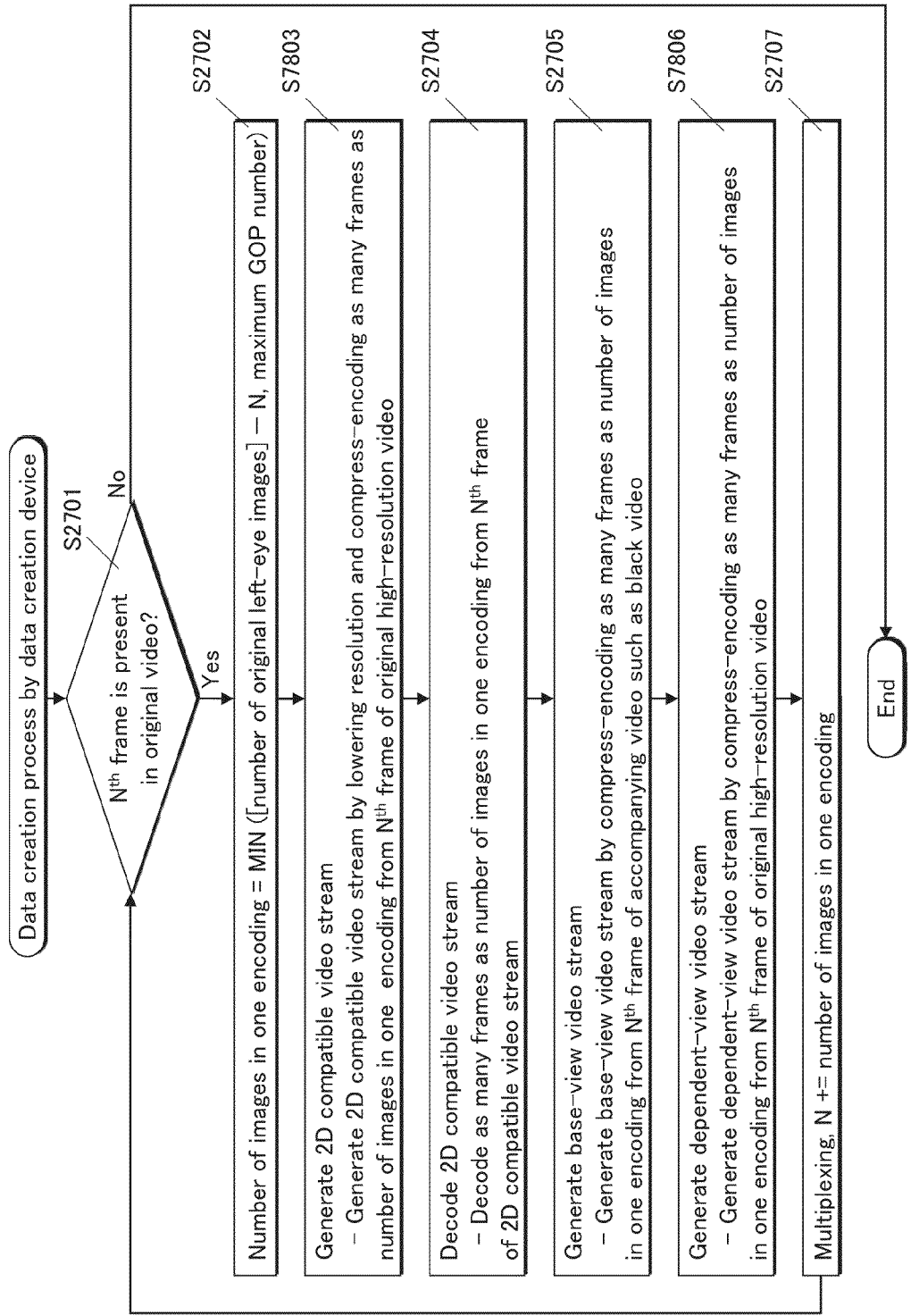
FIG. 78 is a flowchart illustrating the data creation flow by the data creation device in Embodiment 4.

FIG. 78 illustrates the data creation flow of the data creation device 7701.

The data creation flow illustrated in FIG. 78 is approximately the same as the data creation flow of the data creation device 2601 explained in Embodiment 1 with reference to FIG. 27. However, the data creation device 7701 makes high-resolution video based on 2D video, and in FIG. 78, steps S2703 and S2706 in FIG. 27 have been replaced with steps S7803 and S7806, respectively.

In step S7803, the 2D compatible video encoder 7702 generates a portion of the 2D compatible video stream for the number of images in one encoding. More specifically, the 2D compatible video encoder 7702 generates a 2D compatible video stream by lowering resolution (in this example, to Full HD) and compress-encoding as many frames as the number of images in one encoding from the $N^{th}$ frame of the original high-resolution video, and outputs the generated 2D compatible video stream. Processing then proceeds to step S2704.

In step S7806, the dependent-view video encoder 7709 generates a portion of the dependent-view video stream for the number of images in one encoding. More specifically, the video attributes, picture structure and the like are determined based on the base-view video encoding information, and the dependent-view video encoder 7709 generates the dependent-view video stream by compress-encoding as many frames starting from the Nth frame of the input original high-resolution video as the number of images in one encoding, by referencing decoded pictures of the 2D compatible video stream, which is Full HD video (a result of decoding the 2D compatible video stream stored in the 2D compatible video frame memory 2608), by the inter-view reference. Processing then proceeds to step S2707.

<4-4. Playback Device>

The following describes a playback device as a video playback device for playing back the high-resolution video in the present embodiment.

<4-4-1. Structure>

Figure 79:
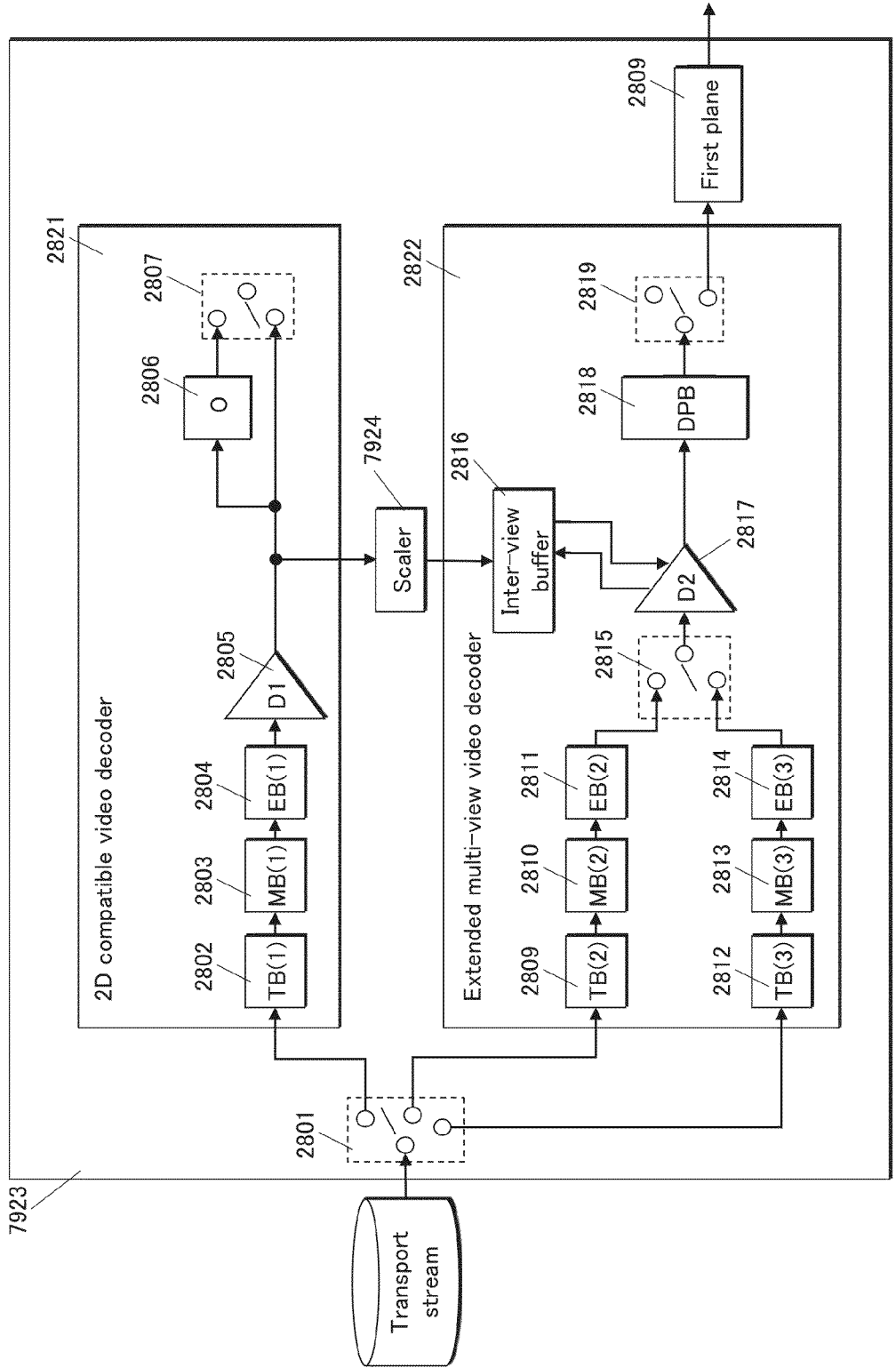
FIG. 79 illustrates the playback device for playing back high-resolution video in Embodiment 4.

FIG. 79 illustrates the structure of a high-resolution playback device 7923 for playing back high-resolution video in the present embodiment.

The high-resolution playback device 7923 has basically the same structure as the 3D video image playback device 2823 of Embodiment 1 illustrated in FIG. 28. However, since the goal of the present embodiment is to provide a high-resolution 2D video, the structure of FIG. 79 does not include a plane output from the 2D compatible video decoder, and a scaler 7924 has been added.

When pictures of the base-view video stream stored in the inter-view reference buffer are replaced, at the timing of DTS, with decoded pictures output from the 2D compatible video decoder, the scaler 7924 scales the decoded pictures output from the 2D compatible video decoder, by a specified scaling method. With this structure, it is possible to decode the dependent-view video stream by referencing pictures that are obtained by scaling the pictures of the 2D compatible video stream.

<4-4-2. Operation>

Figure 80:
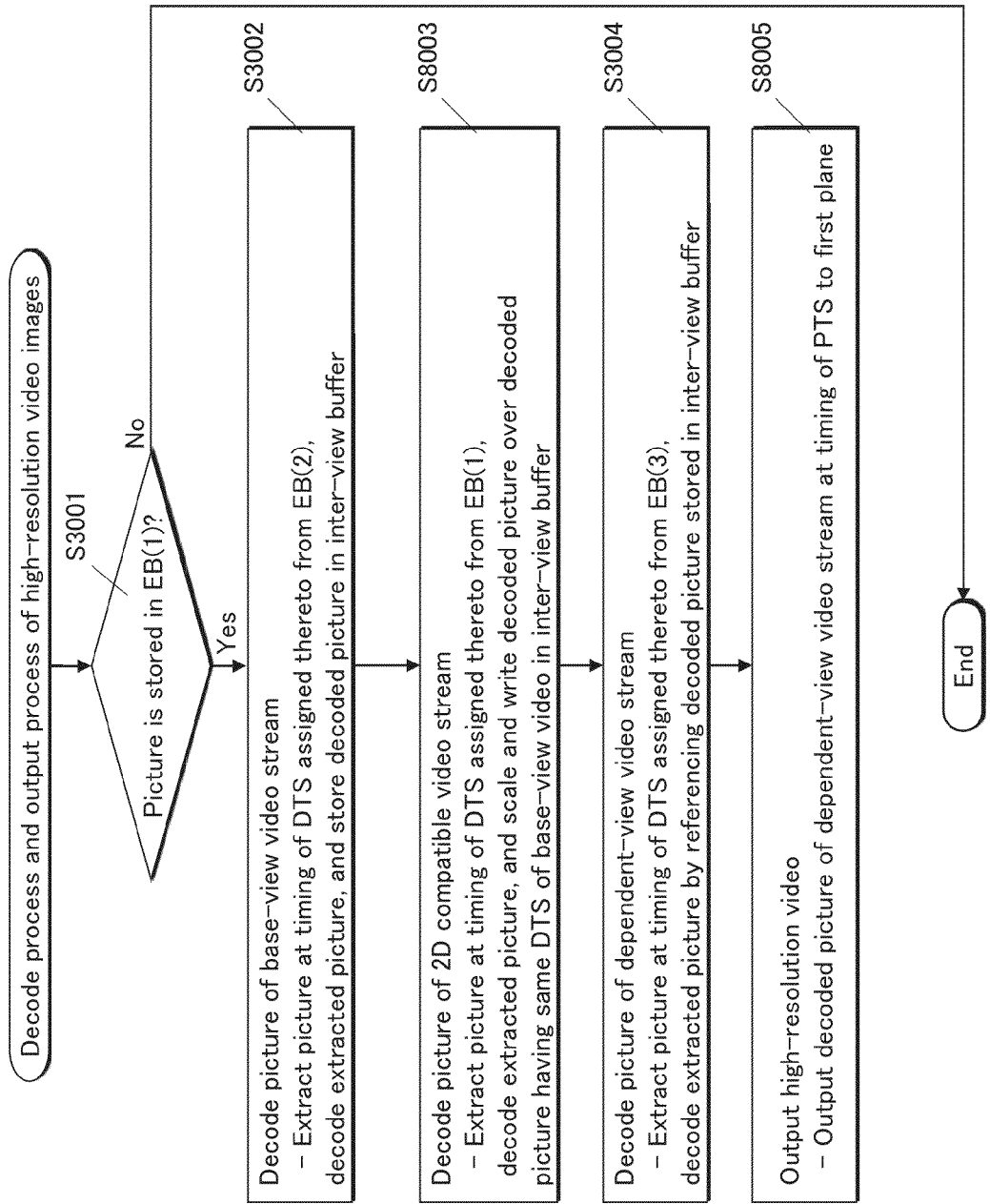
FIG. 80 is a flowchart illustrating the procedures of the decode process and output process during playback of high-resolution video by the playback device in Embodiment 4.

FIG. 80 is a flowchart illustrating the procedures of the decode process and output process during playback of high-resolution video by the playback device 7923.

The flowchart of the decode process and output process illustrated in FIG. 80 is approximately the same as the flowchart explained in Embodiment 1 with reference to FIG. 30. However, in FIG. 80, steps S3003 and S3005 illustrated in FIG. 30 have been replaced with steps S8003 and S8005, respectively.

In step S8003, the playback device 7923 causes the scaler 7924 to scale the decoded pictures of the 2D compatible video stream, and outputs the scaled data to the inter-view reference buffer 2816.

In step S8005, the playback device 7923 outputs the decoded pictures of the dependent-view video stream to the first plane 2809 at the timing of PTS.

<4-5. Supplementary Explanation on Effects>

Figure 71:
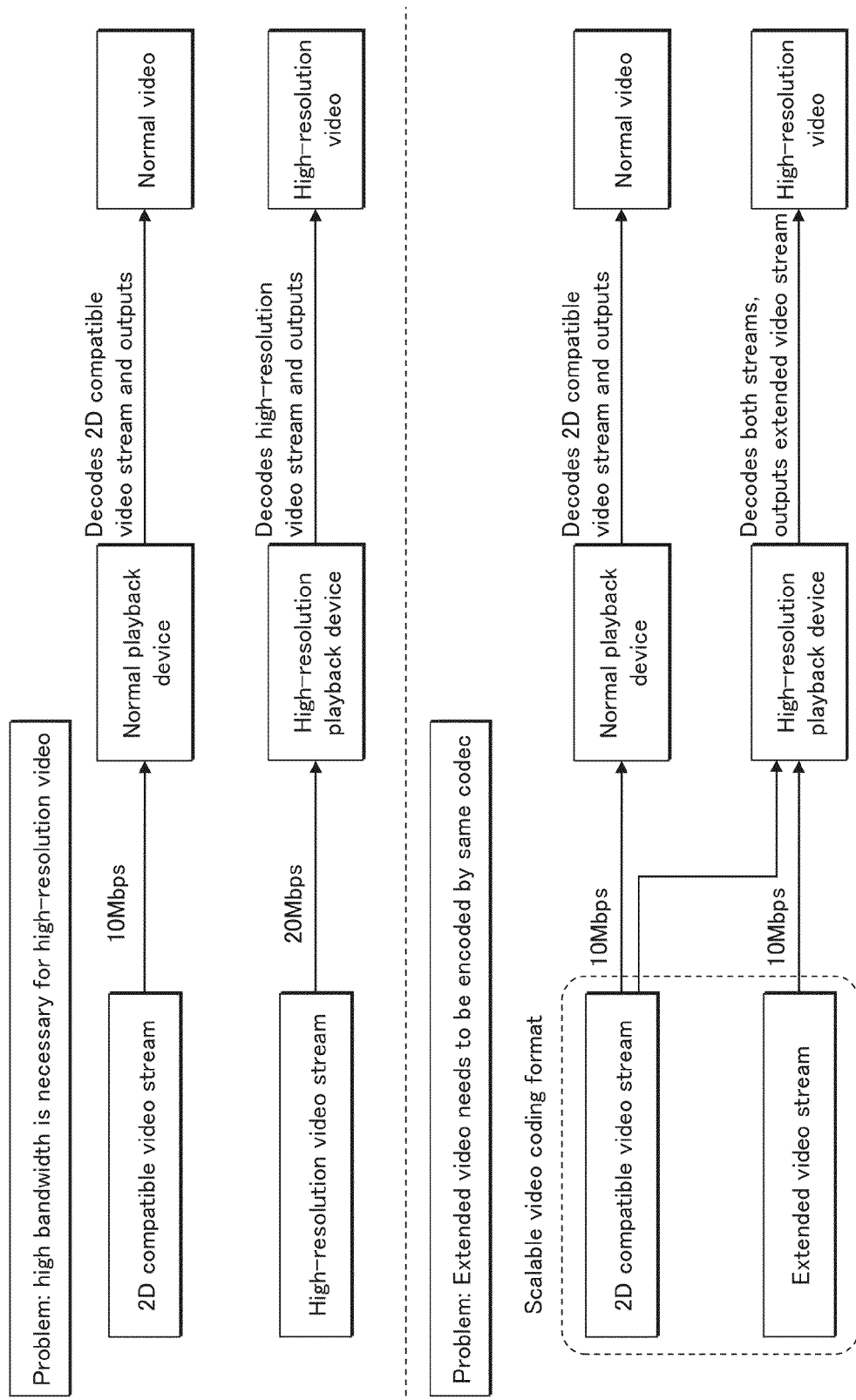
FIG. 71 illustrates the problems in realizing high-resolution video according to Embodiment 4.

The following describes the effects produced by the present embodiment, with reference to FIG. 71.

First, a description is given with reference to the upper portion of FIG. 71. In FIG. 71, the normal playback device is a device that can play back only the 2D compatible video stream. The normal playback device can play back streams having a bit rate of up to 10 Mbps. The normal playback device is assumed to be of a type that has already become popular in the market and plays back streams that are distributed via broadcast waves or the like.

On the other hand, the high-resolution playback device is a playback device that can play back a high-resolution video stream storing encoded video that is higher in resolution than the 2D compatible video stream. In the following, it is assumed as one example that the normal video has Full HD resolution (1920×1080), and the high-resolution video has 4K2K resolution (3820×2160). In the example in the upper portion of FIG. 71, the 2D compatible video stream has a bit rate of 10 Mbps and the high-color-depth video stream, which stores compressed video that is obtained by compressing the same video by the same codec as those for the 2D compatible video stream, has a bit rate of 20 Mbps.

To enable the high-resolution playback device to decode a high-resolution video stream, while maintaining the compatibility with a normal playback device by allowing for the normal playback device to decode and output the 2D compatible video stream, it is necessary to broadcast data in which both the 2D compatible video stream and the high-resolution video stream are multiplexed, and thus a transfer bandwidth including at least a sum of bit rates of both video streams and higher than the conventional one is required. In the case of the upper portion of FIG. 71, it is necessary to transfer the 2D compatible video stream and the high-resolution video stream at the same time at a bit rate of 30 Mbps in which 10 Mbps is for the 2D compatible video stream and 20 Mbps is for the high-resolution video stream.

On the other hand, the lower portion of FIG. 71 illustrates a case where a scalable video encoding format is used to solve the above problem and reduce the required transfer bandwidth. The scalable video encoding format is a format for scaling low-resolution base video to create reference pictures and then decoding a high-resolution extended video.

However, the structure illustrated in the lower portion of FIG. 71 has a restriction that the extended video stream and the 2D compatible video stream need to be encoded by the same video codec. Accordingly, both video streams need to be compress-encoded in, for example, the MPEG-4 MVC format, which is a scalable video encoding format revised from the MPEG-4 AVC.

If both video streams are encoded in this way, the compatibility with normal playback devices that have already been popular in the market is lost. In view of this, it is difficult to adopt the structure illustrated in the lower portion of FIG. 71.

On the other hand, as explained earlier, the present embodiment realizes playback of high-resolution video by a high-resolution playback device, by realizing the inter-view reference between video streams that have been compress-encoded by different codecs, while maintaining playback compatibility with normal playback devices that have already been popular in the market. Furthermore, the extended video stream is structured to have a low bit rate, reducing the bandwidth that is required for transferring the streams.

<4-6. Modifications of Present Embodiment>

(1) The contents of Embodiment 1 and the modifications are also applied to the present embodiment as long as the contents do not contradict the structure and the like of the present embodiment.

(2) The switch setting method of Embodiment 2 illustrated in FIG. 58 can be adopted as the method of setting switches depending on the playback format of the playback device in the present embodiment, by replacing "high-definition" with "high-resolution".

(3) In the present embodiment, a multi-view video encoding format is used to make a high-resolution video based on the 2D compatible video stream. However, a scalable video encoding format is also applicable, with the same structure. In this case, the extended multi-view video decoder of the playback device 7923 may be replaced with an extended scalable video decoder, and the decoding result of the 2D compatible video stream may be replaced with the decoding result of the base-view video stream, without scaling.

(4) In the present embodiment, a multi-view video encoding format is used to make a high-resolution video based on the 2D compatible video stream. However, a Side-by-Side 3D video may be converted into a Full HD 3D video by increasing the resolution.

Figure 81:
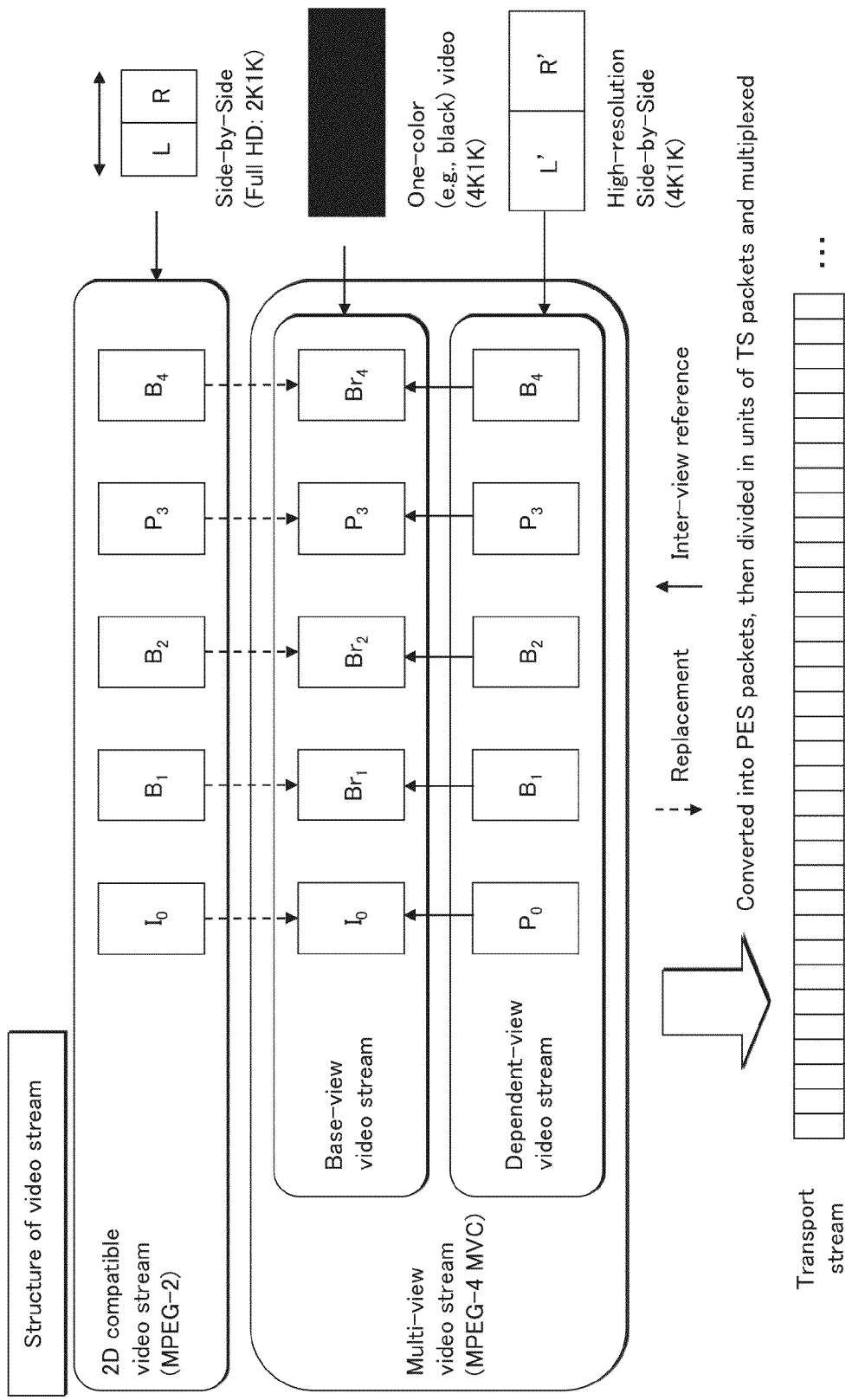
FIG. 81 illustrates the data structure in a modification of Embodiment 4.

FIG. 81 illustrates the stream structure in the present modification.

The 2D compatible video stream is obtained by compress-encoding Side-by-Side 3D video using an encoding format for the 2D compatible video stream. One example of the resolution of the Side-by-Side 3D video is Full HD resolution. The base-view video stream included in the multi-view video stream is obtained by compress-encoding a black video by a codec for multi-view video at a low bit rate. The dependent-view video stream is obtained by compress-encoding a high-resolution 4K1K Side-By-Side video. In this case, the dependent-view video stream is compressed by inter-view reference, but the pictures referenced by the inter-view reference are not the pictures having the same value of presentation time (PTS) of the base-view video stream, but pictures that have been up-converted to 4K1K from the decoded pictures having the same value of presentation time (PTS) of the 2D compatible video stream.

As described in the present embodiment, a video decoder that plays back the video stream replaces decoded pictures of the base-view video stream with the result of scaling decoded pictures of the 2D compatible video stream that have the same value of presentation time. The video decoder then decodes the pictures of the dependent-view video stream having the same value of presentation time by referencing the replaced pictures. With this structure, the dependent-view video stream can be decoded by referencing pictures of 4K1K video up-converted from "decoded pictures of the 2D compatible video stream", thus realizing a low bit rate.

Figure 82:
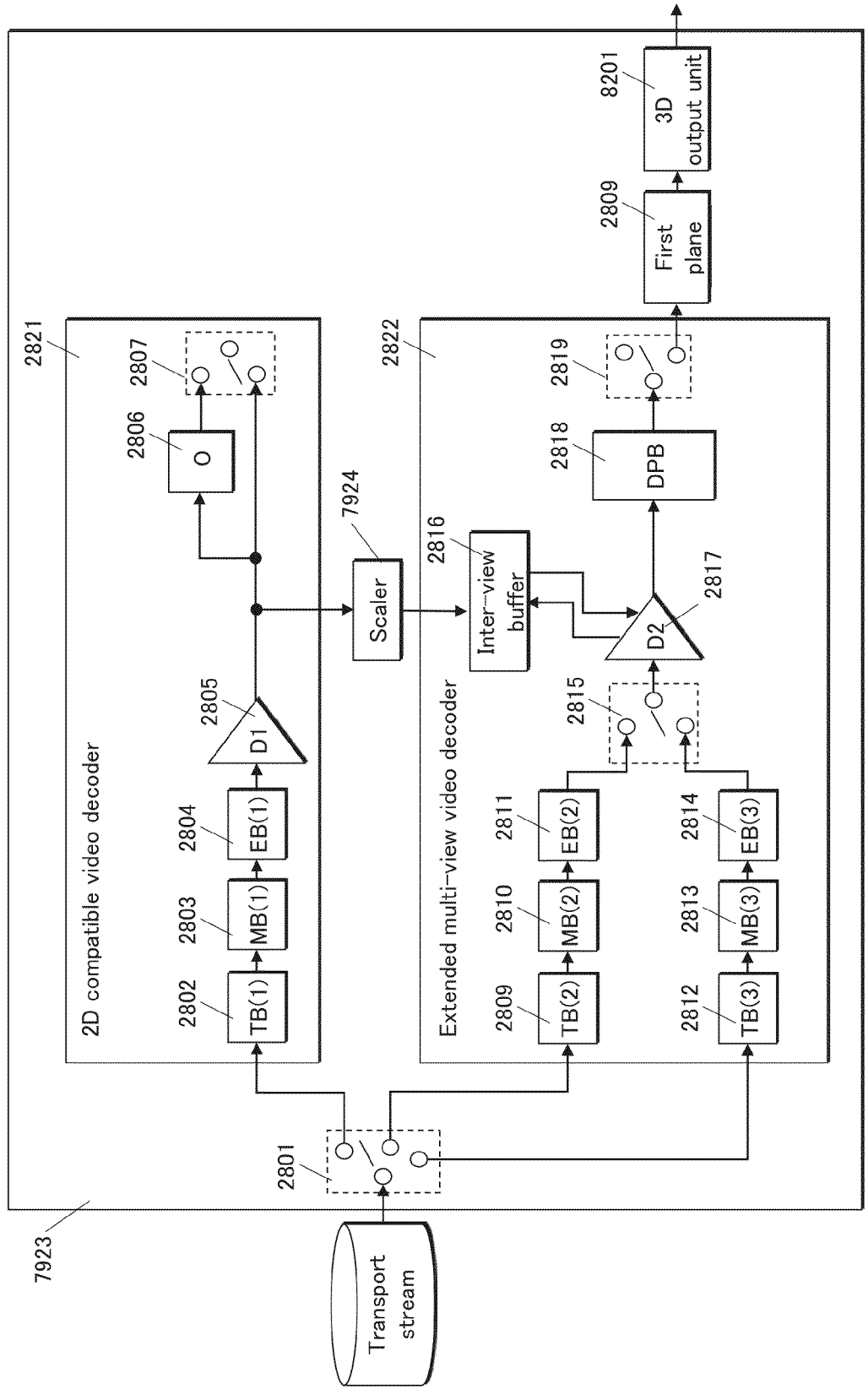
FIG. 82 illustrates the structure of the playback device in a modification of Embodiment 4.

FIG. 82 illustrates the structure of a 3D video playback device in the present modification.

While this structure differs little from the playback device in the present embodiment, a 3D output unit 8201 has been added. The 3D output unit 8201 extracts a left-eye video and a right-eye video from the first plane 2809 in which the 4K1K high-resolution Side-by-Side video has been output, and outputs the extracted left-eye and right-eye videos to a television or the like.

(5) A format for converting a Side-by-Side 3D video into a Full HD 3D video is not limited to the format of the modification (4), but a different format may be adopted.

Figure 83:
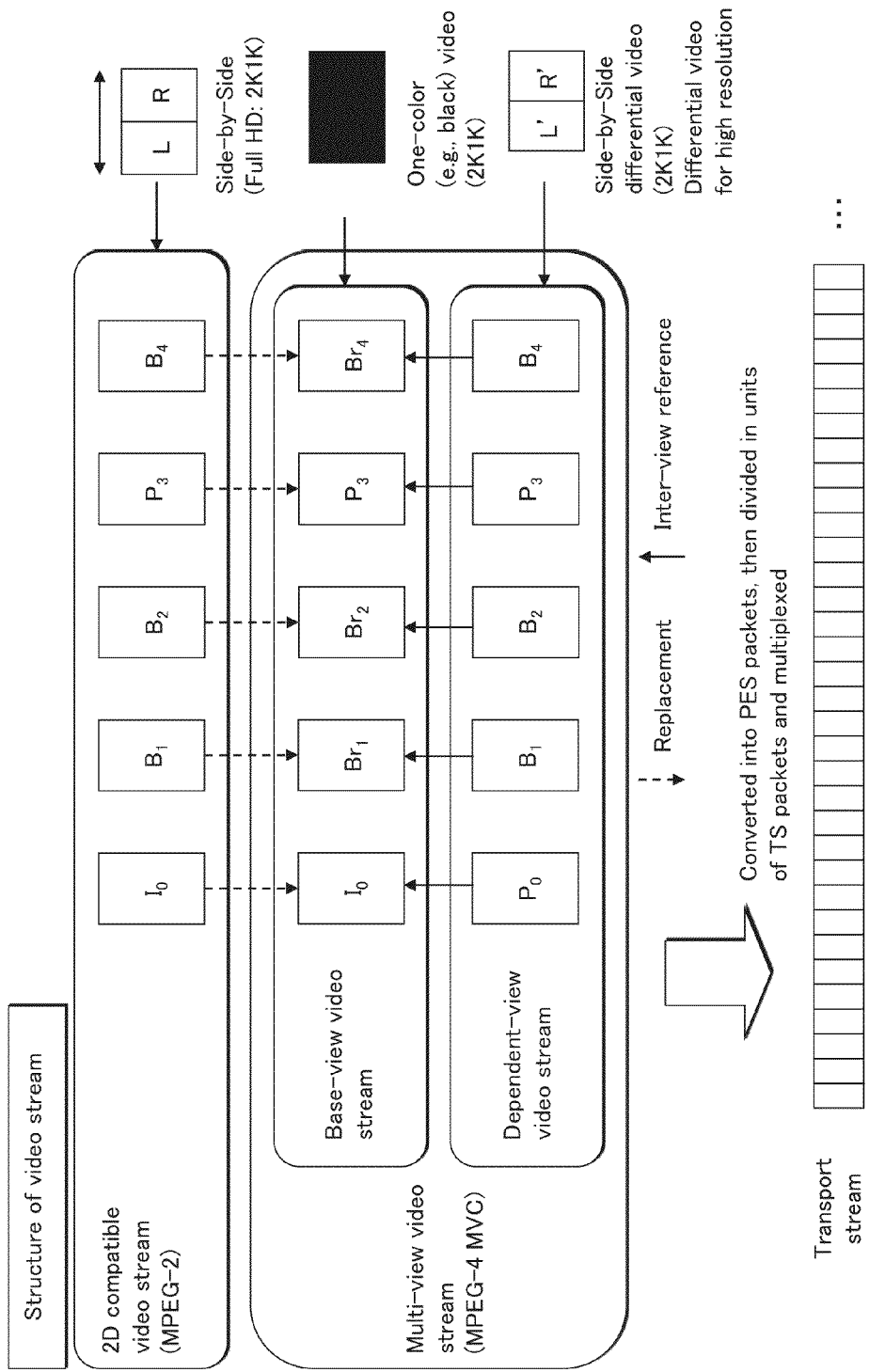
FIG. 83 illustrates the data structure in a modification of Embodiment 4.

FIG. 83 illustrates the structure of video streams in the present modification.

The 2D compatible video stream is obtained by compress-encoding Side-by-Side 3D video using an encoding format for the 2D compatible video stream. One example of the resolution of the Side-by-Side 3D video is Full HD resolution. The base-view video stream included in the multi-view video stream is obtained by compress-encoding a black video by a codec for multi-view video at a low bit rate. The dependent-view video stream is obtained by compress-encoding a Full HD Side-By-Side video. The Side-by-Side video is a differential video for making a high-resolution video based on the 2D compatible video stream. For example, when the Side-by-Side video of the 2D compatible video stream is generated by extracting pixels of odd rows from the left-eye and right-eye Full HD videos, the Side-by-Side video of the dependent-view video stream is generated by extracting pixels of even rows from the left-eye and right-eye Full HD videos.

In this case, the dependent-view video stream is compressed by inter-view reference. The pictures referenced by the inter-view reference are not the pictures having the same value of presentation time (PTS) of the base-view video stream, but pictures that have been scaled from the decoded pictures having the same value of presentation time (PTS) of the 2D compatible video stream.

On the other hand, on the playback side, as described in the present embodiment, a video decoder that plays back the video stream replaces the decoded pictures of the base-view video stream with the decoded pictures having the same value of presentation time of the 2D compatible video stream, and decodes pictures of the dependent-view video stream having the same value of presentation time by referencing the replaced pictures. With this structure, the dependent-view video stream can be decoded by referencing "decoded pictures of the 2D compatible video stream", thus realizing a low bit rate.

Figure 84:
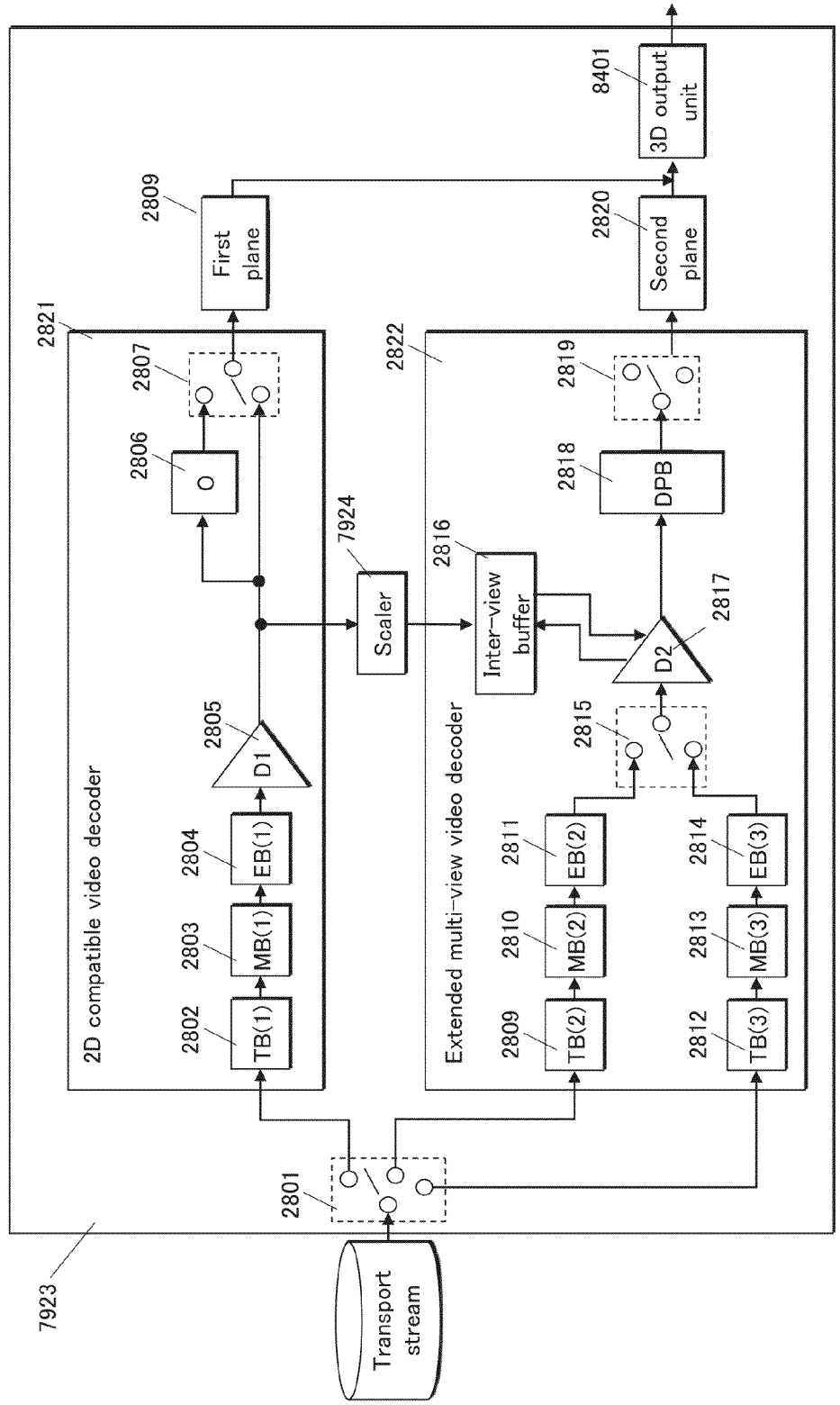
FIG. 84 illustrates the structure of the playback device in a modification of Embodiment 4.

FIG. 84 illustrates the structure of a 3D video playback device in the present modification. While this structure differs little from the playback device in the present embodiment, a 3D output unit 8401 has been added. The 3D output unit 8401 generates a high-resolution Full HD 3D video based on the Side-by-Side video of the 2D compatible video stream stored in the first plane 2809 and the Side-by-Side video of the dependent-view video stream stored in the second plane 2820, and outputs the generated high-resolution Full HD 3D video to a television or the like.

(6) In the above modifications (4) and (5), a Side-by-Side 3D video is used. However, not limited to this, the present invention is applicable to various 3D frame compatible formats such as Top&Bottom and LineByLine. Note that in the Top&Bottom format, left-eye and right-eye videos are respectively compressed in the vertical direction (for example, compressed from 1080 pixels to 540 pixels), and are transmitted in the form where the videos are arranged vertically. In the LineByLine format, the left-eye and right-eye video signals are alternately arranged line by line. In the multi-view encoding format or the scalable encoding format for making high-resolution video in the present embodiment, the method for referencing pictures by the inter-view reference may be changed.

Figure 95:
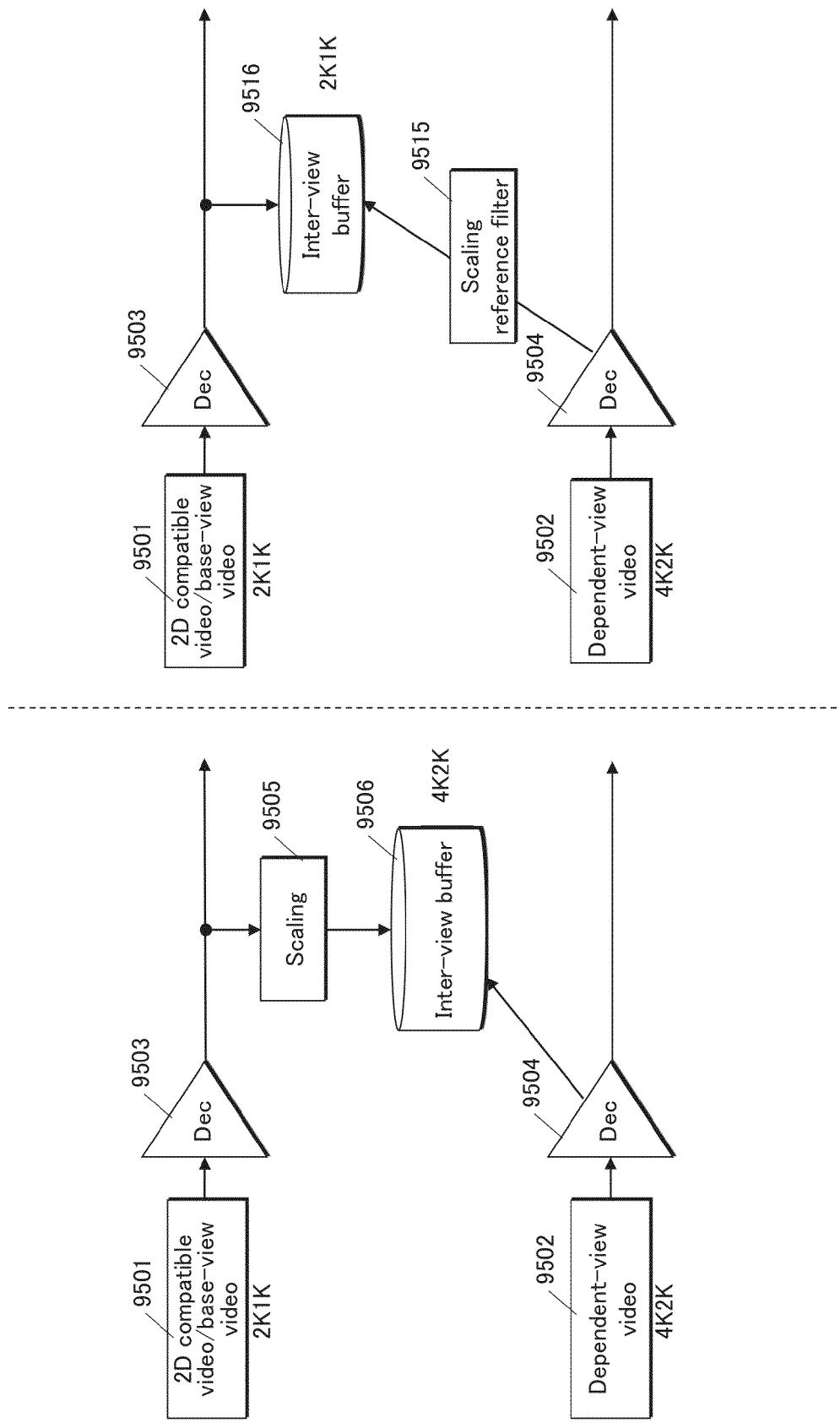
FIG. 95 illustrates the inter-view reference for reducing the amount of memory required for storing reference pictures for the high-definition video.

The left portion of FIG. 95 illustrates the inter-view reference method explained in the present embodiment, and the right portion illustrates an inter-view reference method of the present modification.

In the description with reference to FIG. 95, the 2D compatible video stream or the base-view video stream is assumed to be a Full HD video, and the dependent-view video stream, which is high-resolution, is assumed to be a 4K2K video.

According to the reference method illustrated in the left portion of FIG. 95, the 2D compatible video stream or the base-view video stream (9501) is decoded (9503), and the decoding result is scaled (up-converted) to 4K2K (9505). The resultant pictures are stored in the inter-view reference buffer (9506). When the dependent-view video stream, which is 4K2K, is decoded, the 4K2K decoded pictures stored in the buffer are referenced by the inter-view reference.

On the other hand, according to the reference method of the present modification illustrated in the right portion of FIG. 95, the 2D compatible video stream or the base-view video stream (9501) is decoded (9503). However, the decoded pictures stored in the inter-view reference buffer (9516) have not been up-converted, but still have the Full HD resolution. Further, when the high-resolution 4K2K dependent-view video stream (9502) is decoded, the function of the scaling reference filter (9515) is used to perform the decode process by expanding, in units of macro blocks, the reference area of the decoded pictures of the 2D compatible video stream or the base-view video stream (9501).

With this structure, 2K1K pictures are stored in the inter-view reference buffer (9516), resulting in the reduction of the buffer size necessary for the inter-view reference buffer (and the DPB located in a succeeding portion).

Figure 96:
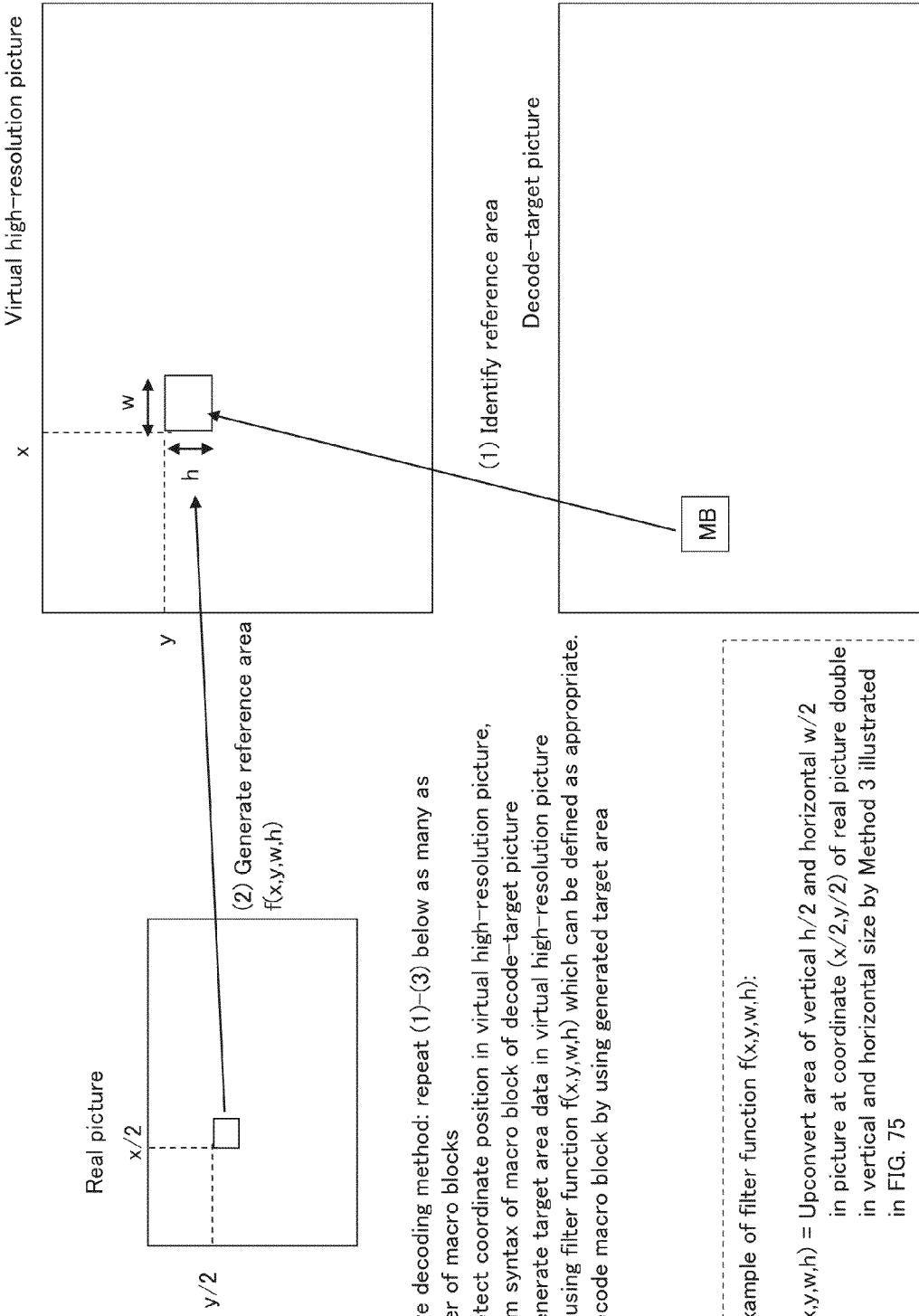
FIG. 96 illustrates the scaling reference filter.

FIG. 96 illustrates specific procedures of the scaling reference filter.

When decoding the dependent-view video stream, areas of the reference picture are identified in units of macroblocks based on the syntax of motion vectors and the like, and decoding is performed by referencing the areas. This reference method includes steps (1) through (3) in FIG. 96. First in (1), a target area (coordinates (x, y) and area size (w, h)) of a high-resolution picture to be referenced by a macroblock is identified. Then in (2), the target area of a virtual high-resolution picture is generated using a filter function. A plurality of filter functions may be provided, with selection of a filter function appropriate for the capabilities of the playback device. As one example of the filter function, function f(x,y,w,h) is provided in a block encircled by a dotted line in FIG. 96. In this example, the filter function f(x, y, w, h) is defined as up-converting an area of vertical h/2 and horizontal w/2 in a picture at coordinate (x/2,y/2) of real picture double in vertical and horizontal size by Method 3 illustrated in FIG. 75. This makes it possible to generate a target area in a virtual high-resolution picture by substituting values for x, y, w, and h.

In (3), the macroblock is decoded by referencing the target area in the virtual high-resolution picture.

The function and the like in FIG. 96 are only provided for the sake of explanation. The actual reference method and filter function may be chosen in accordance with rules for the encoding method of each video stream.

(8) In the present embodiment, the base-view video stream is generated by compress-encoding one-color (e.g., black) images. However, not limited to this, the base-view video stream may be generated by compress-encoding a differential video (representing differences between a 4k2k original high-resolution video and a 4k2k video obtained by up-converting decoded pictures of the Full HD 2D compatible video stream) which is used to make the 2D compatible video stream high-definition.

Figure 91:
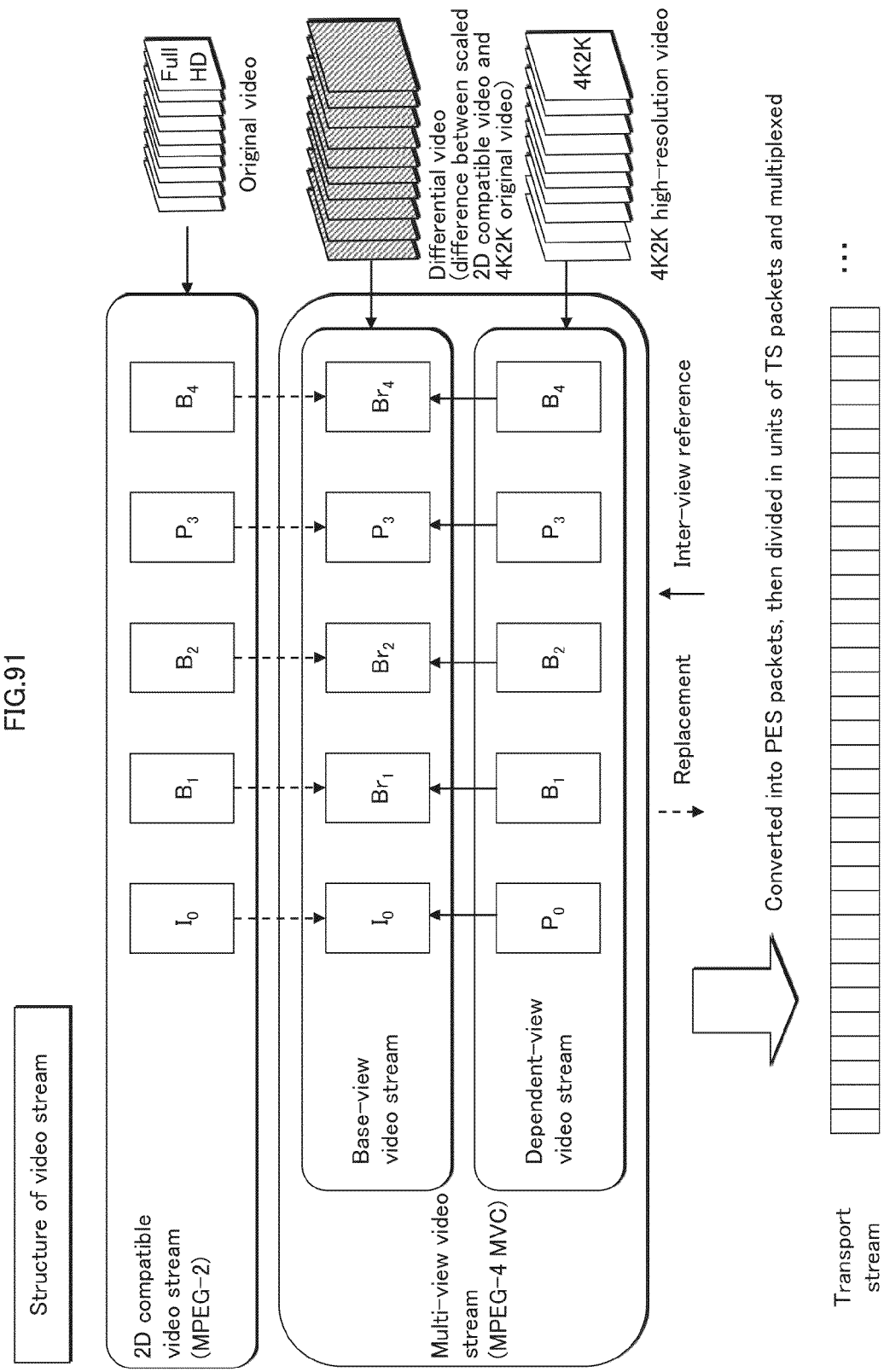
FIG. 91 illustrates the data structure in a modification of Embodiment 4.

FIG. 91 illustrates the structure of video streams in the present modification.

The method for generating and compositing the differential video has already been explained with reference to FIG. 89. The present modification differs from the method in that the differential video is generated by up-converting decoded pictures (2K1K) of the 2D compatible video into 4K2K, before the differences between the original video (4K2K) and the decoded pictures (2K1K) of the 2D compatible video are calculated.

In the data creation device, the base-view video encoder generates the base-view video stream by compress-encoding the differential video between the 4K2K original high-resolution video and the decoded pictures of the 2D compatible video stream; and the dependent-view video encoder generates the dependent-view video stream by referencing pictures of a "high-definition high-resolution 2D video" that is generated by compositing the "differential video" with "high-resolution 4K2K pictures up-converted from Full HD decoded pictures of the 2D compatible video stream".

In the playback device, the base-view video decoder transfers the decoded pictures to the 2D compatible video decoder, and the 2D compatible video decoder performs a process of compositing the differential video with pictures up-converted from the decoded pictures of the 2D compatible video stream and uses the composited pictures when decoding the dependent-view video stream.

This structure provides higher definition to the high-resolution video described in Embodiment 4.

(9) Embodiments 1 to 4 have in common that the playback device includes a 2D compatible video decoder and a multi-view video decoder. As a result, one playback device may be structured to perform, by switching, the playback processes described in Embodiments 1 to 4.

In this case, video streams for Embodiments 1 to 4 may be contained in the same transport stream in units of scenes. In this case, the data creation device 7701 may record a playback format determination descriptor in the PMT or the supplementary data of video stream or the like, wherein the playback format determination descriptor is used to determine which playback format of which embodiment is used in each scene.

FIG. 85 illustrates the structure of the playback format determination descriptor.

The playback format determination descriptor stores a 3D playback flag, a high-definition flag, a high-color-depth flag, and a high-resolution flag. If any of the flags is TRUE, information corresponding to the flag is further stored. For example, the playback format determination descriptor stores a 3D playback information descriptor when the 3D playback flag is TRUE, a high-definition information descriptor when the high-definition flag is TRUE, a high-color-depth information descriptor when the high-color-depth flag is TRUE, and a high-resolution information descriptor when the high-resolution flag is TRUE. By using such information, the playback device can change the internal state to select a playback method of any of the above-described embodiments for adoption and execute the process.

5. Modifications

Although the present invention has been fully described by way of examples with reference to the accompanying drawings, the present invention is not limited to the data creation device and playback device described in the above embodiments, but the data creation device and playback device can be modified, for example, as follows.

(1) The following describes structures and effects of a data creation device as a video encoding device in one embodiment of the present invention and a playback device as a video playback device in one embodiment of the present invention.

According to one aspect of the present invention, there is provided a video encoding device, comprising: a first encoding unit configured to generate a video stream conforming to MPEG-2 format by compress-encoding a first video of a first quality converted from an original video; a second encoding unit configured to generate a base-view video stream and a dependent-view video stream both conforming to MPEG-4 MVC format that allows for an inter-view reference; and an outputting unit configured to output the video streams generated by the first encoding unit and the second encoding unit, wherein the second encoding unit generates, as the base-view video stream, a video stream that is dummy data including the same number of pictures as, and having less total data amount than, the video stream generated by compress-encoding the first video, and generates the dependent-view video stream by compress-encoding a second video by using, as reference pictures, pictures included in the video stream conforming to the MPEG-2 format that have the same time information as pictures included in the base-view video stream and corresponding to pictures constituting the second video, the second video being of a second quality higher than the first quality and being converted from the original video.

In the above-described video encoding device, when generating the video streams conforming to the MPEG-4 MVC format, the second encoding unit may insert information indicating that the reference pictures are included in the video stream conforming to the MPEG-2 format, into the video streams conforming to the MPEG-4 MVC format.

With the above-described structure, the playback side can play back the dependent-view video stream by referencing pictures included in the stream conforming to the MPEG-2 format.

In the above-described video encoding device, the second encoding unit may select, as the reference pictures, pictures having the same values of PTS (Presentation Time Stamp) as the pictures included in the base-view video stream that correspond to the pictures constituting the second video, from among pictures constituting the video stream conforming to the MPEG-2 format.

With the above-described structure, the playback side can reference the PTS to identify pictures to be referenced, among the pictures constituting the stream conforming to the MPEG-2 format.

In the above-described video encoding device, the first encoding unit and the second encoding unit may compress-encode the first video and the second video at the same aspect ratio, and insert information indicating the aspect ratio into the video streams generated thereby.

With the above-described structure, the playback side can identify the aspect ratios of the first video and the second video.

In the above-described video encoding device, the second encoding unit may use, as the dummy data, a group of pictures that have no change over time.

In the above-described video encoding device, the second encoding unit may use, as the group of pictures that have no change over time, a group of one-color images.

With the above-described structure, it is possible to reduce the amount of information of the base-view video stream to be lower than that of conventional technologies.

In the above-described video encoding device, the second video may represent the original video by a higher bit rate than the first video, and the second encoding unit may compress-encode information indicating a difference in bit rate between pictures that correspond to each other, to generate the dependent-view video stream.

With the above-described structure, it is possible to compress-encode video having a bit rate higher than a predetermined bit rate, restricting increase of the required amount of data compared with conventional technologies, while maintaining playback compatibility of video having the predetermined bit rate with playback devices conforming to the MPEG-2 standard.

In the above-described video encoding device, the second video may represent the original video by a higher color depth than the first video, each picture may have color depth information indicating color depths of pixels constituting that picture, and the second encoding unit may compress-encode a difference in the color depth information between pictures that correspond to each other, to generate the dependent-view video stream.

With the above-described structure, it is possible to compress-encode video having a color depth higher than a predetermined color depth, restricting increase of the required amount of data compared with conventional technologies, while maintaining playback compatibility of video having the predetermined color depth with playback devices conforming to the MPEG-2 standard.

In the above-described video encoding device, the second video may represent the original video by a higher resolution than the first video, and the second encoding unit uses, as the reference pictures, the pictures included in the video stream conforming to the MPEG-2 format that have been converted to a resolution of the second video.

With the above-described structure, it is possible to compress-encode video having a resolution higher than a predetermined resolution, restricting increase of the required amount of data compared with conventional technologies, while maintaining playback compatibility of video having the predetermined resolution with playback devices conforming to the MPEG-2 standard.

In the above-described video encoding device, the first video may represent the original video in an interlace format, the second video may represent the original video in a progressive format, and when the second encoding unit is to use top-field pictures and bottom-field pictures as the reference pictures, the second encoding unit may convert the top-field pictures and the bottom-field pictures to the resolution of the second video.

With the above-described structure, it is possible to compress-encode video in the progressive format, restricting increase of the required amount of data compared with conventional technologies, while maintaining playback compatibility of video in the interlace format with playback devices conforming to the MPEG-2 standard.

In the above-described video encoding device, the second encoding unit may use, as the second video, one of a third video that represents the original video by a higher bit rate than the first video, a fourth video that represents the original video by a higher color depth than the first video, and a fifth video that represents the original video by a higher resolution than the first video, and includes a descriptor, which indicates which of the third video, the fourth video, and the fifth video is used as the second video, into at least one of the base-view video stream and the dependent-view video stream.

With the above-described structure, the playback side can identify, as the second video, one of a video that represents the original video by a higher bit rate than the first video, a video that represents the original video by a higher color depth than the first video, and a video that represents the original video by a higher resolution than the first video.

According to another aspect of the present invention, there is provided a video encoding method, comprising: a first encoding step of generating a video stream conforming to MPEG-2 format by compress-encoding a first video of a first quality converted from an original video; a second encoding step of generating a base-view video stream and a dependent-view video stream both conforming to MPEG-4 MVC format that allows for an inter-view reference; and an outputting step of outputting the video streams generated in the first encoding step and the second encoding step, wherein the second encoding step generates, as the base-view video stream, a video stream that is dummy data including the same number of pictures as, and having less total data amount than, the video stream generated by compress-encoding the first video, and generates the dependent-view video stream by compress-encoding a second video by using, as reference pictures, pictures included in the video stream conforming to the MPEG-2 format that have the same time information as pictures included in the base-view video stream and corresponding to pictures constituting the second video, the second video being of a second quality higher than the first quality and being converted from the original video.

According to still another aspect of the present invention, there is provided a video encoding program for causing a computer to function as a video encoding device, the video encoding program causing the computer to function as: a first encoding unit configured to generate a video stream conforming to a MPEG-2 format by compress-encoding a first video of a first quality converted from an original video; a second encoding unit configured to generate a base-view video stream and a dependent-view video stream both conforming to MPEG-4 MVC format that allows for an inter-view reference; and an outputting unit configured to output the video streams generated by the first encoding unit and the second encoding unit, wherein the second encoding unit generates, as the base-view video stream, a video stream that is dummy data including the same number of pictures as, and having less total data amount than, the video stream generated by compress-encoding the first video, and generates the dependent-view video stream by compress-encoding a second video by using, as reference pictures, pictures included in the video stream conforming to the MPEG-2 format that have the same time information as pictures included in the base-view video stream and corresponding to pictures constituting the second video, the second video being of a second quality higher than the first quality and being converted from the original video.

With the above-described structure, the video encoding device can compress-encode the video of the second quality higher than the first quality, restricting increase of the required amount of data compared with conventional technologies, while maintaining playback compatibility of the video of the first quality, with playback devices conforming to the MPEG-2 standard.

According to a further aspect of the present invention, there is provided a video playback device for obtaining video streams output from the aforementioned video encoding device and decoding and playing back the obtained video streams, the video playback device comprising: a first decoding unit configured to decode the video stream conforming to the MPEG-2 format; a second decoding unit configured to decode the base-view video stream, and decode the dependent-view video stream by using, as reference pictures, pictures included in the video stream having been decoded by the first decoding unit that have the same time information as the pictures included in the base-view video stream that correspond to pictures constituting the dependent-view video stream; and a playback unit configured to play back the second video that is obtained by the second decoding unit.

According to a still further aspect of the present invention, there is provided a video playback method for obtaining video streams output by the aforementioned video encoding method and decoding and playing back the obtained video streams, the video playback method comprising: a first decoding step of decoding the video stream conforming to the MPEG-2 format; a second decoding step of decoding the base-view video stream, and decoding the dependent-view video stream by using, as reference pictures, pictures included in the video stream having been decoded in the first decoding step that have the same time information as the pictures included in the base-view video stream that correspond to pictures constituting the dependent-view video stream; and a playback step of playing back the second video that is obtained in the second decoding step.

According to a still further aspect of the present invention, there is provided a video playback program for causing a computer to function as a video playback device for obtaining video streams output from the aforementioned video encoding device and decoding and playing back the obtained video streams, the video playback program causing the computer to function as: a first decoding unit configured to decode the video stream conforming to the MPEG-2 format; a second decoding unit configured to decode the base-view video stream, and decode the dependent-view video stream by using, as reference pictures, pictures included in the video stream having been decoded by the first decoding unit that have the same time information as the pictures included in the base-view video stream that correspond to pictures constituting the dependent-view video stream; and a playback unit configured to play back the second video that is obtained by the second decoding unit.

With the above-described structure, it is possible to decode and play back the compress-encoded video stream of the second quality higher than the first quality, restricting increase of the required amount of data compared with conventional technologies, while maintaining playback compatibility of the video of the first quality with playback devices conforming to the MPEG-2 standard.

(2) Part or all of the structural elements constituting any of the above-described devices may be implemented in one system LSI. The system LSI is an ultra multi-functional LSI that is manufactured by integrating a plurality of components on one chip. More specifically, the system LSI is a computer system that includes a microprocessor, ROM (Read Only Memory), RAM (Random Access Memory) and the like. A computer program is stored in the RAM. The microprocessor operates in accordance with the computer program, thereby enabling the system LSI to realize its functions.

Although the term "LSI" is used here, it may be called IC (Integrated Circuit), system LSI, super LSI, ultra LSI or the like, depending on the level of integration.

Also, an integrated circuit may not necessarily be manufactured as an LSI, but may be realized by a dedicated circuit or a general-purpose processor. It is also possible to use the FPGA (Field Programmable Gate Array), with which a programming is available after the LSI is manufactured, or the reconfigurable processor that can re-configure the connection or setting of the circuit cells within the LSI.

Furthermore, a technology for an integrated circuit that replaces the LSI may appear in the near future as the semiconductor technology improves or branches into other technologies. In that case, the new technology may be incorporated into the integration of the functional blocks.

(3) Each of the above-described devices may be a computer system that includes a microprocessor, ROM, RAM, and hard disk unit. A computer program is stored in the RAM or the hard disk unit. The microprocessor operates in accordance with the computer program, thereby enabling that device to realize its functions. The computer program mentioned above is composed of a plurality of instruction codes which each instructs the computer to realize a predetermined function.

(4) The present invention may be a method representing the procedure of any of the above-described processes. The present invention may be a computer program that allows a computer to realize the method, or may be a digital signal representing the computer program.

Furthermore, the present invention may be a computer-readable recording medium such as a flexible disk, a hard disk, CD-ROM, MO, DVD, DVD-ROM, DVD-RAM, BD (Blu-ray Disc), or a semiconductor memory, that contains the computer program or the digital signal recorded thereon. Furthermore, the present invention may be the computer program or the digital signal recorded on any of the above-mentioned recording mediums.

Furthermore, the present invention may be the computer program or the digital signal transmitted via an electric communication line, a wireless or wired communication line, a network of which the Internet is representative, or a data broadcast.

(5) The present invention may be any combination of the above-described embodiments and modifications.

INDUSTRIAL APPLICABILITY

The video encoding device and the video playback device of the present invention are preferable as devices included in a system for encoding high-grade-quality video and transmitting and playing back the encoded high-grade-quality video, while maintaining playback compatibility with playback devices conforming to the MPEG-2 standard.

REFERENCE SIGNS LIST 2602 2D compatible video encoder
2603 2D compatible video decoder
2604 extended multi-view video encoder
2605 base-view video encoder
2606 2D compatible video encoding information
2607 base-view video encoding information
2608 2D compatible video frame memory
2609 dependent-view video encoder
2610 multiplexer
2801 PID filter
2802 TB(1)
2803 MB(1)
2804 EB(1)
2805 2D compatible video decoder
2806 O (re-ordering buffer)
2807 switch
2808 first plane
2809 TB(2)
2810 MB(2)
2811 EB(2)
2812 TB(3)
2813 MB(3)
2814 EB(3)
2815 decode switch
2816 inter-view reference buffer
2817 multi-view video decoder
2818 DPB
2819 output plane switch
2820 second plane
2821 2D compatible video decoder
2822 extended multi-view video decoder
5401 data creation device
5404 extended multi-view video encoder
5409 dependent-view video encoder
5623 playback device

The invention claimed is:

1. A video encoding device, comprising:
a first encoder configured to generate a video stream conforming to a first encoding format by compress-encoding a first video of a first quality converted from an original video;
a second encoder configured to generate a base-view video stream and a dependent-view video stream both conforming to a second encoding format that allows for an inter-view reference; and
an outputter configured to output the video streams generated by the first encoder and the second encoder,
wherein the second encoder generates, as the base-view video stream, a video stream that is dummy data including the same number of pictures as the video stream generated by compress-encoding the first video, and
generates the dependent-view video stream by compress-encoding a second video by using, as reference pictures, pictures included in the video stream conforming to the first encoding format that have the same time information as pictures included in the base-view video stream and corresponding to pictures constituting the second video, the second video being of a second quality higher than the first quality and being converted from the original video.

2. The video encoding device of claim 1, wherein
when generating the video streams conforming to the second encoding format, the second encoder inserts information indicating that the reference pictures are included in the video stream conforming to the first encoding format, into the video streams conforming to the second encoding format.

3. The video encoding device of claim 2, wherein
the second encoder selects, as the reference pictures, pictures having the same values of PTS (Presentation Time Stamp) as the pictures included in the base-view video stream that correspond to the pictures constituting the second video, from among pictures constituting the video stream conforming to the first encoding format.

4. The video encoding device of claim 2, wherein
the first encoder and the second encoder compress-encode the first video and the second video at the same aspect ratio, and insert information indicating the aspect ratio into the video streams generated thereby.

5. The video encoding device of claim 1, wherein
the second encoder uses, as the dummy data, a group of pictures that have no change over time.

6. The video encoding device of claim 1, wherein
the second encoder uses, as the group of pictures that have no change over time, a group of one-color images.

7. The video encoding device of claim 1, wherein
the second video represents the original video by a higher bit rate than the first video, and
the second encoder compress-encodes information indicating a difference in bit rate between pictures that correspond to each other, to generate the dependent-view video stream.

8. The video encoding device of claim 1, wherein
the second video represents the original video by a higher color depth than the first video,
each picture has color depth information indicating color depths of pixels constituting that picture, and
the second encoder compress-encodes a difference in the color depth information between pictures that correspond to each other, to generate the dependent-view video stream.

9. The video encoding device of claim 1, wherein
the second video represents the original video by a higher resolution than the first video, and
the second encoder uses, as the reference pictures, the pictures included in the video stream conforming to the first encoding format that have been converted to a resolution of the second video.

10. The video encoding device of claim 9, wherein
the first video represents the original video in an interlace format,
the second video represents the original video in a progressive format, and
when the second encoder is to use top-field pictures and bottom-field pictures as the reference pictures, the second encoder converts the top-field pictures and the bottom-field pictures to the resolution of the second video.

11. The video encoding device of claim 1, wherein
the second encoder uses, as the second video, one of a third video that represents the original video by a higher bit rate than the first video, a fourth video that represents the original video by a higher color depth than the first video, and a fifth video that represents the original video by a higher resolution than the first video, and includes a descriptor, which indicates which of the third video, the fourth video, and the fifth video is used as the second video, into at least one of the base-view video stream and the dependent-view video stream.

12. A video encoding method, comprising:
a first encoding step of generating a video stream conforming to a first encoding format by compress-encoding a first video of a first quality converted from an original video;
a second encoding step of generating a base-view video stream and a dependent-view video stream both conforming to a second encoding format that allows for an inter-view reference; and
an outputting step of outputting the video streams generated in the first encoding step and the second encoding step,
wherein the second encoding step generates, as the base-view video stream, a video stream that is dummy data including the same number of pictures as the video stream generated by compress-encoding the first video, and
generates the dependent-view video stream by compress-encoding a second video by using, as reference pictures, pictures included in the video stream conforming to the first encoding format that have the same time information as pictures included in the base-view video stream and corresponding to pictures constituting the second video, the second video being of a second quality higher than the first quality and being converted from the original video.

13. A non-transitory computer-readable recording medium storing a video encoding program for causing a computer to function as a video encoding device, the video encoding program causing the computer to function as:

a first encoder configured to generate a video stream conforming to a first encoding format by compress-encoding a first video of a first quality converted from an original video;
a second encoder configured to generate a base-view video stream and a dependent-view video stream both conforming to a second encoding format that allows for an inter-view reference; and
an outputter configured to output the video streams generated by the first encoder and the second encoder,
wherein the second encoder generates, as the base-view video stream, a video stream that is dummy data including the same number of pictures as the video stream generated by compress-encoding the first video, and
generates the dependent-view video stream by compress-encoding a second video by using, as reference pictures, pictures included in the video stream conforming to the first encoding format that have the same time information as pictures included in the base-view video stream and corresponding to pictures constituting the second video, the second video being of a second quality higher than the first quality and being converted from the original video.

14. A video playback device for obtaining video streams output from the video encoding device defined in claim 1 and decoding and playing back the obtained video streams, the video playback device comprising:
a first decoder configured to decode the video stream conforming to the first encoding format;
a second decoder configured to decode the base-view video stream, and decode the dependent-view video stream by using, as reference pictures, pictures included in the video stream having been decoded by the first decoder that have the same time information as the pictures included in the base-view video stream that correspond to pictures constituting the dependent-view video stream; and
a video player configured to play back the second video that is obtained by the second decoder.

15. A video playback method for obtaining video streams output by the video encoding method defined in claim 12 and decoding and playing back the obtained video streams, the video playback method comprising:
a first decoding step of decoding the video stream conforming to the first encoding format;
a second decoding step of decoding the base-view video stream, and decoding the dependent-view video stream by using, as reference pictures, pictures included in the video stream having been decoded in the first decoding step that have the same time information as the pictures included in the base-view video stream that correspond to pictures constituting the dependent-view video stream; and
a playback step of playing back the second video that is obtained in the second decoding step.

16. A non-transitory computer-readable recording medium storing video playback program for causing a computer to function as a video playback device for obtaining video streams output from the video encoding device defined in claim 1 and decoding and playing back the obtained video streams, the video playback program causing the computer to function as:
a first decoder configured to decode the video stream conforming to the first encoding format;
a second decoder configured to decode the base-view video stream, and decode the dependent-view video stream by using, as reference pictures, pictures included in the video stream having been decoded by the first decoder that have the same time information as the pictures included in the base-view video stream that correspond to pictures constituting the dependent-view video stream; and
a video player configured to play back the second video that is obtained by the second decoder.

* * * * *